US00RE45358E

(19) United States
(12) Reissued Patent
Marumoto

(10) Patent Number: US RE45,358 E
(45) Date of Reissued Patent: Feb. 3, 2015

(54) DATA PROCESSING METHOD, DATA PROCESSING APPARATUS, MASK GENERATION METHOD, AND MASK PATTERN

(75) Inventor: Yoshitomo Marumoto, Kawasaki (JP)

(73) Assignee: Canon Kabushiki Kaisha, Tokyo (JP)

(21) Appl. No.: 13/293,809

(22) Filed: Nov. 10, 2011

Related U.S. Patent Documents

Reissue of:
(64) Patent No.: 7,614,713
Issued: Nov. 10, 2009
Appl. No.: 11/566,855
Filed: Dec. 5, 2006

U.S. Applications:
(63) Continuation of application No. PCT/JP2005/012514, filed on Jul. 6, 2005.

(30) Foreign Application Priority Data

Jul. 6, 2004 (JP) ..... 2004-199623
Jul. 6, 2005 (JP) ..... 2005-197873

(51) Int. Cl.
*B41J 29/38* (2006.01)

(52) U.S. Cl.
USPC ..... 347/14; 347/15; 347/43

(58) Field of Classification Search
CPC .. G06K 15/107; B41J 2/2132; B41J 2/04505; B41J 2/5058; H04N 1/4055
USPC ..... 347/14, 15, 19, 43, 41; 358/3.06, 3.13, 358/3.3
See application file for complete search history.

(56) References Cited

U.S. PATENT DOCUMENTS 5,818,474 A 10/1998 Takahashi et al.
6,130,685 A * 10/2000 Matsubara et al. ..... 347/41
(Continued)

FOREIGN PATENT DOCUMENTS

EP 1 080 919 3/2001
JP 7-052390 2/1995
(Continued)

OTHER PUBLICATIONS

Office Action dated Feb. 10, 2012, in Japanese Appln. No. 2009-029169.
(Continued)

*Primary Examiner* — Thinh Nguyen
(74) *Attorney, Agent, or Firm* — Fitzpatrick, Cella, Harper & Scinto

(57) ABSTRACT

The present invention provides a mask for divided printing that completes an image by plural scans using inks of different plural inks, the mask being able to suppress possible grains during printing to reduce image degradation resulting from beading. If for example, among the print permitting pixels for which the total repulsive potential is to be calculated, a print permitting pixel Do has the highest total repulsive potential, changes in repulsive potential after movement of the pixels are determined and the print permitting pixel Do is moved to a pixel having the lowest total repulsive potential after the movement. This processing is repeated to enable a reduction in the total energy of the entire plane. Consequently, the print permitting pixels are appropriately dispersed in overlapping plane masks so as to have few low frequency components.

51 Claims, 86 Drawing Sheets

(56) References Cited

U.S. PATENT DOCUMENTS

| | | | | |
|---|---|---|---|---|
| 6,164,745 | A * | 12/2000 | Nagoshi et al. | 347/15 |
| 6,250,737 | B1 * | 6/2001 | Matsubara et al. | 347/40 |
| 6,447,102 | B1 | 9/2002 | Chen et al. | |
| 6,493,112 | B1 | 12/2002 | Arce et al. | |
| 6,601,939 | B2 * | 8/2003 | Fujita et al. | 347/15 |
| 6,874,864 | B1 | 4/2005 | Maeda et al. | |
| 7,469,985 | B2 * | 12/2008 | Noguchi et al. | 347/15 |
| 2003/0016261 | A1 | 1/2003 | Nitta et al. | |
| 2007/0109604 | A1 | 5/2007 | Marumoto | |
| 2007/0236526 | A1 * | 10/2007 | Noguchi et al. | 347/15 |

FOREIGN PATENT DOCUMENTS

| | | |
|---|---|---|
| JP | 11-150652 | 6/1999 |
| JP | 2002-96455 | 4/2002 |
| JP | 2002-144552 | 5/2002 |
| JP | 2002-307671 | 10/2002 |
| RU | 2 221 701 | 1/2004 |

OTHER PUBLICATIONS

Dooley, Predicting Brightness Appearance At Edges using Linear And Non-Linear Visual Describing Functions, Proc. SPES Annual Meeting, 1975, p. 167.

T. Mitsa et al., "Digital Halftoning Using a Blue Noise Mask", Proceedings of SPIE (The International Society for Optical Engineers) vol. 1452, pp. 47-56 (1991).

Lau, et al., "Blue- and Green-Noise Halftoning Models", IEEE Signal Processing Magazine, Jul. 2003, pp. 28-38.

* cited by examiner

LAYER MASK PATTERN
C1 ONLY

LAYER MASK PATTERN
M1 ONLY

LAYER MASK PATTERN
Y1 ONLY

MASK PATTERN ACCORDING TO
COMPARATIVE EXAMPLE
(DISPERSED MASK ONLY IN SELF PLANE)
C1 ONLY

MASK PATTERN ACCORDING TO
COMPARATIVE EXAMPLE
(RANDOM MASK)
C1 ONLY

LAYER MASK PATTERN
C1 + M1
LOGICAL SUM

LAYER MASK PATTERN
C1 + M1
LOGICAL PRODUCT

LAYER MASK PATTERN
C1 + M1 + Y1
LOGICAL SUM

LAYER MASK PATTERN
C1 + M1 + Y1
LOGICAL PRODUCT

MASK PATTERN ACCORDING TO
COMPARATIVE EXAMPLE
(DISPERSED MASK ONLY IN SELF PLANE)
C1 + M1
LOGICAL SUM

MASK PATTERN ACCORDING TO
COMPARATIVE EXAMPLE
(DISPERSED MASK ONLY IN SELF PLANE)
C1 + M1
LOGICAL PRODUCT

MASK PATTERN ACCORDING TO
COMPARATIVE EXAMPLE
(RANDOM MASK)
C1 + M1
LOGICAL SUM

MASK PATTERN ACCORDING TO
COMPARATIVE EXAMPLE
(RANDOM MASK)
C1 + M1
LOGICAL PRODUCT

DEFINITION OF SUPERPOSING
OF MASK PATTERNS

| | | | |
|---|---|---|---|
| 1 | 0 | 0 | 0 |
| 0 | 0 | 0 | 1 |
| 0 | 1 | 0 | 0 |
| 0 | 0 | 0 | 1 |

| | | | |
|---|---|---|---|
| 0 | 0 | 1 | 0 |
| 0 | 0 | 0 | 0 |
| 0 | 1 | 0 | 0 |
| 0 | 0 | 0 | 0 |

SUPERPOSING

| | | | |
|---|---|---|---|
| 1 | 0 | 1 | 0 |
| 0 | 0 | 0 | 1 |
| 0 | 2 | 0 | 0 |
| 0 | 0 | 0 | 1 |

FIG.27

LAYER MASK PATTERN
C1 + M1
SUPERPOSING

LAYER MASK PATTERN
C1 + M1 + Y1
SUPERPOSING

MASK PATTERN ACCORDING TO
COMPARATIVE EXAMPLE
(DISPERSED MASK ONLY IN SELF PLANE)
C1 + M1
SUPERPOSING

MASK PATTERN ACCORDING TO
COMPARATIVE EXAMPLE
(RANDOM MASK)
C1 + M1
SUPERPOSING

COMPARISON OF DISPLACED MASK PATTERNS
C1 + M1
LOGICAL SUM

COMPARISON OF DISPLACED MASK PATTERNS
C1 + M1
LOGICAL PRODUCT

COMPARISON OF DISPLACED MASK PATTERNS
C1 + M1
SUPERPOSING

MASK CHARACTERISTIC EVALUATION
LAYER MASK PATTERN
C1 ONLY

MASK CHARACTERISTIC EVALUATION
LAYER MASK PATTERN
M1 ONLY

MASK CHARACTERISTIC EVALUATION
LAYER MASK PATTERN
Y1 ONLY

MASK CHARACTERISTIC EVALUATION
LAYER MASK PATTERNS
C1 + M1 + Y1
SUPERPOSING

MASK CHARACTERISTIC EVALUATION
LAYER MASK PATTERNS
C1 + M1 + Y1 + C2 + M2 + Y2
SUPERPOSING

MASK CHARACTERISTIC EVALUATION
LAYER MASK PATTERNS
C1 + M1 + Y1 + C2 + M2 + Y2 + C3 + M3 + Y3
SUPERPOSING

MASK CHARACTERISTIC EVALUATION
(COMPARISON OF DISPLACED MASK PATTERNS)
MASK PATTERNS
C1 + M1 + Y1
SUPERPOSING

MASK CHARACTERISTIC EVALUATION
(COMPARISON OF DISPLACED MASK PATTERNS)
MASK PATTERNS
C1 + M1 + Y1 + C2 + M2 + Y2
SUPERPOSING

MASK CHARACTERISTIC EVALUATION
(COMPARISON OF DISPLACED MASK PATTERNS)
MASK PATTERNS
C1 + M1 + Y1 + C2 + M2 + Y2 + C3 + M3 + Y3
SUPERPOSING

MASK CHARACTERISTIC EVALUATION
LAYER MASK PATTERN
C1 ONLY

MASK CHARACTERISTIC EVALUATION
LAYER MASK PATTERN
M1 ONLY

MASK CHARACTERISTIC EVALUATION
LAYER MASK PATTERN
Y1 ONLY

MASK CHARACTERISTIC EVALUATION
LAYER MASK PATTERNS
C1 + M1
LOGICAL SUM

MASK CHARACTERISTIC EVALUATION
LAYER MASK PATTERNS
C1 + M1
LOGICAL PRODUCT

MASK CHARACTERISTIC EVALUATION
LAYER MASK PATTERNS
C1 + M1
SUPERPOSING

MASK CHARACTERISTIC EVALUATION
LAYER MASK PATTERNS
C1 + M1 + Y1
SUPERPOSING

MASK CHARACTERISTIC EVALUATION
LAYER MASK PATTERNS
(DISPLACED MASK PATTERNS)
C1 + M1
LOGICAL SUM

MASK CHARACTERISTIC EVALUATION
LAYER MASK PATTERNS
(DISPLACED MASK PATTERNS)
C1 + M1
LOGICAL PRODUCT

MASK CHARACTERISTIC EVALUATION
LAYER MASK PATTERNS
(DISPLACED MASK PATTERNS)
C1 + M1
SUPERPOSING

MASK CHARACTERISTIC EVALUATION
LAYER MASK PATTERNS
(DISPLACED MASK PATTERNS)
C1 + M1 + Y1
SUPERPOSING

POWER SPECTRA:
COMPARISON OF DISPLACED MASK PATTERNS
LOGICAL SUM

CONCEPTUAL DRAWING OF 150% MASK

CONCEPTUAL DRAWING OF CLUSTER MASK

DATA PROCESSING METHOD, DATA PROCESSING APPARATUS, MASK GENERATION METHOD, AND MASK PATTERN

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

This application is a *reissue of U.S. Pat. No. 7,614,713, issued on Nov. 10, 2009, which is hereby incorporated by reference, as if fully set forth herein. U.S. Pat. No. 7,614,713 matured from U.S. application Ser. No. 11/566,855, filed Dec. 5, 2006, which is a* continuation application of PCT application No. PCT/JP2005/012514 under 37 Code of Federal Regulations § 1.53 (b) and the said PCT application claims the benefit of Japanese Patent Application Nos. 2004-199623, filed Jul. 6, 2004 and 2005-197873, filed Jul. 6, 2005, which are hereby incorporated by reference herein in their entirety.

BACKGROUND OF THE INVENTION

1. Field of the Invention

The present invention relates to a data processing method, a data processing apparatus, a mask generating method, and a mask pattern, and more specifically, to mask processing or a mask pattern for generating dot print data for dividedly forming ink dots constituting a print image by means of plural scans of a print head.

2. Description of the Related Art

Ink jet printers widely employ what is called a multi-path printing system. The multi-path printing system is a system that dividedly forms ink dots constituting an arbitrary area in an image by means of plural scans of a print head. This system can distribute an uneven density, which results from a variation in ejecting performance such as the direction in which ink is ejected from each nozzle (or ejection opening) or an error in conveyance of a print sheet, into plural scans. This enables high grade images with unnoticeable density unevenness to be printed.

A mask process using a mask pattern (also simply referred to as a "mask") is generally executed for generating dot print data required to dividedly form plural ink dots constituting a print image by means of plural scans. The mask pattern is what arranges pixels that permit printing (hereinafter also referred to as "print permitting pixel") and pixels that do not permit printing (hereinafter also referred to as "print non-permitting pixel") as described below in FIG. 5. The print permitting pixels correspond to black parts in FIG. 5, whereas the print non-permitting pixels correspond to white parts in FIG. 5. The mask patterns may have forms according to various purposes such as adjusting the number of print dots for each of the plural scans and reducing the density unevenness, by creating the arrangement of the print permitting pixels in the mask pattern.

For example, the two types of mask patterns described below are effective on an image quality.

A typical mask pattern is known as a mask pattern based on a Beyer type pattern. However, such mask pattern has regular arrangement of the print permitting pixel and is likely to cause interference with image data. This may disadvantageously degrade image quality.

Thus, Patent Document 2 discloses using the mask pattern in which the print permitting pixels are randomly arranged (hereinafter referred to as a random mask) to prevent interference of the mask with image data from occurring. This serves to solve the above problem.

On the other hand, Patent Document 1 describes that a mask pattern is generated so that arrangement of the print permitting pixels has high dispersiveness and such a highly dispersive mask pattern is used to suppress degradation of images resulting from the deviation of dot formation positions during bidirectional printing. More specifically, the arrangement of the print permitting pixels in the mask described in Patent Document 1 is appropriately dispersed using the concept of a repulsive potential. In other words, this mask pattern is generated so as to avoid arranging dots formed by using this mask pattern close to one another, as mush as possible. Thus, in terms of frequency components, the arrangement of the print permitting pixels has few low-frequency components. With this mask, even if positions of dots formed by bidirectional printing deviate from each other and thereby textures of the mask pattern itself appear significantly in the print image, the textures are difficult to be visible because of their appropriate dispersion.

Patent Document 1: Japanese Patent Application Laid-Open No. 2002-144552

Patent Document 2: Japanese Patent Application Laid-Open No. 7-052390

Patent Document 3: Japanese Patent Laid-Open Application No. 2002-96455

SUMMARY OF THE INVENTION

With their increased operating speeds, increased printing densities, and the increased number of ink types available, recent ink jet printing systems tend to increase the amount of ink applied per unit time or per unit area of a print medium. Thus, a more than ever important problem is beading, in which extra inks that cannot be absorbed by a print medium contact and connect to each other on the medium to cause uneven density in a print image.

To reduce beading, it is important to arrange applied inks at different positions within a short time, as much as possible. To achieve this, it is effective to use different mask patterns for the respective color inks, as much as possible. This makes it possible to reduce the probability of landing of different color inks on the same place.

However, beading cannot be sufficiently reduced simply by using different mask patterns for the respective colors.

FIGS. 86(a) to 86(c) illustrate this problem. These figures show that in a certain scan in multi-path printing, inks land on a print medium in order of cyan, magenta, and yellow. As shown in FIG. 86(a), a cyan ink is ejected first to the print medium in which no ink has landed. At this time, the positions where the cyan inks landed of course are consistent with the arrangement of print permitting pixels of a mask used. Thus before the ink has been completely absorbed by the print medium, cyan ink droplets 10C are present on the print medium in an arrangement consistent with the mask. Then, as shown in FIG. 86(b), a magenta ink is similarly ejected to the print medium at positions consistent with a corresponding mask. Ink droplets 10M are similarly formed before absorption. Here, depending on the relationship between the arrangements of the print permitting pixels in the masks for the cyan and magenta inks, the cyan ink droplets 10C and magenta ink droplets 10M may contact and connect to one another to form ink droplets 10B (shown by x in the figure). Moreover, as shown in FIG. 86(c), a yellow ink is similarly ejected to the print medium at positions consistent with the corresponding mask. Ink droplets 10Y are similarly formed before absorption. Also in this case, depending on the relationship between the arrangements of the print permitting pixels in the masks for the respective inks, connected ink droplets 10B (shown by x in the figure) are formed. As further scans are executed to increase the ratio of ink droplets to pixels, ink droplets may overlap the same pixel to form similar connected ink droplets.

Thus, if sequentially ejected ink droplets are applied to pixels adjacent or close to each other, or to the same pixel, they contact and draw one another by their surface tensions, and then two or three (or more) ink droplets join together to form a large droplet 10B (also referred as grain). Once such a grain is formed, the next ink droplet applied to an adjacent or close position is likely to be drawn to that grain. That is, the first grain grows gradually as a core to become larger. In a particularly uniform image area, such grains are fixed to and spread on the print medium at random positions, and are visible as the beading.

Further, the mask pattern is used to be repeated in two-dimensional directions. The distribution of the grains is thus likely to be perceived by human eyes as textures with a repetitive period of the mask pattern.

These problems cannot be solved by the mask patterns described in Patent Documents 1 and 2. This is because Patent Documents 1 and 2 do not design mask patterns for different colors taking the dispersion among the mask patterns into account.

With masks according to Patent Documents 1 and 2, which do not design masks so that masks for different colors are associated with each other as described above, when the masks for different colors are superposed on each other, the print permitting pixels are not appropriately dispersed, and thus dots are unavoidably located adjacent to each other or overlap each other in images during divided printing (intermediate images).

The present invention is made to solve the above problems. An object of the present invention is to provide a data processing method, a data processing apparatus, a mask generating method, and a mask pattern which enable the reduction of image quality degradation resulting from beading caused by grains that may be formed during divided printing.

The grain is not generated simply by the surface tensions of inks. For example, if liquids that react to each other, for example, ink and a process liquid that coagulates or insolubilizes the ink, are applied during the same scan, contacting droplets are bonded together by a stronger chemical reaction to form grains. Further, if inks of the same color are applied during the same scan, they may be formed into grains. Accordingly, another object of the present invention is to solve problems caused by such grains.

To achieve this object, the present invention provides a method for generating mask patterns that are used to generate image data that causes plural types of dots to be printed by respective scans, said method comprising: a determining step of determining an arrangement of print permitting pixels in each of plural mask patterns corresponding to the plural types of dots, wherein said determining step includes a step of determining an arrangement of the print permitting pixels so that low frequency components that are defined by the arrangement of the print permitting pixels in each of the plural mask patterns decrease together in the plural mask patterns.

Another aspect of the present invention provides a method for generating mask patterns that are used to generate image data that causes plural types of dots to be printed by respective scans, said method comprising: a determining step of determining an arrangement of print permitting pixels in each of plural mask patterns corresponding to the plural types of dots, wherein said determining step includes a step of changing an arrangement of the print permitting pixels in each of the plural mask patterns, and said changing step changes the arrangement of the print permitting pixels in the plural mask patterns so that low frequency components defined by the arrangement of the print permitting pixels decrease.

Yet another aspect of the present invention provides a method for generating mask patterns that are used to generate image data that causes plural types of dots to be printed by respective scans, said method comprising: a determining step of determining an arrangement of print permitting pixels in each of plural mask patterns corresponding to the plural types of dots, wherein said determining step includes a step of changing an arrangement of the print permitting pixels of the plural mask patterns on the basis of a predetermined rule that associates the arrangements of the print permitting pixels in each of the plural mask patterns with one another, and the arrangements of the print permitting pixels after changed by said changing step define fewer low frequency components than that of the arrangements of the print permitting pixels before changing by said changing step.

Still another aspect of the present invention provides a method for generating mask patterns that are used to generate image data that causes plural types of dots to be printed by respective scans, said method comprising: a determining step of determining an arrangement of print permitting pixels in each of plural mask patterns corresponding to the plural types of dots, by changing the arrangement of print permitting pixels in each of plural mask patterns corresponding to the plural types of dots from a first arrangement state to a second arrangement state, wherein an arrangement pattern of the print permitting pixels obtained by calculating a logical product of plural mask patterns in the second arrangement state defines fewer low frequency components than that obtained by calculating a logical product of plural mask patterns in the first arrangement state.

Further another aspect of the present invention provides a method for generating mask patterns that are used to generate image data that causes plural types of dots to be printed by respective scans, said method comprising: a determining step of determining an arrangement of print permitting pixels in each of plural mask patterns corresponding to the plural types of dots, by changing the arrangement of print permitting pixels in each of plural mask patterns corresponding to the plural types of dots from a first arrangement state to a second arrangement state, wherein an arrangement pattern of the print permitting pixels obtained by calculating a logical sum of plural mask patterns in the second arrangement state defines fewer low frequency components than that obtained by calculating a logical sum of plural mask patterns in the first arrangement state.

The present invention provides a data processing method for generating image data which is used for each of plural scans during which plural nozzle groups that print plural types of dots scan a predetermined area of a print medium plural times to execute printing, said method comprising: a dividing step of dividing the image data corresponding to the plural types of dots into image data used for the respective plural scans, by using plural types of mask patterns corresponding to the respective types of dots, wherein of the plural types of mask patterns, an arrangement of print permitting pixels in plural first mask patterns corresponding to plural scans for printing a first type of dots and an arrangement of print permitting pixels in plural second mask patterns corresponding to plural scans for printing a second type of dots differ from each other, and low frequency components of an arrangement pattern of print permitting pixels obtained by calculating a logical product of a predetermined one of the plural first mask patterns and a predetermined one of the plural second mask patterns are fewer than that obtained by calculating a logical product of the predetermined one of the plural first mask patterns and a pattern obtained by displacing the predetermined one of the plural second mask patterns.

Another aspect of the present invention provides a data processing method for generating image data which is used for each of plural scans during which plural nozzle groups that print plural types of dots scan a predetermined area of a print medium plural times to execute printing, said method comprising: a dividing step of dividing the image data corresponding to the plural types of dots into image data used for the respective plural scans, by using plural types of mask patterns corresponding to the respective types of dots, wherein of the plural types of mask patterns, an arrangement of print permitting pixels in plural first mask patterns corresponding to plural scans for printing a first type of dots and an arrangement of print permitting pixels in plural second mask patterns corresponding to plural scans for printing a second type of dots differ from each other, and low frequency components of an arrangement pattern of print permitting pixels obtained by calculating a logical product of a predetermined one of the plural first mask patterns and a predetermined one of the plural second mask patterns at a regular position are fewer than that obtained by calculating a logical product of the predetermined one of the plural first mask patterns and the predetermined one of the plural second mask patterns at a position different from the regular position.

Yet another aspect of the present invention provides a data processing method for generating image data which is used for each of plural scans during which plural nozzle groups that print plural types of dots scan a predetermined area of a print medium plural times to execute printing, said method comprising: a dividing step of dividing the image data corresponding to the plural types of dots into image data used for the respective plural scans, by using plural types of mask patterns corresponding to the respective types of dots, wherein of the plural types of mask patterns, an arrangement of print permitting pixels in plural first mask patterns corresponding to plural scans for printing a first type of dots and an arrangement of print permitting pixels in plural second mask patterns corresponding to plural scans for printing a second type of dots differ from each other, and the print permitting pixels in a predetermined one of the plural first mask patterns and in a predetermined one of the plural second mask patterns are arranged so as to be associated with one another so that an arrangement pattern of print permitting pixels obtained by calculating a logical product of the predetermined first mask pattern and the predetermined second mask pattern has a property in which low frequency components are fewer than high frequency components.

Still another aspect of the present invention provides a data processing method for generating image data which is used for each of plural scans during which plural nozzle groups that print plural types of dots scan a predetermined area of a print medium plural times to execute printing, said method comprising: a dividing step of dividing the image data corresponding to the plural types of dots into image data used for the respective plural scans, by using plural types of mask patterns corresponding to the respective types of dots, wherein of the plural types of mask patterns, an arrangement of print permitting pixels in plural first mask patterns corresponding to plural scans for printing a first type of dots and an arrangement of print permitting pixels in plural second mask patterns corresponding to plural scans for printing a second type of dots differ from each other, and an arrangement pattern of print permitting pixels obtained by calculating a logical product of the predetermined one of the plural first mask patterns and the predetermined one of the plural second mask patterns is aperiodic and has few low frequency components.

Further another aspect of the present invention provides a data processing method for generating image data which is used for each of plural scans during which plural nozzle groups that print plural types of dots scan a predetermined area of a print medium plural times to execute printing, said method comprising: a dividing step of dividing the image data corresponding to the plural types of dots into image data used for the respective plural scans, by using plural types of mask patterns corresponding to the respective types of dots, wherein of the plural types of mask patterns, an arrangement of print permitting pixels in plural first mask patterns corresponding to plural scans for printing a first type of dots and an arrangement of print permitting pixels in plural second mask patterns corresponding to plural scans for printing a second type of dots differ from each other, and low frequency components of an arrangement pattern of print permitting pixels obtained by calculating a logical sum of a predetermined one of the plural first mask patterns and a predetermined one of the plural second mask patterns are fewer than that obtained by calculating a logical sum of the predetermined one of the plural first mask patterns and a pattern obtained by displacing the predetermined one of the plural second mask patterns.

Further another aspect of the present invention provides a data processing method for generating image data which is used for each of plural scans during which plural nozzle groups that print plural types of dots scan a predetermined area of a print medium plural times to execute printing, said method comprising: a dividing step of dividing the image data corresponding to the plural types of dots into image data used for the respective plural scans, by using plural types of mask patterns corresponding to the respective types of dots, wherein of the plural types of mask patterns, an arrangement of print permitting pixels in plural first mask patterns corresponding to plural scans for printing a first type of dots and an arrangement of print permitting pixels in plural second mask patterns corresponding to plural scans for printing a second type of dots differ from each other, and low frequency components of an arrangement pattern of print permitting pixels obtained by calculating a logical sum of a predetermined one of the plural first mask patterns and a predetermined one of the plural second mask patterns at a regular position are fewer than that obtained by calculating a logical sum of the predetermined one of the plural first mask patterns and the predetermined one of the plural second mask patterns at a position different from the regular position.

Further another aspect of the present invention provides a data processing method for generating image data which is used for each of plural scans during which plural nozzle groups that print plural types of dots scan a predetermined area of a print medium plural times to execute printing, said method comprising: a dividing step of dividing the image data corresponding to the plural types of dots into image data used for the respective plural scans, by using plural types of mask patterns corresponding to the respective types of dots, wherein of the plural types of mask patterns, an arrangement of print permitting pixels in plural first mask patterns corresponding to plural scans for printing a first type of dots and an arrangement of print permitting pixels in plural second mask patterns corresponding to plural scans for printing a second type of dots differ from each other, and the print permitting pixels in a predetermined one of the plural first mask patterns and in a predetermined one of the plural second mask patterns are arranged so as to be associated with one another so that an arrangement pattern of print permitting pixels obtained by calculating a logical sum of the predetermined first mask pattern and the predetermined second mask pattern has a property in which low frequency components are fewer than high frequency components.

Further another aspect of the present invention provides a data processing method for generating image data which is used for each of plural scans during which plural nozzle groups that print plural types of dots scan a predetermined area of a print medium plural times to execute printing, said method comprising: a dividing step of dividing the image data corresponding to the plural types of dots into image data used for the respective plural scans, by using plural types of mask patterns corresponding to the respective types of dots, wherein of the plural types of mask patterns, an arrangement of print permitting pixels in plural first mask patterns corresponding to plural scans for printing a first type of dots and an arrangement of print permitting pixels in plural second mask patterns corresponding to plural scans for printing a second type of dots differ from each other, and an arrangement pattern of print permitting pixels obtained by calculating a logical sum of a predetermined one of the plural first mask patterns and a predetermined one of the plural second mask patterns is aperiodic and has few low frequency components.

Further another aspect of the present invention provides a data processing method for generating image data which is used for each of plural scans during which plural nozzle groups that print plural types of dots scan a predetermined area of a print medium plural times to execute printing, said method comprising: a dividing step of dividing the image data corresponding to the plural types of dots into image data used for the respective plural scans, by using plural types of mask patterns corresponding to the respective types of dots, wherein of the plural types of mask patterns, an arrangement of print permitting pixels in plural first mask patterns corresponding to plural scans for printing a first type of dots and an arrangement of print permitting pixels in plural second mask patterns corresponding to plural scans for printing a second type of dots differ from each other, and low frequency components of an arrangement pattern of print permitting pixels obtained by calculating a logical product of a predetermined one of the plural first mask patterns and a predetermined one of the plural second mask patterns are fewer than that obtained by calculating a logical product of the predetermined first mask pattern and a pattern obtained by displacing the predetermined second mask pattern, and low frequency components of an arrangement pattern of print permitting pixels obtained by calculating a logical sum of the predetermined first mask pattern and the predetermined second mask pattern are fewer than that obtained by calculating a logical sum of the predetermined first mask patterns and a pattern obtained by displacing the predetermined second mask patterns.

Further another aspect of the present invention provides a data processing method for generating image data which is used for each of plural scans during which plural nozzle groups that print plural types of dots scan a predetermined area of a print medium plural times to execute printing, said method comprising: a dividing step of dividing the image data corresponding to the plural types of dots into image data used for the respective plural scans, by using plural types of mask patterns corresponding to the respective types of dots, wherein of the plural types of mask patterns, an arrangement of print permitting pixels in plural first mask patterns corresponding to plural scans for printing a first type of dots and an arrangement of print permitting pixels in plural second mask patterns corresponding to plural scans for printing a second type of dots differ from each other, and low frequency components of an arrangement pattern of print permitting pixels obtained by calculating a logical product of a predetermined one of the plural first mask patterns and a predetermined one of the plural second mask patterns at a regular position are fewer than that obtained by calculating a logical product of the predetermined first mask patterns and the predetermined second mask patterns at a position different from the regular position, and low frequency components of an arrangement pattern of print permitting pixels obtained by calculating a logical sum of the predetermined first mask pattern and the predetermined second mask pattern at the regular position are fewer than that obtained by calculating a logical sum of the predetermined first mask pattern and the predetermined second mask pattern at a position different from the regular position.

Further another aspect of the present invention provides a data processing method for generating image data which is used for each of plural scans during which plural nozzle groups that print plural types of dots scan a predetermined area of a print medium plural times to execute printing, said method comprising: a dividing step of dividing the image data corresponding to the plural types of dots into image data used for the respective plural scans, by using plural types of mask patterns corresponding to the respective types of dots, wherein of the plural types of mask patterns, an arrangement of print permitting pixels in plural first mask patterns corresponding to plural scans for printing a first type of dots and an arrangement of print permitting pixels in plural second mask patterns corresponding to plural scans for printing a second type of dots differ from each other, and the print permitting pixels in a predetermined one of the plural first mask patterns and in a predetermined one of the plural second mask patterns are arranged so as to be associated with one another, so that an arrangement pattern of print permitting pixels obtained by calculating a logical product of the predetermined first mask pattern and the predetermined second mask pattern has a property in which low frequency components are fewer than high frequency components and an arrangement pattern of print permitting pixels obtained by calculating a logical sum of the predetermined first mask pattern and the predetermined second mask pattern has a property in which low frequency components are fewer than high frequency components.

Further another aspect of the present invention provides a data processing method for generating image data which is used for each of plural scans during which plural nozzle groups that print plural types of dots scan a predetermined area of a print medium plural times to execute printing, said method comprising: a dividing step of dividing the image data corresponding to the plural types of dots into image data used for the respective plural scans, by using plural types of mask patterns corresponding to the respective types of dots, wherein of the plural types of mask patterns, an arrangement of print permitting pixels in plural first mask patterns corresponding to plural scans for printing a first type of dots and an arrangement of print permitting pixels in plural second mask patterns corresponding to plural scans for printing a second type of dots differ from each other, and the print permitting pixels in a predetermined one of the plural first mask patterns and in a predetermined one of the plural second mask patterns are arranged so as to be associated with one another, so that an arrangement pattern of print permitting pixels obtained by calculating a logical product of the predetermined first mask pattern and the predetermined second mask patterns is aperiodic and has few low frequency components and an arrangement pattern of print permitting pixels obtained by calculating a logical sum of the predetermined first mask pattern and the predetermined second mask pattern is aperiodic and has few low frequency components.

Further another aspect of the present invention provides a data processing method for generating image data which is used for each of plural scans during which plural nozzle groups that print plural types of dots scan a predetermined area of a print medium plural times to execute printing, said method comprising: a dividing step of dividing the image data corresponding to the plural types of dots into image data used for the respective plural scans, by of using plural types of mask patterns corresponding to the respective types of dots, wherein each of the plural types of mask patterns has plural mask patterns corresponding to the plural scans, and an arrangement pattern of print permitting pixels obtained by calculating a logical product of at least two predetermined mask patterns for the same predetermined one of the plural scans has fewer low frequency components than that obtained by calculating a logical product of the at least two predetermined patterns which are displaced from each other, has.

Further another aspect of the present invention provides a data processing method for generating image data which is used for each of plural scans during which plural nozzle groups that print plural types of dots scan a predetermined area of a print medium plural times to execute printing, said method comprising: a dividing step of dividing the image data corresponding to the plural types of dots into image data used for the respective plural scans, by using plural types of mask patterns corresponding to the respective types of dots, wherein each of the plural types of mask patterns has plural mask patterns corresponding to the plural scans, and an arrangement pattern of print permitting pixels obtained by calculating a logical sum of at least two predetermined mask patterns for the same predetermined one of the plural scans has fewer low frequency components than that obtained by calculating a logical sum of the at least two predetermined patterns which are displaced from each other, has.

Further another aspect of the present invention provides a data processing method for generating image data which is used for each of plural scans during which plural nozzle groups that print plural types of dots scan a predetermined area of a print medium plural times to execute printing, said method comprising: a dividing step of dividing the image data corresponding to the plural types of dots into image data used for the respective plural scans, by of using plural types of mask patterns corresponding to the respective types of dots, wherein each of the plural types of mask patterns has plural mask patterns corresponding to the plural scans, and an arrangement pattern of print permitting pixels obtained by calculating a logical product of at least two predetermined mask patterns for the same predetermined one of the plural scans has fewer low frequency components than that obtained by calculating a logical product of the at least two predetermined patterns which are displaced from each other, has, and an arrangement pattern of print permitting pixels obtained by calculating a logical sum of at least two predetermined mask patterns for the same predetermined one of the plural scans has fewer low frequency components than that obtained by calculating a logical sum of the at least two predetermined patterns which are displaced from each other, has.

The present invention provides a data processing method for generating image data which is used for each of plural scans during which plural nozzle groups that print plural types of dots scan a predetermined area of a print medium plural times to execute printing, said method comprising: a dividing step of dividing the image data corresponding to the plural types of dots into image data used for the respective plural scans, by using plural types of mask patterns corresponding to the respective types of dots, wherein each of the plural types of mask patterns has plural mask patterns corresponding to the plural scans, and an arrangement pattern of print permitting pixels obtained by calculating a logical product of a N (N is integer equal to or greater than 2) predetermined mask patterns constituting the plural mask patterns has fewer low frequency components than that obtained by calculating a logical product of the N predetermined patterns which are displaced from each other, has.

Further another aspect of the present invention provides a data processing method for generating image data which is used for each of plural scans during which plural nozzle groups that print plural types of dots scan a predetermined area of a print medium plural times to execute printing, said method comprising: a dividing step of dividing the image data corresponding to the plural types of dots into image data used for the respective plural scans, by using plural types of mask patterns corresponding to the respective types of dots, wherein each of the plural types of mask patterns has plural mask patterns corresponding to the plural scans, and an arrangement pattern of print permitting pixels obtained by calculating a logical sum of a N (N is integer equal to or greater than 2) predetermined mask patterns constituting the plural mask patterns has fewer low frequency components than that obtained by calculating a logical sum of the N predetermined patterns which are displaced from each other, has.

Further another aspect of the present invention provides a data processing method for generating image data which is used for each of plural scans during which plural nozzle groups that print plural types of dots scan a predetermined area of a print medium plural times to execute printing, said method comprising: a dividing step of dividing the image data corresponding to the plural types of dots into image data used for the respective plural scans, by using plural types of mask patterns corresponding to the respective types of dots, wherein each of the plural types of mask patterns has plural mask patterns corresponding to the plural scans, and an arrangement pattern of print permitting pixels obtained by calculating a logical product of a N (N is integer equal to or greater than 2) predetermined mask patterns constituting the plural mask patterns has fewer low frequency components than that obtained by calculating a logical product of the N predetermined patterns which are displaced from each other, has, and an arrangement pattern of print permitting pixels obtained by calculating a logical sum of the N (N is integer equal to or greater than 2) predetermined mask patterns constituting the plural mask patterns has fewer low frequency components than that obtained by calculating a logical sum of the N predetermined patterns which are displaced from each other, has.

Moreover, the present invention provides plural mask patterns that are used to generate image data for printing plural types of dots by respective scans, wherein when at least two of the plural mask patterns are superposed each other, a pattern of the print permitting pixels of superposed mask patterns has fewer low frequency components than that obtained by superposing the at least two mask patterns at which are displaced each other.

The present invention can reduce image degradation resulting from beading caused by grains that may be formed during divided printing.

The above configuration makes it possible to perform the processing for reducing the viscosity of the treatment liquid on the application member (the treatment liquid viscosity reduction processing), depending on the length of time during which the viscosity of the treatment liquid increases as well as on the degree of thickening of the treatment liquid. Accordingly, a time for performing the treatment liquid viscosity reduction processing can be reduced to the minimum necessary.

Further features of the present invention will become apparent from the following description of exemplary embodiments (with reference to the attached drawings).

BRIEF DESCRIPTION OF THE DRAWINGS

FIG. 27 is a diagram illustrating a "superposing" pattern of mask patterns;

DESCRIPTION OF THE EMBODIMENTS

Embodiments of the present invention will be described below in detail with reference to the drawings.

The embodiments of the present invention relate to the generation of a mask that is used to generate binary dot print data for each scan in multi-pass printing as well as a relevant mask pattern. Before describing several specific embodiments of the present invention, description will be given of a configuration for generating a mask pattern or using a mask pattern to generate dot print data. The term "dot print data", as used in the present specification, means data indicating dot printing.

Figure 1:
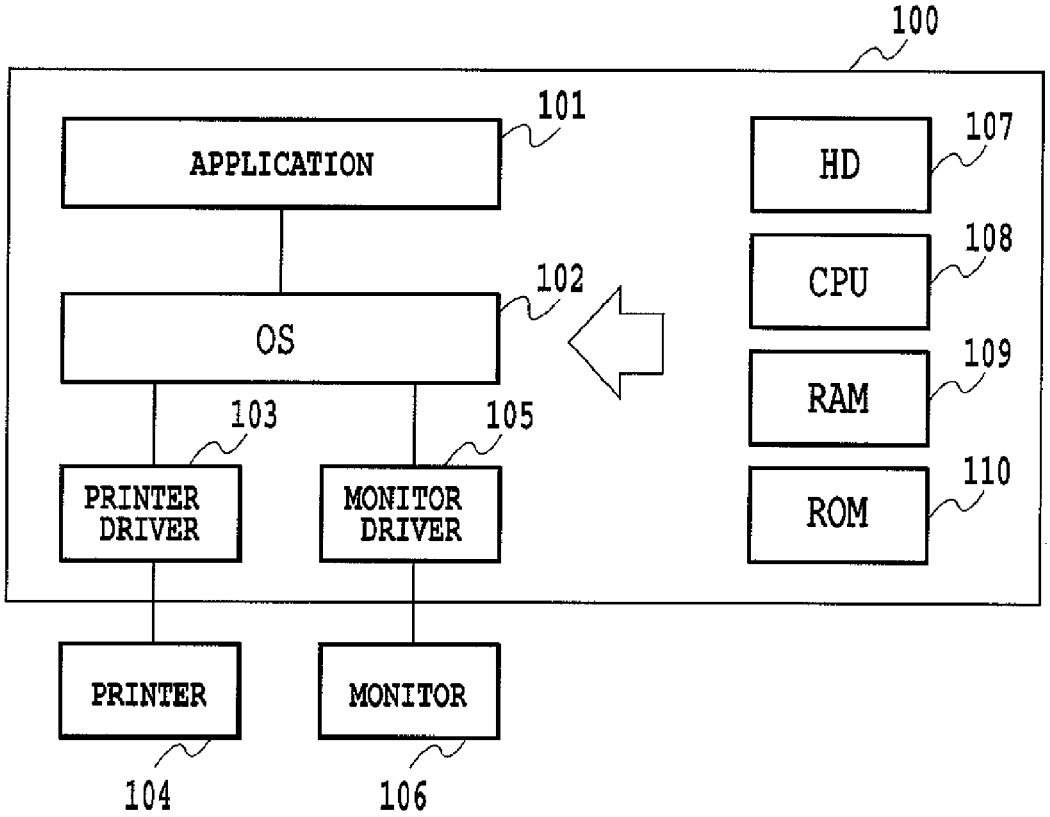
FIG. 1 is a block diagram mainly showing hardware and software in a PC serving as an image processing apparatus according to an embodiment of the present invention.

FIG. 1 is a block diagram showing the configuration of hardware and software in a personal computer (hereinafter also simply referred to as a PC) that functions as a host apparatus according to an embodiment of the present invention. The host apparatus generates image data that is printed by a printer 104.

In FIG. 1, the PC 100, which serves as a host computer, operates software including application software 101, a printer driver 103, and a monitor driver 105 under the control of an operating system (OS) 102. The application software 101 executes processes related to word processing, table calculation, and an Internet browser. The monitor driver 105 executes processes such as generation of image data that is displayed on a monitor 106.

The printer driver 103 processes a group of various drawing instructions (image drawing instruction, text drawing instruction, graphics drawing instruction, and the like) that are issued to the OS 102 by the application software 101. The printer driver 103 thus generates binary image data that is finally used by the printer 104. Specifically, the printer driver 103 executes image processing described later with reference to FIG. 2 to generate binary image data on plural ink colors for use in the printer 104.

The host computer 100 comprises a CPU 108, a hard disk (HD) 107, a RAM 109, and a ROM 110 as hardware for operating the above software. More specifically, the CPU 108 executes processing in accordance with the above software programs stored in the hard disk 107 and ROM 110. The RAM 119 is used as a work area for the processing.

The printer 104 according to the present embodiment is of what is called a serial type which scans pint heads that eject ink over a print medium and ejects inks from the print heads while the scanning with the print head to perform printing. The print heads are provided for respective inks C, M, Y, and K and installed on a carriage so as to be scanned over the print media such as print sheets. Each of the print heads has an ejection opening arrangement density of 1,200 dpi and ejects 3.0 pico-liters of ink droplets through each of the ejection openings. Each print head has 512 ejection openings.

The printer 104 is a printing apparatus that can execute multi-pass printing. Thus, masks described later for the embodiments are stored in a predetermined memory so that for printing, a specified mask is used for each scan and for each ink color to generate binary divided image data.

Further, if no mask patterns are stored in a predetermined memory and the PC 100 functions as a data processing apparatus for generating masks, the PC 100 executes mask generating processes described in the embodiments described below. Mask data generated is stored in a predetermined memory of the printer 104.

Figure 2:
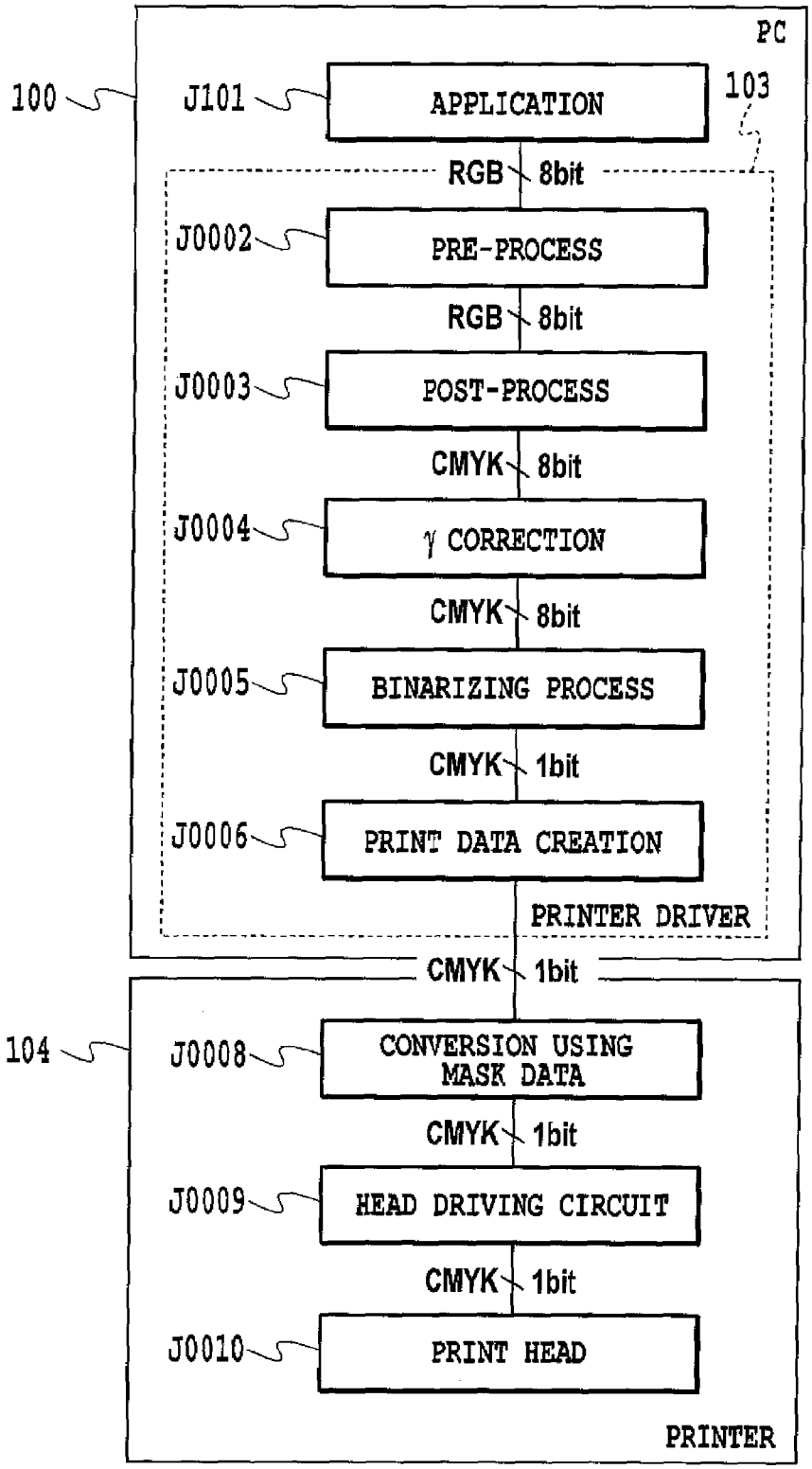
FIG. 2 is a block diagram illustrating the flow of an image data converting process in an ink jet printing system according to an embodiment of the present invention.

FIG. 2 is a block diagram illustrating main data processing that is executed in the PC 100 and printer 104 when the printer 104 executes printing in the configuration shown in FIG. 1. The ink jet printer 104 according to the present embodiment executes printing using four ink colors, cyan, magenta, yellow, and black as described above. To achieve this, the ink jet printer 104 comprises a print head J0010 that ejects these four inks.

The user can create image data to be printed by the printer 104, via the application 101. Then, for printing, the image data created through the application 101 is delivered to the printer driver 103.

The printer driver 103 executes its processing including a pre-process J0002, a post-process J003, a γ correction J0004, a binarizing process J0005, and a print data creation J0006. The pre-process J0002 executes a gamut conversion that converts the gamut of a display device that displays a screen provided by an application into the gamut of the printer 104. Specifically, image data R, G, and B in which R, G, and B are each expressed by 8 bits is converted into 8-bit data R, G, and B within the gamut of the printer via a three-dimensional LUT. The post-process J0003 then separates colors reproducing the converted gamut into ink colors. Specifically, the post-process J0003 involves determining 8-bit data C, M, Y, and K corresponding to a combination of inks that are used to reproduce colors expressed by the 8-bit data obtained by the pre-process J0002. The γ correction J0004 is executed for each of the data C, M, Y, and K obtained via the color separation. Specifically, the γ correction executes a conversion such that the 8-bit data C, M, Y, and K obtained by color separation are linearly associated with graduation sequence characteristics of the printer. Next, the binarizing process J0005 executes a quantizing process of converting the γ corrected 8-bit data C, M, Y, and K into 1-bit data of C, M, Y, and K. Finally, the print data creating process J0006 adds print control data or the like to binary image data containing the binarized 1-bit data C, M, Y, and K to create print data. Here, the binary image data contains dot print data indicating printing of dots and dot non-printing data indicating non-printing of dots. The print control data is composed of "print medium information", "print grade information", and "other control information" on a sheet feeding method and the like. Print data thus generated is supplied to the printer 104.

On the other hand, the printer 104 executes a mask data converting process J0008 on the binary image data contained in the input print data. The mask data converting process J0008 uses a mask pattern stored in the predetermined memory of the printer and described later for the embodiments to execute an AND process on input binary image data. This generates binary divided image data for each scan in multi-pass printing and determines timings for actual ink ejections. The binary divided image data includes dot printing data and dot non-printing data.

Figure 3:
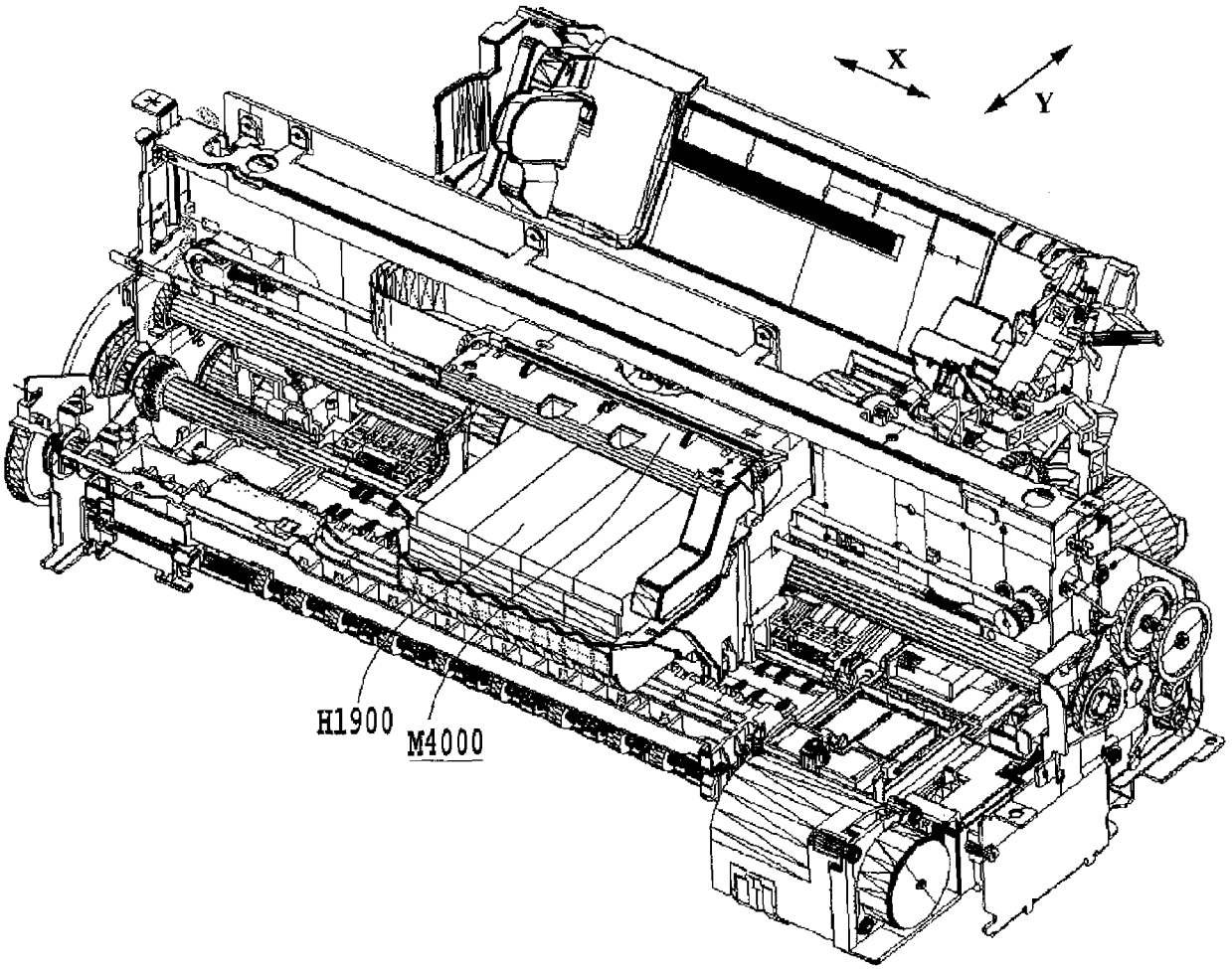
FIG. 3 is a perspective view showing an ink jet printing apparatus that is applicable to the embodiments of the present invention.

FIG. 3 is a perspective view showing the ink jet printer 104. A carriage M4000 moves in an X direction (main scanning direction) in the figure with mounting the print heads and ink tanks H1900, which supply a cyan (C), magenta (M), yellow, and black (K) inks to the print heads. While the moving of the carriage, the ink is ejected through each of the nozzles in the print heads at predetermined timings, based on the binary divided image data. When one main scanning with the print heads is finished, the print media is conveyed by a predetermined amount in a Y direction (sub-scanning direction) in the figure. The above printing main scan and sub-scan operations are alternately repeated to sequentially form images on the basis of multi-pass printing.

Description will be given below of embodiments for a method for generating mask patterns which are used in or generated by the above printing system and which are distinguished from one another on the basis of the number of scans (hereinafter referred to as passes) required to complete a multi-pass printing image and the rate of print permitting pixels. The mask pattern generated by this method will also be described below.

Embodiment 1

100% Even Mask for Two Pass Printing

(1) Summary of the Embodiment

The present embodiment relates to two pass multi-pass printing in which an image is completed by two times of scanning operations of the print heads for each of the cyan (C), magenta (M), yellow (Y), and black (K) ink. For each of the ink colors used for the two pass printing, not only a mask (hereinafter referred to a "1 plane" mask) for each of plural scans (in the present embodiment, two scans) but also an arbitrary combination of plural planes of these masks is appropriately dispersed.

Figure 4:
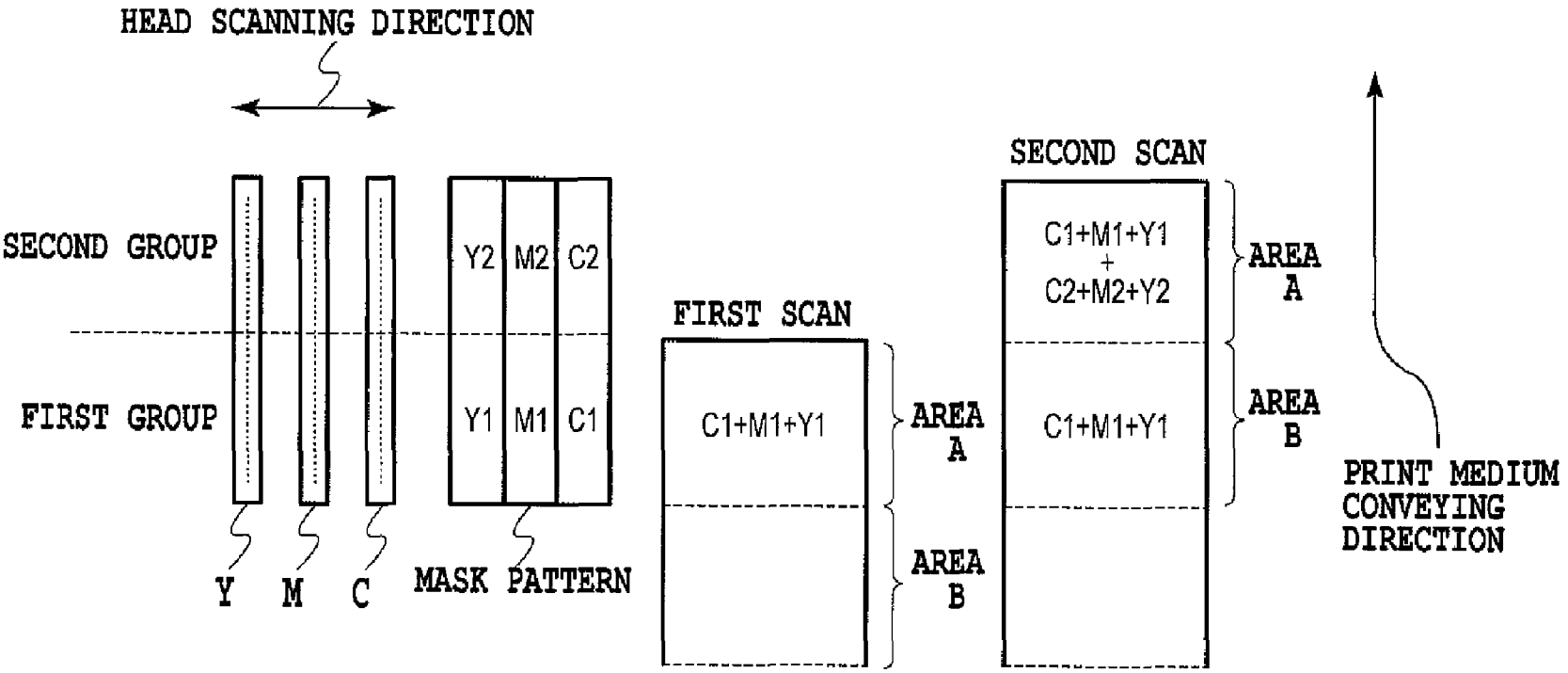
FIG. 4 is a diagram schematically showing a print head, a mask pattern, and a print medium to describe two-pass printing.

FIG. 4 is a diagram schematically showing print heads, mask patterns, and a print medium to describe the two pass printing. In the description of the figure, for simplification of illustration and description, the two pass printing is executed using three colors, cyan, magenta, and yellow. This also applies to the masks described below.

Each group of color nozzles for cyan, magenta, and yellow is divided into two groups of first and second groups, each of which includes 256 nozzles. These groups are made correspond to respective mask patterns (C1, C2, M1, M2, Y1, and Y2) according to the present embodiment. Each mask pattern has a size equal to 256 pixels in a sub-scanning direction (conveying direction); the number of pixels in each mask pattern is the same as that of nozzles in each group. Further, each mask pattern also has a size equal to 256 pixels in a scanning direction. Two mask patterns (C1 and C2, M1 and M2, and Y1 and Y2) corresponding to nozzle groups for the same color ink are complementary to each other. Superposing these mask patterns on top of each other allows printing of an area corresponding to 256×256 pixels to be completed.

Each color nozzle group ejects ink to a print medium while executing scanning with the nozzle groups in a direction ("head scanning direction" show by an arrow in the figure) that is substantially orthogonal to the nozzle arrangement direction. In this example, the C, M, and Y inks are ejected to each area. Further, every time the scan is finished, the print medium is conveyed by an amount equal to the width corresponding to one group (in this case, equal to 256 pixels) in a direction ("print medium conveying direction" shown by an arrow in the figure) that is orthogonal to the scanning direction. This makes it possible to complete, by two scans, an image in an area of the print medium which has a size corresponding to the width of each group.

More specifically, during the first scan, an area A on the print medium is printed using the first group of the C nozzle group, the first group of the M nozzle group, and the first group of the Y nozzle group, in order of C, M, and Y. Further, during the first scan, the mask patterns C1, M1, and Y1 are used for the area A.

Next, during the second scan, the area A, on which printing by the first scan has been completed, is subjected to the remaining printing using the second group of the C nozzle group, the second group of the M nozzle group, and the second group of the Y nozzle group, in order of Y, M, and C. Further, an unprinted area B is also printed using the first group of the C nozzle group, the first group of the M nozzle group, and the first group of the Y nozzle group, in order of Y, M, and C. Accordingly, during the second scan, the mask patterns C2, M2, and Y2 are used for the area A, and the mask patterns C1, M1, and Y1 are used for the area B. This operation is further continued to print each area in order of the mask patterns C1, M1, Y1, Y2, M2, and C2 or the mask patterns Y1, M1, C1, C2, M2, and Y2.

Figure 5:
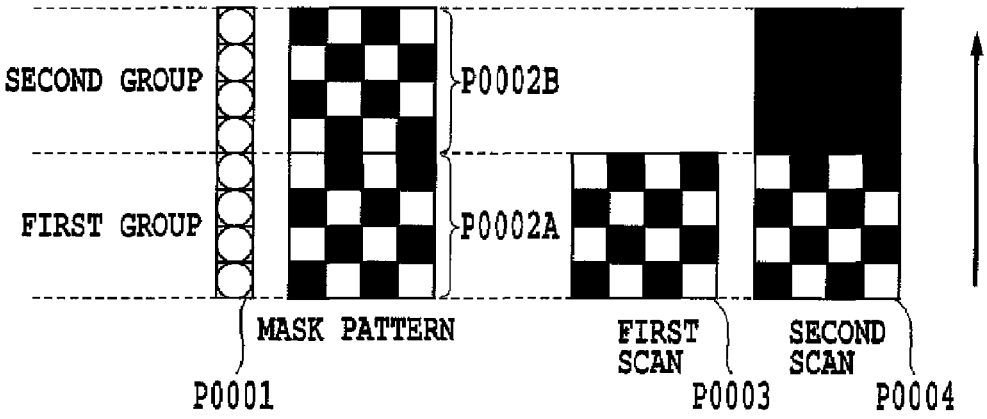
FIG. 5 is a diagram schematically showing the print head, mask pattern, and print medium to describe two-pass printing.

FIG. 5 is a schematic diagram conceptually illustrating masks for used in the two pass printing, described with reference to FIG. 4, as well as their complementary relationship. In FIG. 5, P0001 denotes a print head for one of the colors C, M, and Y, shown in FIG. 4. Here, the print head is shown to have eight nozzles for simplification of illustration. The nozzles are divided into the first and second groups as described above. Each nozzle group has four nozzles. P0002A and P0002B denote mask patterns correspond to the nozzle arrays of the first and second groups, respectively. That is, the mask pattern P0002A (lower pattern in the figure) which is used for a first scan for an area and the mask pattern P0002B (upper pattern in the figure) which is used for a second scan for that area are shown. Each of these masks constitutes a mask of one plane. In each mask pattern, print permitting pixels are shown in black, whereas print non-permitting pixels are shown in white. The first scan mask pattern P0002A is complementary to the second scan mask pattern P0002B. accordingly, laying these mask patterns on top of each other results in a pattern in which all of the 4×4 area is filled with print permitting pixels. It is noted that for easy description, the illustrated patterns are different from those described below in the present embodiment. In addition, in the figure, the arrangement of the print permitting pixels has a checker pattern and a reverse checker pattern. However, the mask patterns in these arrangements are not included in the scope of the present invention.

Now, the "print permitting pixel" and "print non-permitting pixel" are defined. The "print permitting pixel" permits dot printing (ink ejection) as described above. If binary image data corresponding to the print permitting pixel indicates "ejection", dot printing is executed. If the binary image data corresponding to the print permitting pixel indicates "non-ejection", dot printing is not executed. On the other hand, the "print non-permitting pixel" does not permit printing regardless of the binary image data. Accordingly, even if the binary image data corresponding to the print non-permitting pixel indicates "ejection", printing is not executed.

P0003 and P0004 denote images completed by the two pass printing and shown as arrangements of dots constituting the images. For simplification of description, these images are what is called solid images in which dots are formed on all the pixels. Accordingly, the dot arrangements directly reflect the print permitting pixels of the mask P0002 that is used to generate dot print data. During the first scan, dot print data on the first group is generated using the mask pattern P0002A. Then the print medium is conveyed by an amount corresponding to the width of the nozzle group in the direction of an arrow in the figure. During the subsequent second scan, the dot print data of the first group for the area offset by the conveying amount is also generated using the mask pattern P2000A. Dot print data on the second group for the area printed using the first group is generated using the mask pattern P2000B. These two printing scans complete an image.

Figure 6A:
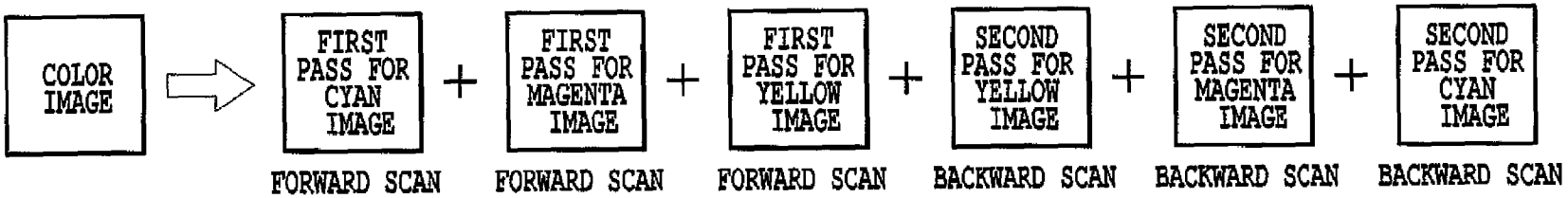
FIG. 6A is a diagram schematically showing binary data on six planes for two-divided printing of each of C, M, and Y.
Figure 6B:
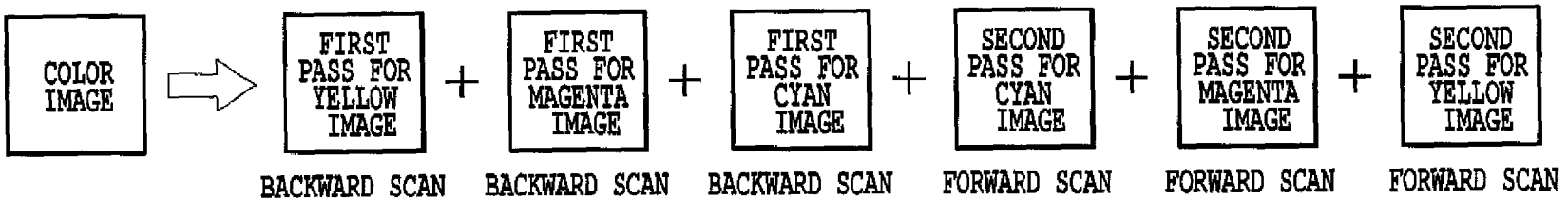
FIG. 6B is a diagram schematically showing binary data on six planes for two-divided printing of each of C, M, and Y.

FIGS. 6A and 6B are diagrams illustrating the two pass printing described with reference to FIGS. 4 and 5 and executed using the C, M, and Y inks (as described above, the black K ink is omitted for simplification). As shown in FIGS. 6A and 6B, the masks C1, M1, Y1, C2, M2, and Y2 are used to eject the C, M, and Y inks during two scans (in the example shown in FIGS. 6A and 6B, a forward scan and a backward scan) to print a color image.

FIG. 6A shows how an image is completed in an area on which printing is executed in order of a forward scan (rightward scan in FIG. 4) and a backward scan (leftward scan in FIG. 4). During the forward scan of the first scan, a cyan image is first printed based on dot print data of cyan divided data generated using the cyan mask (mask C1) for the first pass. During the same scan, on the basis of respective dot print data of divided image data generated using the magenta and yellow masks (masks M1 and Y1), a magenta image is printed on the already printed cyan image, and a yellow image is further printed on the already printed cyan and magenta images. During the backward scan of the second scan after the conveyance of the print medium by the predetermined amount, images are similarly sequentially printed on already printed images on the basis of yellow, magenta, and cyan dot print data generated using the masks Y2, M2, and C2.

On the other hand, FIG. 6B shows how an image is completed in an area on which printing is executed in order of the backward scan (leftward scan in FIG. 4) and the forward scan (rightward scan in FIG. 4). During the backward scan of the first scan, a yellow image is first printed on the basis of dot print data of yellow divided data generated using the yellow mask (mask Y1) for the first pass. During the same scan, on the basis of respective dot print data of divided image data generated using the magenta and cyan masks (masks M1 and C1), a magenta image is printed on the already printed yellow image, and a cyan image is further printed on the already printed yellow and magenta images. During the forward scan of the second scan, after the conveyance of the print medium by the predetermined amount, images are similarly sequentially printed on already printed images on the basis of cyan, magenta, and yellow dot print data generated using the masks C2, M2, and Y2.

Figure 86:
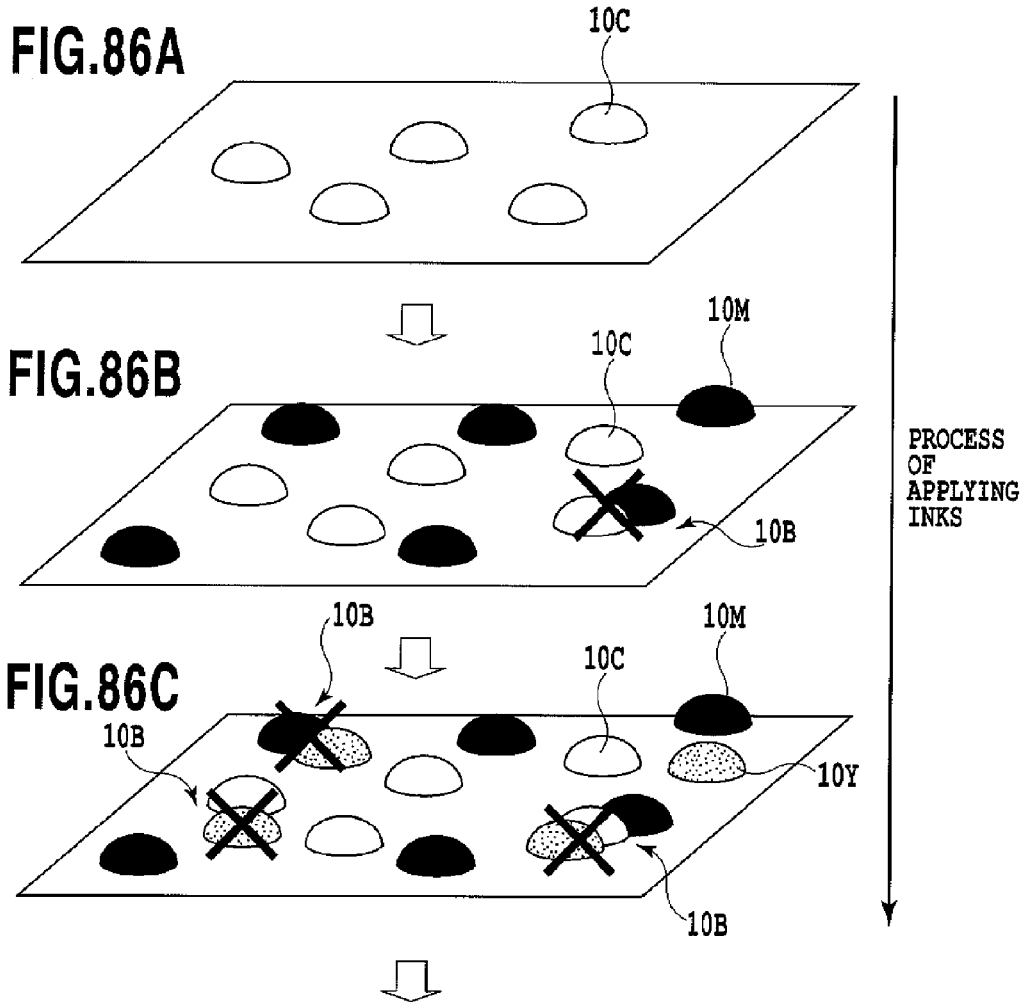
FIG. 86 is a diagram illustrating problems of the prior art.

When the three colors C, M, and Y are used to execute the two pass printing in which an image is completed by two scans, intermediate images are present in which images for each plane of the mask are laid on top of one another, for example, an intermediate image in which the cyan image for the first pass is laid on top of the magenta image for the first pass, an intermediate image in which the yellow image for the first pass is laid on top of the above image, and an intermediate image in which the yellow image for the second pass is laid on top of the above images for the first pass. In these intermediate images, grains, described with reference to FIGS. 86(a) to 86(c) may occur. In particular, more grains occur in the intermediate images if the amount of ink applied per unit time or per unit area of the print medium increases as a result of an increase in a printing speed, a print density and in the number of ink types for use. Grains having occurred in the intermediate image are fixed as they are and viewed as beading such as an irregular mottled pattern in a completed image.

To avoid the occurrence of grains in the intermediate image, the present embodiment is characterized in that an arrangement of print permitting pixels obtained by superposed planes of masks on top of one another has a property of few low-frequency components. The small amount of low frequency components makes it possible to reduce an ink dot arrangement bias in the intermediate image at each stage. Also, an important characteristic is that the superposed masks has a property of aperiodic arrangement of print permitting pixels in order to prevent the interference of the mask with image data or noise. That is, the arrangement of print permitting pixels obtained by superposing planes of masks on top of one another has properties of an aperiodic and few low-frequency components, so that the arrangement is highly dispersive. The present embodiment thus prevents dots from being arranged close or adjacent to one another or overlapping one another, as much as possible, in intermediate images at the corresponding stages leading to the completion of an image. Even if overlapping or adjacent dots cannot be eliminated, the present embodiment makes such overlapping dots or the like highly dispersive.

The term "low frequency components" refers to components present in a lower frequency side of a half point of a space frequency region in which frequency components (power spectrum) are present.

(2) Mask Generating Method

A method for generating a mask according an embodiment of the present invention is roughly classified into two types: a method of simultaneously generating masks for plural passes (simultaneous generation) and a method of sequentially generating a mask for each pass (pass-by-pass generation), and the mask generating method is executed by any one of the above two method. The former simultaneous generation method simultaneously generates masks for (the number of passes (the number of scans) required to complete an image—1) passes and generates a mask for the remaining one pass so that the print permitting pixels of this mask are exclusive to the arrangement of the print permitting pixels of the simultaneously generated masks. The latter pass-by-pass generation method sequentially generates a masks for each of the plural passes (scans) required to complete an image, and a mask for the final pass is generated so that the print permitting pixels of this mask are exclusive to the arrangement of the print permitting pixels of the already generated masks, as is the case with the former method. It should be noted that in the present embodiment, in which the masks are used for the two pass printing, the simultaneous generation is equal to the pass-by pass generation.

Moreover, for each of the above two generation methods, a manner of determining the arrangement of print permitting pixels includes a method of arranging all the print permitting pixels of the mask in a predetermined way and moving the arrangement, while making the entire mask being generated more dispersive (this method is hereinafter be referred to as an "arrangement moving method"), and a method of placing each print permitting pixel while making the entire mask being generated more dispersive (this method is hereinafter referred to as a "sequential arrangement method").

Figure 7:
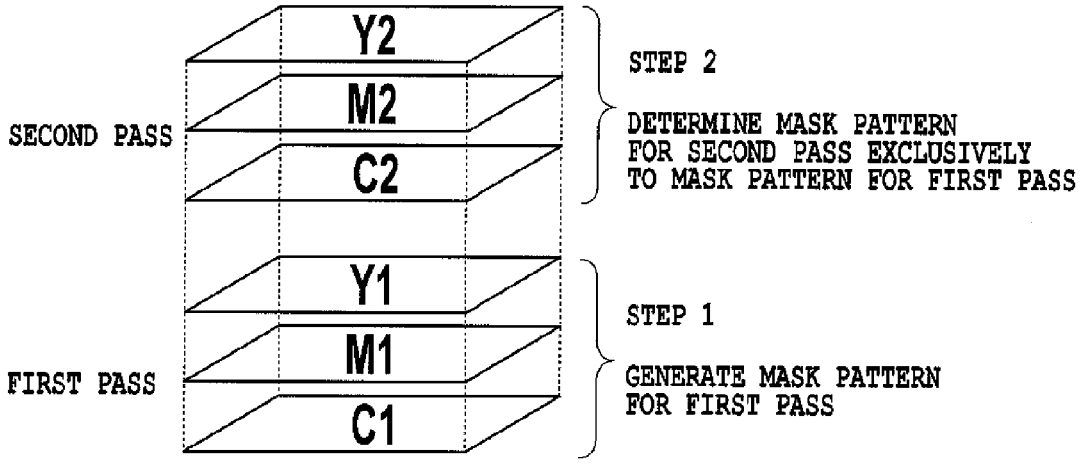
FIG. 7 is a diagram illustrating a mask generating method according to a first embodiment of the present invention.

FIG. 7 is a diagram conceptually showing a mask generating method for the two pass printing according to the present embodiment.

In step 1 of mask generation, masks C1, M1, and Y1 of respective planes for the first pass are generated. In step 2, masks C2, M2, and Y2 of respective planes for the second pass are generated so that they are complementary to the masks C1, M1, and Y1 for the first pass. More specifically, for each color, the mask for the second pass is generated so that the arrangement of the print permitting pixels of this mask is exclusive to the arrangement of the print permitting pixels of the corresponding mask for the first pass.

In the above mask generating methods, the print permitting pixels of the masks C1, M1, and Y1 for the first pass are arranged as described below. First, the arrangement moving method will be described, and then the sequential arrangement method will be described. Of course, either of these methods may be used.

Arrangement Moving Method

Figure 8:
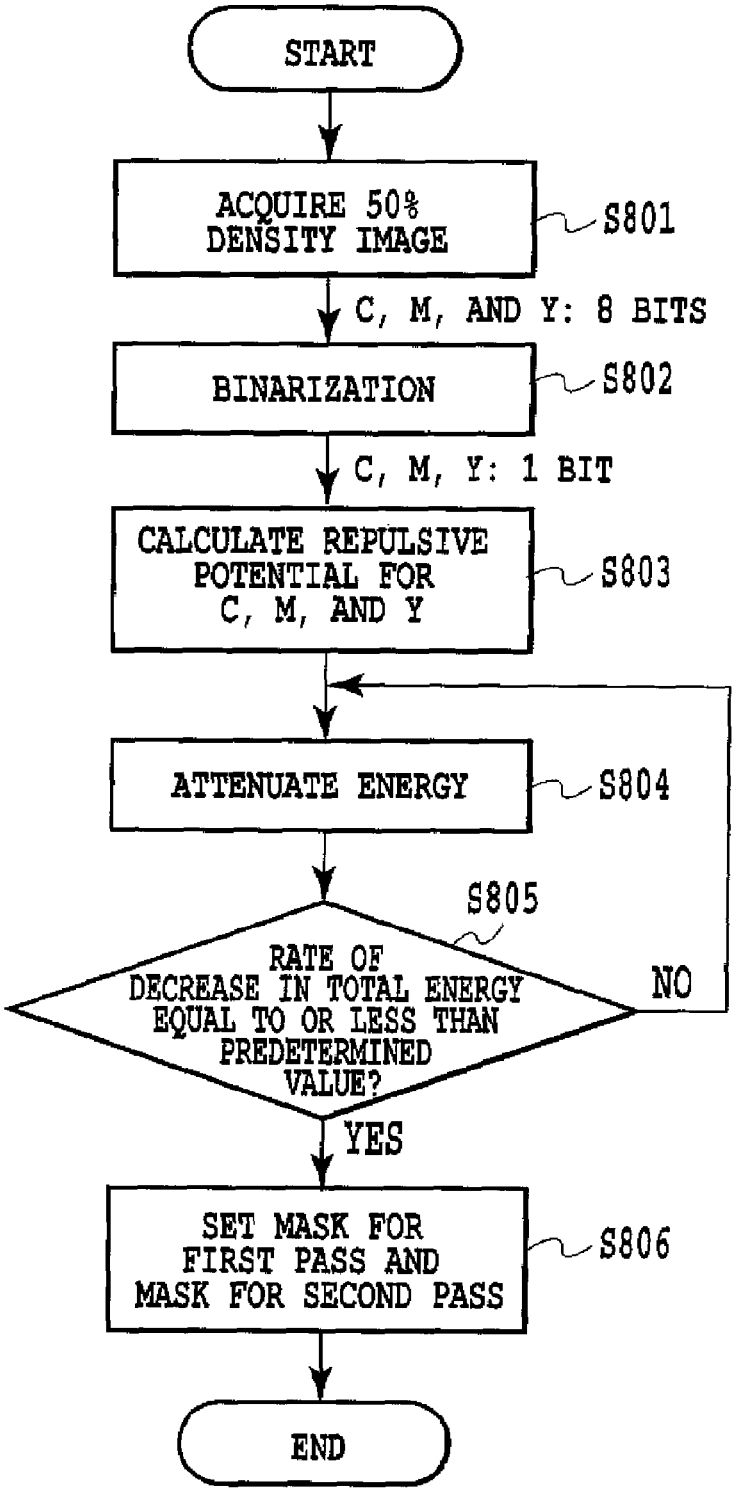
FIG. 8 is a flowchart showing the procedure of the mask generating method according to the first embodiment of the present invention.

FIG. 8 is a flowchart showing a process for determining the arrangement of the print permitting pixels of masks for the two pass printing according to the present embodiment on the basis of the arrangement moving method.

First, in step S801, C, M and Y images each of 50% density are acquired which correspond to the plane size of the masks C1, M1, and Y1 for the firs pass. Then in step S802, each image is binarized by a binarizing technique such as an error diffusion method. Thus, for each of the planes of masks C1, M1, and Y1, an initial arrangement is obtained in which print permitting pixels with 1-bit data of "1" are disposed on 50% of the mask pixels. The binarizing technique is thus used to obtain an initial arrangement of print permitting pixels because a somewhat dispersive arrangement is initially obtained depending on the binarizing method used. Further, the binarizing technique makes it possible to reduce the time for calculation or convergence required to subsequently finally determine the arrangement. In other words, the method for obtaining the initial arrangement is not essential on applying the present invention. For example, a plane of mask may have an initial arrangement in which print permitting pixels with 1-bit data of 1 are randomly arranged.

Then, in step S803, a repulsive potential is calculated for all the print permitting pixels in each of the planes of masks C1, M1, and Y1 obtained as described above. Specifically, (i) Repulsive force is applied to the print permitting pixels of the same plane depending on the distance between these print permitting pixels.

(ii) Also, repulsive force is applied to the print permitting pixels of different planes.

(iii) Different repulsive force is applied for the same plane and the different planes.

(iv) Print permitting pixels of different planes are allowed to overlap one another, and repulsive force is applied to overlapping print permitting pixels (two, three, or more print permitting pixels) according to combinations of the overlapping print permitting pixels.

Figure 9:
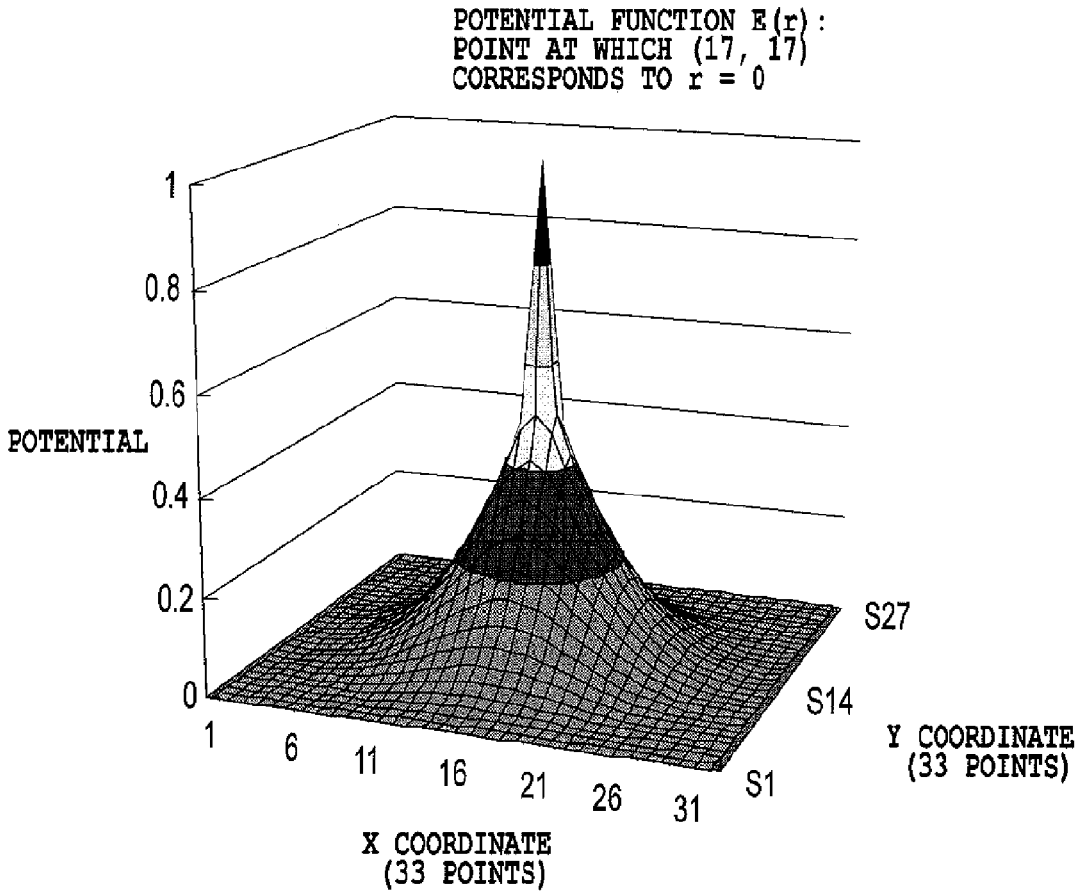
FIG. 9 is a diagram schematically showing a function for basic repulsive potential E(r) according to the embodiment of the present invention.

FIG. 9 is a diagram schematically showing a function for a basic repulsive potential E(r) according to the present embodiment.

As shown in FIG. 9, for the repulsive force function that is defined in the present embodiment, the coverage of the repulsive force is up to r=16 (pixels; mask pixels on which print permitting pixels are arranged). The potential that attenuates depending on the distance basically brings a high energy state, that is, an unstable state when print permitting pixels are arranged close to one another. Thus, the convergence calculation makes it possible to avoid selection of a dense arrangement as much as possible.

The shape of the repulsive force is more desirably determined by the ratio of the print permitting pixels to all the mask pixels.

Further, in the case that plural color inks are used for printing, it may occur that the number of positions where ink dots are actually arranged exceed that of positions where ink dots can be arranged (for a resolution of 1200 dpi, 1200×1200 possible positions in a 1-inch square), and then the actual arranged ink dots are made overlapped each other. Accordingly, in calculating the repulsive potential of each print permitting pixel, considerations need to be given for possible overlapping of print permitting pixels each other. Thus, the function is defined so as to have a finite repulsive potential at r=0. This enables dispersion with possible overlapping of print permitting pixels taken into account.

The present embodiment executes calculations such that a repulsive potential $\alpha E(r)$ is applied to the print permitting pixels on the same plane, a repulsive potential $\beta E(r)$ is applied to the print permitting pixels on different planes, and a repulsive potential $\gamma s(n)E(r)$ is applied to overlapping print permitting pixels. More specifically, a repulsive potential resulting from the presence of a certain print permitting pixel is what is obtained by adding following potentials to the above repulsive potential: the repulsive potentials of print permitting pixels on the same plane, print permitting pixels on different planes, and a overlapping print permitting pixels on different planes, respectively within the distance r from the certain print permitting pixel.

Mask patterns have a finite size (in the present embodiment, 256 pixels×256 pixels), therefore a periodic boundary condition is used which allows the same pattern of 256 pixels×256 pixels to be seemingly repeated. Accordingly, the left end of a mask pattern is adjacent to the right end of that mask pattern. The upper end of a mask pattern is adjacent to the lower end of that mask pattern.

For the above repulsive potentials, coefficients $\alpha$, $\beta$, and $\gamma$ are weighting coefficients and in the present embodiment, $\alpha=3$, $\beta=1$, and $\gamma=3$. The values $\alpha$, $\beta$ and $\gamma$ affect the dispersiveness of print permitting pixels. The values $\alpha$, $\beta$ and $\gamma$ can be actually determined by, for example, experimental optimization based on print images printed using the masks.

The coefficient s(n) is used for an multiplying in addition to γ in order to disperse overlapping print permitting pixels. The coefficient s(n) has a value corresponding to the number of overlaps so as to increase the degree of dispersion of the print permitting pixels consistently with the number of overlaps. The present inventor experiments show that an appropriate dispersion can be achieved by using s(n) determined by either of the two equations:

[Equation 1]

$$s(n) = \sum_{i=1}^{n} nCi \text{ or } s(n) = \sum_{i=1}^{n-1} nCi$$

That is, when the n denotes the number of overlaps, the sum of numbers of combinations is denoted by s(n). Specifically, for an object print permitting pixel for which repulsive force is to be calculated, overlapping print permitting pixels (which are located at the same position as that of the object print permitting pixel on the same plane or different planes) and overlapping print permitting pixels located at the distance r from the object print permitting pixel are searched. In this case, n denotes the number of overlaps common to overlapping of the object print permitting pixel and the print permitting pixel on the same plane and the different planes, which overlap the object print permitting pixel at the same position, and overlapping of the print permitting pixels which are located at the distance r from the object print permitting pixel, on respective planes, and overlap each other in the same manner. Then, for these two pixels, repulsive forces resulting from the overlapping print permitting pixels are considered.

In the case of considering an example in which for two pixels, print permitting pixels are present commonly on a first, second, and third planes, n is defined as 3. Then, repulsive force attributed to the overlapping of the three print permitting pixels is allowed to act on these pixels. Here, when the repulsive force resulting from the overlapping of the three print permitting pixels is considered, the repulsive force of the overlapping of every two print permitting pixels and the repulsive force of each print permitting pixel are considered to act in a multiplexing manner together with the repulsive force of the overlapping of the three print permitting pixels. In other words, with the third plane not taken into account, the overlapping may be considered to occur between two print permitting pixels on the first and second planes. With the second plane not taken into account, the overlapping may be considered to be the one between two print permitting pixels on the first and third planes. With the first plane not taken into account, the overlapping may be considered to occur between two print permitting pixels on the second and third planes. To calculate the multiplexing effect of overlapping of the print permitting pixels, the repulsive force resulting from the combination of overlaps is defined and s(n) such as the one described above is used. The experiments show that this makes it possible to provide a highly dispersive print permitting pixel arrangement.

Referring back to FIG. 8, in step S803, the total energy is determined which is equal to the sum of the repulsive potentials of all the print permitting pixels. Then, processing is executed to reduce the total energy.

This processing involves sequentially shifting each of the print permitting pixels to one of the pixels located at a distance r of at most 4, at which pixel the repulsive potential of the shifted print permitting pixel most decreases. This processing is repeated (step S804) to reduce the total energy that is equal to the sum of the repulsive potentials of all the print permitting pixels. In other words, the process of gradually reducing the total energy corresponds to the process of sequentially making the arrangement of the print permitting pixels more dispersive, that is, the process of gradually reducing low frequency components of the print permitting pixels.

In step S805, the rate of a decrease in total energy obtained in step S804 is calculated. If the rate is determined to be equal to or less than a predetermined value, the energy attenuating process is ended. It should be noted that the predetermined value can be determined, for example, on the basis of the results of actual printing and corresponds to a decrease rate at which an image with appropriately reduced low frequency components can be printed.

Finally, in step S806, respective planes with the rate of a decrease in total energy equal to or less than the predetermined value are set as the masks C1, Y1, and M1 for the first pass. Further, the masks C2, M2, and Y2 for the second pass are set in which the print permitting pixels are arranged at positions exclusive to those of the print permitting pixels in the masks C1, M1, and Y1.

In step S805, the present embodiment determines whether the rate of a decrease in total energy is equal to or less than the predetermined value. Then if the rate of a decrease in total energy is equal to or less than the predetermined value, the process shifts to step S806. However, the present embodiment is not limited to this example. For example, the present embodiment may determine in step S805 whether or not the total energy is equal to or less than the predetermined value, and if so, shift to step S806.

FIGS. 10A to 10D are diagrams schematically showing the repulsive potential calculation and total energy attenuating process, described above. More specifically, these figures include perspective views showing the three planes C1, Y1, and Y1 according to the present embodiment and plan views specifically showing movement of the print permitting pixels. In the figures, the smallest squares show mask pixels. Pixels overlapping each other among three overlapping planes correspond to the same pixel position among the planes.

Figure 10A:
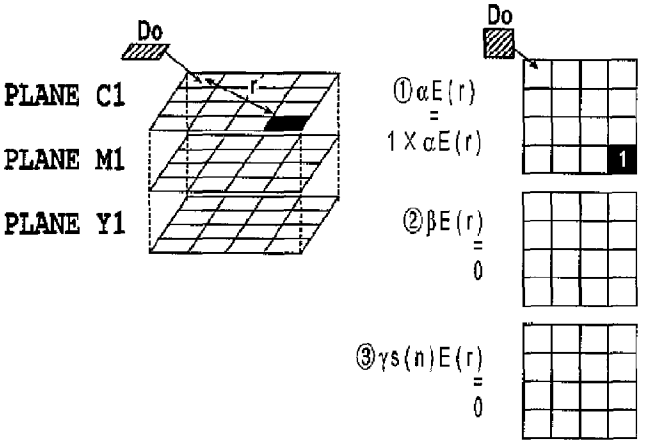
FIG. 10A is a diagram schematically showing a process of applying a repulsive potential and attenuating total energy according to the first embodiment of the present invention.

FIG. 10A illustrates that when print permitting pixels are present on the same plane, the repulsive force of these print permitting pixels is added to (increases) the repulsive potential. In the example shown in the figure, one print permitting pixel is present on the same plane C1 on which an object print permitting pixel Do is present at the distance r from that pixel. In this case, $\alpha=3$ is applied, and a potential $1\times\alpha E(r)$ is added as the potential of the object print permitting pixel Do.

Figure 10B:
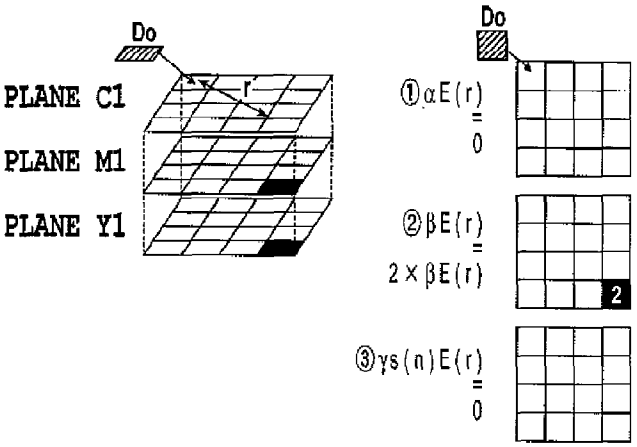
FIG. 10B is a diagram schematically showing the process of applying a repulsive potential and attenuating total energy according to the first embodiment of the present invention.

FIG. 10B is a diagram illustrating that print permitting pixels are present on planes (M1 and Y1) different from that on which the object print permitting pixel Do is present and that a repulsive potential is added on the basis of the relationship between the object print permitting pixel and these two print permitting pixels. The relationship between the object print permitting pixel and these two print permitting pixels is that between different planes. Then, $\beta=1$ is applied and a potential $2\times\beta E(r)$ corresponding to the two print permitting pixels is added.

Figure 10C:
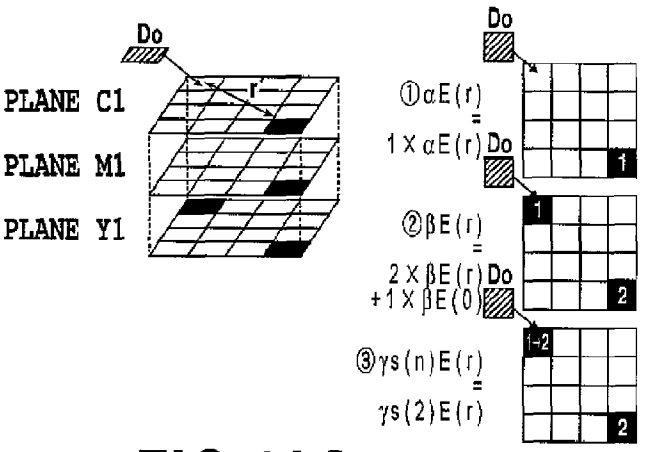
FIG. 10C is a diagram schematically showing the process of applying a repulsive potential and attenuating total energy according to the first embodiment of the present invention.

FIG. 10C is a diagram illustrating that print permitting pixels are present on the same plane on which the object print permitting pixels is present and on planes different from that on which the object print permitting pixel is present as is the case with the above two figures, and in addition, a print permitting pixel is present on the same pixel of a different plane and then that print permitting pixel and the object print permitting pixel overlap each another, and illustrating the repulsive potential based on the relationship among these print permitting pixels. Not only the conditions shown in FIGS. 10A and 10B are met but a print permitting pixel is present at the same pixel on the plane Y1, which is different from the plane C1 with the object print permitting pixel Do present. Thus, the following potentials are added: the repulsive potential $1\times\alpha E(r)$ of one print permitting pixel on the same plane, the repulsive potential $1\times\beta E(\mathbf{0})$ of one print permitting pixel on the different plane at the same pixel, the repulsive potential $2\times\beta E(r)$ of two print permitting pixels on the different planes, and the repulsive potential $\gamma s(\mathbf{2})\times E(r)$ of overlapping to which $\gamma=3$ is applied at a overlap number n=2. As s result, in the print permitting pixel arrangement shown in FIG. 10C, the sum of the repulsive potentials associated with the presence of the object print permitting pixel Do is $1\times\beta E(\mathbf{0})+1\times\alpha E(r)+2\times\beta E(r)+\gamma s(\mathbf{2})\times E(r)$.

Figure 10D:
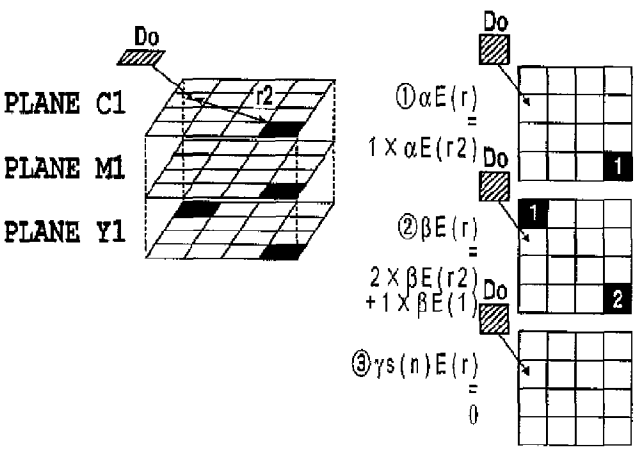
FIG. 10D is a diagram schematically showing the process of applying a repulsive potential and attenuating total energy according to the first embodiment of the present invention.

FIG. 10D is a diagram illustrating that in the print permitting pixel arrangement shown in FIG. 10C, movement of the print permitting pixel Do changes the sum of repulsive potentials of this print permitting pixel. As shown in FIG. 10D, when the print permitting pixel Do (located on the plane C1) shifts to an adjacent pixel on the same plane, the sum of the repulsive potentials associated with the presence of the print permitting pixel Do changes into $\beta E(\mathbf{1})+1\times\alpha E(r\mathbf{2})+2\times\beta E(r\mathbf{2})$ because the distance changes into r2 from r and the number n of overlaps becomes 0. For the print permitting pixel arrangement shown in FIG. 10C, the sum of the repulsive potentials $1\times\beta E(\mathbf{0})+2\times\alpha E(r)+1\times\beta E(r)\ \gamma s(\mathbf{2})\times E(r)$ is compared with the sum of the repulsive potentials resulting from movement of the print permitting pixel Do in FIG. 10D. This determines a change in the sum of the repulsive potentials after the movement.

In the above description, the sum of the repulsive potentials is obtained by determining the sum of energies of the print permitting pixels between two pixels, or of the print permitting pixels among three pixels when the print permitting pixel is moved. However, this is for simplification and the sum of the repulsive potentials is of course obtained by integrating the repulsive potentials on the basis of the relationship between the print permitting pixel of interest and print permitting pixels including those of other possible pixels other than the above print permitting pixels.

If, of the print permitting pixels for each of which the sum of the repulsive potentials is calculated as shown in FIGS. 10A to 10C, for example the print permitting pixel Do shows the largest repulsive potential sum, changes in repulsive potential after the movement of the pixel Do is determined as described in FIG. 10D and the print permitting pixel Do is moved to the pixel with most decreasing of repulsive potential sum. This processing is repeated to enable a reduction in the total energy of the three planes. That is, the print permitting pixel arrangement of the superposing of the three planes is appropriately distributed with few low frequency components.

When the print permitting pixels are appropriately dispersed among the three superposed planes of masks C1, M1, and Y1, the print permitting pixels are also appropriately dispersed among the complementary masks C2, M2, and Y2. Further, the print permitting pixels of superposing of an arbitrary number (2, 3, 4, or 5) of these 6 planes are also appropriately dispersed and have few low frequency components. In an area in which an image is printed in order of the forward and backward scans according to the present embodiment, printing is executed using the mask C1 for the first pass, the mask M1 for the first pass, the mask Y1 for the first pass, the mask Y2 for the second pass, the mask M2 for the second pass, and the mask C2 for the second pass in this order so that the mask patterns overlap one another. Accordingly, the distributions of ink dots in the following intermediate images have few low-frequency components and are highly dispersive: "C for the first pass+M for the first pass", "C for the first pass+M for the first pass+Y for the first pass", "C for the first pass+M for the first pass+Y for the first pass+Y for the second pass", "C for the first pass+M for the first pass+Y for the first pass+Y for the second pass+M for the second pass", and "C for the first pass+M for the first pass+Y for the first pass+Y for the second pass+M for the second pass+C for the second pass". Likewise, in an area in which an image is printed in order of the backward and forward scans, printing is executed using the mask C1 for the first pass, the mask Y1 for the first pass, the mask M1 for the first pass, the mask C1 for the second pass, the mask M2 for the second pass, and the mask Y2 for the second pass in this order so that the mask patterns overlap one another. Accordingly, the distributions of ink dots in the following intermediate images have few low-frequency components and are highly dispersive: "Y for the first pass+M for the first pass", "Y for the first pass+M for the first pass+C for the first pass", "Y for the first pass+M for the first pass+C for the first pass+C for the second pass", "Y for the first pass+M for the first pass+C for the first pass+C for the second pass+M for the second pass", and "Y for the first pass+M for the first pass+C for the first pass+C for the second pass+M for the second pass+Y for the second pass". Then, dots printed in accordance with dot print data for each pass which is generated using the above masks are also appropriately dispersed. That is, as described above, when an arrangement pattern of print permitting pixels of a mask has few low-frequency components, an arrangement pattern of dots printed using these masks is free from a dot arrangement bias or the like in the dot arrangement pattern in the original image not subjected to the mask processing yet. That is, dot patterns printed using masks for each pass contain few low-frequency components and are highly dispersive as is the case with mask patterns.

Thus, even if the inks do not sufficiently penetrate at an intermediate image stage due to the relative relationship between the inks and the print medium, the probability that insufficiently penetrating inks contact each other to form grains can be reduced owing to the well-dispersed ink dots. This makes it possible to suppress what is called beading resulting from grains. Even if grains are formed, they will be also appropriately distributed and less significantly affect the grade of print images.

Thus, since the inks do not necessarily need to penetrate sufficiently at an intermediate image stage, the printer 104 can reduce the difference in printing time among the planes, that is, the difference in ejection time. For example, this enables an increase in carriage speed or ejection frequency or a reduction in the number of passes for multi-pass printing; four passes adopted taking sufficient penetration of inks into account can be reduced to two.

In the above description, the arrangement moving method is applied to three plane masks which are used for the first pass and which are included in the masks for two passes. However, the arrangement moving method is not limited to this aspect but is applicable to all the planes to determine the arrangement of the print permitting pixels. For the masks for two pass printing according to the present embodiment, the arrangement moving method is applicable to six plane masks for two passes each for C, M, and Y. In this case, the range within which the print permitting pixels are moved is not limited to nearby pixels. Arranged pixels may be moved on the basis of the relationship between the corresponding print permitting pixels on different planes. Specifically, for example, a print permitting pixel on one plane may be moved to a pixel on the same plane on which no print permitting pixel is placed, and a print permitting pixel placed on a pixel of another plane which corresponds to the moved pixel may be moved to a pixel on the same plane which corresponds the pixel on which the above print permitting pixel was located. This makes it possible to change the arrangement relationship among the print permitting pixels on all the planes involved in the repulsive potential calculation. Consequently, the positions of the print permitting pixels can be changed to one another so as to minimize the potential energy.

Sequential Arrangement Method

This method is a method which sequentially arranges print permitting pixels in a part of plane of mask where no print permitting pixels have been arranged yet, as described above.

Figure 11:
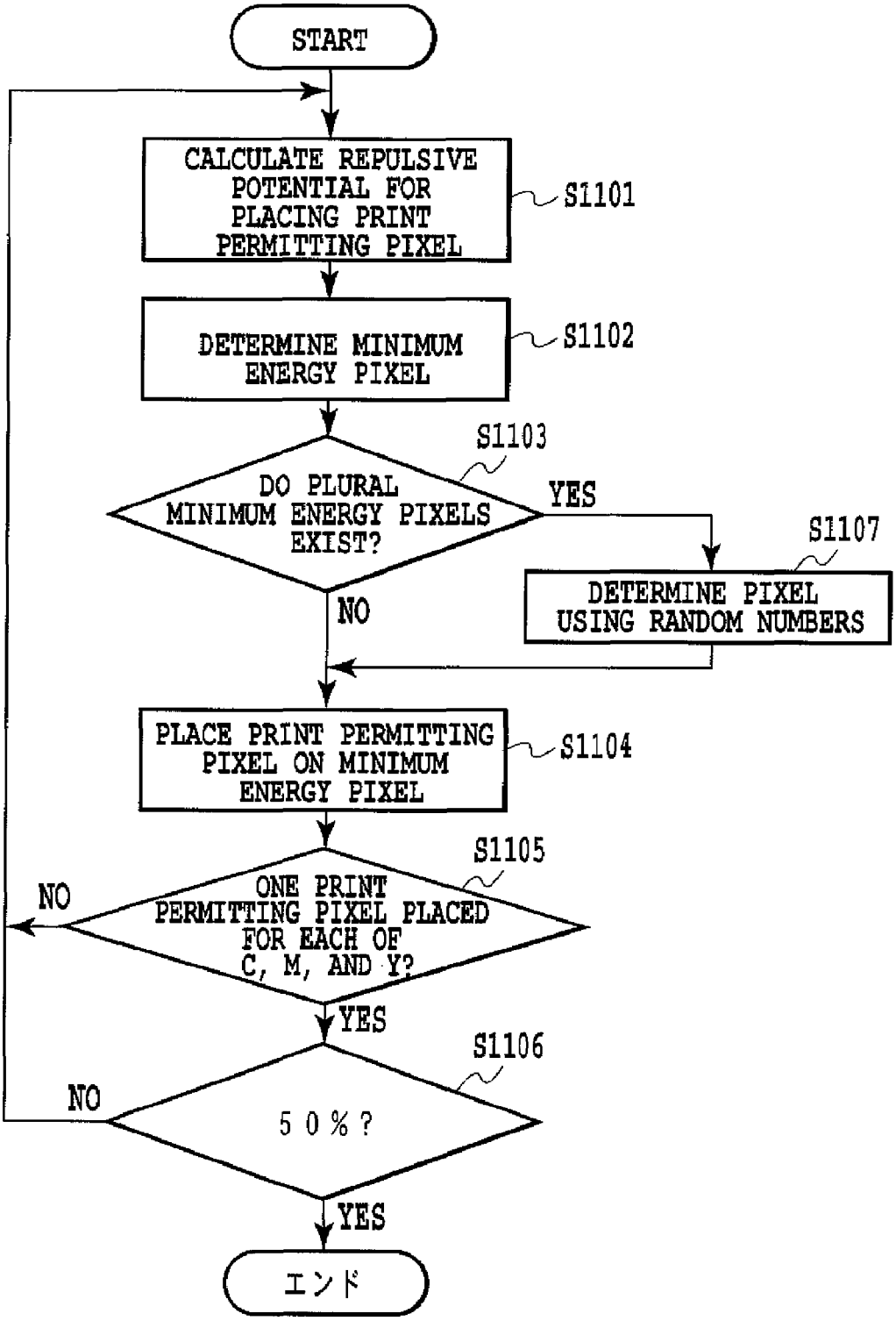
FIG. 11 is a flowchart showing the procedure of another mask generating method according to the first embodiment of the present invention.

FIG. 11 is a flowchart showing a process of determining the arrangement of print permitting pixels on the basis of the sequential arrangement method according to the present embodiment.

The process shown in FIG. 11 sequentially places a print permitting pixel on three planes in series and repeats this operation until 50% of the print permitting pixels are arranged on each plane. First, in step S1101, before a print permitting pixel has been arranged, calculation is made of the possible repulsive potential between this print permitting pixel and each of the print permitting pixels already arranged on the plane masks C1, M1, and Y1.

The repulsive potential can be calculated in the same manner as described above for the arrangement moving method. The difference between the present method and the arrangement moving method is that with reference to the example shown in FIGS. 10A to 10C, if in contrast to the above arrangement moving method, the print permitting pixel Do, shown in these figures, has not been placed yet but is to be newly placed, the repulsive potential is calculated on the basis of the relationship between the print permitting pixel Do and print permitting pixels already arranged on the same plane C1 and on the different plane M1 or Y1. As is also apparent from the description, at the initial stage where no print permitting pixels have been arranged yet, the repulsive potential has the same value regardless of the position of the print permitting pixel.

Next, in step S1102, among the repulsive potentials calculated under the assumption that the print permitting pixel is placed on each of mask pixels, mask pixels having the minimum potential energy is determined. Then, in step S1103, the method determines whether or not plural mask pixels show that minimum energy. If plural mask pixels show the minimum energy, then in step S1107, random numbers are used to determine one of the plural mask pixels. In the present embodiment, the pixel with the minimum energy is determined under the condition that on the same plane, no print permitting pixel is placed on a pixel on which a print permitting pixel has already been placed. This is because depending on a parameter such as the weighting coefficient or repulsive potential function, in the repulsive potential calculation, overlapping of print permitting pixels on the same plane may result in the minimum energy as a result of the relationship between the object print permitting pixel and print permitting pixels on the other planes and because in this case, the overlapping is prohibited because only one print permitting pixel is allowed to be placed on one mask pixel.

In step S1104, a print permitting pixel is placed on the determined mask pixel with the minimum potential energy. That is, mask data on that pixel is set to "1".

In step S1105, the method determines whether or not one print permitting pixel has been placed on each of the C, M, and Y planes. If this placement has not been finished, the processing starting in step S1101 is repeated.

When one print permitting pixel has been sequentially placed on the planes C1, M1, and Y1 in this order, in step S1106, the method determines whether or not print permitting pixels have been arranged on up to 50% of all the mask pixels. If print permitting pixels have not been arranged on up to 50% of the mask pixels, the processing starting in step S1101 is repeated. Once 50% of the print permitting pixels have been arranged on each of the three planes, the present process is finished. After the masks C1, M1, and Y1 for the first pass are thus set, the complementary masks C2, M2, and Y2 are subsequently set.

The above described sequential arrangement method also makes it possible to produce masks having characteristics similar to those of masks produced by the above arrangement moving method. That is, for the three planes of masks C1, M1, and Y1 obtained by the sequential arrangement method, the print permitting pixels are appropriately dispersed in the superposed masks. Accordingly, the print permitting pixels are also appropriately dispersed for the masks C2, M2, and Y2, which are complementary to the masks C1, M1, and Y1. Further, the print permitting pixels are also appropriately dispersed on an arbitrary number (2, 3, 4, or 5) of these 6 planes and have few low-frequency components.

The above mask generating methods are further characterized by generating no such a periodic pattern as has regularly repeated print permitting pixel arrangements. These methods do not generate, for example, such a periodic pattern as has repeated any checker pattern or any repeated Beyer type arrangements. Even if such a pattern is generated, re-setting the repulsive potential parameter enables convergence to the state in which generation of period patterns is avoided. Thus, masks generated by the mask generating methods according to the present embodiment have aperiodic patterns.

In the above mask generating methods, each plane is not set to avoid the use of particular print permitting pixels. However, even if particular pixels on each plane are set to be unused as print permitting pixels, well-dispersed masks with few low-frequency components can be obtained with the use of these pixels avoided.

(3) Mask Characteristic Evaluation

Effect of Repulsive Potential Weighting Coefficients $\alpha$, $\beta$, and $\gamma s(n)$ on Masks First, a specific description will be given of the effects of the weighting coefficients $\alpha$, $\beta$, and $\gamma s(n)$ for the repulsive potential calculation (discussion will not be given of the distance but only of effects of the coefficients) on masks generated by the mask generating methods according to the present embodiment, described above. As described above, the coefficient $\alpha$ acts on the dispersion of print permitting pixels on the same plane. The coefficient $\beta$ acts on the dispersion of print permitting pixels between different planes. The coefficient $\gamma s(n)$ acts on the dispersion of overlaps if print permitting pixels on different planes are located on the same pixel and overlap each other.

In the present embodiment, the same function (FIG. 9) is used for all the terms as E(r). However, different potential functions may be used for the respective terms. In this case, of course, a difference in dispersion described below essentially corresponds to the difference among $\alpha E(r)$ and $\beta E(r)'$ and γE(r)" that are the product of the function E(r) and each of the corresponding weighting coefficients α, β, and γ(n).

If the repulsive potential is defined only for print permitting pixels on the same plane and energy is attenuated to determine the print permitting pixel distribution, that is, if α=1 for αE(r) and β=γ=0, the print permitting pixel arrangement on one plane is such that the print permitting pixels are appropriately dispersed on each plane. This is due to the effect of αE(r). However, a pattern of overlapping print permitting pixels (a logical product or a logical sum) extracted from two (plural) superposed planes is biased in terms of the arrangement of print permitting pixels and has a large amount of low frequency components. This is because some print permitting pixels on two planes may happen to overlap one another or because a bias may result from the lack of association between two planes.

Figure 12:
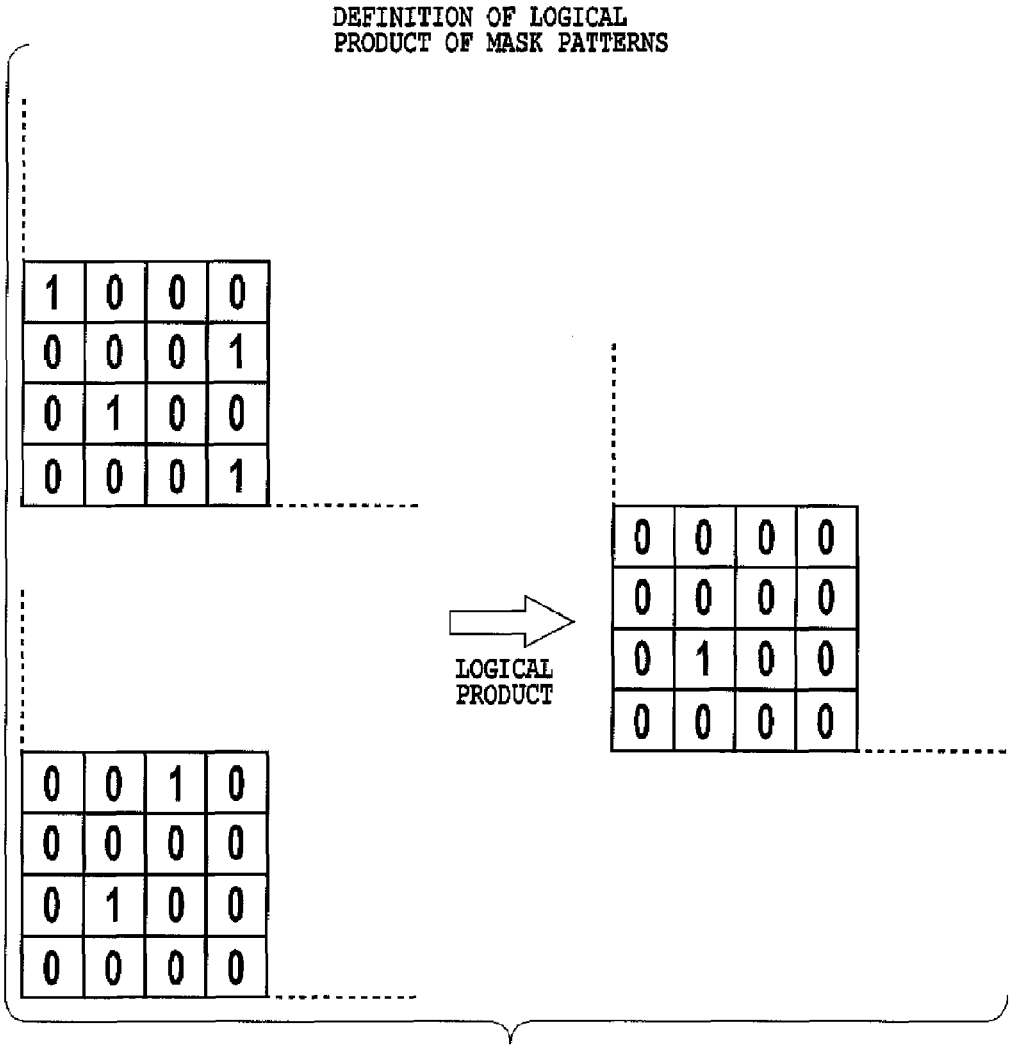
FIG. 12 is a diagram illustrating the logical product of mask patterns.

The "logical product" pattern is obtained by performing a logical product operation on the same pixel position on plural planes as shown in FIG. 12. Specifically, when print permitting pixels ("1") are present at the corresponding pixel positions on plural (in the illustrated example, two) planes, a logical product pattern is obtained by extracting these positions. The logical product pattern shows a distribution of overlapping print permitting pixels between different planes.

Figure 13:
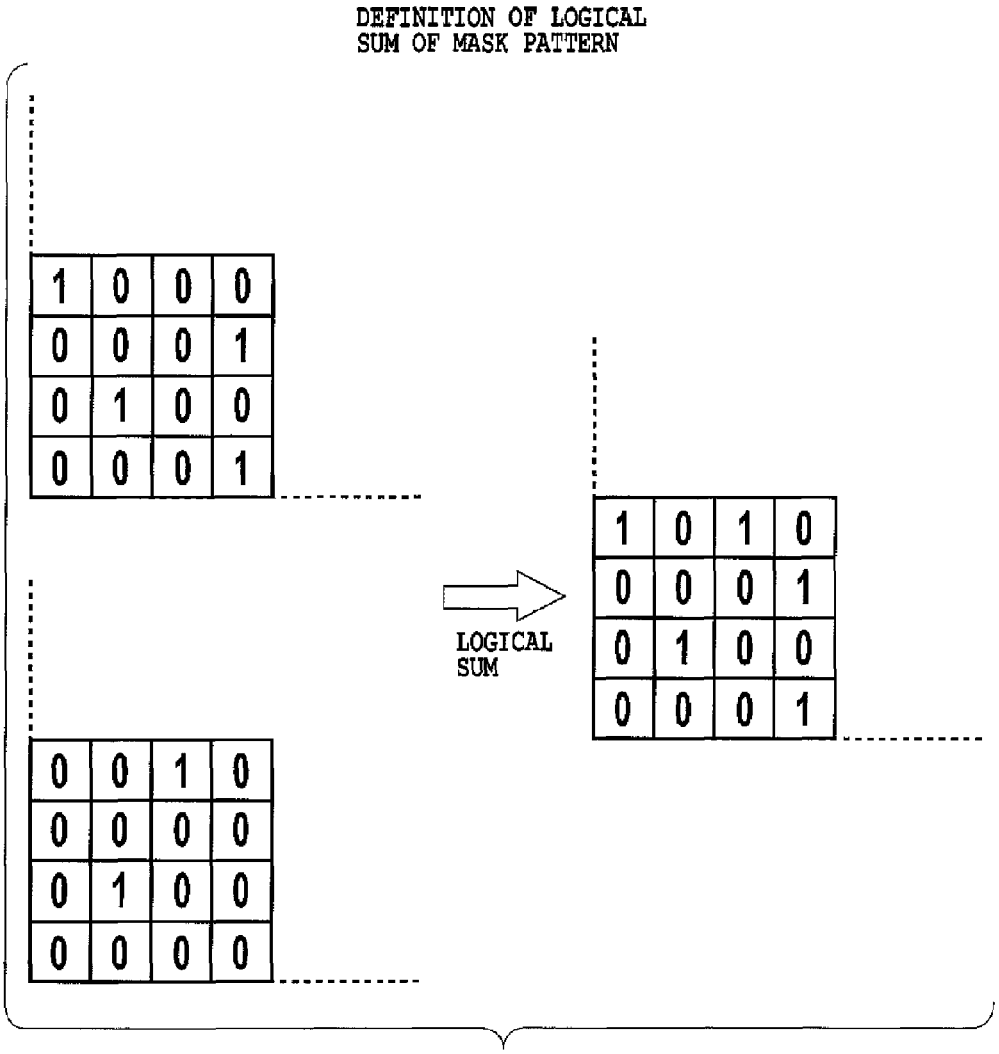
FIG. 13 is a diagram illustrating the logical sum of the mask patterns.

A "logical sum" pattern is obtained by performing a logical sum operation on the same pixel position on plural planes as shown in FIG. 13. Specifically, when a print permitting pixel ("1") is present at a certain pixel position on one of plural (in the illustrated example, two) planes, a logical sum pattern is obtained by extracting this position. The logical sum pattern shows the respective arrangement of print permitting pixels on the different planes, as an arrangement of print permitting pixels on one plane.

Next, it is assumed that the same repulsive potential is applied to all the print permitting pixels on the three planes, that is, α=β=1 for αE(r) and βE(r) and γ=0. In this case, the print permitting pixel distribution on each plane has a certain amount of low frequency components and has biased distribution. On the other hand, the print permitting pixel distribution (logical sum) on the superposed three color planes is appropriately dispersive. This is because α and β have the same value, so that the effect of dispersion of print permitting pixels on the same plane is the same as that on the other planes, with resultant insufficient dispersion of print permitting pixels on each plane.

Thus, to vary the repulsive potential between the same plane and different planes, for example, α=3 and β=1 are set. This makes it possible to relatively reduce the effects of the other planes, improving the dispersion within the same plane. Moreover, the print permitting pixel dispersion (logical sum pattern) of two superposed planes is appropriately dispersive and has few low-frequency components. Thus, the dispersion of print permitting pixels is improved both on the same plane and on different planes. That is say, the dispersion both on the same plane and on different planes is improved by making the terms αE(r) and βE(r) effective and making the values α and β different from each other.

Next, discussion will be given first of the case in which the term γs(n)E(r) is not used when some print permitting pixels overlap one another. Two planes having print permitting pixel distributions having few low-frequency components are superposed without making the term γs(n)E(r) effective. Then, overlapping print permitting pixels (the logical product) are extracted from the resulting print permitting pixel distribution and have an inappropriate distribution with a large amount of low frequency components.

In contrast, the use of the term γs(n)E(r) first provides each plane with a print permitting pixel distribution having few low-frequency components. Then, a distribution of overlapping print permitting pixels (the logical product) extracted from a print permitting pixel distribution of the superposed planes has an arrangement with few low-frequency components.

Thus, the term γs(n)E(R) is basically effective in appropriately dispersing overlapping print permitting pixels. Here, as described with reference to FIGS. 10A to 10D, this term is set so that the potential increases consistently with the number of overlaps and thus moves or arranges each print permitting pixel according to the potential to attenuate the energy, and give an effect that reduces the number of the overlaps while lowering the energy. This means that the above effect is the same as that of αE(r) for reducing the number of adjacent print permitting pixels on the same plane. Thus, the term γs(n)E(r) is effective not only in dispersing overlapping print permitting pixels as much as possible but also in reducing the number of overlaps. This effect makes it possible to minimize the number of print permitting pixels in a mass of adjacent or overlapping print permitting pixels. As a result, a print permitting pixel distribution with few low-frequency components can be obtained.

Consequently, the present embodiment uses the values α=3, β=1, and γ=3 as described above.

For example, α, β<<γ may be set and overlapping print permitting pixels extracted from plural superposed planes may be noted so that the effect of the term γs(n)E(r) is utilized to obtain an appropriate dispersion in which overlapping print permitting pixels have very few low frequency components.

Further, in the present embodiment, the repulsive forces among the planes are all βE(r). However, the interactions among the planes may be effectively varied taking the magnitudes of the interactions into account. For example, the repulsive potential between planes of masks used for inks landed at as short a time interval as possible is made higher than the other repulsive potentials. In other words, the coefficient of βE(r) or the shape of E(r) may be effectively varied among the planes. Further, for example, when a reaction system is used for fixation, if ink containing a reaction liquid or such a component is ejected using the print head, it is effective to make the repulsive potential between a plan mask used for the reaction liquid or the like and a plane mask used for ink that reacts markedly with the reaction liquid or the like, higher than a normal repulsive potential. A specific example of variation of the repulsive potential function is variation of the coverage distance r of the repulsive force. For example, r may be 16 at most as described above when image data for processing has a gray scale value of 50% and may increase as the gray scale value increases above or decreases below 50%.

In the present specification, more even dispersion of print permitting pixels or their overlaps means a "more appropriate dispersion" or a "better dispersion". The "even dispersion" correspond to, in the above example of the repulsive potential, the minimized total energy, that is, the minimized number of overlaps or adjacencies in a mass of overlapping or adjacent print permitting pixels. Moreover, in this state, the print permitting pixels are arranged as evenly as possible. Furthermore, the expression "a decrease in an amount (value) of low frequency components" means that the amount (value) of frequency components in an area (low frequency area) relating to sensitive human visual characteristics decreases depending on the level of the dispersion.

Mask According to the Present Embodiment and Mask in Conventional Example

Figure 14:
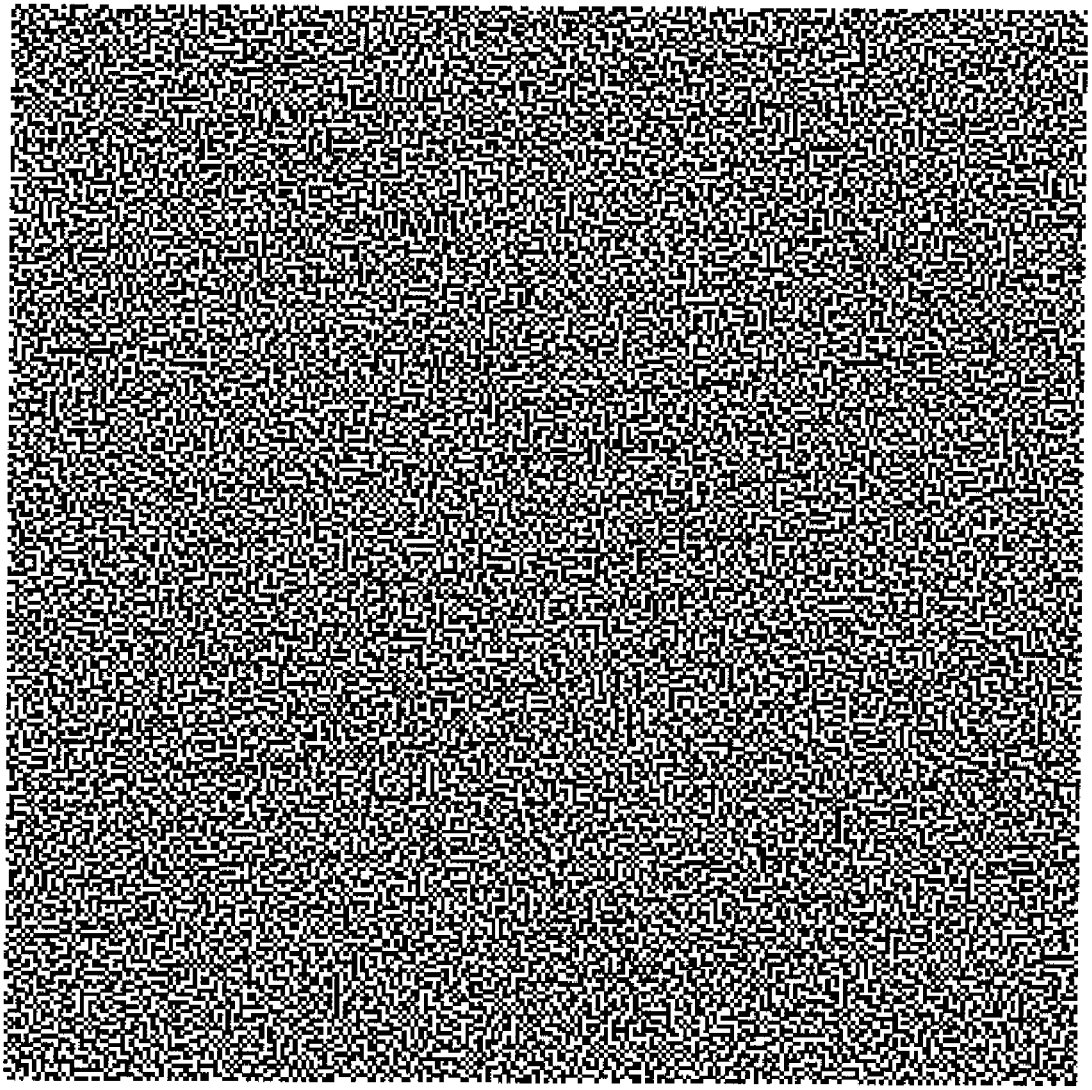
FIG. 14 is a diagram showing an arrangement of print permitting pixels in a mask pattern according to the first embodiment of the present invention.
Figure 15:
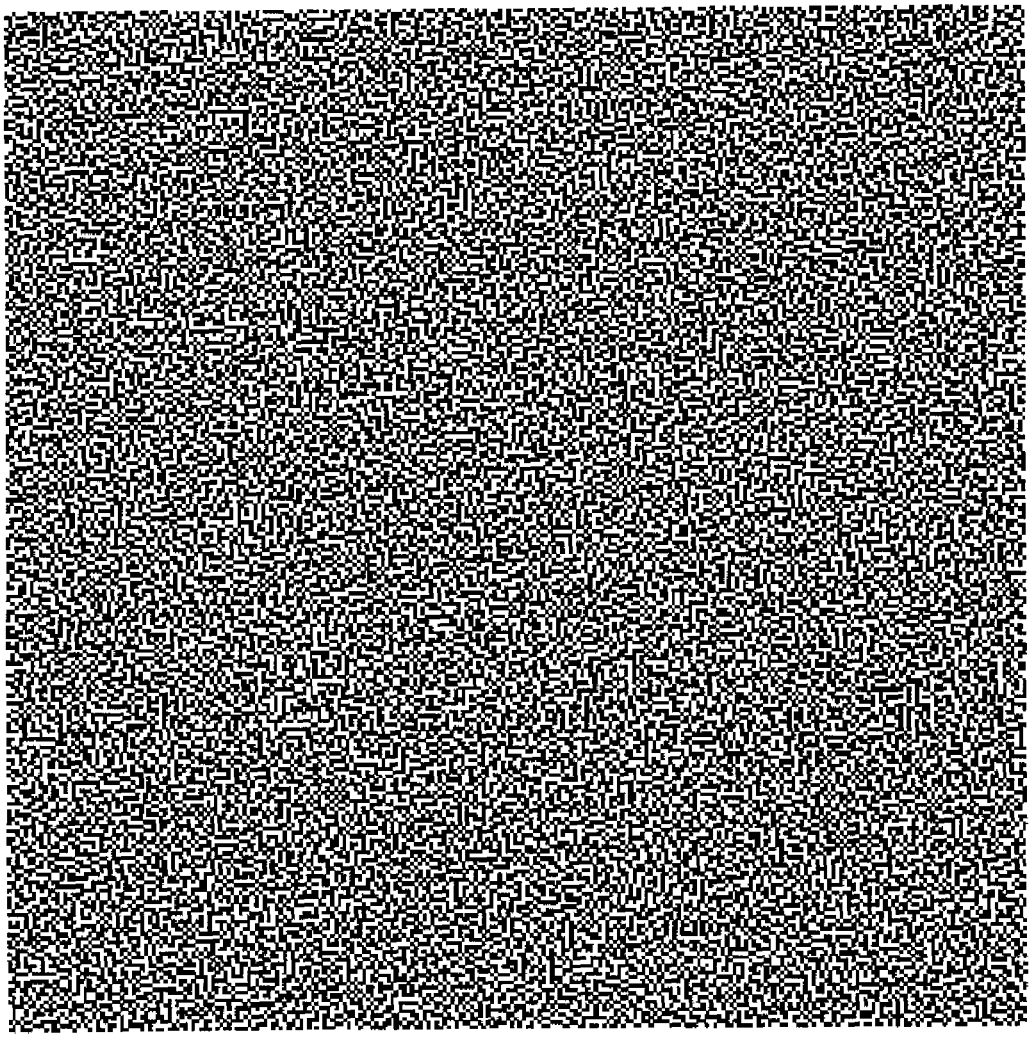
FIG. 15 is a diagram showing an arrangement of print permitting pixels in a mask pattern according to the first embodiment of the present invention.
Figure 16:
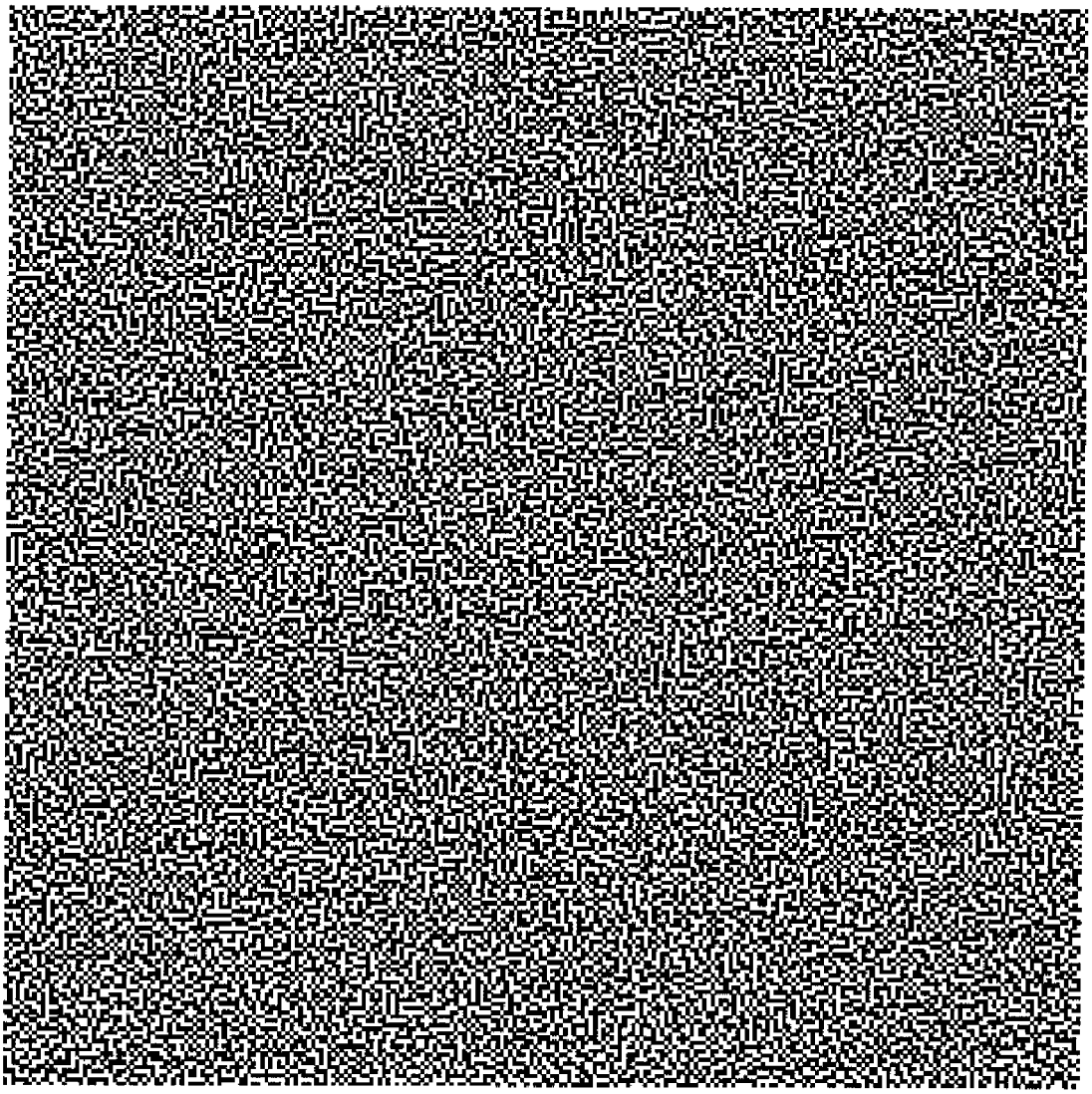
FIG. 16 is a diagram showing an arrangement of print permitting pixels in a mask pattern according to the first embodiment of the present invention.
Figure 17:
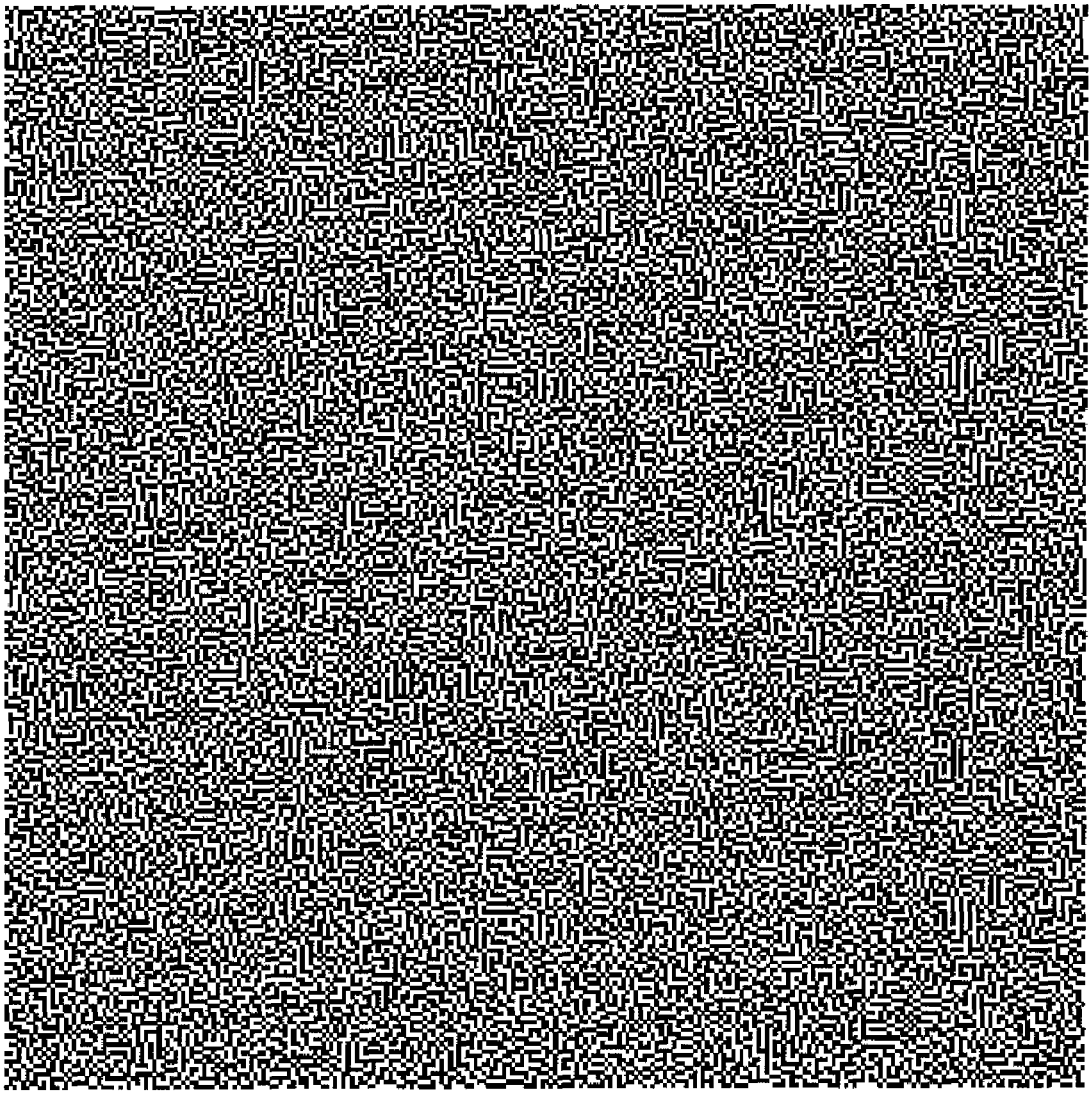
FIG. 17 is a diagram showing an arrangement of print permitting pixels in a mask pattern according to a comparative example.
Figure 18:
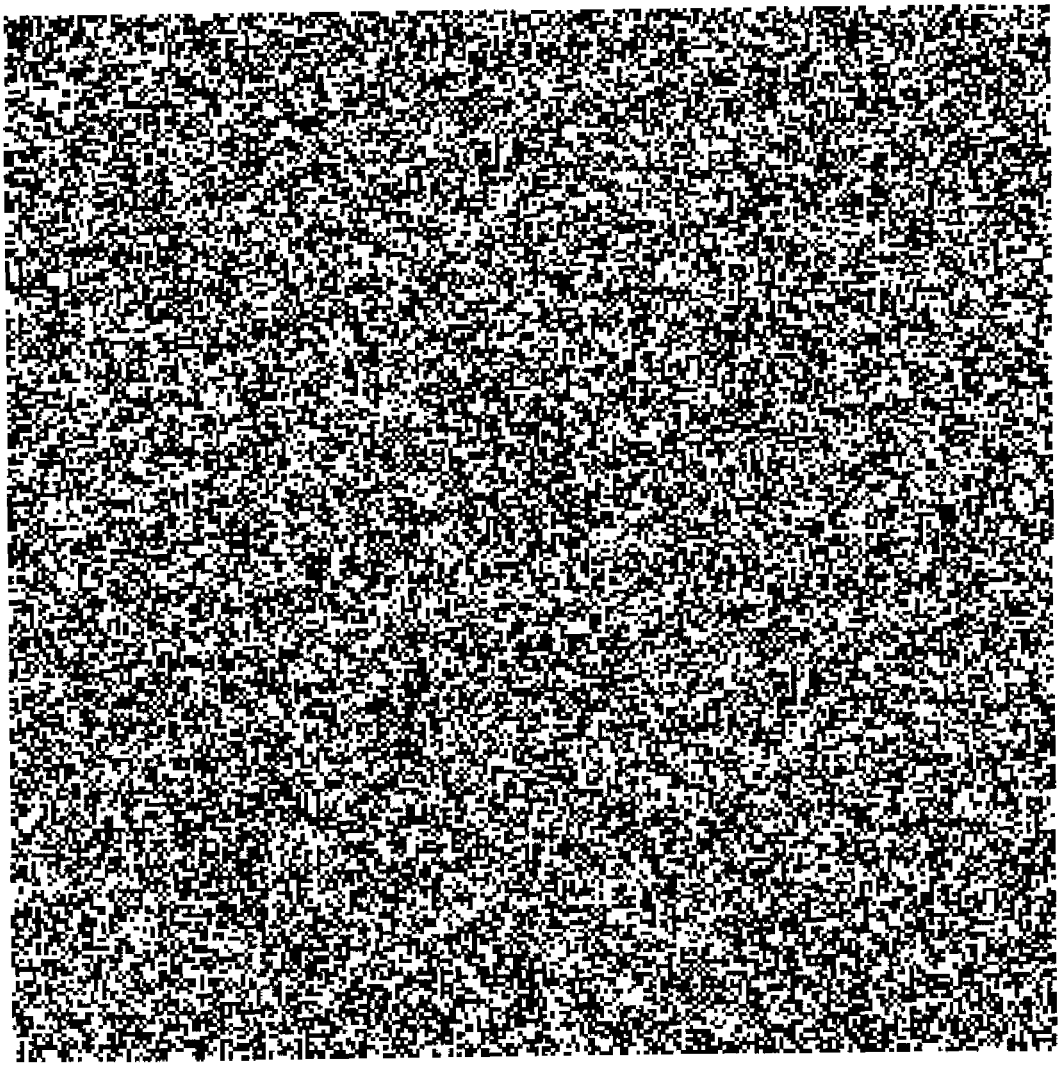
FIG. 18 is a diagram showing an arrangement of print permitting pixels in a mask pattern according to a comparative example.

FIGS. 14 to 16 are diagrams showing respective arrangement patterns of print permitting pixels of masks C1, M1 and Y1 (hereinafter referred to as "layer masks") according to the present embodiment, which are generated by the above generating method. FIGS. 17 and 18 are diagrams showing similar arrangement patterns of print permitting pixels of conventional masks. More specifically, FIG. 17 shows the pattern of a mask generated according to the method described in Patent Document 1 (referred to as a "dispersed mask only in self plane"), which can be used for the cyan ink for the first pass. FIG. 18 shows the pattern of a random mask described in Patent Document 2. Each of the mask patterns shown in FIGS. 14 to 18 has an area size of 256 pixels×256 pixels. In each pattern, white pixels represent print non-permitting pixels (a pixel that masks image data regardless of the matter of the image data on corresponding pixel). Black pixels represent print permitting pixels (a pixel that permits dots to be formed depending on the matter of the image data on the pixels).

As shown in these figures, only the random mask shown in FIG. 18 gives the observer the impression that it is rough and lacks smoothness, compared to the other masks. This is because in generating the random mask pattern, the print permitting pixels are randomly arranged without taking into account the correlations (the coefficient $\alpha$) among the dot positions within that plane. In contrast, the print permitting pixels are arranged in the patterns of the "dispersed mask only in self plane" (FIG. 17) and the mask (FIGS. 14 to 16) according to the present embodiment, so as to especially take into account the dispersion of the print permitting pixels within the same plane based on the effect of the coefficient $\alpha$. This avoids biasing the dispersion of the print permitting pixels, giving the observer the impression that the masks are generally smooth.

Figure 19:
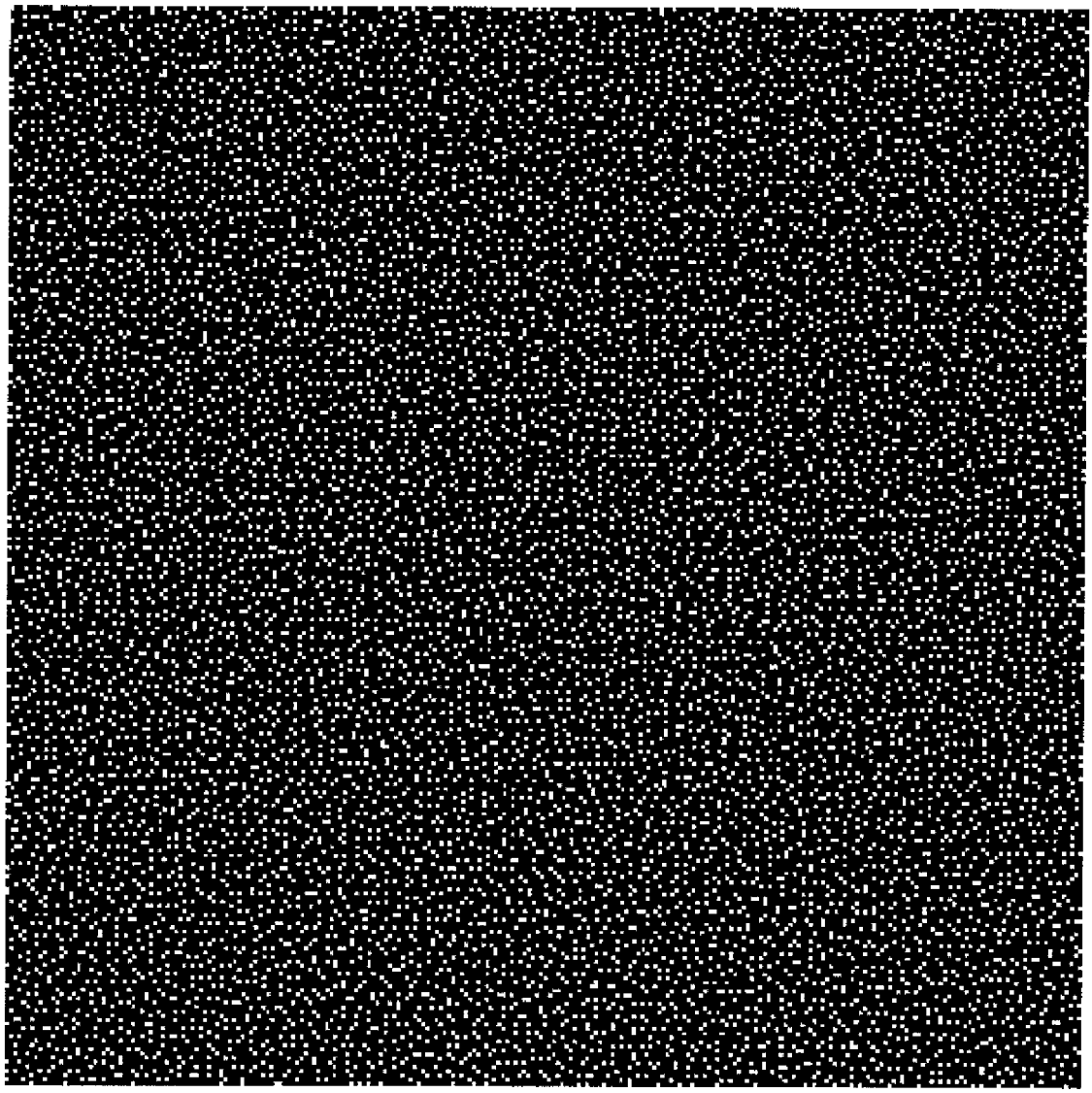
FIG. 19 is a diagram showing an arrangement of print permitting pixels in the logical sum of two mask patterns according to the first embodiment of the present invention.
Figure 20:
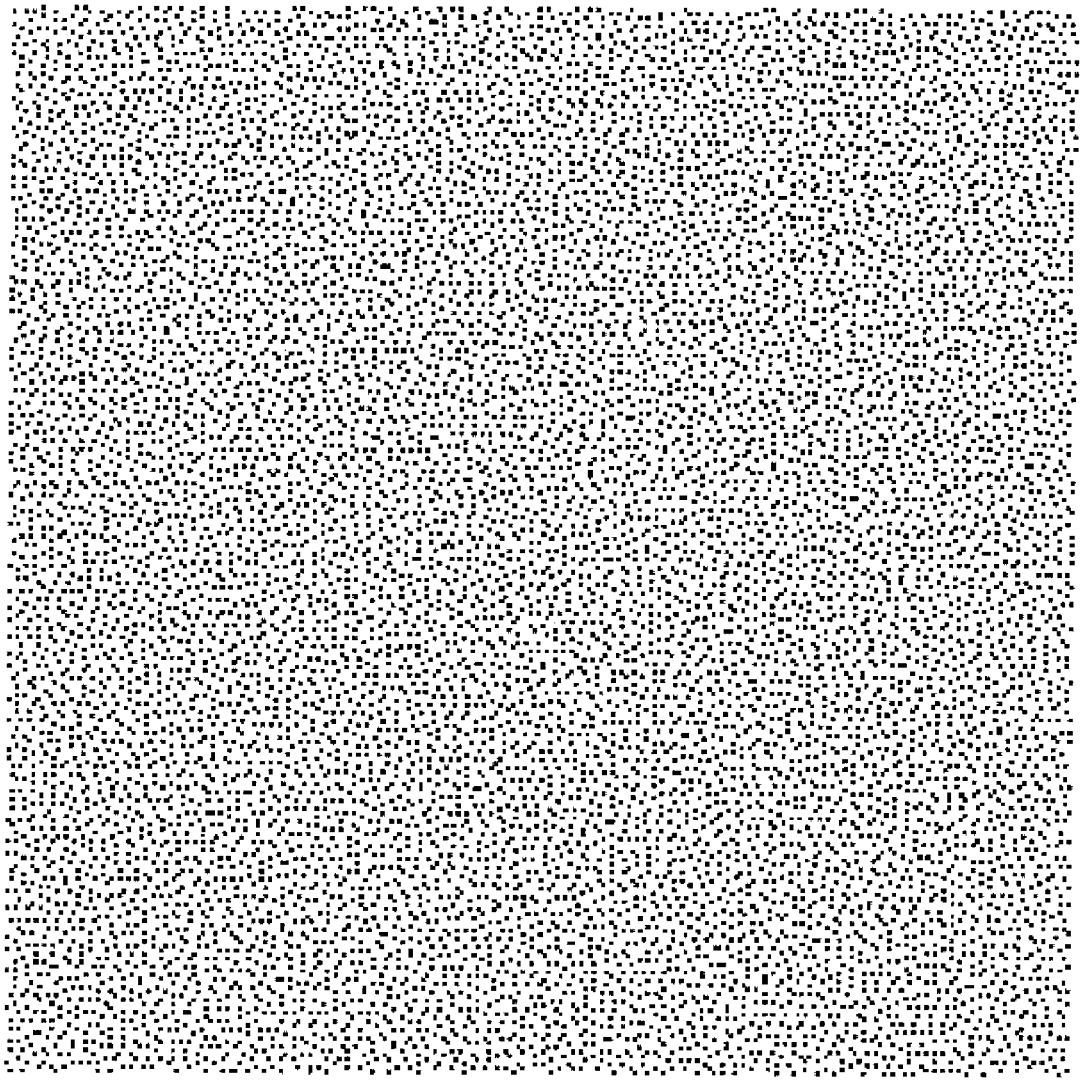
FIG. 20 is a diagram showing an arrangement of print permitting pixels in the logical product of two mask patterns according to the first embodiment of the present invention.
Figure 21:
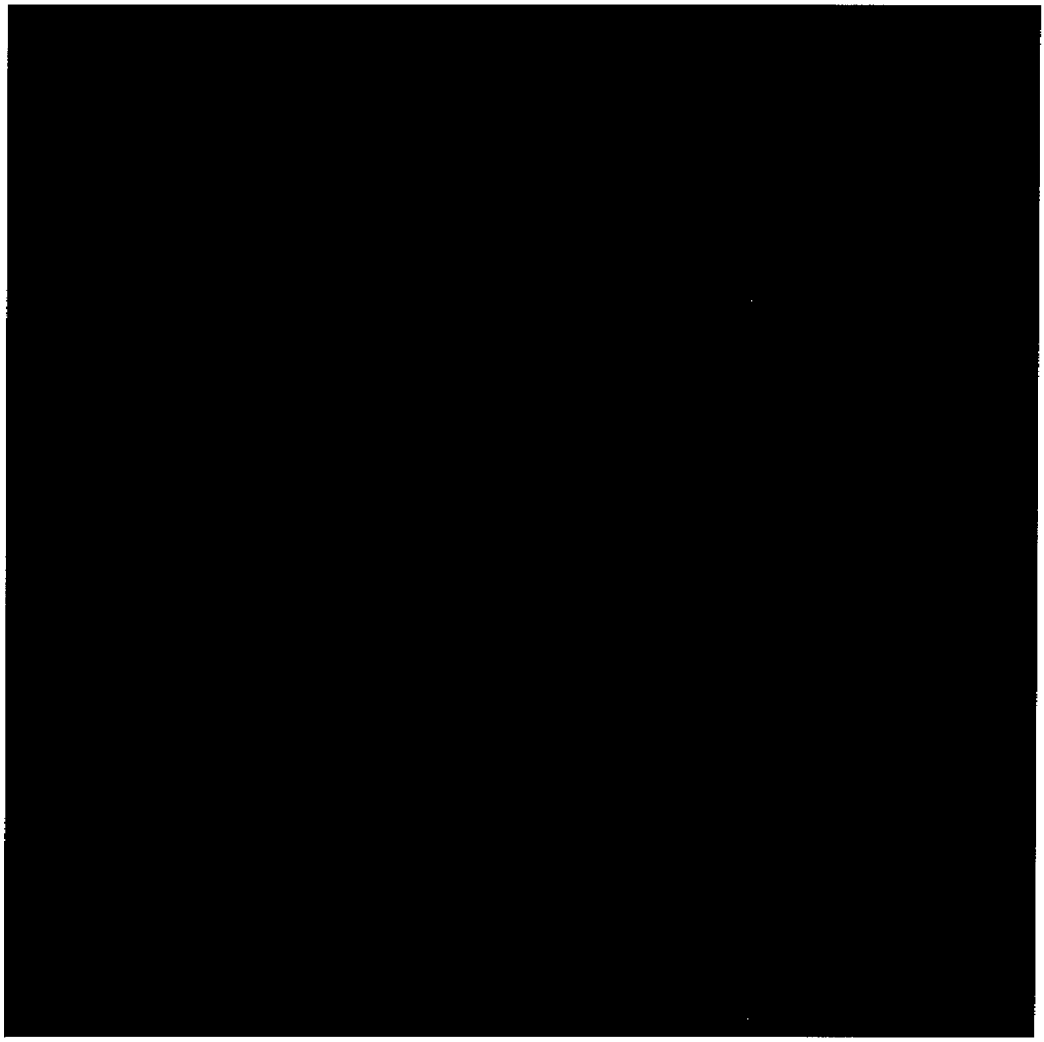
FIG. 21 is a diagram showing an arrangement of print permitting pixels in the logical sum of three mask patterns according to the first embodiment of the present invention.
Figure 22:
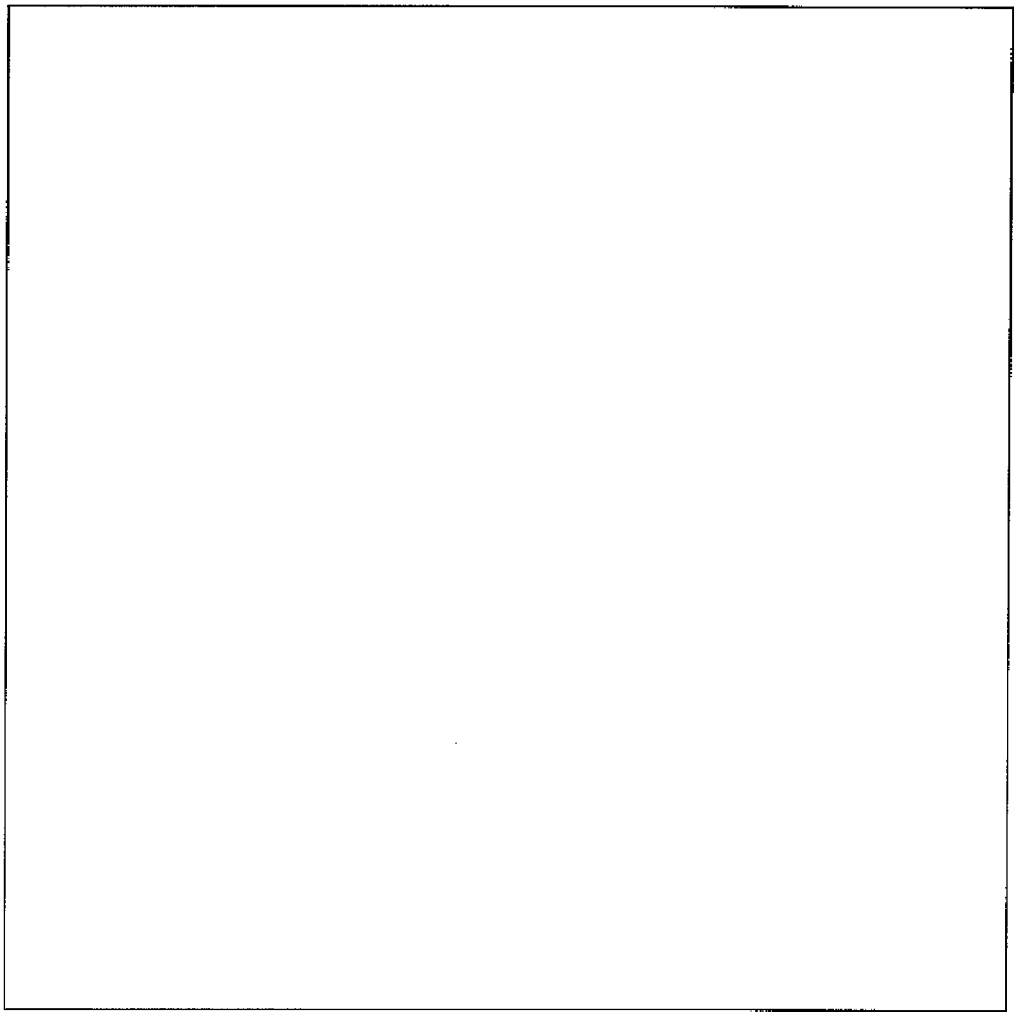
FIG. 22 is a diagram showing an arrangement of print permitting pixels in the logical product of three mask patterns according to the first embodiment of the present invention.
Figure 23:
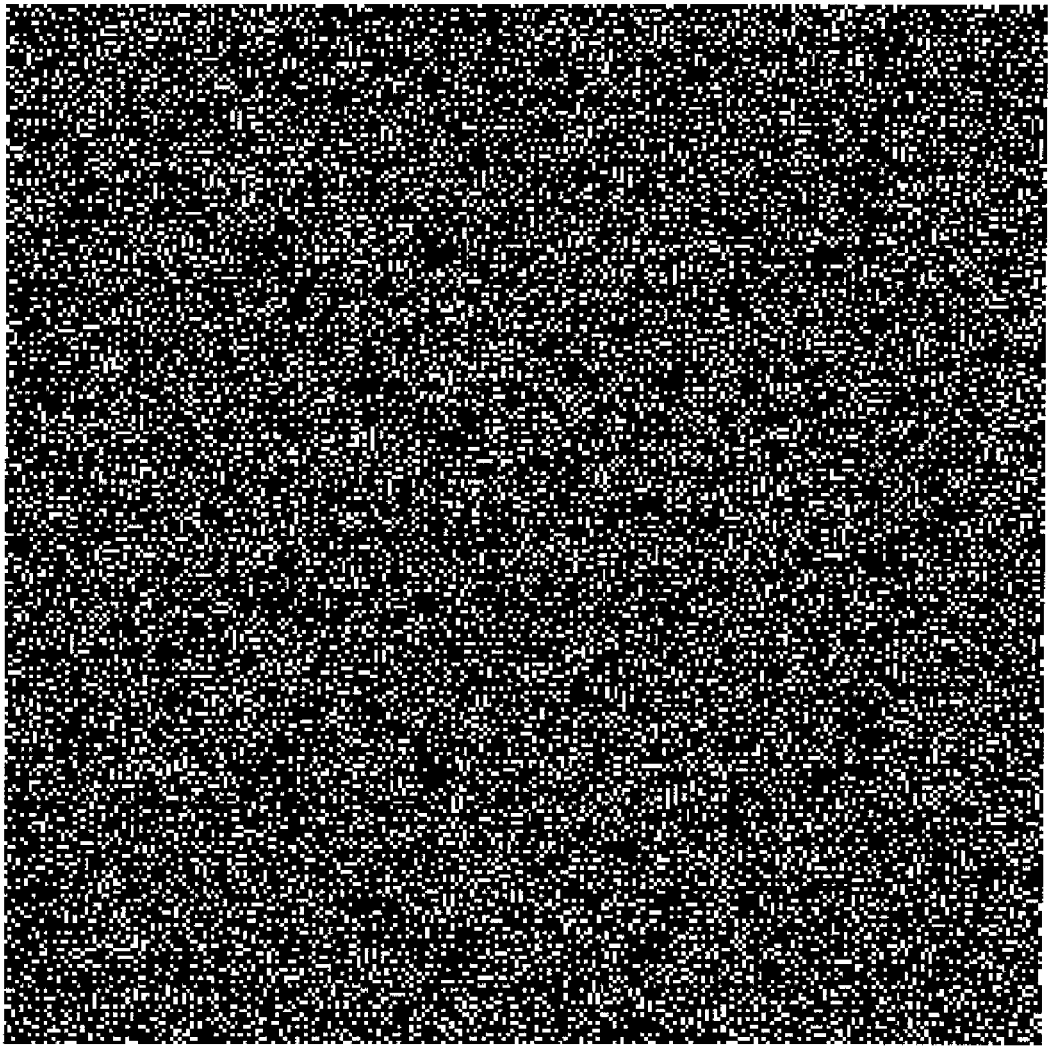
FIG. 23 is a diagram showing an arrangement of print permitting pixels in the logical sum of two mask patterns according to a comparative example.
Figure 24:
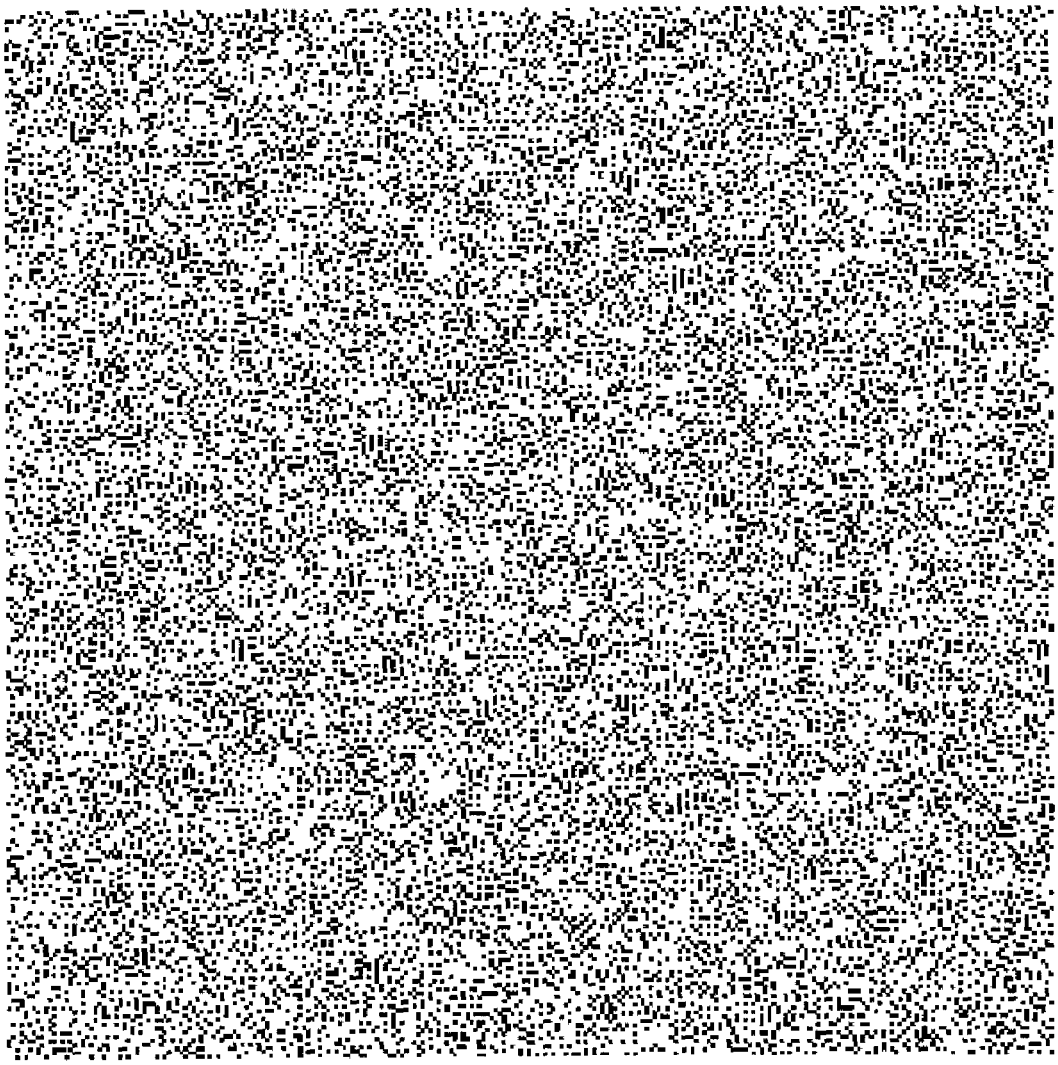
FIG. 24 is a diagram showing an arrangement of print permitting pixels in the logical product of the two mask patterns according to the comparative example.
Figure 25:
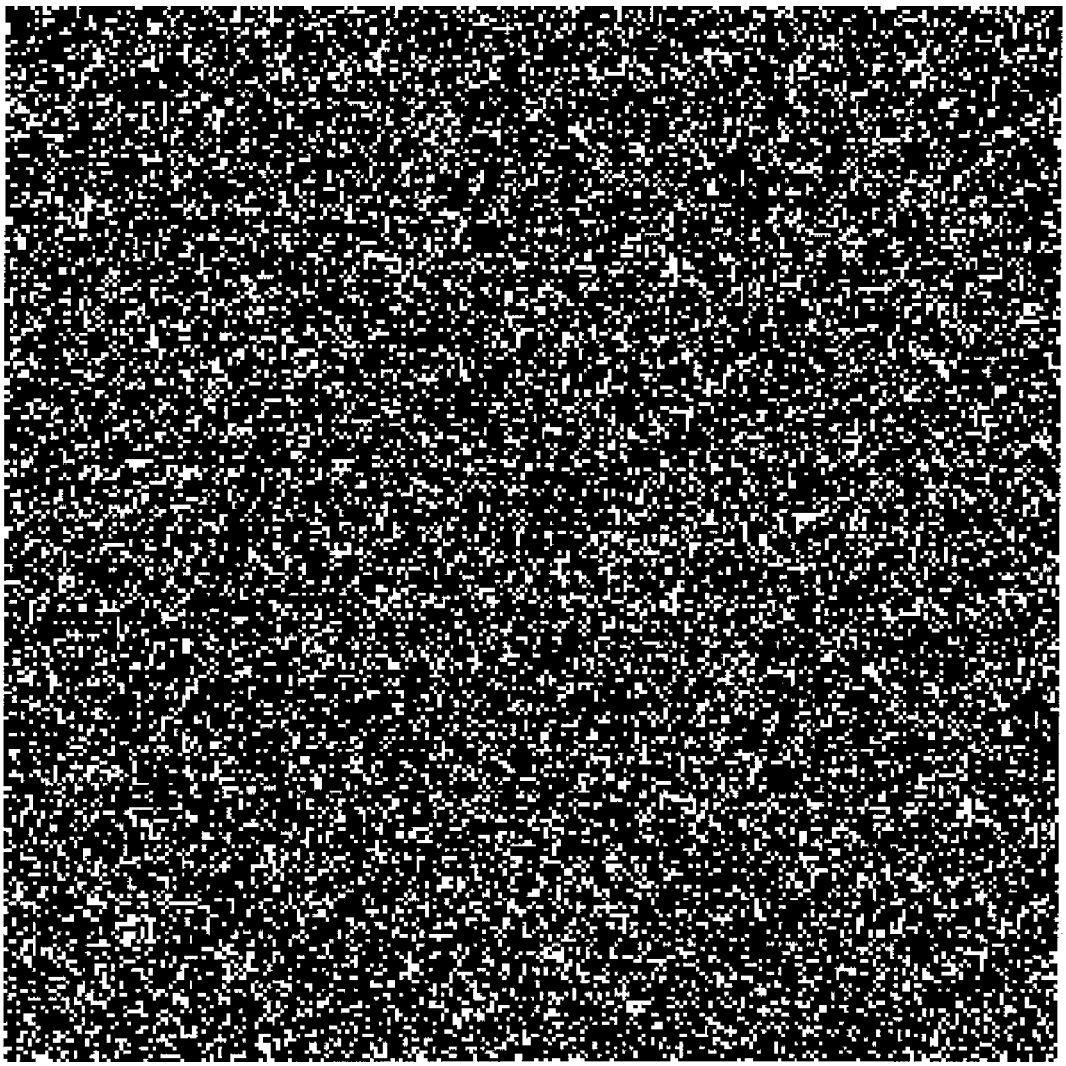
FIG. 25 is a diagram showing an arrangement of print permitting pixels in the logical sum of two mask patterns according to another comparative example.
Figure 26:
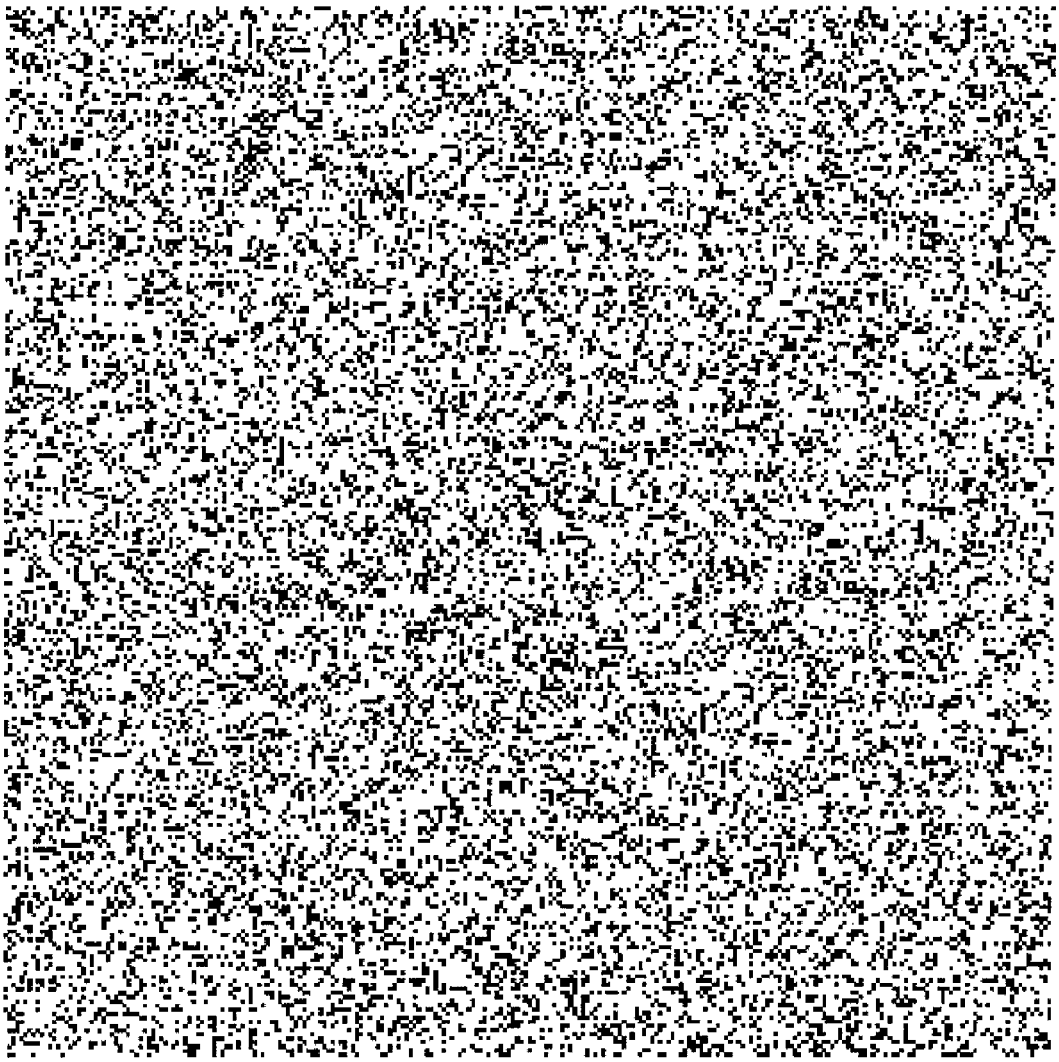
FIG. 26 is a diagram showing an arrangement of print permitting pixels in the logical product of the two mask patterns according to the comparative example in FIG. 25.

FIGS. 19 and 20 are diagrams showing a logical sum and logical product patterns, respectively, of the layer masks C1 and M1 according to the present embodiment shown in FIGS. 14 and 15. Further, FIGS. 21 and 22 are diagrams showing a logical sum and logical product patterns, respectively, of the layer masks C1, M1 and Y1 shown in FIGS. 14, 15 and 16. FIGS. 23 and 24 are diagrams showing a logical sum and logical product patterns, respectively, of two masks of the dispersed mask only in self plane according to the conventional example. FIGS. 25 and 26 are diagrams showing a logical sum and logical product patterns, respectively, of two random masks according to the conventional example.

As shown in FIGS. 19 and 20, the following are appropriately dispersed and do not give the observer any rough feeling: the arrangement (logical sum) of the print permitting pixels obtained by superposing the two masks according to the present embodiment each other and the arrangement (logical product) of overlapping print permitting pixels extracted from the above arrangement. This is because the print permitting pixels are arranged on the two planes taking into account the dispersion of the print permitting pixels between the two planes (the coefficient $\beta$) and the dispersion of the overlaps themselves (the coefficient $\gamma s(n)$).

Further, as shown in FIG. 21, the print permitting pixels are generally closely arranged in the logical sum pattern of the print permitting pixels obtained by superposing the three masks according to the present embodiment on one another. That is, since the present embodiment takes the dispersion of the print permitting pixels among the three plans into account (the coefficient $\beta$), the print permitting pixels are appropriately dispersed among the three planes. As a result, the print permitting pixels are generally closely arranged. Moreover, the planes are even masks for two pass printing, and the print permitting pixels are thus arranged on each of the planes at a density of 50%. Consequently, the three superposed planes have a density of 150%, and thus do not prevent the overlapping of the print permitting pixels from being eliminated. However, the present embodiment uses the coefficient $\gamma s(n)$ to limit the number of overlaps to two. As a result, in the logical product pattern obtained by extracting overlapping print permitting pixels on the three planes, no such overlaps are present, as shown in FIG. 22.

In contrast, the logical sum and logical product patterns obtained by superposing the masks of the "dispersed mask only in self plane" disclosed in Patent Document 1, which are planes of different colors, are dispersed less appropriately than those according to the present embodiment (FIGS. 19 and 20), as shown in FIGS. 23 and 24. This is because Patent Document 1 takes the dispersion on the same plane into account but not the dispersion of the print permitting pixels between the planes (the coefficient $\beta$) or the dispersion of overlaps of the print permitting pixels (the coefficient $\gamma s(n)$). The random masks according to the conventional example also show an inappropriately dispersed logical sum and logical product patterns as shown in FIGS. 25 and 26.

Another method for evaluating a mask pattern is defined to use a "superposing" pattern. As shown in FIG. 27, this "superposing" pattern is such that when a print permitting pixel ("1") is present at a certain mask pixel on plural (in the illustrated example, two) planes, the data "1" indicating a print permitting pixel is present on the corresponding pixels, and such that when print permitting pixels overlap each other on the same mask pixel, data corresponding to the number of overlaps is present. For example, if two overlaps are present, the data indicates "2". If three overlaps are present, the data indicates "3". The "superposing" pattern is represented by a density corresponding to the number indicated by the data, as shown later. That is, the black density increases consistently with the number of overlapping print permitting pixels. The superposing pattern can show, on one plane, the arrangements of the print permitting pixels of the different planes and also can show the arrangement of the overlapping print permitting pixels with the degree of the overlapping.

Figure 28:
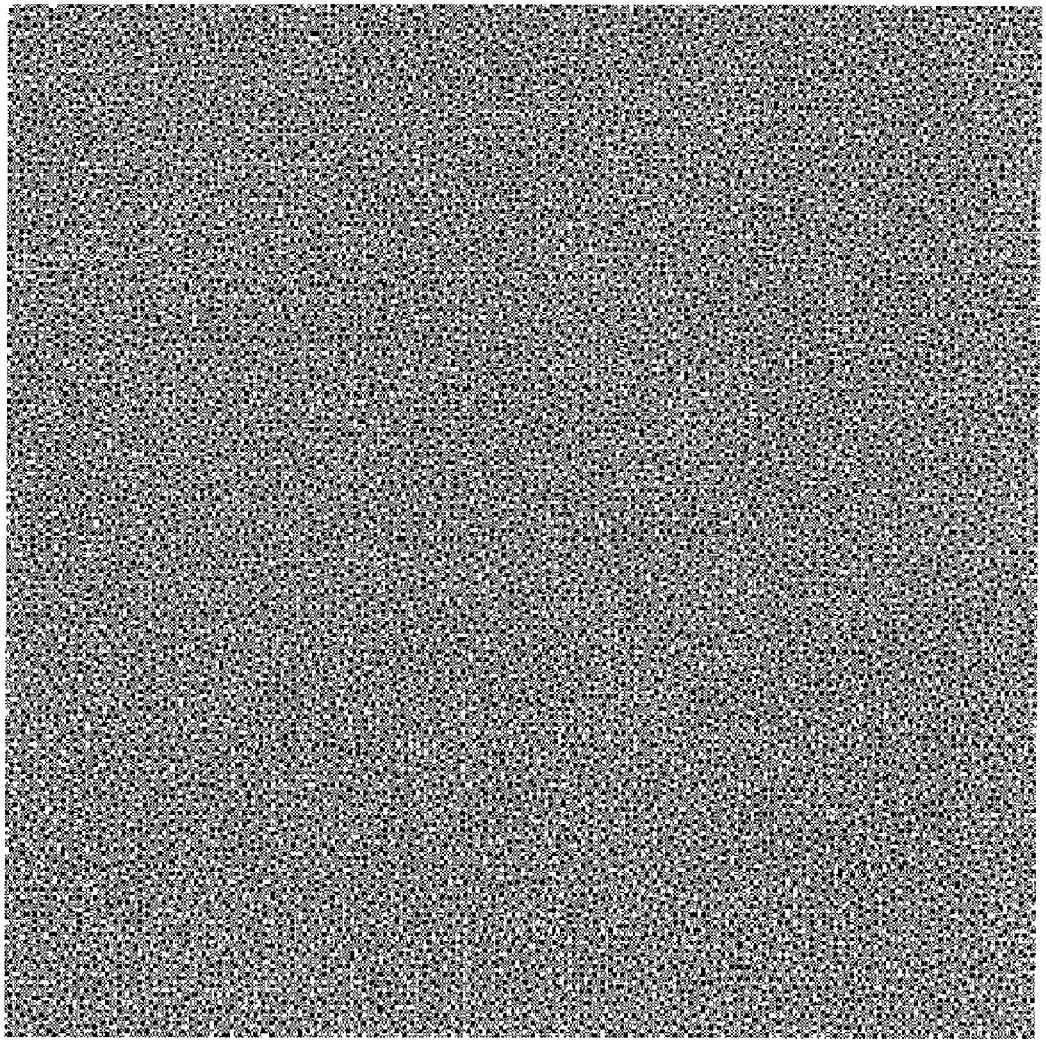
FIG. 28 is a diagram showing an arrangement of print permitting pixels in "superposing" of two mask patterns according to the first embodiment of the present invention.
Figure 29:
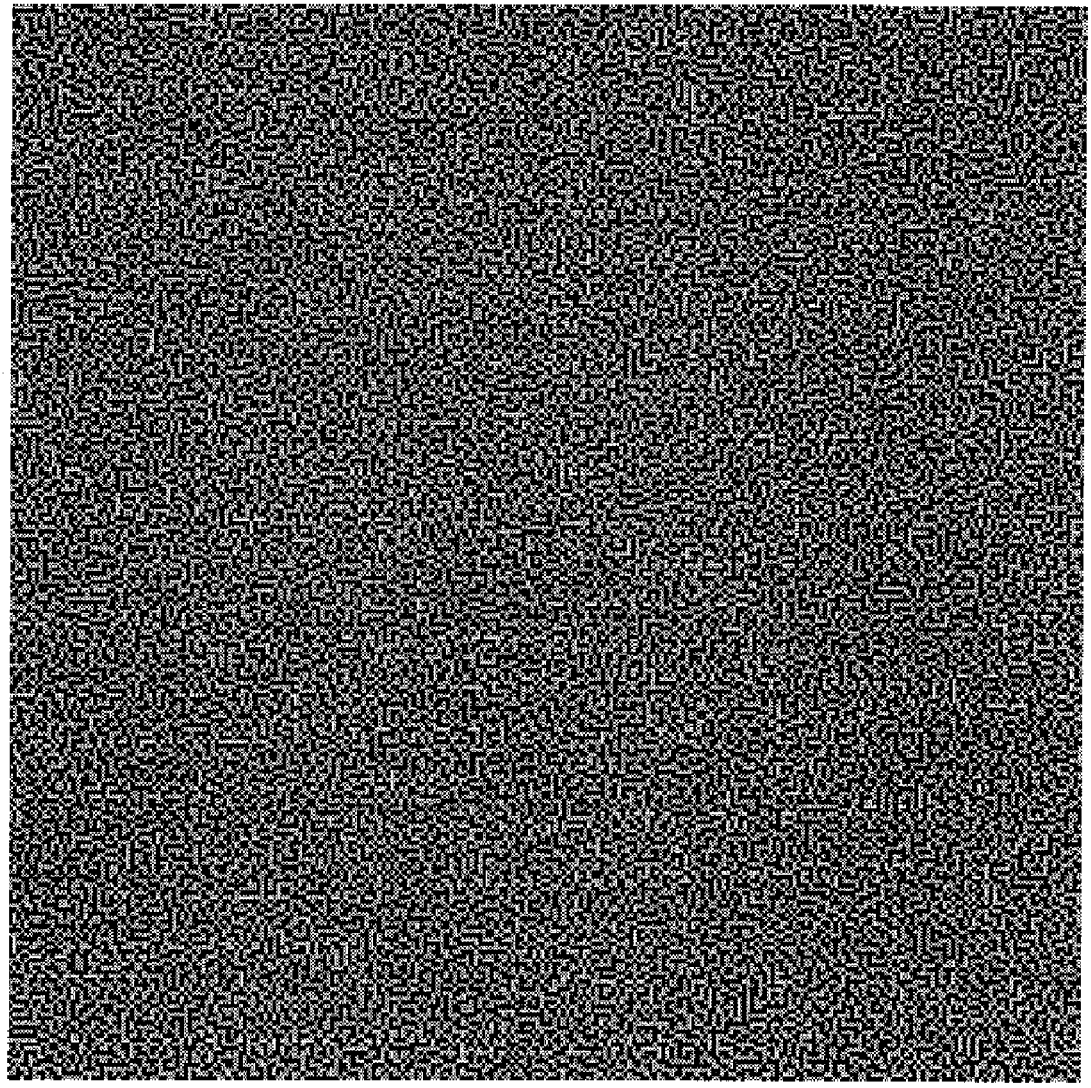
FIG. 29 is a diagram showing an arrangement of print permitting pixels in "superposing" of three mask patterns according to the first embodiment of the present invention.

FIGS. 28 and 29 show "superposing" patterns in which two and three layer masks, respectively, according to the present embodiment are superposed each other.

The patterns shown in FIGS. 28 and 29 are similar to ink dot patterns in intermediate images obtained when printing is executed using the masks according to the present embodiment. Accordingly, these patterns also show that the ink dots and their overlaps are appropriately dispersed in the intermediate images.

Figure 30:
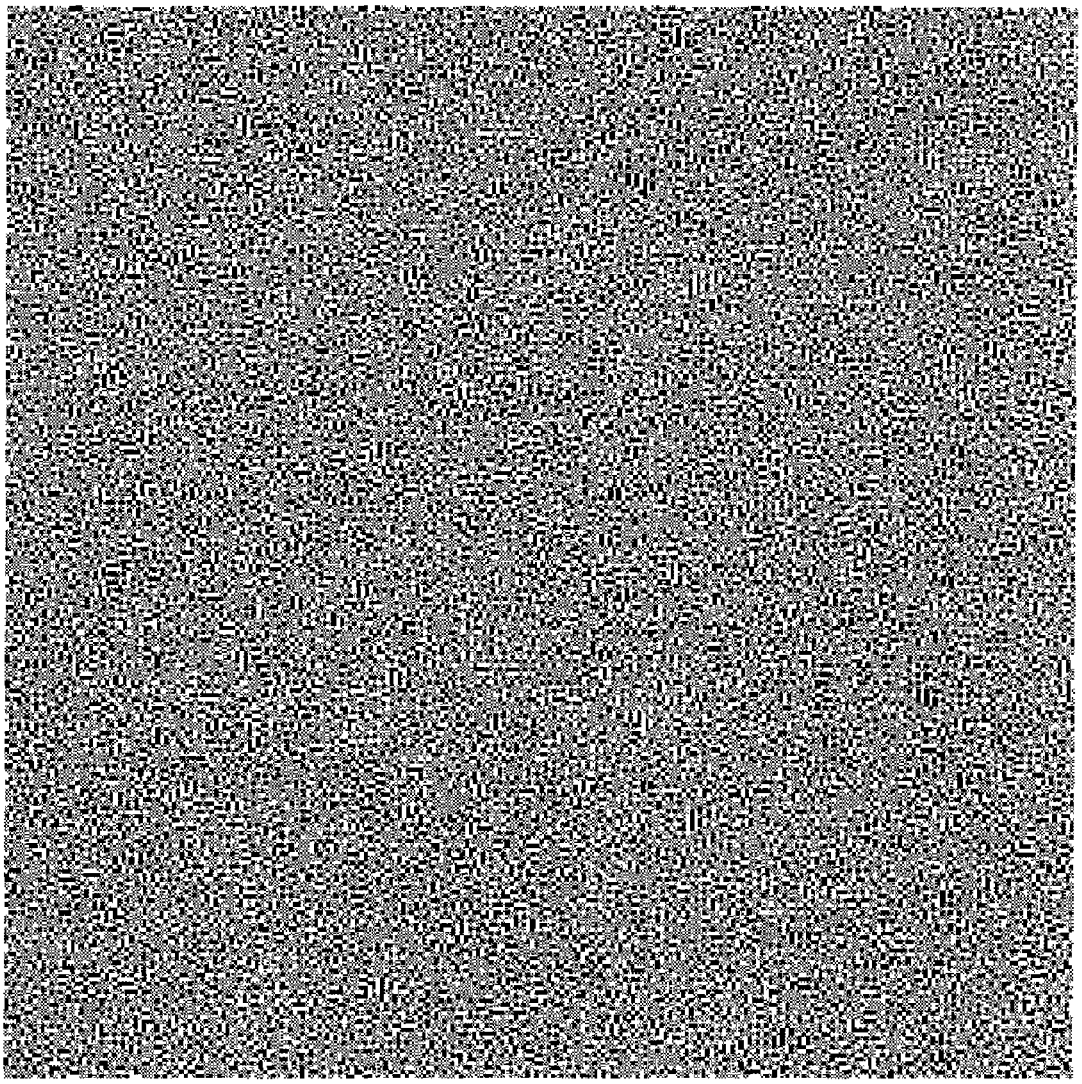
FIG. 30 is a diagram showing an arrangement of print permitting pixels in "superposing" of two mask patterns according to a comparative example.
Figure 31:
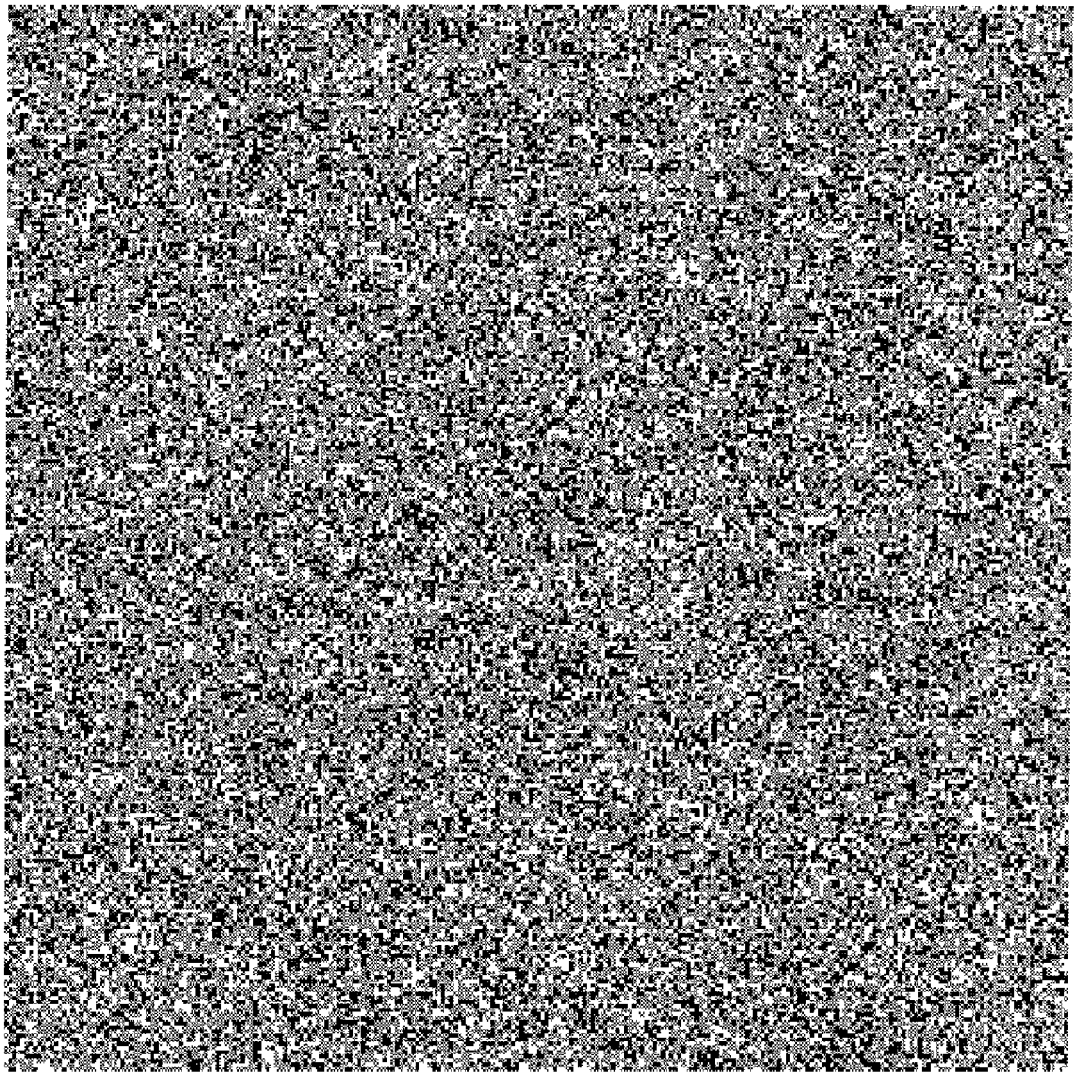
FIG. 31 is a diagram showing an arrangement of print permitting pixels in "superposing" of two mask patterns according to another comparative example.

FIGS. 30 and 31 show "superposing" patterns of two masks of the dispersed mask only in self plane and of random mask, according to the conventional example. These figures show that in the "superposing" pattern of the conventional masks, the print permitting pixels and their overlaps are also inappropriately dispersed.

Evaluations Based on Power Spectra

Now, the mask according to the present embodiment is evaluated on the basis of a power spectrum showing the frequency characteristics of the mask pattern. The power spectrum described below is obtained by changing the arrangement of print permitting pixels to a dot arrangement and is obtained for a plane of size 256 pixels×256 pixels. This power spectrum is a radially average power spectrum described in "T. Mitsa and K. J. Parker, "Digital Halftoning using a Blue Noise Mask", Proc. SPIE 1452, pp. 47-56 (1991)", which allows two-dimensional space frequencies to be handled as one-dimensional ones.

Figure 32:
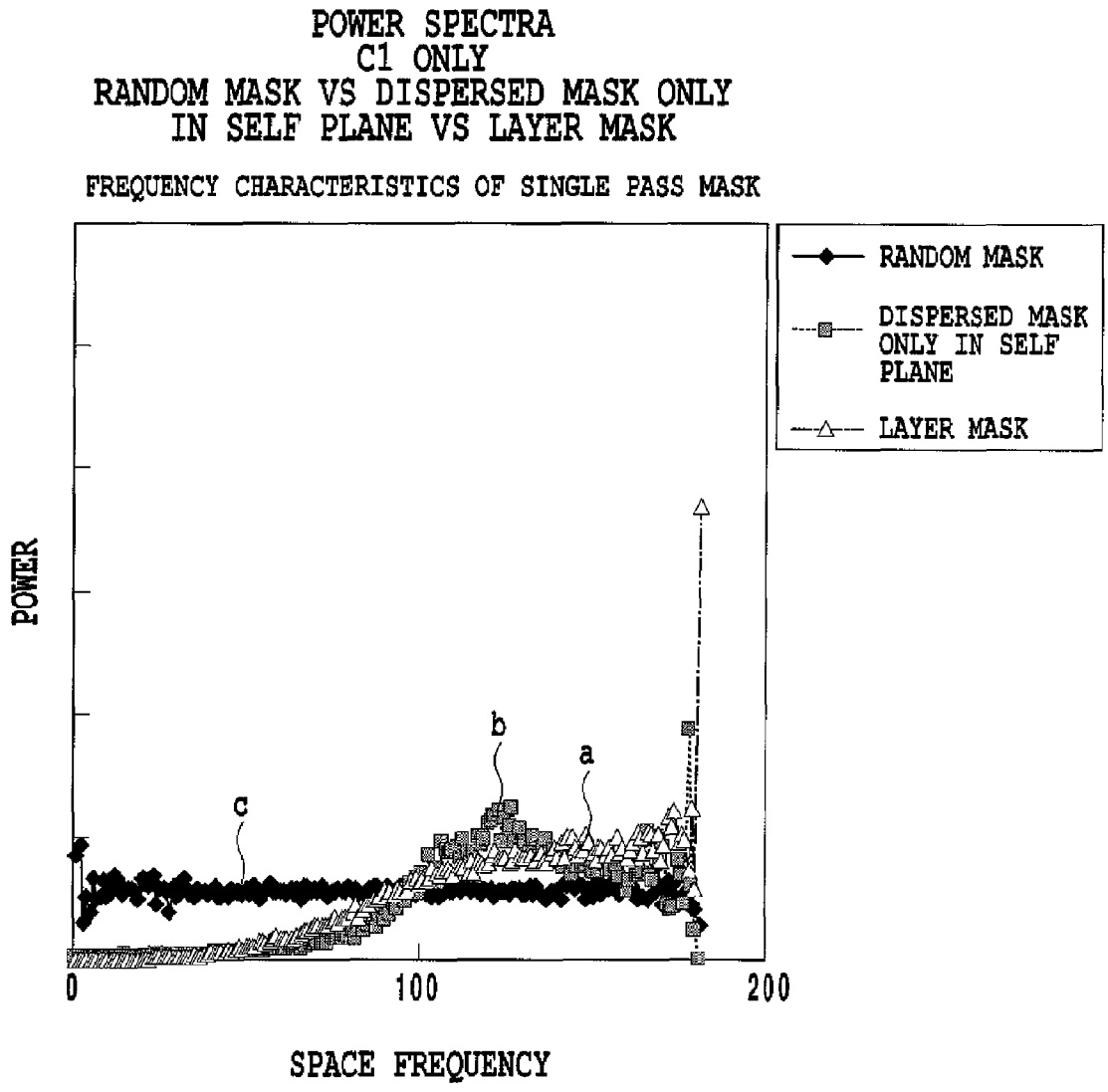
FIG. 32 is a diagram illustrating the frequency characteristics of a mask according to the first embodiment of the present invention and a mask according to a conventional example.
Figure 33:
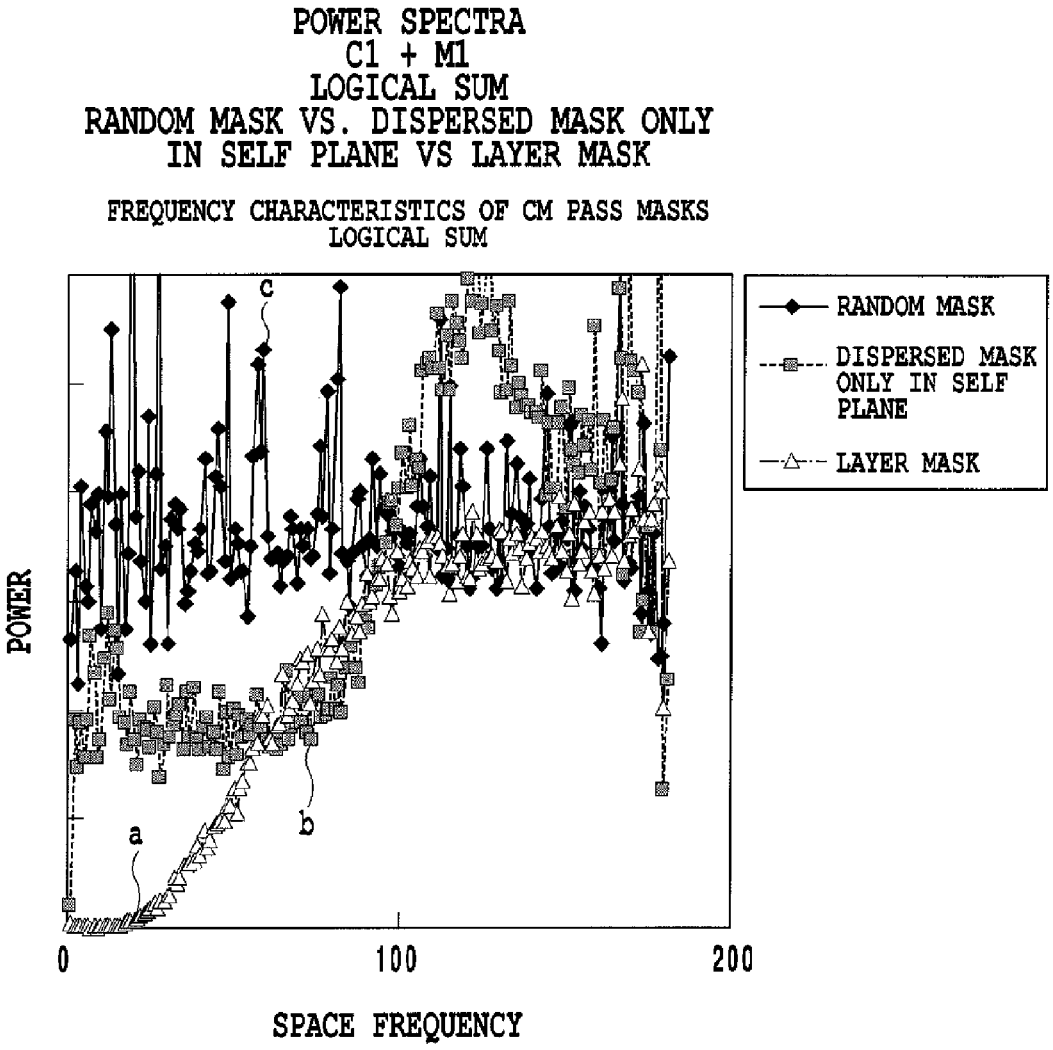
FIG. 33 is a diagram illustrating the frequency characteristics of the logical sum of two masks according to the first embodiment of the present invention and the frequency characteristics of the logical sum of two masks according to the conventional example.
Figure 34:
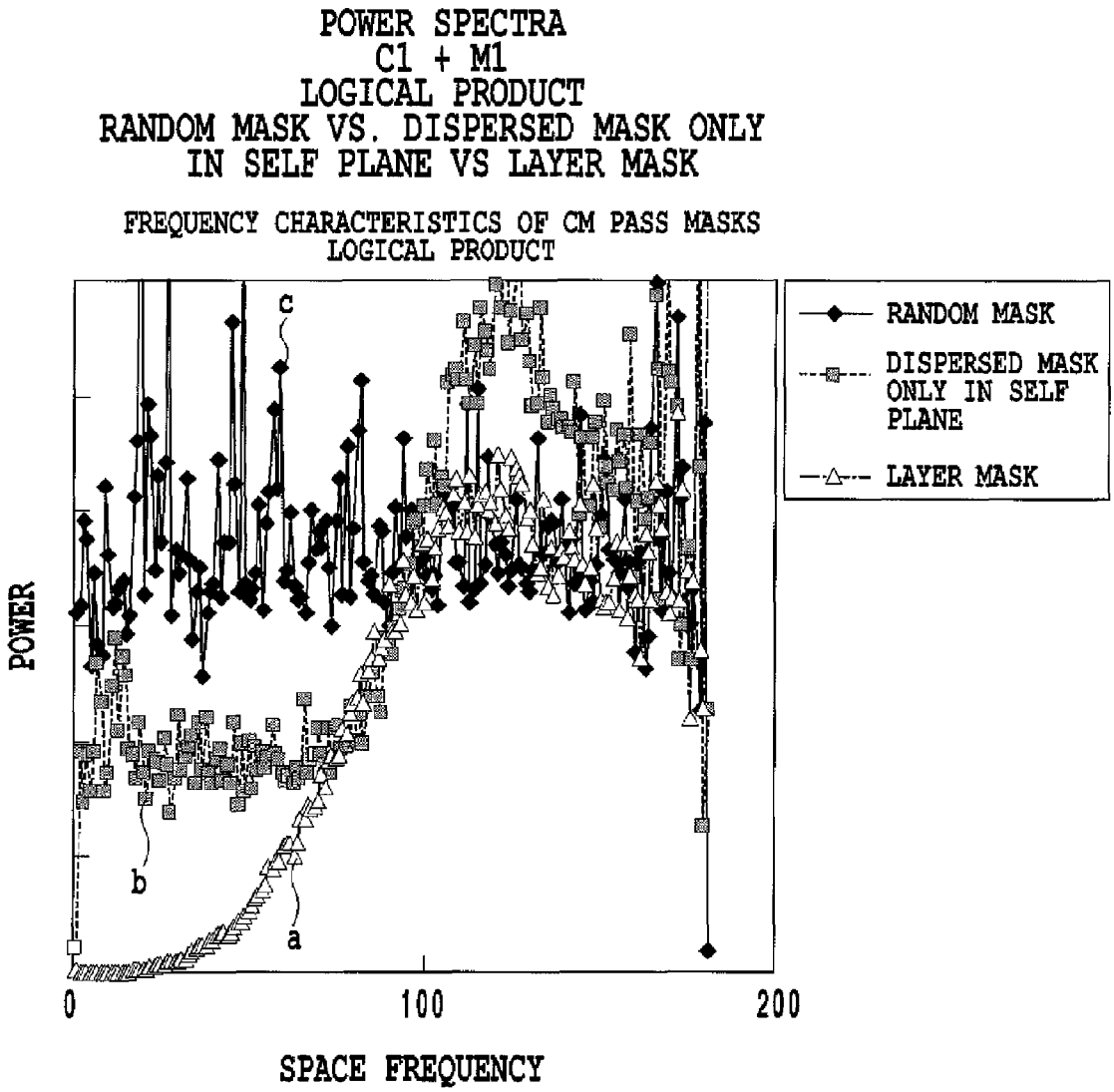
FIG. 34 is a diagram illustrating the frequency characteristics of logical product of two masks according to the first embodiment of the present invention and the frequency characteristics of logical product of two masks according to the conventional example.

FIG. 32 illustrates the frequency characteristics of a single mask pattern (C1) for the layer mask according to the present invention and the dispersed mask only in self plane and the random mask each according to the conventional example. FIG. 33 illustrates the frequency characteristics of the logical sum pattern of two masks (C1 and M1) for the above three type of masks. FIG. 34 illustrates the frequency characteristics of the logical product pattern of two masks (C1 and M1) for the above three type of masks.

In FIG. 32, each curve shows the power spectrum of the corresponding mask pattern with respect to space frequencies. A curve a shows the power spectrum of the mask pattern of the layer mask according to the present invention (FIG. 14). A curve b shows the power spectrum of the mask pattern of the dispersed mask only in self plane (FIG. 17). A curve c shows the power spectrum of the mask pattern of the random mask pattern (FIG. 18). A comparison of these three curves indicates that the random mask (curve c) has a substantially uniform power over the entire area of spatial frequencies. The print permitting pixels are randomly arranged in the random mask and thus has no specially characterized dispersion intervals. This results in a substantially uniform distribution of the spectrum from a lower frequency area to a higher frequency area. On the other hand, in the layer mask according to the present embodiment and the dispersed mask only in self plane according to the conventional example (curves a and b), power is lower in the lower frequency area, with a power peak present in the higher frequency area. This shows that the print permitting pixels are substantially uniformly dispersed with certain distances maintained among them.

One characteristic of the present invention is that focus is given to "low frequency components" present in the lower frequency side of a half of the entire frequency area in which the power spectrum of the mask pattern is present. When a mask pattern has few low-frequency components, beading attributed to the dispersion of grains is unlikely to occur or to be visually recognized. This prevents a printed image from giving the observer a rough feeling. Further, in particular, the mask pattern is two-dimensionally repeatedly used for an image in which one pattern is printed. Repetition of a given mask pattern causes the repeated pattern to be more likely to perceived by the observer as the amount of low frequency components increases. The pattern significantly affects the occurrence and appearance of beading, resulting in a rough feeling associated with the mask period. It is thus important to focus on the repeated pattern to design the mask pattern such that it shows few low-frequency components. That is, the present invention focuses on the lower frequency area, which may cause a visually rough feeling, to reduce the components of the low frequency area. In other words, the mask pattern according to the present invention is featured in showing a reduced low frequency power.

Moreover, frequency characteristics relating to the sensitivity of the human eyes depend on the distance between print matter and the eyes or the like as discussed in many documents such as a Dooley's document (R. P. Dooley: Prediction Brightness Appearance at Edges Using Linear and Non-Linear Visual Describing Functions, SPES Annual Meeting (1975)). Various experiments show that when viewing print matter, the human eyes readily perceive the components of an area of frequencies lower than about 10 cycles/mm. The present inventor has also experimentally confirmed this. It is thus important to focus on an area (lower frequency area) of frequencies lower than 10 cycles/mm. Actually, the eyes may be moved closer to the print matter. The present inventor thus thinks it important to design the mask pattern focusing on the area of low frequencies lower than about 20 cycles/mm. This range generally coincides with the low frequency area to which focus is given in connection with mask evaluations according to embodiments described later (for example, FIG. 50).

In each of the power spectra of a logical sum and product patterns obtained by superposing masks each other as shown in FIGS. 33 and 34, the low frequency components of the dispersed mask only in self plane (curve b) according to the conventional example shows more low-frequency components than the layer mask (curve a) according to the present embodiment. In other words, a more inappropriate dispersion results from the arrangement of the print permitting pixels in the dispersed mask only in self plate according to the conventional example than from the layer mask according to the present embodiment, as shown in FIGS. 23 and 24.

Figure 35:
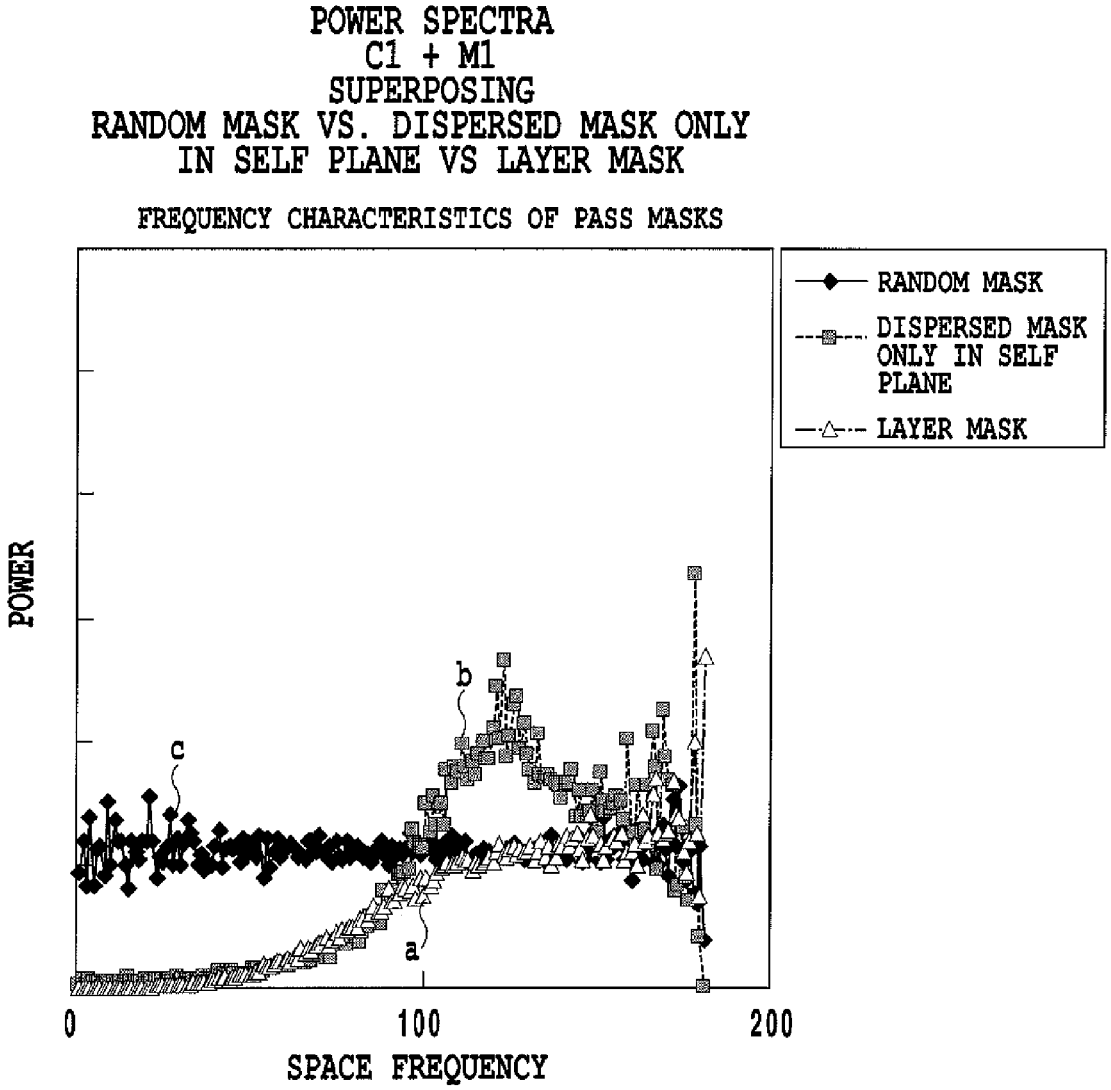
FIG. 35 is a diagram illustrating the frequency characteristics of "superposing" of two masks according to the first embodiment of the present invention and the frequency characteristics of two "superposing" masks according to the conventional example.
Figure 36:
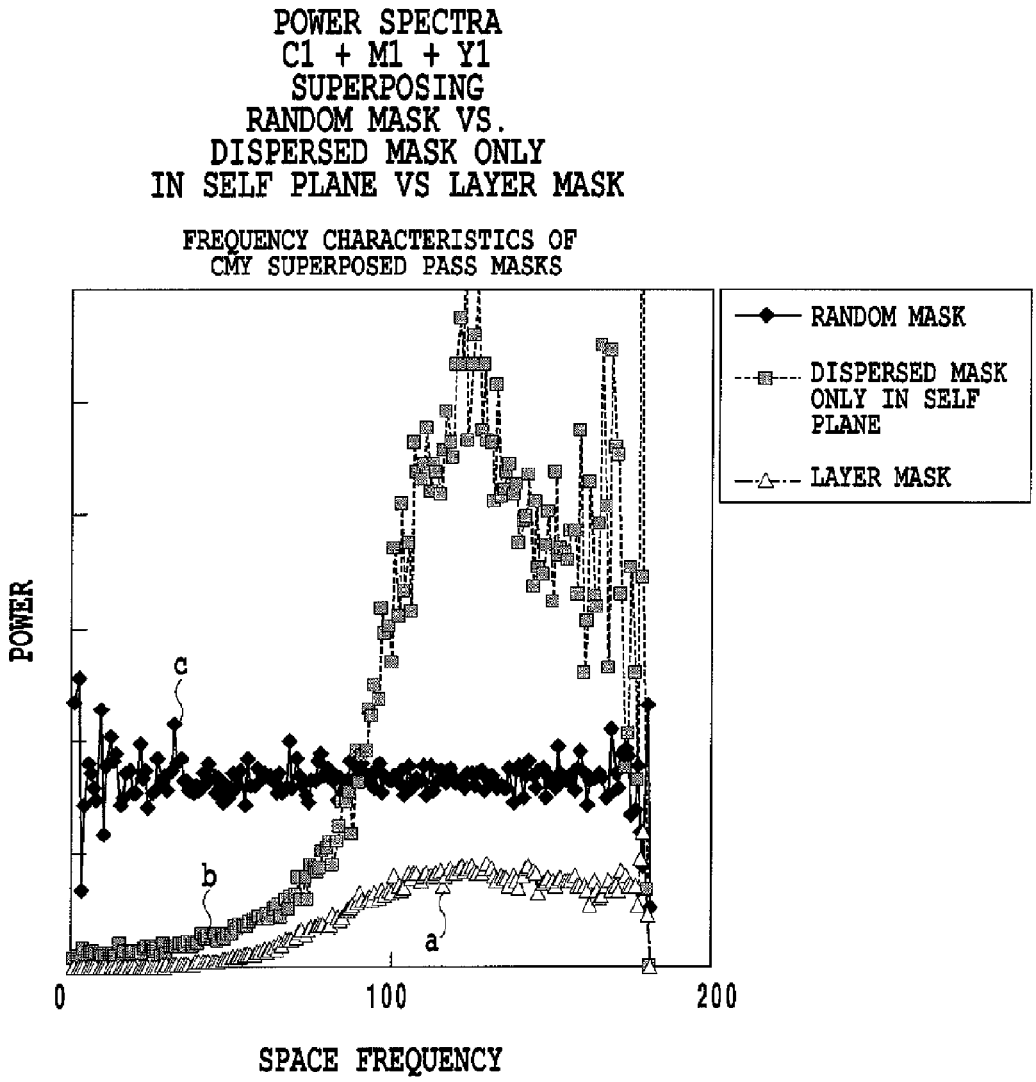
FIG. 36 is a diagram illustrating the frequency characteristics of "superposing" of three masks according to the first embodiment of the present invention and the frequency characteristics of "superposing" of three masks according to the conventional example.

FIGS. 35 and 36 show the power spectra of "superposing" patterns of superposed two and three masks of the layer mask according to the present embodiment, the dispersed masks only in self plane and the random mask each according to the conventional example, respectively. In each figure, a curve a shows the power spectrum of the superposed pattern (FIGS. 28 and 29) of the layer masks according to the present embodiment. A curve b shows the power spectrum of the superposed pattern (FIG. 30) of dispersed masks only in self plane according to the conventional example. A curve c shows the power spectrum of the superposed pattern (FIG. 31) of the random masks also according to the conventional example.

A comparison of the three curves indicates that the random masks shows a substantially uniform power over the entire space frequency area as is the case with the power spectra of the single mask and logical sum and logical product patterns. On the other hand, the superposed pattern of the masks of the dispersed mask only in self plane shown by the curve b shows more low-frequency components than the dispersed mask only in self plane shown in FIG. 32. Also, the superposed pattern of the masks of the dispersed mask only in self plane shown by the curve b shows more low-frequency components than that of the layer masks according to the present embodiment. This degrades the dispersion to enhance the rough feeling of the pattern, as shown in FIG. 30.

In contrast, the superposed pattern of the layer masks according to the present embodiment, shown by the curve a, shows almost as few low-frequency components as the single layer mask shown in FIG. 32. This indicates that even in the three superposed planes, the print permitting pixels are substantially evenly dispersed with certain distances maintained among them.

Evaluation Based on Displacement

The mask according to the embodiment of the present invention differs from the conventional mask (dispersed mask only in self plane described in Patent Document 1), which is obtained taking only one plane into account, in a change in dispersiveness between the superposing of different planes of masks at a regular position and their superposing at an irregular position. For the mask according to the embodiment of the present invention, superposing different planes of masks with intentional displacement makes the print permitting pixels significantly less dispersive. That is, since the present embodiment also takes the dispersion among the different planes into account, the dispersiveness is markedly degraded if the masks are superposed one another in a manner different from the regular one with the dispersion taken into account. On the other hand, since the dispersed mask only in self plane according to the conventional example does not take the dispersion among the different planes into account, the dispersiveness remains unchanged even if the masks are superposed one another in a manner different from the regular one.

This displacement evaluation is executed as follows. C1, M1, and Y1 planes generated according to the above generating method are displaced with respect to one another in each color raster direction. In this case, the masks themselves are periodically arranged and can thus be displaced with respect to one another.

Figure 37:
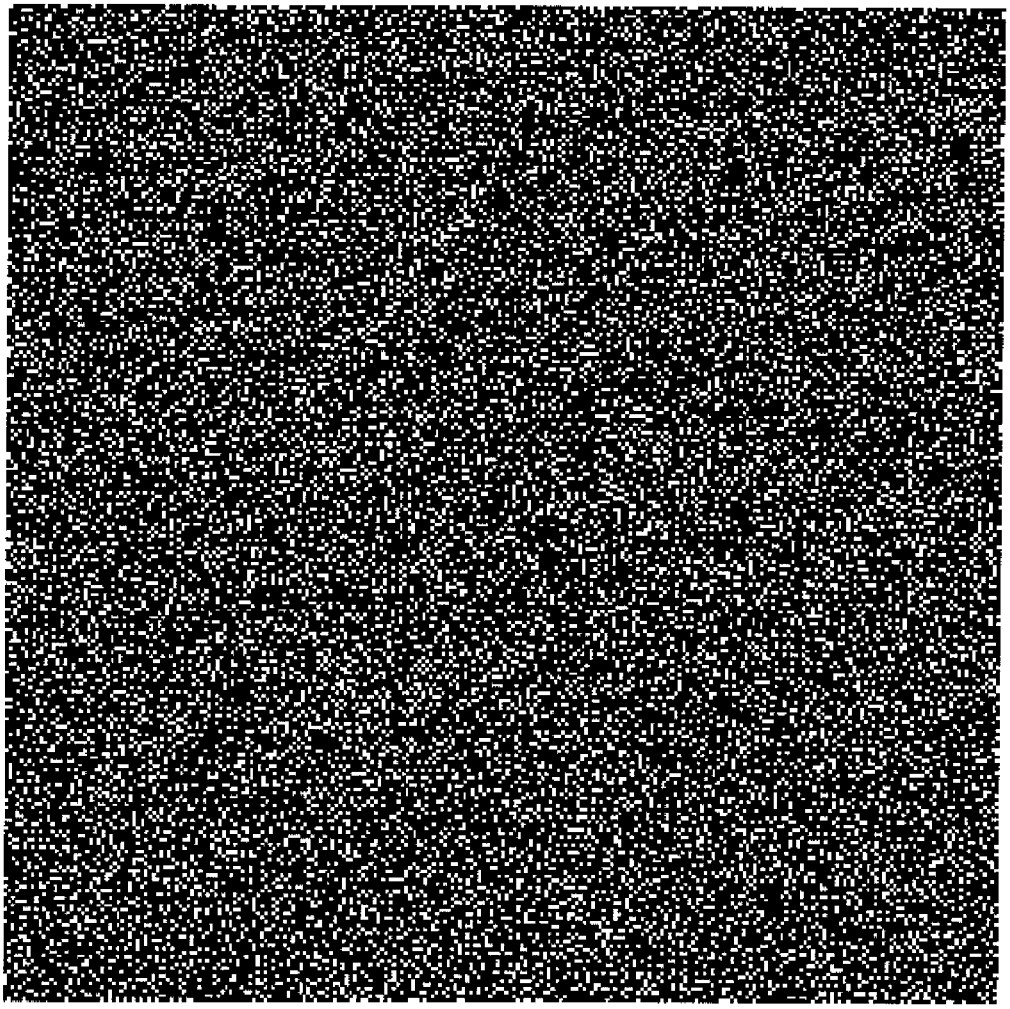
FIG. 37 is a diagram showing an arrangement of print permitting pixels in the logical sum of two mask patterns on masks according to the first embodiment of the present invention which are displaced with respect to each other.
Figure 38:
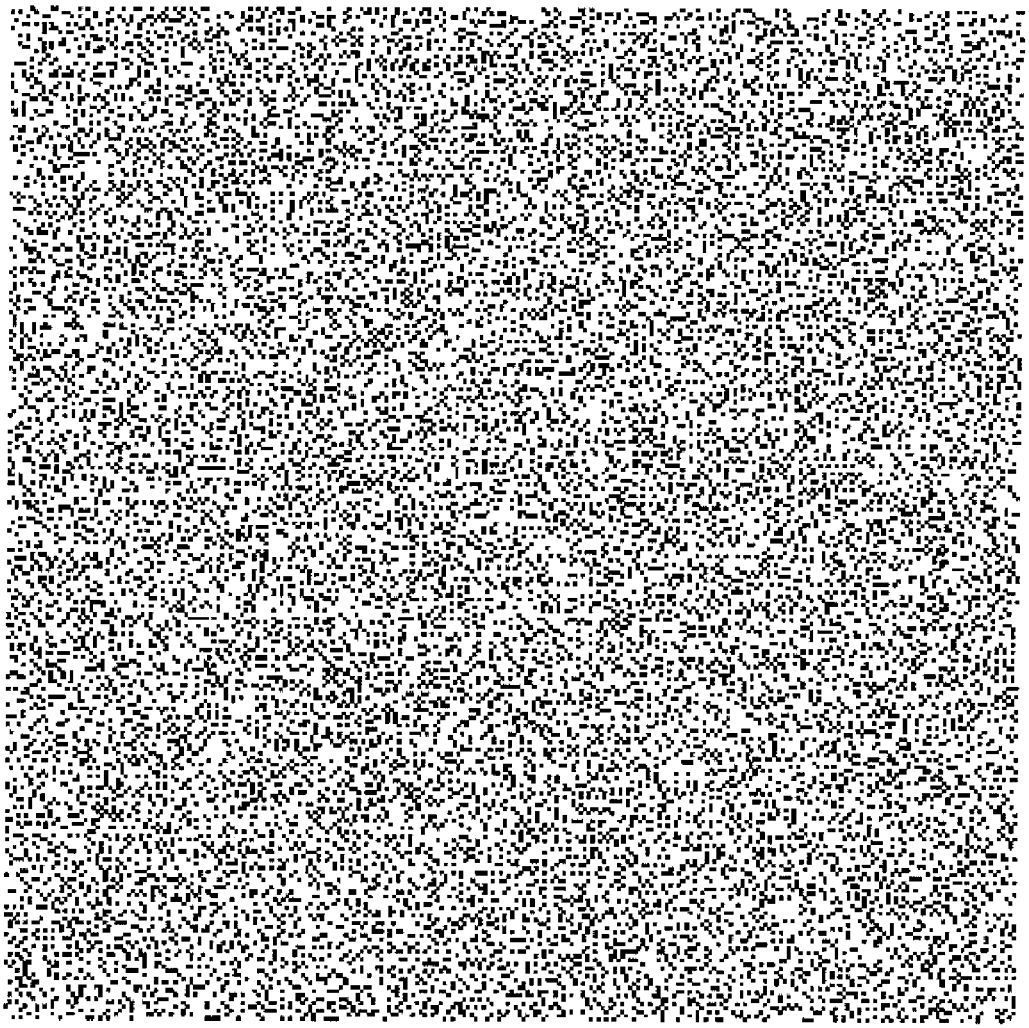
FIG. 38 is a diagram showing an arrangement of print permitting pixels in the logical product of two mask patterns on masks according to the first embodiment of the present invention which are displaced with respect to each other.
Figure 39:
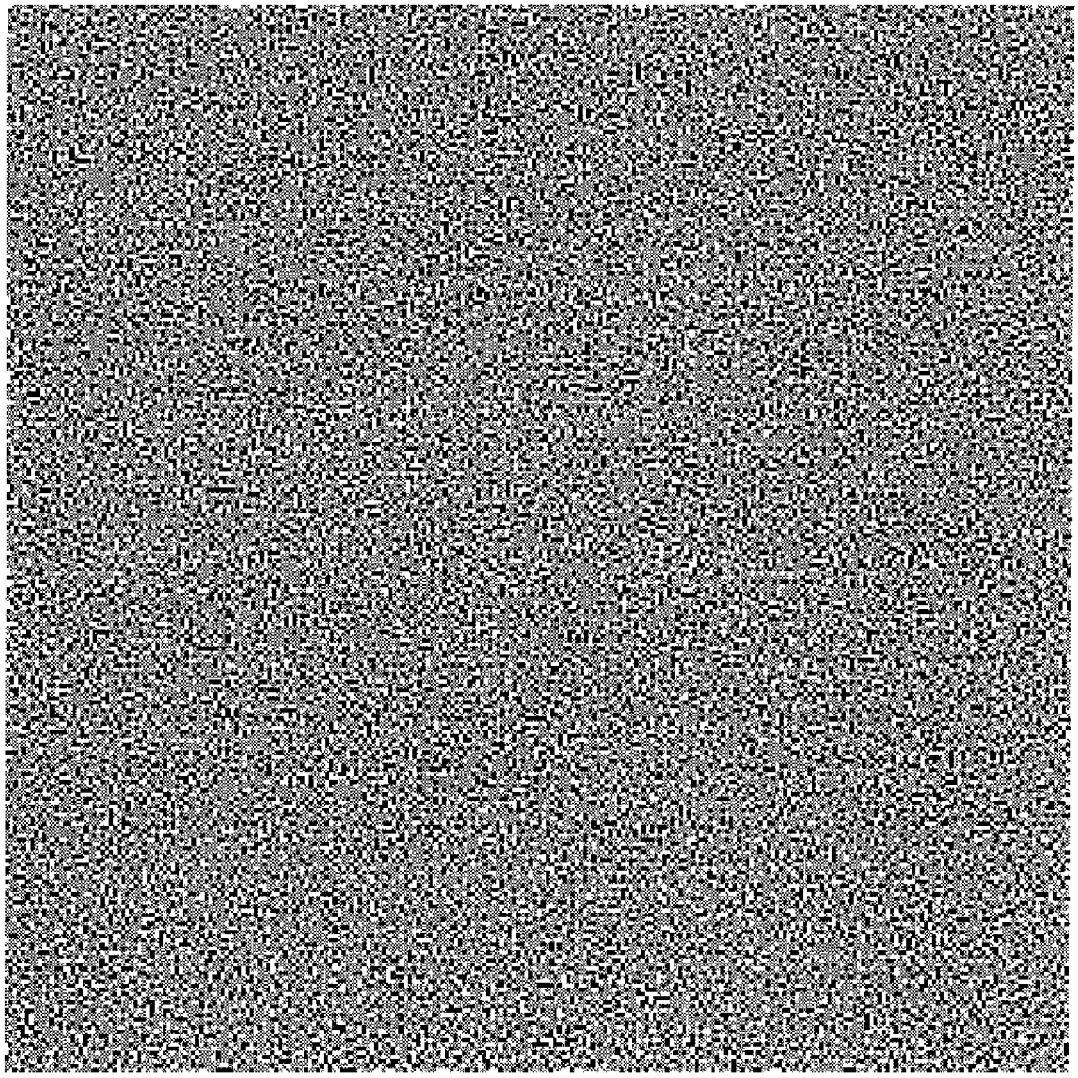
FIG. 39 is a diagram showing an arrangement of print permitting pixels in "superposing" of two mask patterns on masks according to the first embodiment of the present invention which are displaced with respect to each other.

FIGS. 37 to 39 are diagrams showing a logical sum, logical product, and "superposing" patterns, respectively, obtained when C1 and Y1 patterns are superposed each other with the masks displaced. As is apparent from these figures, degraded dispersiveness is exhibited by all of the logical sum, logical product, and "superposing" patterns of the displaced layer masks C1 and M1 according to the present embodiment.

Figure 40:
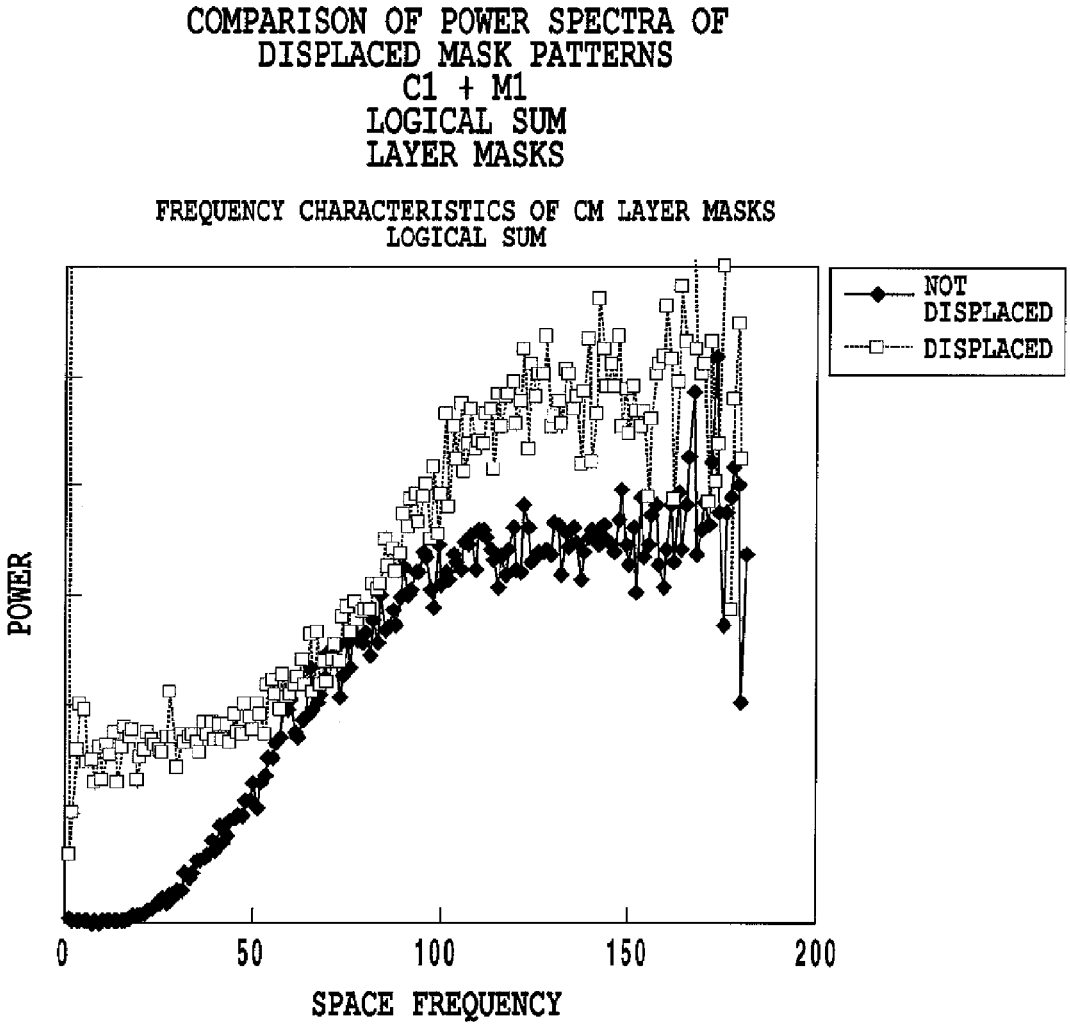
FIG. 40 is a diagram showing the power spectrum of logical sum of a mask according to the first embodiment of the present invention and this mask displaced.
Figure 41:
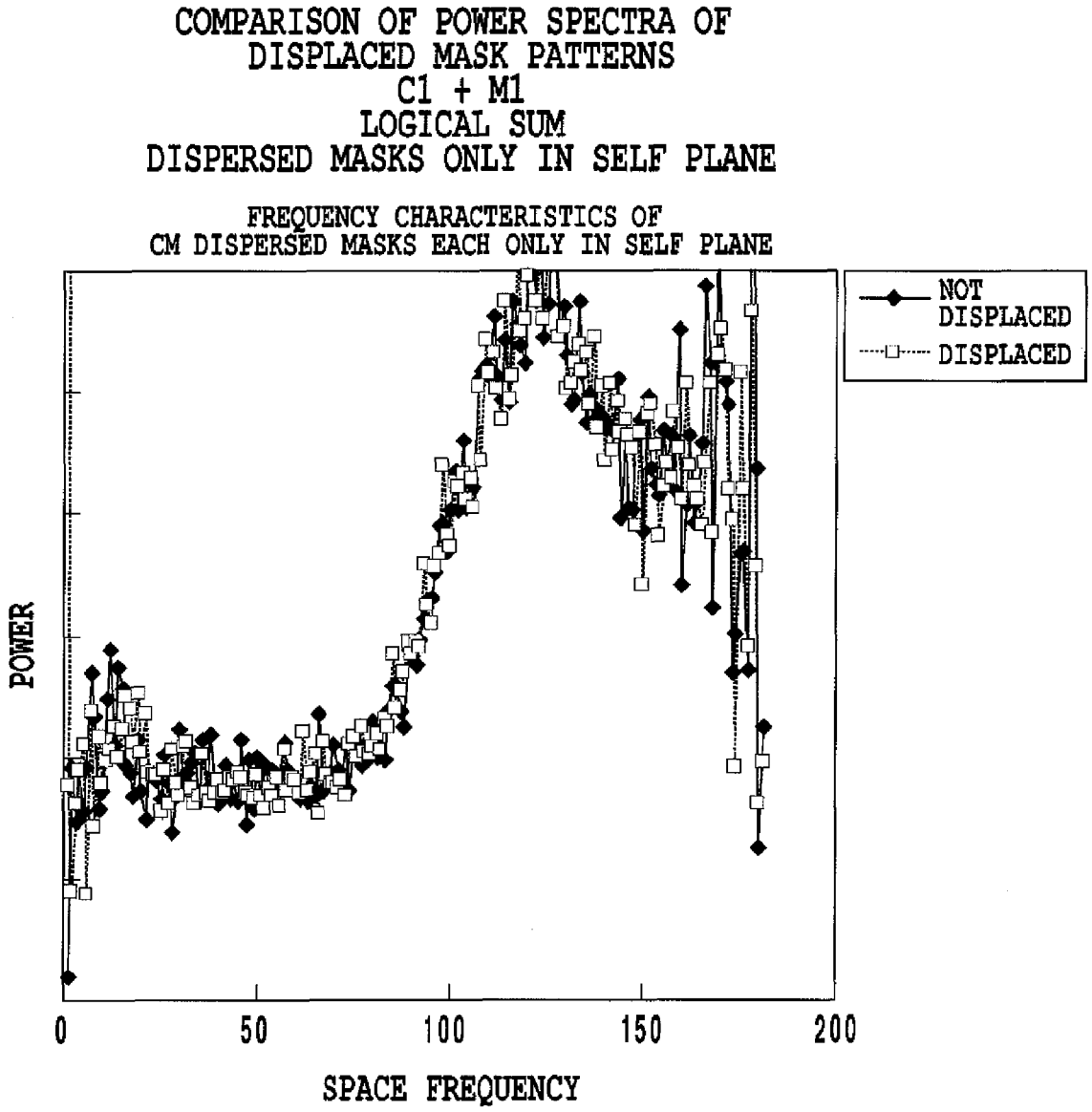
FIG. 41 is a diagram showing the power spectrum of logical sum of a mask according to a comparative example and this mask displaced.
Figure 42:
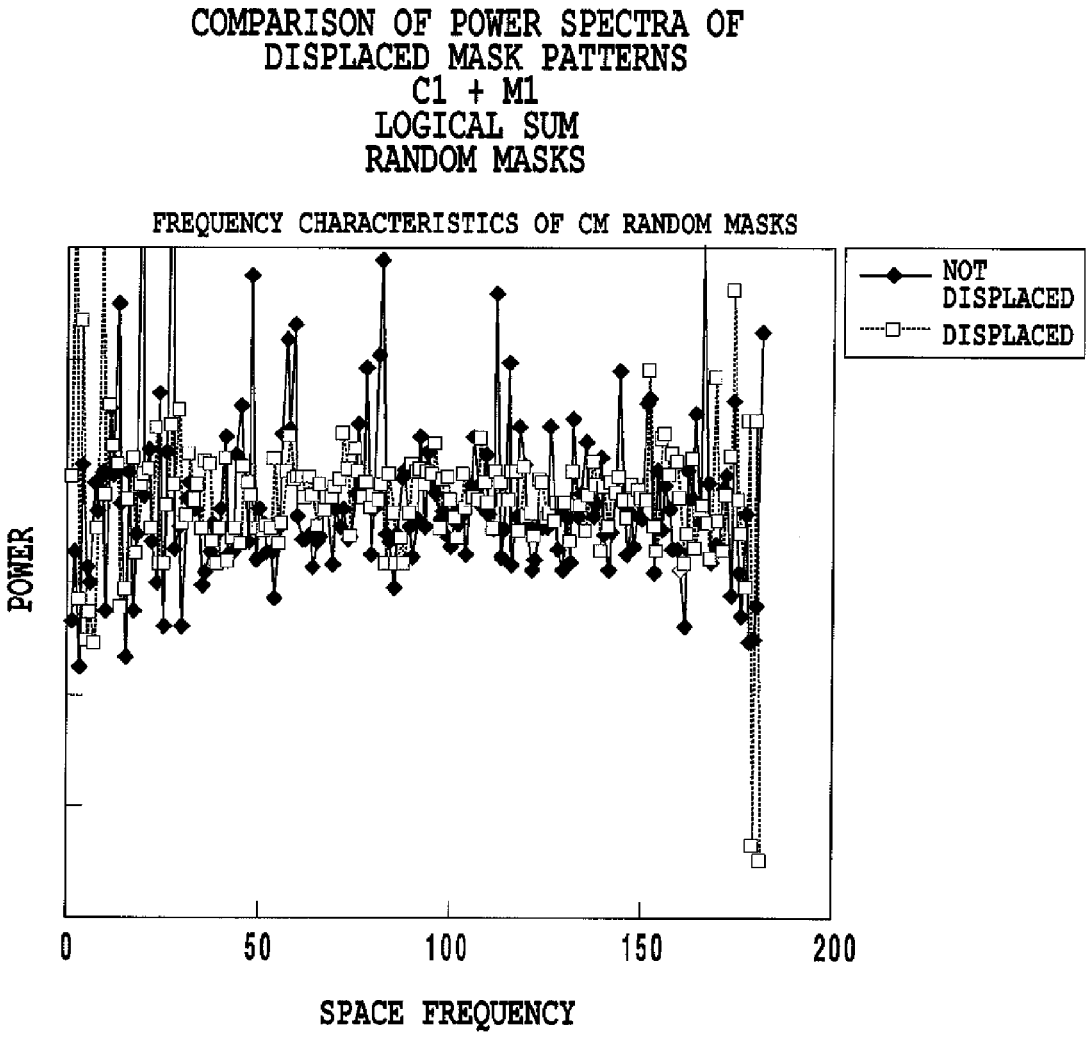
FIG. 42 is a diagram showing the power spectrum of logical sum of a mask according to another comparative example and this mask displaced.

FIGS. 40 to 42 show a comparison of power spectra obtained when the masks are displaced and when they are not displaced (that is, the masks are superposed each other at the regular position). FIGS. 40 to 42 show the power spectra of a logical sum pattern of the layer masks according to the present embodiment, the masks of the dispersed mask only in self plane and random masks each according to the conventional example, respectively.

The layer masks according to the present embodiment shown in FIG. 40 show larger amount of low-frequency components when displaced than when aligned. This is because the layer masks take the dispersion among the different planes into account, so that the dispersiveness is markedly degraded if the masks are superposed one another in a manner different from the regular one with the dispersion taken into account, as described above.

In contrast, for the dispersed masks only in self plane and random masks according the conventional example shown in FIGS. 41 and 42, the power spectra exhibit almost no change between when the masks are displaced and when they are aligned. This is because these masks originally do not take the dispersion among the different planes into account, so that the dispersiveness does not change significantly if the masks are displaced.

Figure 43:
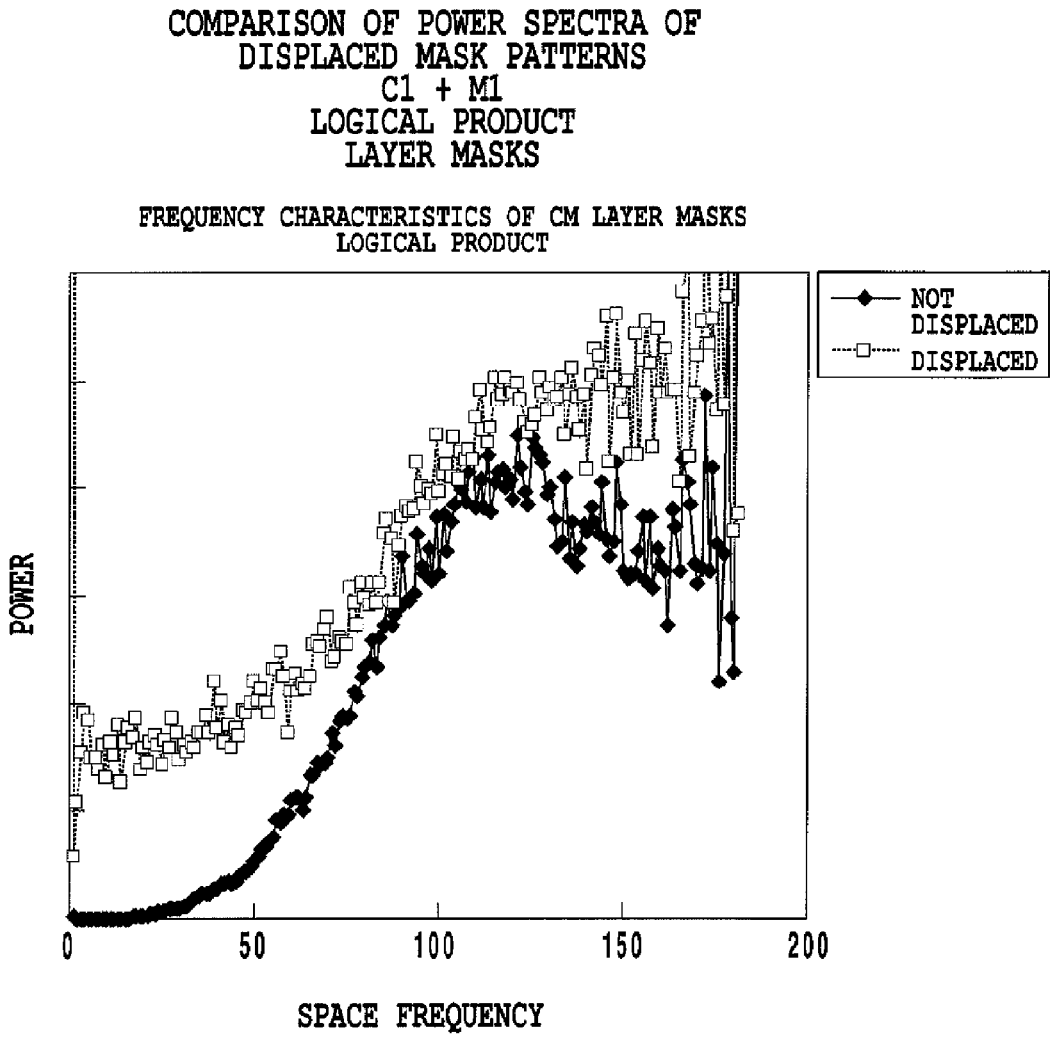
FIG. 43 is a diagram showing the power spectrum of logical product of a mask according to the first embodiment of the present invention and this mask displaced.
Figure 44:
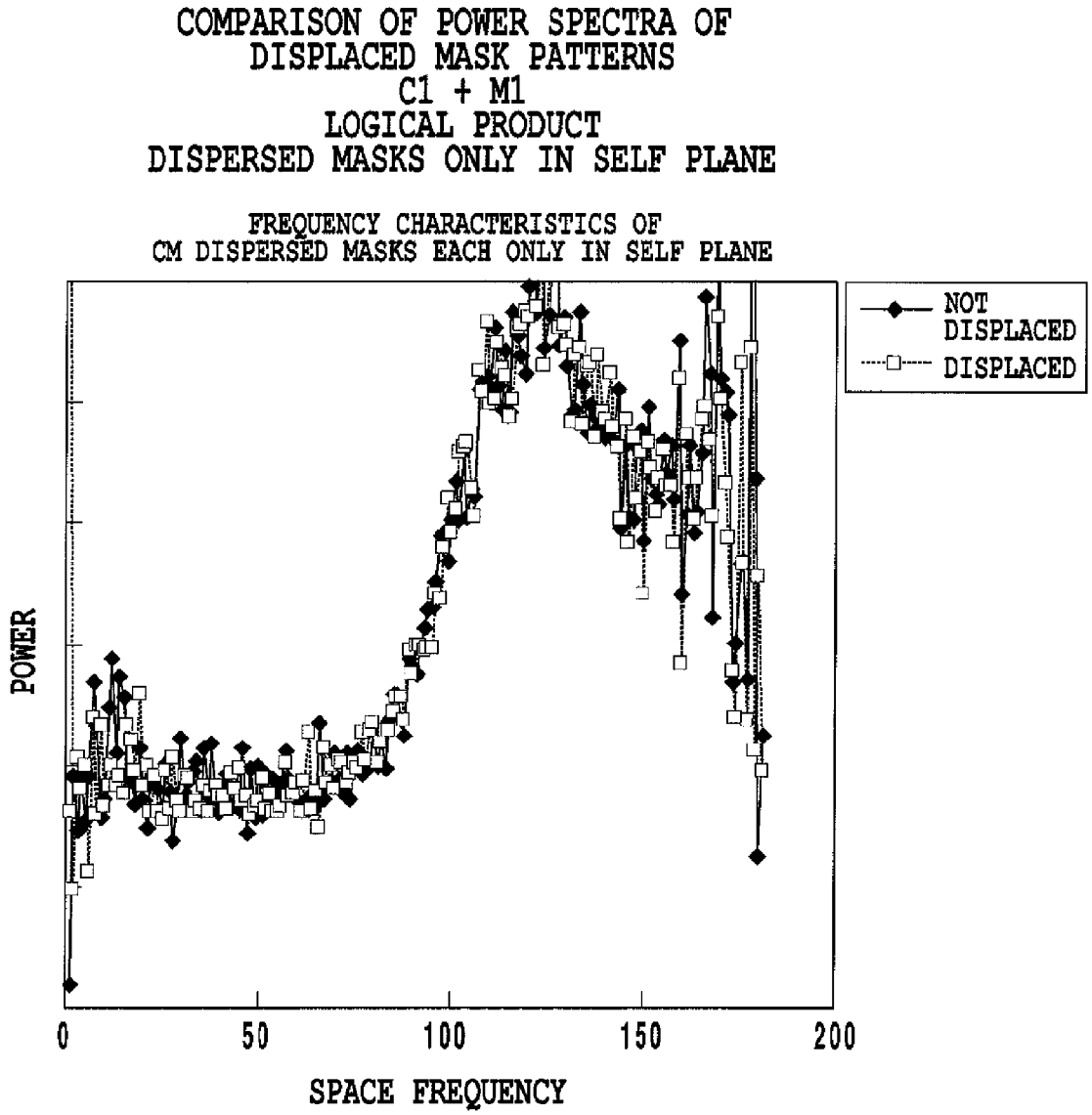
FIG. 44 is a diagram showing the power spectrum of logical product of a mask according to a comparative example and this mask displaced.
Figure 45:
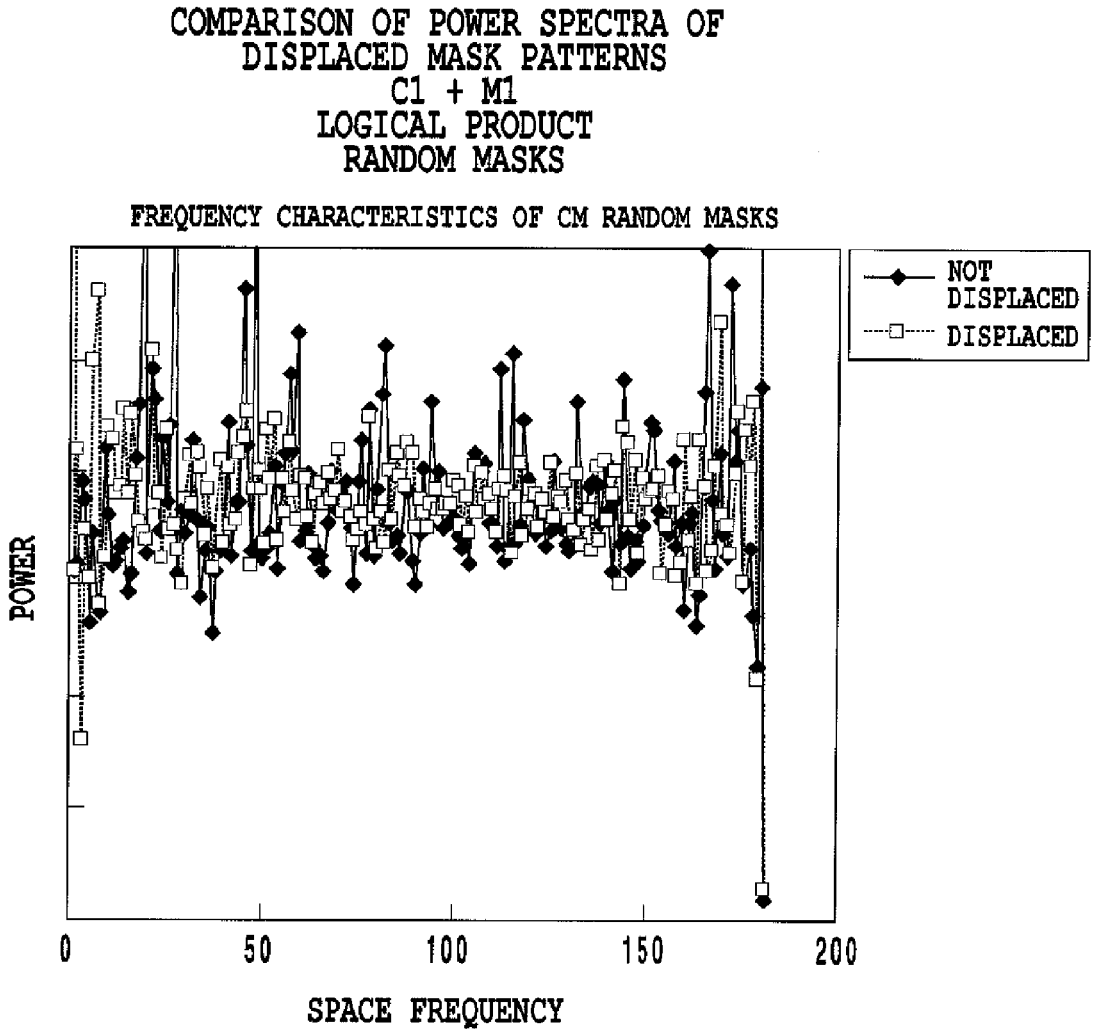
FIG. 45 is a diagram showing the power spectrum of logical product of a mask according to another comparative example and this mask displaced.
Figure 46:
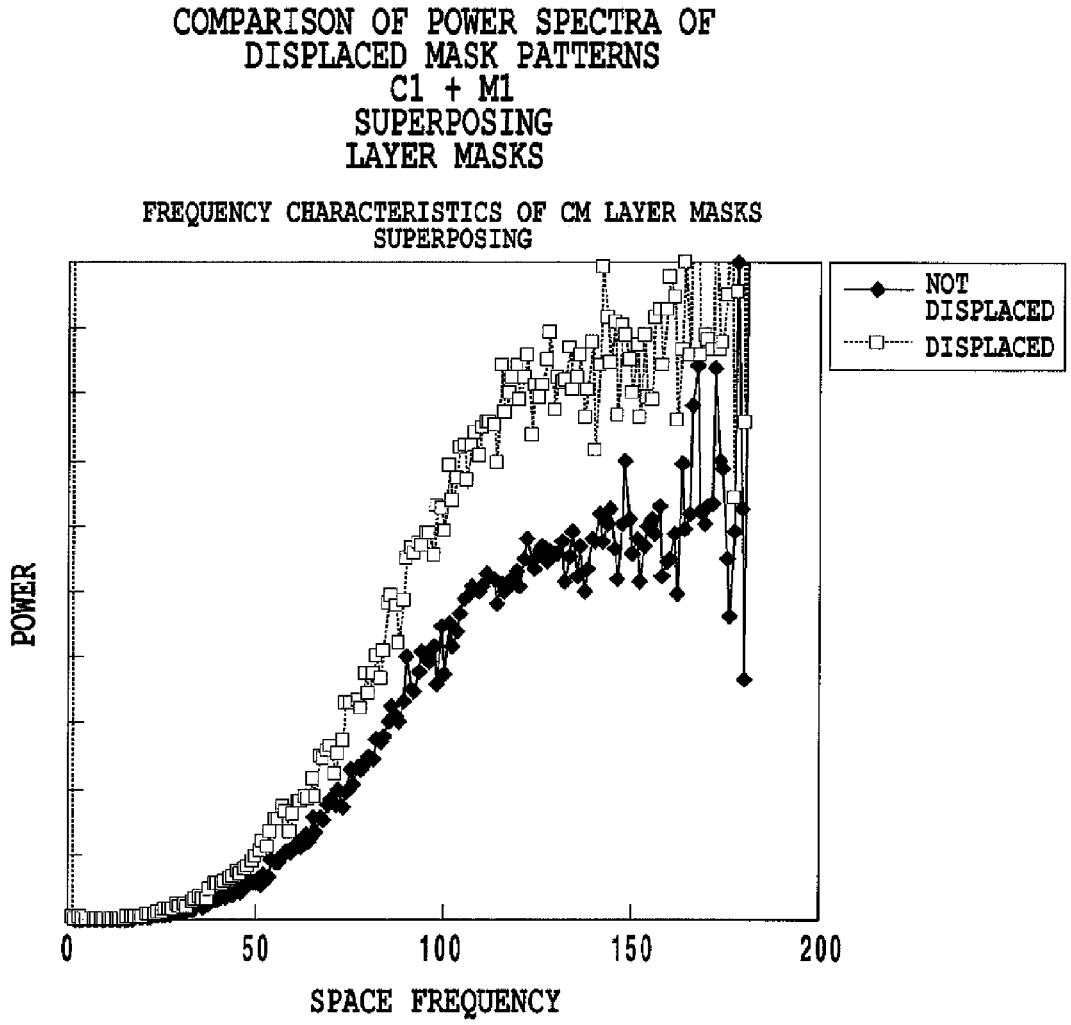
FIG. 46 is a diagram showing the power spectrum of "superposing" of two mask patterns on a mask according to the first embodiment of the present invention and on this mask displaced.
Figure 47:
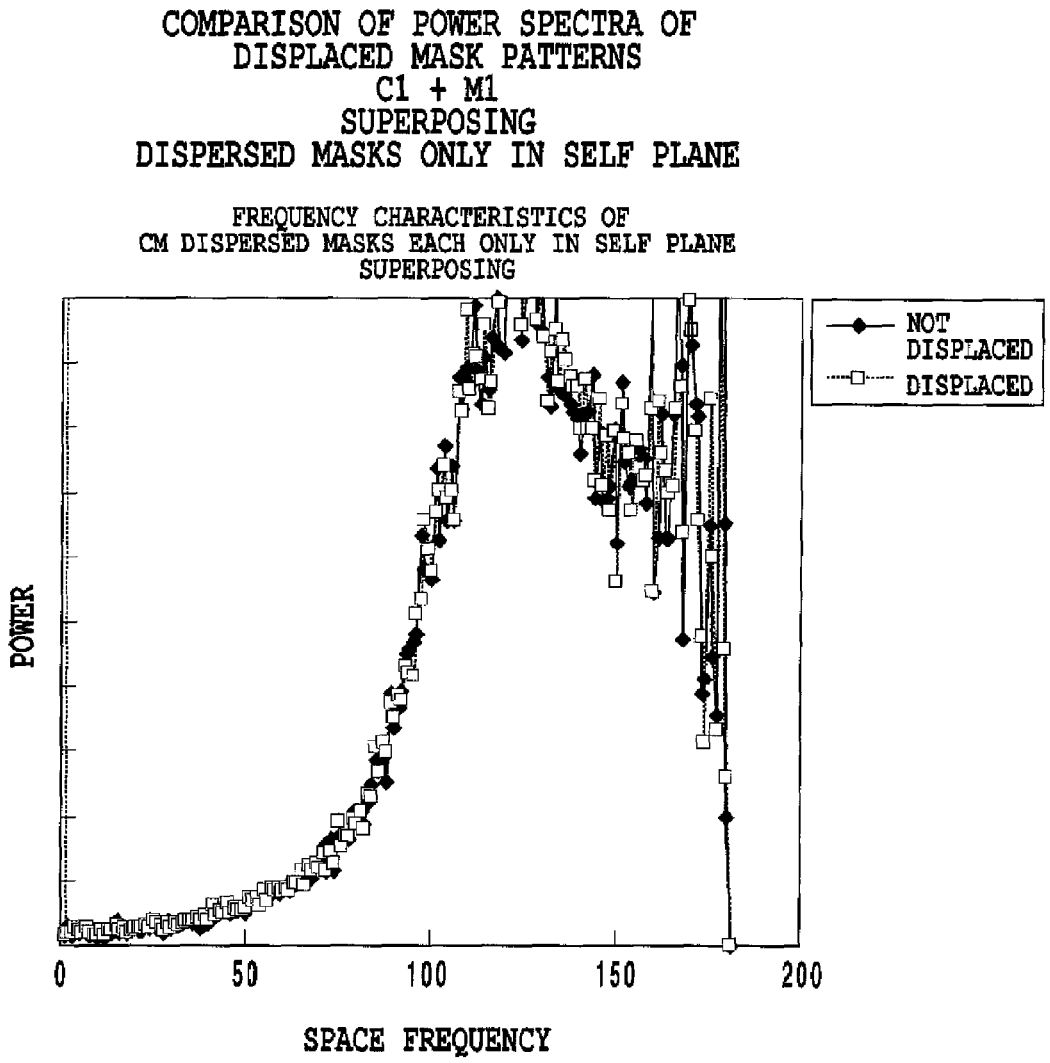
FIG. 47 is a diagram showing the power spectrum of "superposing" of two mask patterns on a mask according to a comparative example and on this mask displaced.
Figure 48:
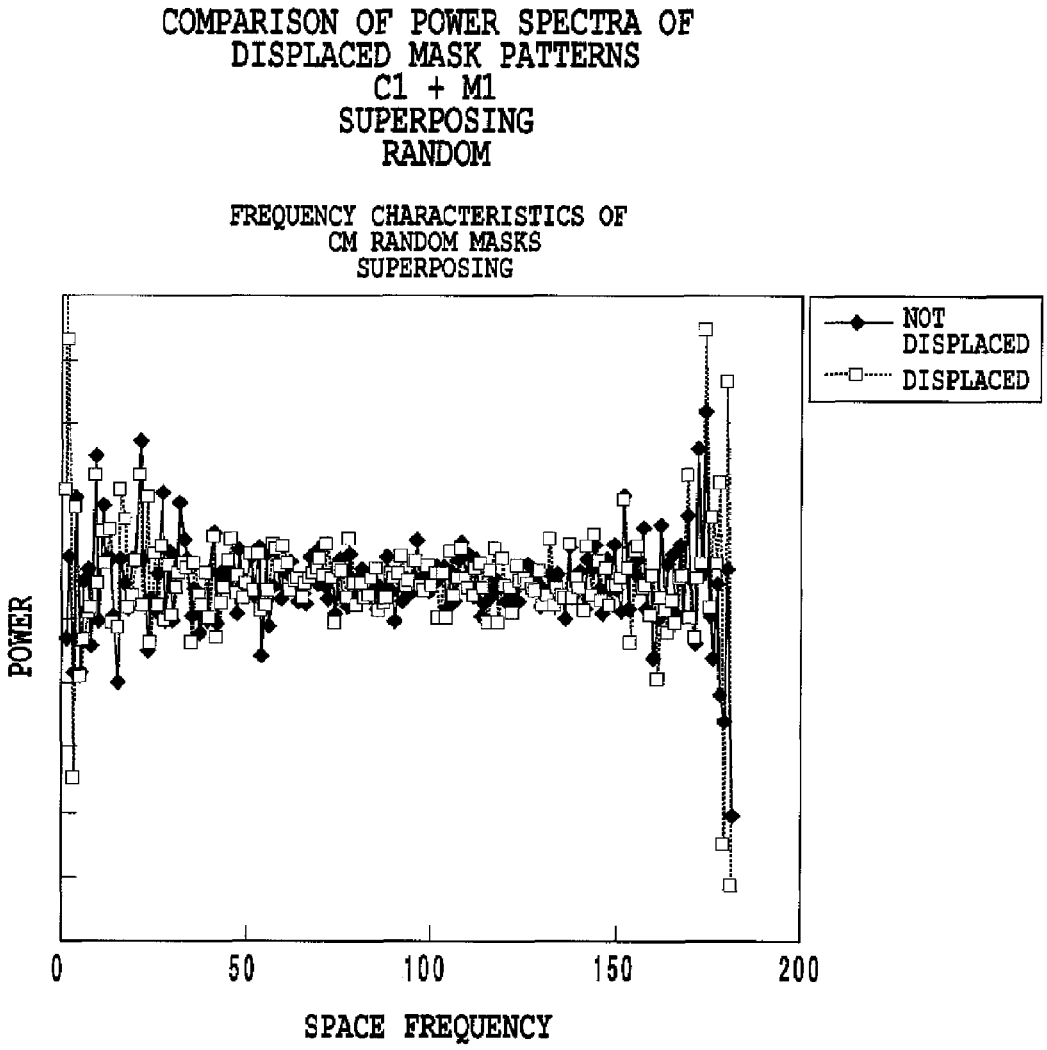
FIG. 48 is a diagram showing the power spectrum of "superposing" of two mask patterns on a mask according to another comparative example and on this mask displaced.
Figure 49:
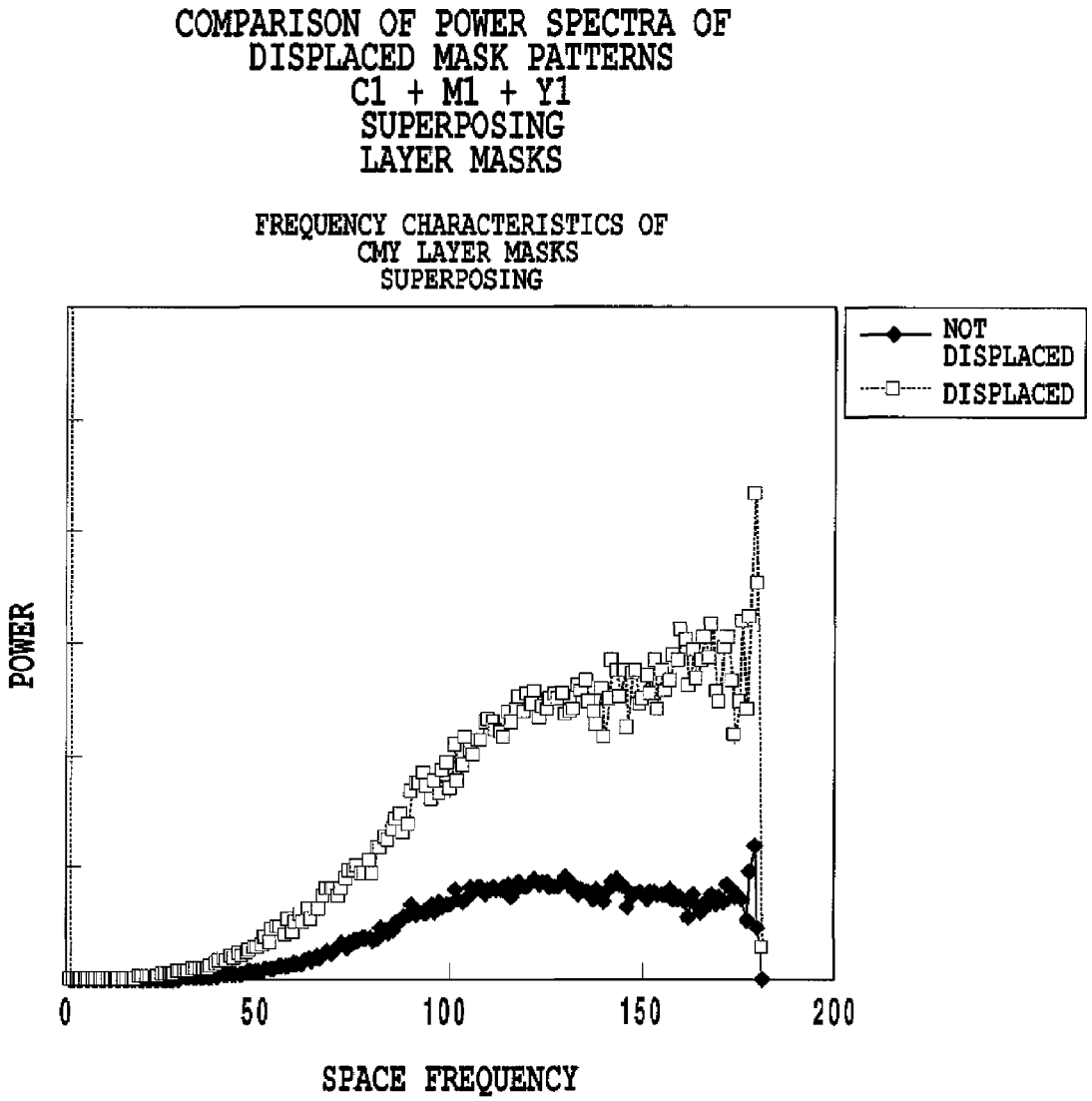
FIG. 49 is a diagram showing the power spectrum of "superposing" of three mask patterns on a mask according to the first embodiment of the present invention and on this mask displaced.

FIGS. 43 to 45 are diagrams showing a comparison of power spectra obtained when the masks are displaced as shown in FIGS. 40 to 42 and when they are aligned, respectively. FIGS. 43 to 45 show the power spectra of the layer masks according to the present embodiment, and the dispersed masks only in self plane and random masks each according to the conventional example, respectively. Further, FIGS. 46 to 48 are diagrams showing a comparison of power spectra obtained when the masks are displaced and when they are aligned, and show the power spectra of "superposing" patterns of the layer masks according to the present embodiment and the dispersed masks only in self plane and random masks according to the conventional example, respectively. As is apparent from these figures, the layer masks according to the present invention show much more low-frequency components when displaced than when aligned. On the other hand, with the dispersed masks only in self plane and the random masks according to the conventional example, the low frequency components in the power spectrum exhibit almost no change between when the masks are displaced and when they are aligned. For the power spectra of "superposing" patterns of the three layer masks C1, M1 and Y1 according to the present embodiment shown in FIG. 49, the power of the entire frequency area similarly increases when the masks are displaced.

Figure 50:
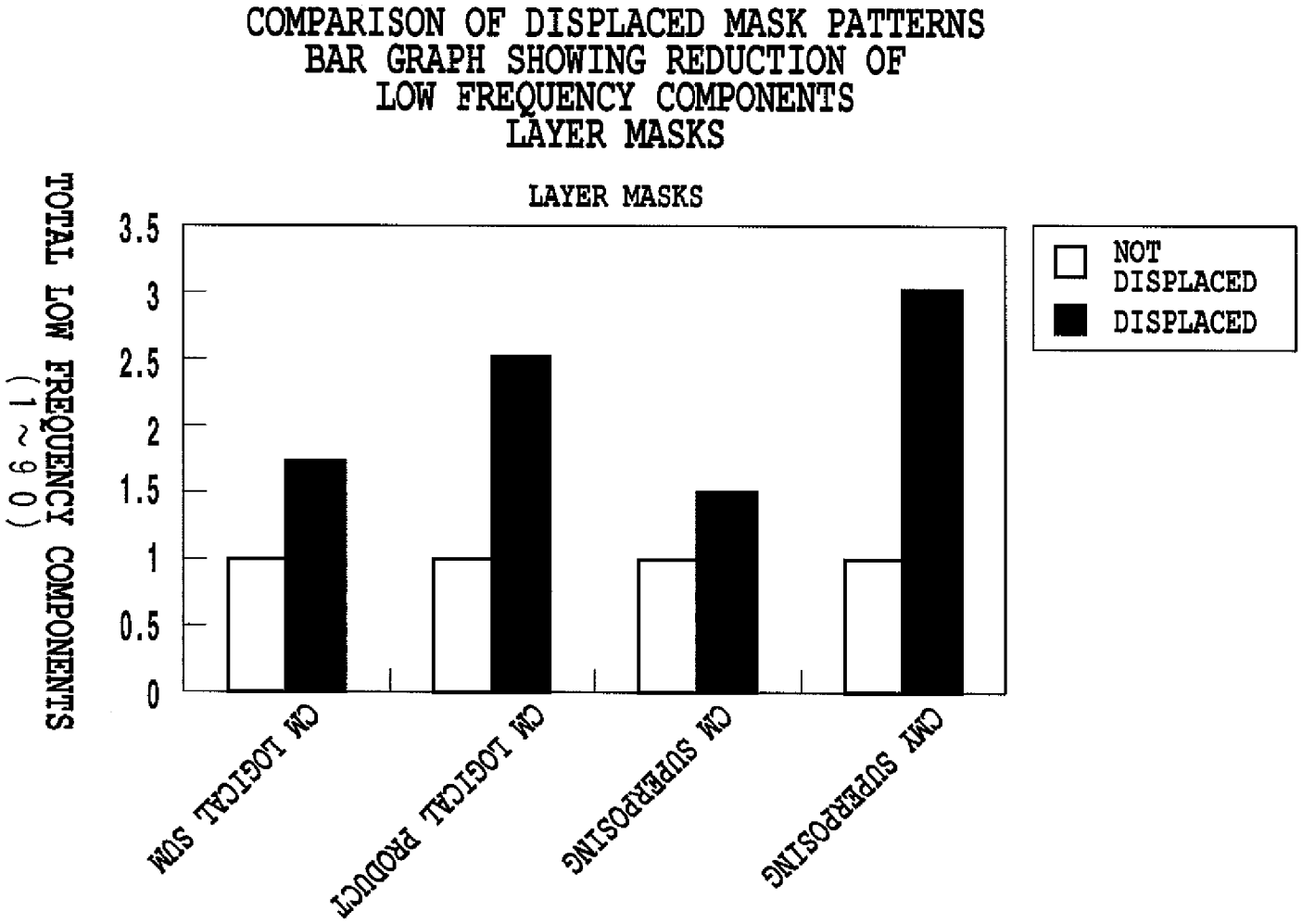
FIG. 50 is a diagram showing the difference in low frequency components between the logical sum and logical product and "superposing" of masks according to the first embodiment of the present invention and this mask displaced.
Figure 51:
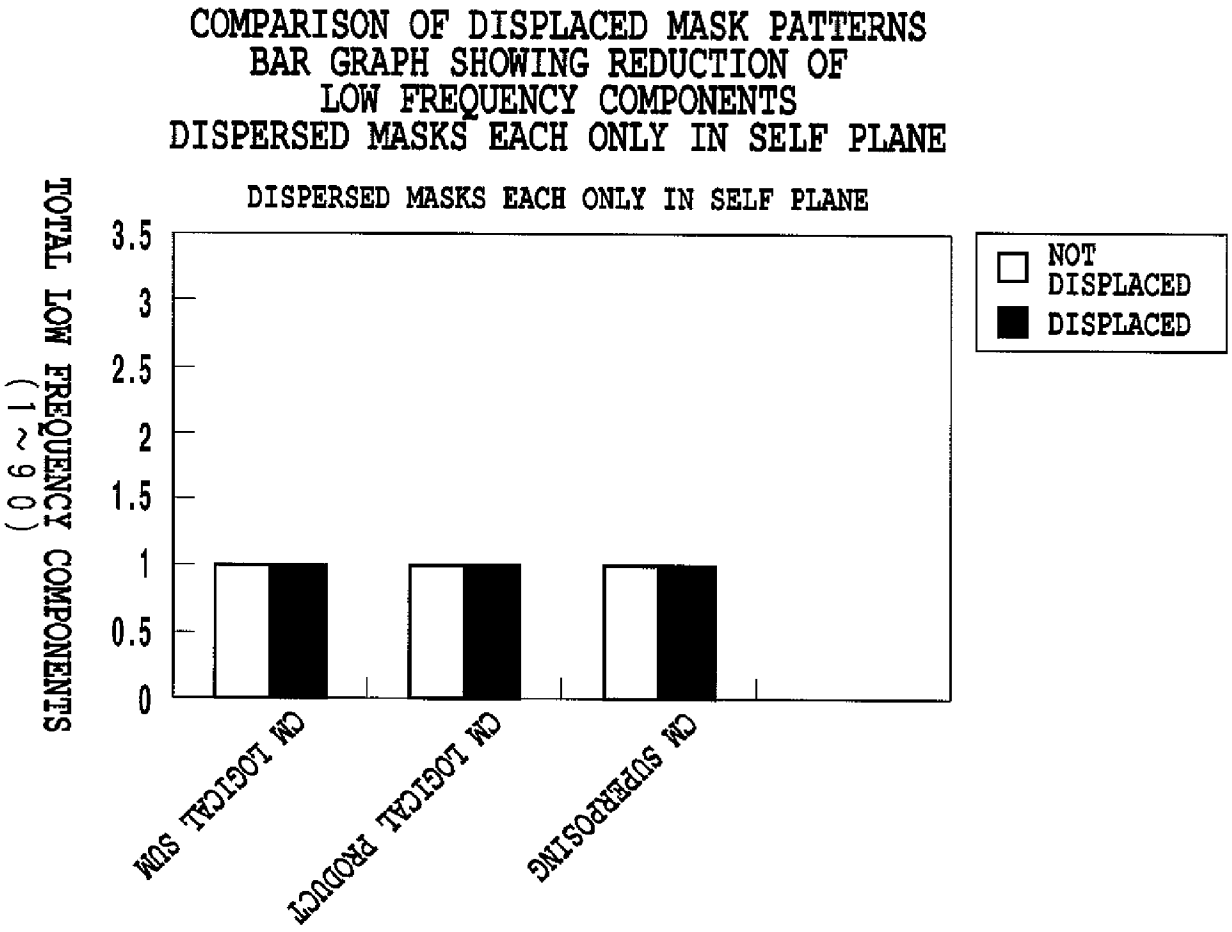
FIG. 51 is a diagram showing the difference in low frequency components between the logical sum and logical product and "superposing" of masks according to a comparative example and this mask displaced.
Figure 52:
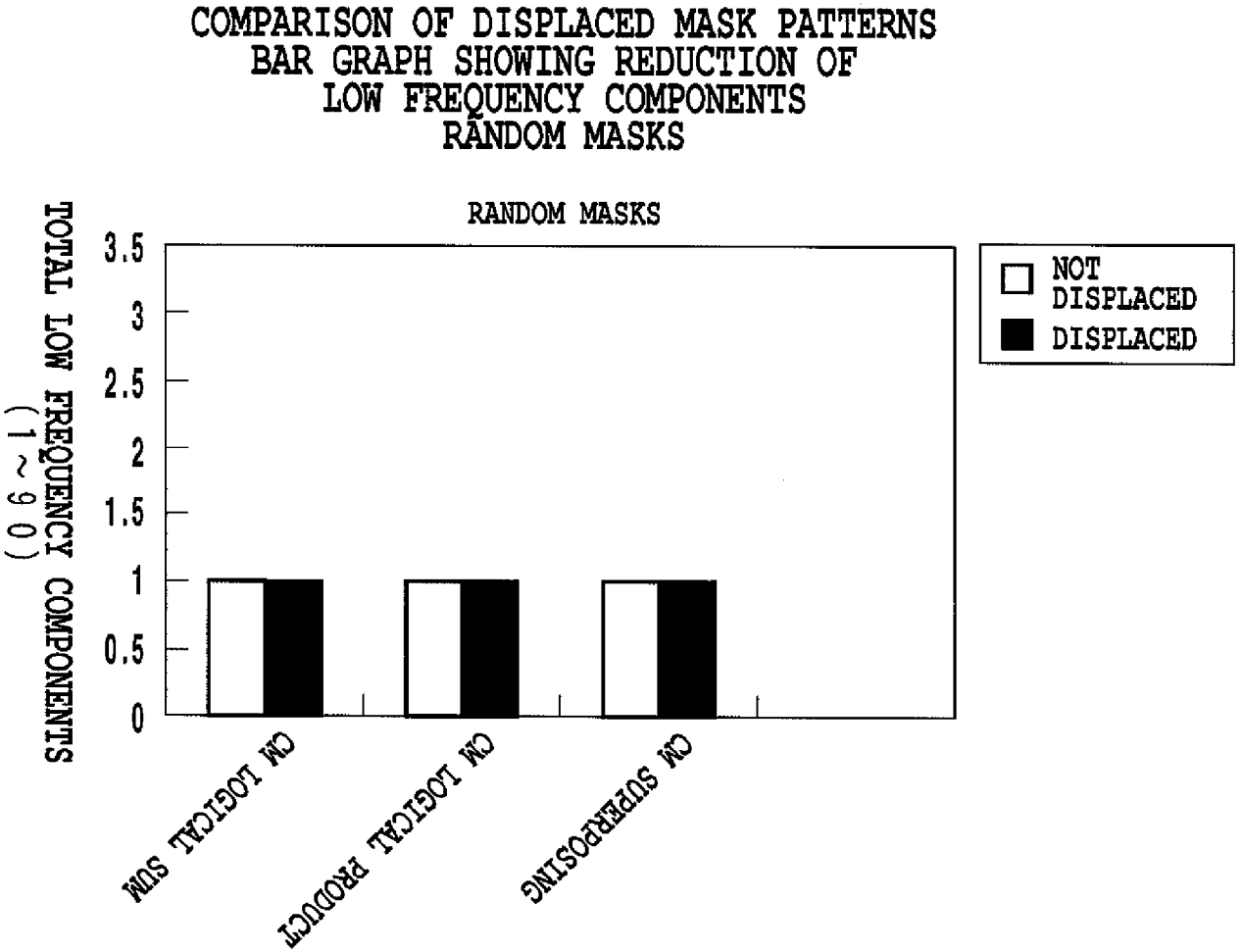
FIG. 52 is a diagram showing the difference in low frequency components between the logical sum and logical product and "superposing" of masks according to another comparative example and this mask displaced.

FIGS. 50 to 52 are diagrams showing the evaluations based on displacement in terms of the amount of low frequency components, for the layer masks according to the present embodiment and the dispersed masks only in self plane and the random masks according to the conventional example, respectively. Here, the amount of low frequency components corresponds to the integration of the frequency components on the range equal to or lower than 90 which corresponds to about half of the space frequency area in which the power spectra are present.

As shown in FIG. 50, the layer masks according to the present embodiment show more low-frequency components when displaced than when aligned, for all of the logical sum, logical product, and "superposing" patterns of the masks C1 and M1 and the "superposing" pattern of the masks C1, M1, and Y1.

In contrast, both the dispersed masks only in self plane shown in FIG. 51 and the random masks shown in FIG. 52 exhibit no change between when the masks are displaced and when they are aligned.

As described above, when the masks are superposed each other, it is possible to determine whether or not the present invention has been applied to the masks, depending on whether a dispersiveness evaluation value changes greatly when the masks are displaced. That is, the above described evaluation based on displacement proves that the masks to which the present invention is applied take the dispersiveness in overlapping into account.

Embodiment 2

100% Even Mask for Four Pass Printing

(1) Summary of the Embodiment

The present embodiment relates to four pass multi-pass printing in which an image is completed by four scans for each of the cyan (C), magenta (M), yellow (Y) and black (K) ink. For each of the ink colors for the four pass printing, not only masks for each of plural (in the present embodiment, four) scans but also a combination of plural arbitrary planes of these masks are appropriately dispersed.

In the description below, for simplification of illustration and description, four pass printing is executed using three colors, cyan, magenta, and yellow.

Each group of color nozzles for cyan, magenta and yellow is divided into four groups of a first to fourth groups, each including 128 nozzles. These groups are associated with respective mask patterns (C1, C2, C3, and C4, M1, M2, M3, and M4, and Y1, Y2, Y3, and Y4) according to the present embodiment. Each mask pattern has a size equal to 128 pixels in the sub-scanning direction (conveying direction), the number of which is the same as that of nozzles in each group. On the other hand, the mask pattern has a size equal to 256 pixels in a scan direction. Four mask patterns (C1, C2, C3, and C4, or M1, M2, M3, and M4, or Y1, Y2, Y3, and Y4) corresponding to a nozzle group for the same color ink are complementary to one another and correspond to all image data pixels. Superposing these mask patterns one another completes printing of an area corresponding to 128 pixels×256 pixels.

In a printing operation using these masks, each color nozzle group ejects ink to a print medium while executing scanning in a direction substantially orthogonal to the nozzle arranging direction. For example, the C, M and Y inks are ejected to each area. Further, every time a scan is finished, the print medium is conveyed by an amount equal to the width of one group (in this case, equal to 128 pixels) in a direction orthogonal to the scanning direction. This makes it possible to complete, by four scans, an image in an area of the print medium which has a size equal to the width of each group.

More specifically, four contiguous areas in the print medium each of which has a size corresponding to the width of each nozzle group are defined as areas A, B, C and D arranged in this order in the conveying direction of the print medium. Then, during the first scan, an area A on the print medium is printed using the first group of the C nozzle group, the first group of the M nozzle group, and the first group of the Y nozzle group. During the first scan, the mask patterns C1, M1 and Y1 are used for the area A.

Next, during the second scan, the area A, on which printing by the first scan has been completed, is subjected to printing using the second group of the C nozzle group, the second group of the M nozzle group, and the second group of the Y nozzle group. An unprinted area B is also printed using the first group of the C nozzle group, the first group of the M nozzle group, and the first group of the Y nozzle group. Accordingly, during the second scan, the mask patterns C2, M2 and Y2 are used for the area A, and the mask patterns C1, M1 and Y1 are used for the area B.

Further, during the third scan, the area A, on which printing by the second scan has been completed, is subjected to printing using the third group of the C nozzle group, the third group of the M nozzle group, and the third group of the Y nozzle group. The area B is also printed using the second group of the C nozzle group, the second group of the M nozzle group, and the second group of the Y nozzle group. An unprinted area C is also printed using the first group of the C nozzle group, the first group of the M nozzle group, and the first group of the Y nozzle group. Accordingly, during the third scan, the mask patterns C3, M3 and Y3 are used for the area A, the mask patterns C2, M2 and Y2 are used for the area B, and the mask patterns C1, M1 and Y1 are used for the area C.

Further, during the fourth scan, the area A, on which printing by the third scan has been completed, is subjected to printing using the fourth group of the C nozzle group, the fourth group of the M nozzle group, and the fourth group of the Y nozzle group. The area B is also printed using the third group of the C nozzle group, the third group of the M nozzle group, and the third group of the Y nozzle group. The area C is also printed using the second group of the C nozzle group, the second group of the M nozzle group, and the second group of the Y nozzle group. An unprinted area D is also printed using the first group of the C nozzle group, the first group of the M nozzle group, and the first group of the Y nozzle group. Accordingly, during the fourth scan, the mask patterns C4, M4 and Y4 are used for the area A, the mask patterns C3, M3 and Y3 are used for the area B, the mask patterns C2, M2 and Y2 are used for the area C, and the mask patterns C1, M1 and Y1 are used for the area D.

As described above, the four scans complete the image in the area 4 on the print medium. Further, the area B and the subsequent areas are similarly printed.

In the present embodiment, as is the case of the above first embodiment, the arrangement of print permitting pixels obtained by superposing the planes of masks one another is aperiodic and highly dispersive to show few low-frequency components, in order to avoid the occurrence of grains in intermediate images. This prevents dots from being arranged close or adjacent to one another or overlapping one another in intermediate images at the corresponding stages leading to the completion of an image, as much as possible. Also, even if overlapping or adjacent dots cannot be eliminated, the present embodiment makes such overlapping dots or the like highly dispersive.

(2) Mask Generating Method

The present embodiment can use, as a mask generating method, either of the simultaneous generation method and pass-by pass generation method, described in Embodiment 1. However, in the present embodiment, the simultaneous generation method is not the same as the pass-by pass generation method. These methods will be sequentially described below.

Simultaneous Generation

Figure 53:
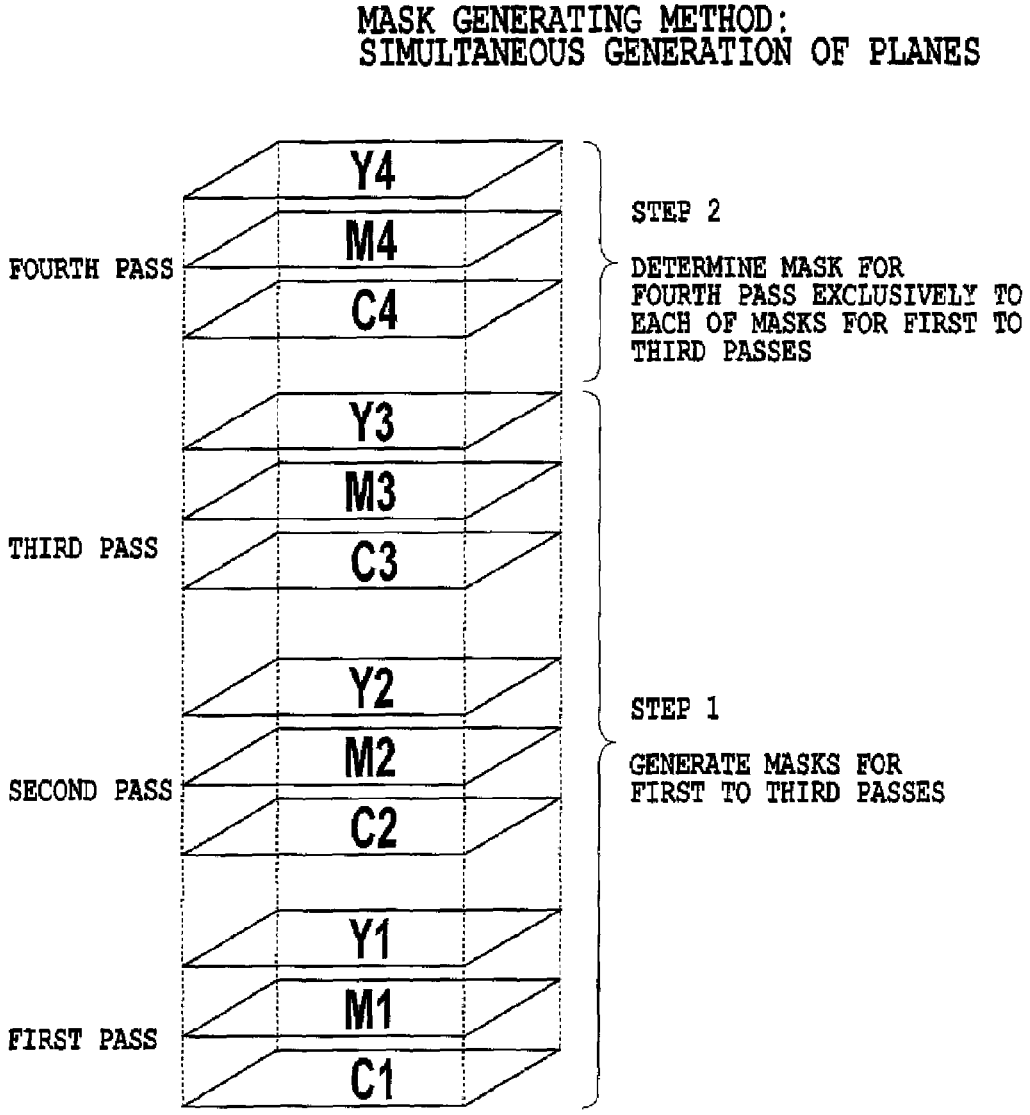
FIG. 53 is a diagram illustrating a mask generating method according to a second embodiment of the present invention.

FIG. 53 is a diagram conceptually illustrating the simultaneous generation method according to the present embodiment.

As shown in FIG. 53, the simultaneous generation method according to the present embodiment simultaneously generates masks (C1, M1 and Y1), (C2, M2 and Y2), and (C3, M3 and Y3) for the first to third passes, in step 1. Then, in step two-plane masks (C4, M4 and Y4) for the fourth pass are generated so as to be complementary, for each color, to the masks for the first to third passes (C1, M1 and Y1), (C2, M2 and Y2), and (C3, M3 and Y3). In other words, the mask for the fourth pass is generated so that the arrangement of the print permitting pixels is exclusive to the arrangements of the print permitting pixels of the masks for the first to third passes for each color.

Specifically, either the "arrangement moving method" or "sequential moving method", described in Embodiment 1, may be used as shown below to arrange the print permitting pixels to generate masks for the first to third passes.

Arrangement Moving Method

Processing that is executed for this method is basically similar to that described for Embodiment 1 with reference to FIG. 8. Specifically, as is the case with step S801 in FIG. 8, C, M and Y images each of 25% density are acquired which correspond to the size of plane of each of the color masks (C1, M1 and Y1), (C2, M2 and Y2), and (C3, M3 and Y3) for the first to third passes. Then, as in the case of step S802, a binarizing technique such as an error diffusion method is used to binarize each image. This results in an initial arrangement in which print permitting pixels are disposed on 25% of all the mask pixels on the plane of each of the masks (C1, M1 and Y1), (C2, M2 and Y2), and (C3, M3 and Y3).

Then, as is the case with step S803, the repulsive potential is calculated for all the print permitting pixels on the plane of each of the masks (C1, M1 and Y1), (C2, M2 and Y2), and (C3, M3 and Y3) obtained as described above.

The calculation of the repulsive potential is different from that of the processing according to Embodiment 1, in bellowing points. For example, to calculate the repulsive potential of a certain print permitting pixel on the plane C2, the effect of a print permitting pixel on another plane of a different color which is located at a distance r from the above print permitting pixel; the value of the weighting coefficient $\beta$ in $\beta E(r)$ is set to be 1 as is the case with Embodiment 1. On the other hand, the effect of print permitting pixels on different planes C1 and C3 of the same color which are located at the distance r from the above allowed pixel; the value of the weighting coefficient $\beta$ in $\beta E(r)$ is set to be 2. Thus, the dispersion of print permitting pixels obtained when the masks of the same color are superposed (β is 2) is given priority over the dispersion of print permitting pixels obtained when masks of different colors are superposed (β is 1).

Then, as is the case with step S804 in FIG. 8, energy is attenuated as described in FIGS. 10A to 10D. Here, the difference from Embodiment 1 is as follows. Each of the print permitting pixels on nine planes calculated in the preceding processing is moved to one of the pixels located within a distance r of at most 4 from that print permitting pixel, at which the repulsive potential most decreases. On this occasion, print permitting pixels of the same color (of the planes) are prohibited from overlapping on each other. Thus, masks of the same color for three passes can be made complementary to one another.

Sequential Arrangement Method

The sequential arrangement method for simultaneous generation is basically the same as the processing described for Embodiment 1 with reference to FIG. 11. The difference between the present embodiment and Embodiment 1 is the same as that described for the arrangement moving method. That is, to calculate the repulsive potential, the effect of a print permitting pixel on another plane of a different color; the value of the weighting coefficient β in βE(r) is set to be 1. The effect of print permitting pixel on different planes of the same color; the value of the weighting coefficient β in βE(r) is set to be 2. Further, when an object print permitting pixel is placed on a pixel at which the repulsive potential is minimum, print permitting pixels of the same color (of the planes) are prohibited from overlapping on one another.

The process is then finished when print permitting pixels are arranged at 25% of the pixels on each plane (see step S1106 in FIG. 11).

Pass-by Pass Generation

Figure 54:
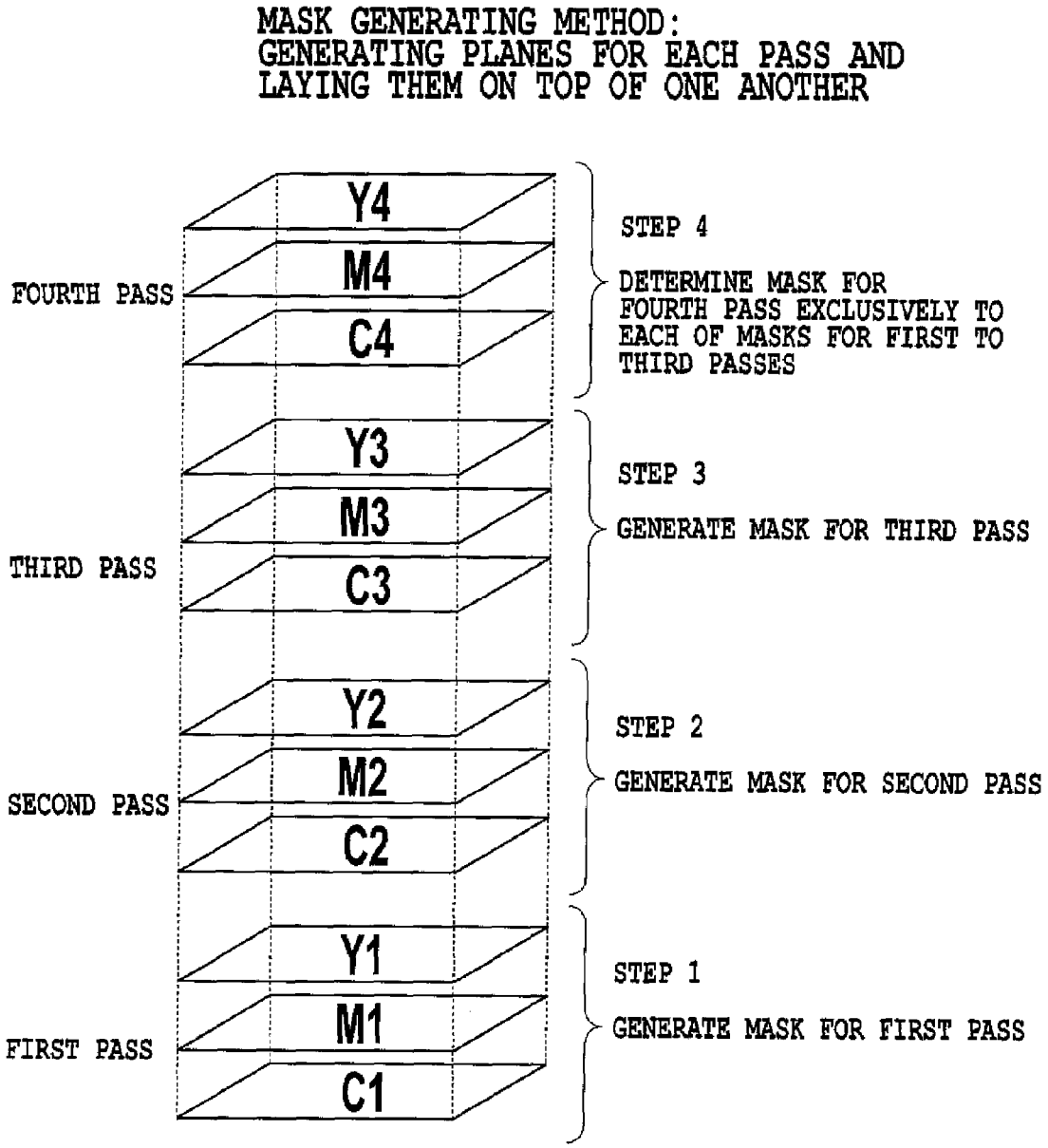
FIG. 54 is a diagram illustrating a mask generating method according to the second embodiment of the present invention.

FIG. 54 is a diagram conceptually illustrating an pass-by pass generation method according to the present embodiment.

As shown in FIG. 54, the pass-by pass generation method according to the present embodiment generates masks (C1, M1 and Y1) for the first pass in step 1, masks (C2, M2 and Y2) for the second pass in step 2, and masks (C3, M3 and Y3) for the second pass in step 3. Then, step 4 generates masks (C4, M4 and Y4) for each plane which are used for the fourth pass, so that the masks (C4, M4 and Y4) are complementary, for each color, to the generated masks (C1, M1 and Y1), (C2, M2 and Y2), and (C3, M3 and Y3) for the first to third passes. In other words, the masks for the fourth pass are generated so that the arrangement of the print permitting pixels is exclusive to the arrangement of the print permitting pixels of the masks for the first to third passes.

Specifically, either the "arrangement moving method" or "sequential moving method", described in Embodiment 1, may be used as shown below to arrange the print permitting pixels to generate masks for the first to third passes.

Arrangement Moving Method

Processing that is executed for this method is basically similar to that described for Embodiment 1 with reference to FIG. 8. Specifically, as is the case with step S801 in FIG. 8, C, M, and Y images each of 25% density are acquired which correspond to the size of plane of each of the color masks (C1, M1, and Y1) for the first pass. Then, as in the case of step S802, a binarizing technique such as an error diffusion method is used to binarize each image. This results in an initial arrangement in which print permitting pixels are disposed on 25% of all the mask pixels for the plane of each of the masks (C1, M1 and Y1).

Then, as is the case with step S803, the repulsive potential is calculated for all the print permitting pixels on the plane of each of the masks (C1, M1, and Y1) obtained as described above.

The difference point in this calculation of the repulsive potential from the process according to Embodiment 1 is the same as that in the above described arrangement moving method for simultaneous generation of the present embodiment. That is, to calculate the repulsive potential of a certain print permitting pixel, the effect of a print permitting pixel on another plane of a different color which is located at a distance r from the above print permitting pixel; the value of the weighting coefficient β in βE(r) is set to be 1 as is the case with the Embodiment 1. On the other hand, the effect of print permitting pixels on different planes of the same color which are located at the distance r from the above print permitting pixel; the value of the weighting coefficient β in βE(r) is set to be 3. Thus, the dispersion of print permitting pixels obtained when masks of the same color are superposed (β is 3) is given priority over the dispersion of print permitting pixels obtained when masks of different colors are superposed (β is 1). Since the effect of a plane of a different color; the value of the coefficient β in βE(r) is set at 1, a pattern can be obtained in which for example, sets of C, M, and Y print permitting pixels are each very dispersively arranged.

Once the print permitting pixels are thus arranged on the masks (C1, M1 and Y1) for the first pass, mask patterns for the second pass (step 2) and third pass (step 3) are similarly obtained. In this case, when arranging print permitting pixels (see step S804 in FIG. 8), the already generated mask patterns for the passes; arrangements of print permitting pixels for the passes are fixed. This ensures the complementariness of the mask patterns for the first to third passes.

Sequential Arrangement Method

The sequential arrangement method in the pass-by pass generation is basically the same as the processing described for Embodiment 1 with reference to FIG. 11. The difference point from Embodiment 1 is the same as that described for the arrangement moving method of the present embodiment. That is, to calculate the repulsive potential, the effect of a print permitting pixels on another plane of a different color; the value of the weighting coefficient β in βE(r) is set to be 1. The effect of print permitting pixels on different planes of the same color; the value of the weighting coefficient β in βE(r) is set to be 3. Further, when a object print permitting pixel is placed on a pixel at which the repulsive potential is minimum, the already generated pass patterns; the already determined arrangement of print permitting pixels are fixed. This ensures the complementariness of the mask patterns for the first to third passes.

The process is then finished when print permitting pixels are arranged at 25% of the pixels on each plane (see step S1106 in FIG. 11).

(3) Mask Characteristic Evaluation

Figure 55:
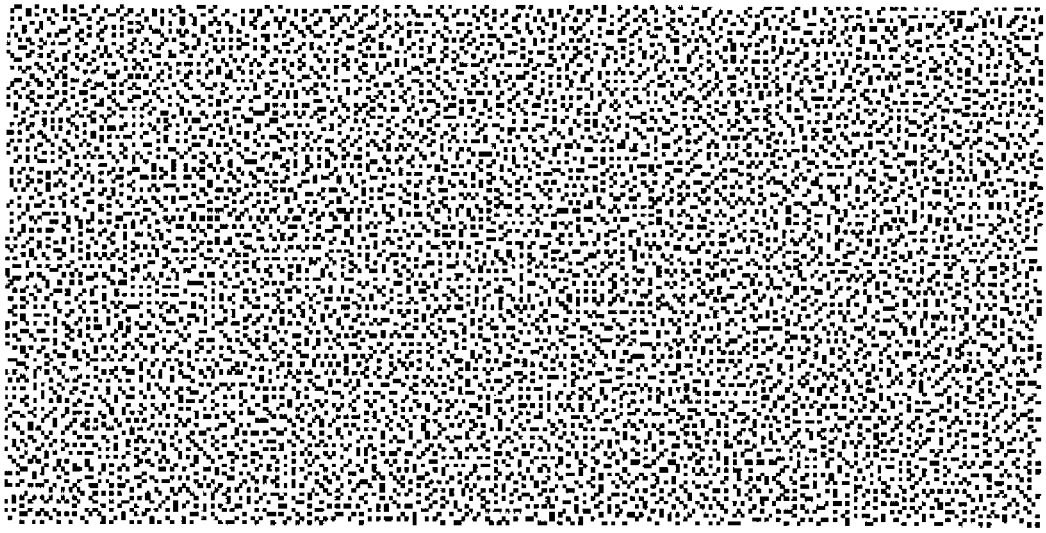
FIG. 55 is a diagram showing an arrangement of print permitting pixels in a mask pattern according to the second embodiment of the present invention.
Figure 56:
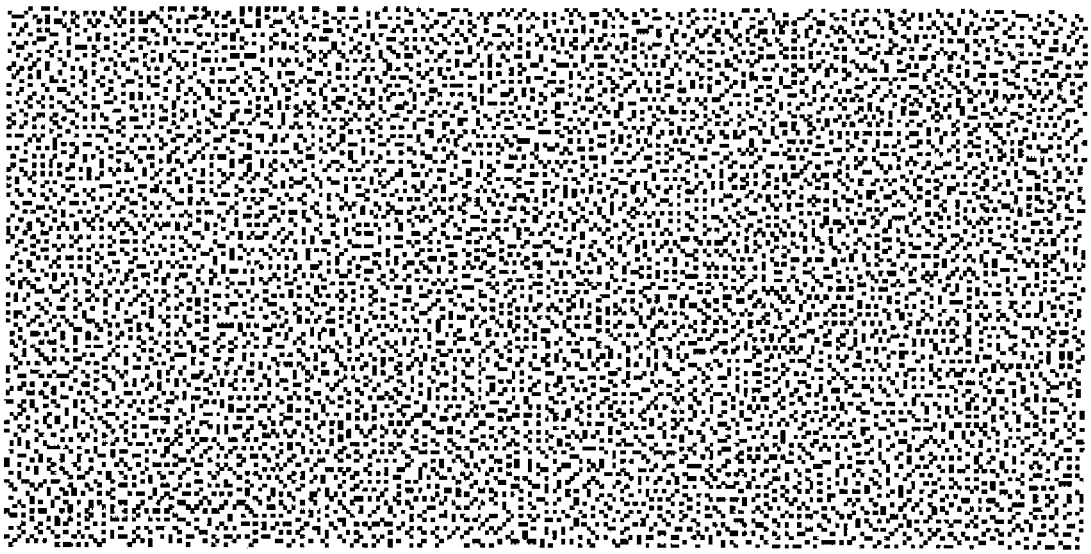
FIG. 56 is a diagram showing an arrangement of print permitting pixels in a mask pattern according to the second embodiment of the present invention.
Figure 57:
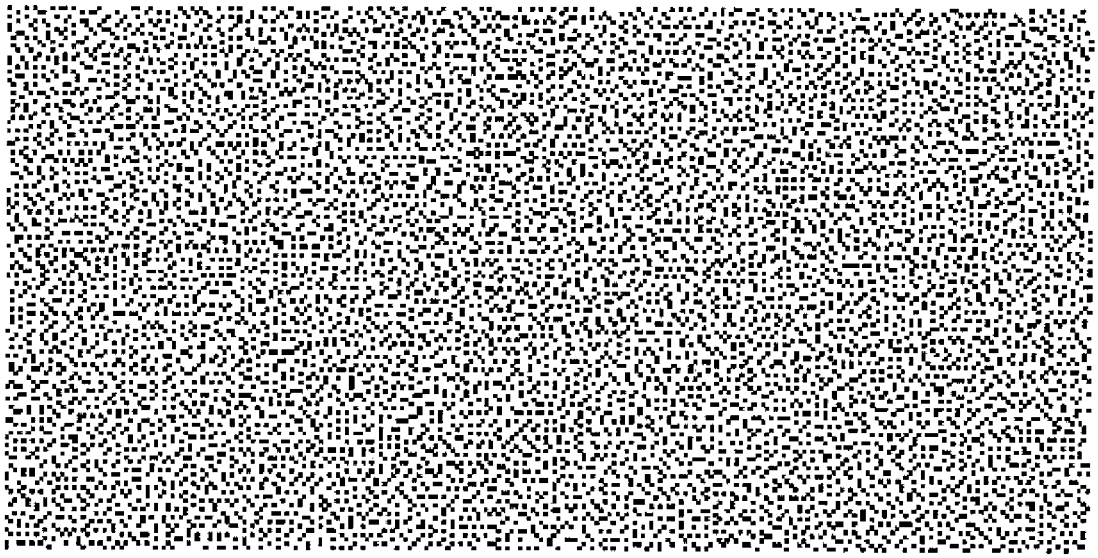
FIG. 57 is a diagram showing an arrangement of print permitting pixels in a mask pattern according to the second embodiment of the present invention.

FIGS. 55 to 57 are diagrams showing the arrangement pattern of print permitting pixels in one plane of layer masks C1, M1 and Y1 according to the present embodiment which have been generated using any of the above generating methods. Each mask pattern has an area of 128 pixels×256 pixels.

As shown in FIGS. 55 to 57, the print permitting pixels are arranged in the mask pattern according to the present embodiment taking into account the dispersiveness within the same plane based on the effect of the coefficient α. This gives the observer the impression that the image is generally smooth.

Figure 58:
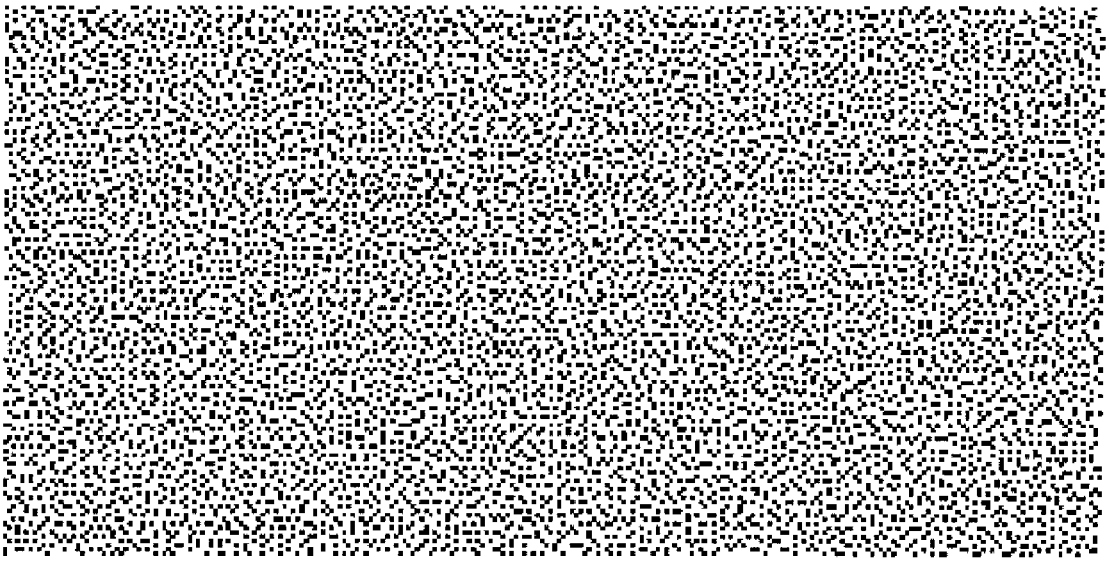
FIG. 58 is a diagram showing an arrangement of print permitting pixels in "superposing" of three mask patterns according to the second embodiment of the present invention.
Figure 59:
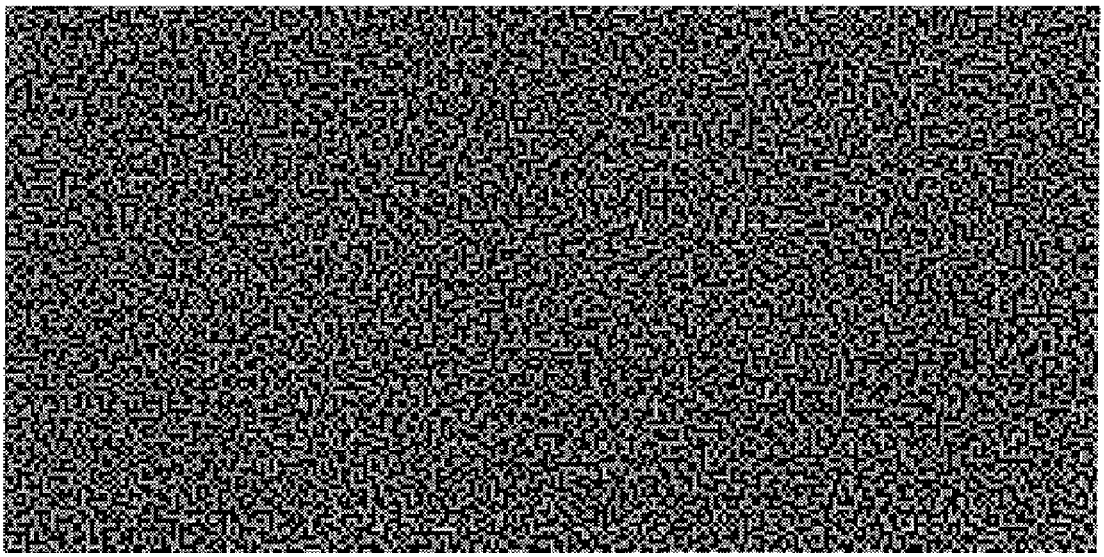
FIG. 59 is a diagram showing an arrangement of print permitting pixels in "superposing" of six mask patterns according to the second embodiment of the present invention.
Figure 60:
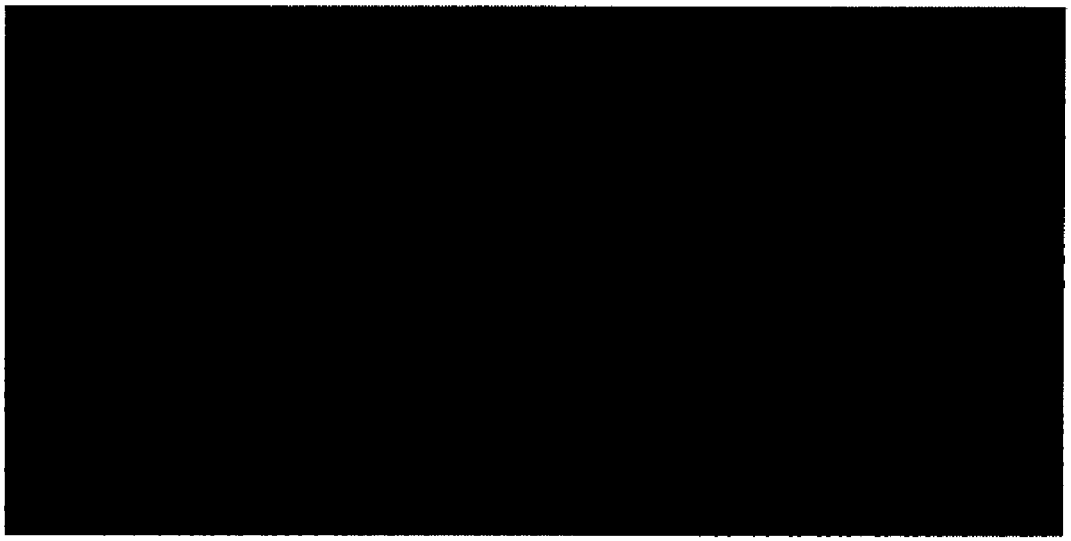
FIG. 60 is a diagram showing an arrangement of print permitting pixels in "superposing" of nine mask patterns according to the second embodiment of the present invention.

FIGS. 58 to 60 show "superposing" patterns of three layer masks (C1, M1 and Y1), six layer masks (C1, M1, Y1, C2, M2 and Y2), and nine layer masks (C1, M1, Y1, C2, M2, Y2, C3, M3 and Y3) according to the present embodiment, respectively, which are superposed one another at the regular position. The "superposing" patterns in which the plural layer masks are superposed one another express their logical sum patterns at lower densities and their logical product patterns at higher densities.

The illustrated "superposing" patterns substantially express ink dot patterns in intermediate images obtained when the masks according to the present embodiment are used for printing. Accordingly, these patterns show that the ink dots of the intermediate images and their overlaps are appropriately dispersed.

Evaluation Based on Displacement

The layer masks for four pass printing according to the present embodiment are also evaluated on the basis of the displacement as is the case with Embodiment 1.

Figure 61:
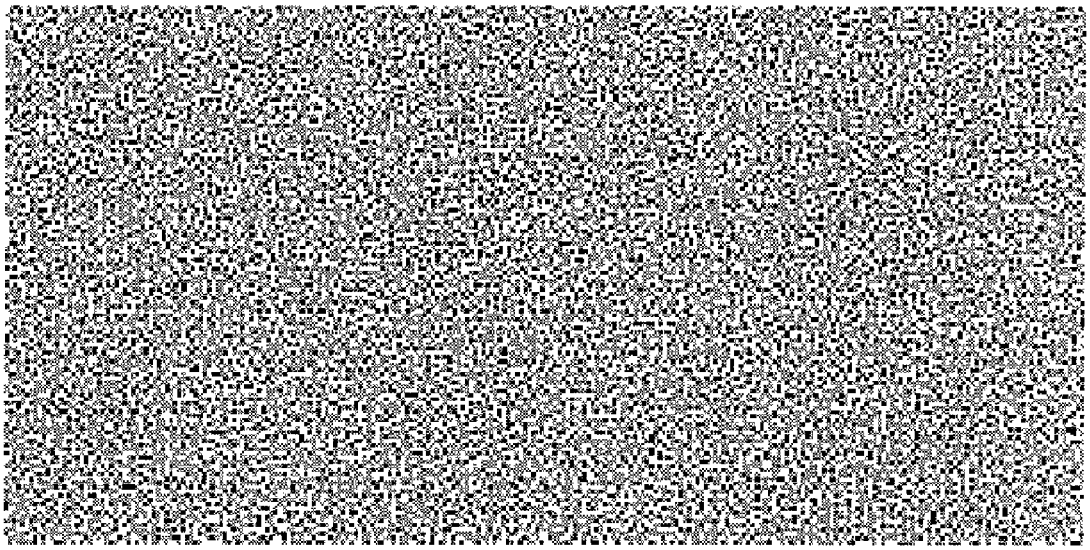
FIG. 61 is a diagram showing an arrangement of print permitting pixels in "superposing" of three mask patterns on masks according to the second embodiment of the present invention which are displaced with respect to one another.
Figure 62:
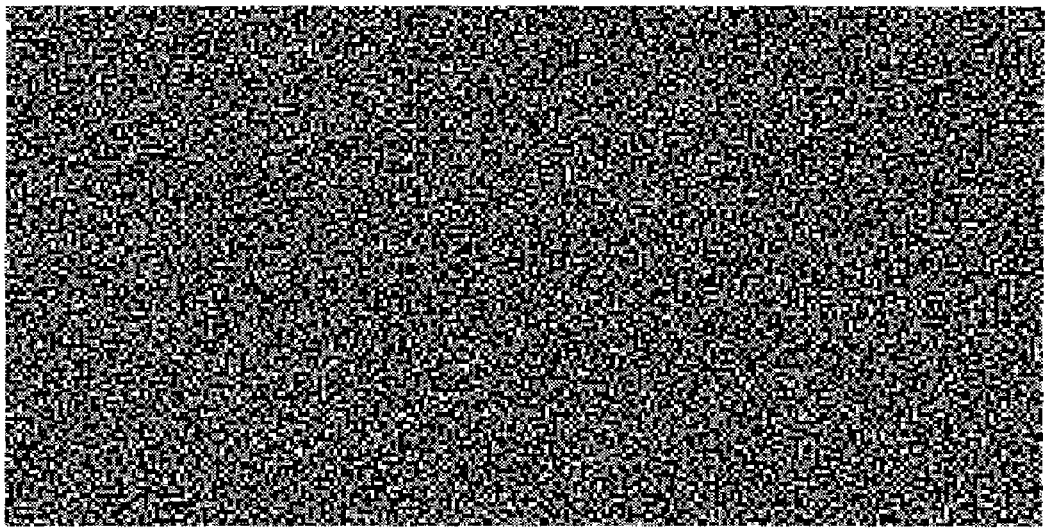
FIG. 62 is a diagram showing an arrangement of print permitting pixels in "superposing" of six mask patterns on masks according to the second embodiment of the present invention which are displaced with respect to one another.
Figure 63:
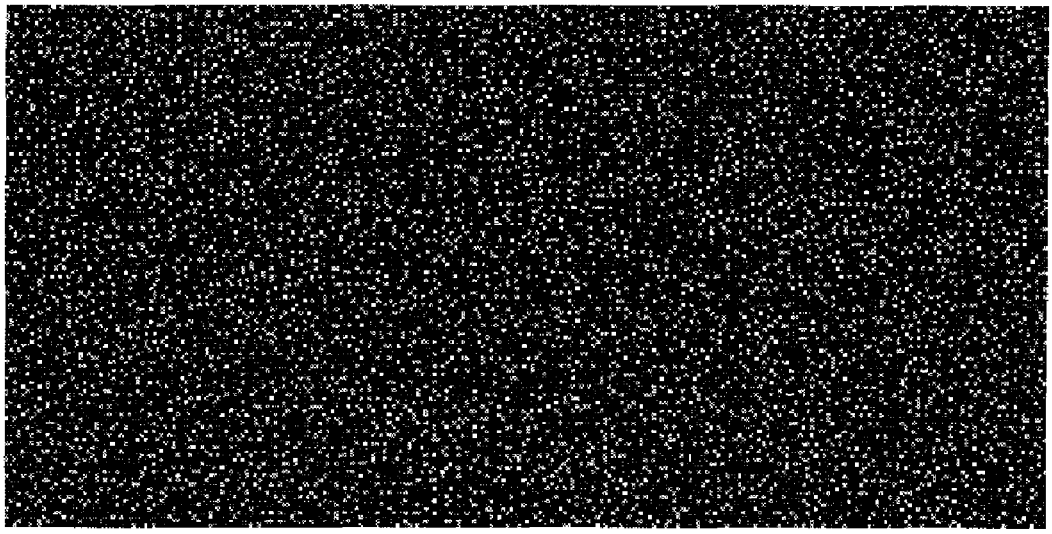
FIG. 63 is a diagram showing an arrangement of print permitting pixels in "superposing" of nine mask patterns on masks according to the second embodiment of the present invention which are displaced with respect to one another.

FIG. 61 is a diagram showing a "superposing" pattern obtained when the three layer masks (C1, M1 and Y1) shown in FIG. 58 are superposed one another so as to be displaced. Furthermore, FIG. 62 is a diagram showing a "superposing" pattern obtained when the six layer masks (C1, M1, Y1, C2, M2 and Y2) shown in FIG. 59 are superposed one another so as to be displaced. Moreover, FIG. 63 is a diagram showing a "superposing" pattern obtained when the nine layer masks (C1, M1, Y1, C2, M2, Y2, C3, M3 and Y3) shown in FIG. 60 are superposed one another so as to be displaced.

As is apparent from these figures, any of the superposing patterns (FIGS. 61 to 63) of the displaced layer masks according to the present embodiment exhibits lower dispersiveness than the aligned patterns (FIGS. 58 to 60). Therefore, in viewing the patterns, the observer gets a rougher feeling.

Figure 64:
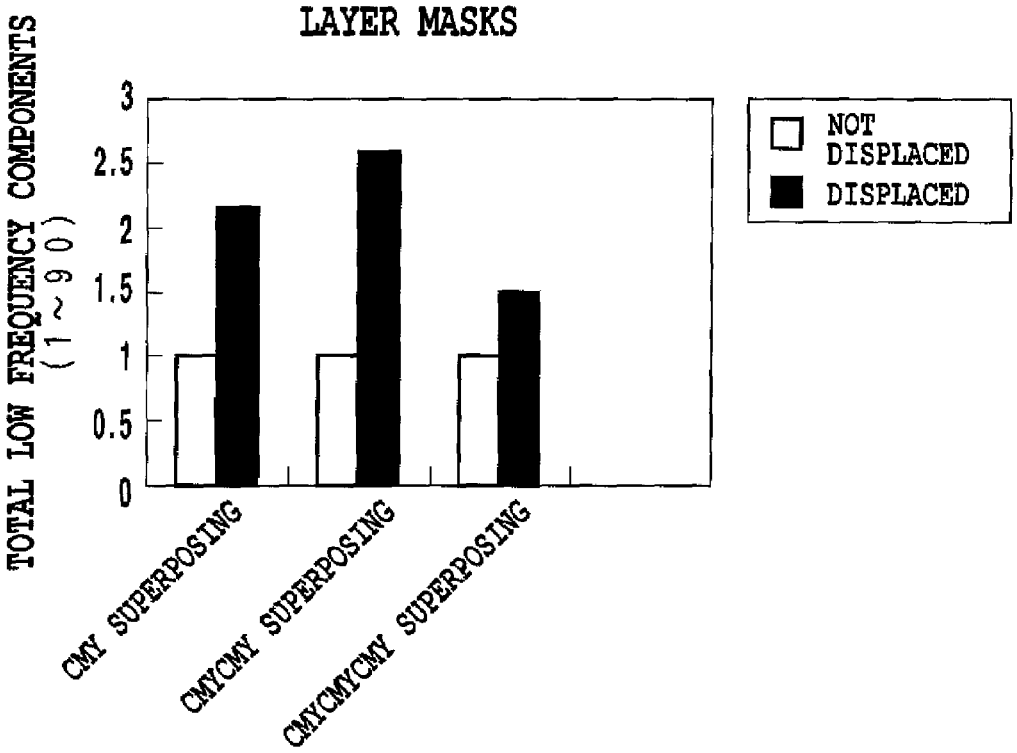
FIG. 64 is a diagram showing the difference in low frequency components between "superposing" masks according to the second embodiment of the present invention and these masks displaced with respect to one another.

FIG. 64 is a diagram showing the evaluation based on displacement in terms of an amount of low frequency components. The figure shows a comparison of the amount of low frequency components obtained when the "superposing" patterns is displaced (FIGS. 61 to 63) and when they are aligned (FIGS. 58 to 60), for the three layer masks (C1, M1 and Y1), six layer masks (C1, M1, Y1, C2, M2 and Y2), and nine layer masks (C1, M1, Y1, C2, M2, Y2, C3, M3 and Y3).

As shown in FIG. 64, the layer masks according to the present embodiment show smaller amount of frequency components when displaced than when aligned (that is, the masks are superposed one another at the regular position), in any superposing pattern.

As described above, when the masks are superposed each other, it is possible to determine whether or not the present invention has been applied to the masks, depending on whether a dispersiveness evaluation value changes greatly when the masks are displaced.

It should be noted that the mask pattern according to the present embodiment has a size of 256 pixels×128 pixels; the length size is different from the width size. To evaluate frequency components in this pattern, the length size of the pattern is made equal to its width size before the evaluation. To make both the length and width sizes equal to the longitudinal size (in the present embodiment, the width of 256 pixels), the present embodiment repeats the pattern in the vertical direction to form a pattern of 256 pixels×256 pixels before evaluating the frequency components.

This also applies to different sizes; both the length and width sizes are made equal to the longitudinal size before the frequency components are evaluated. Specifically, the pattern is repeated in a shorter direction until a shorter direction size of the pattern is equal to or larger than a longer direction size. A pattern is cut out of the resulting pattern and evaluated. In this case, both the length and width sizes are preferably the n-th power of 2 (n is a positive integer) so as to make fast Fourier transformation available for frequency transformation. If the length and width sizes are not the n-th power of 2, the n-th power of 2 which is closest to the longer direction size is determined. The pattern is then repeated in the vertical and horizontal directions so as to enable a pattern with a size of the determined n-power of 2 to be cut out. A pattern with a size of the determined n-th power of 2 is then cut out of the pattern generated by the repetition and evaluated. For example, it is assumed that the mask pattern has a width of 500 pixels and a length of 320 pixels. In this case, since the longer direction size is "500", the n-th power of 2 which is closest to "500" is determined. The closest n-th power of 2 is then determined to be "512". Thus, to cut out a pattern of 512 pixels×512 pixels, the original pattern is repeated once both in the horizontal and vertical directions to generate a pattern of 1,000 pixels×640 pixels. A pattern of 512×512 pixels is then cut out of the generated pattern of 1,000 pixels×640 pixels and evaluated.

Embodiment 3

100% Gradation Mask for Two Pass Printing

The present embodiment relates to what is called a gradation mask. The gradation mask is known from, for example, Patent Document 3. The gradation mask shows a print rate varying depending on the nozzle position such that a lower print rate is set for the ends of a nozzle array, while a higher print rate is set for the center of the nozzle array. This mask is effective in improving image grade by relatively reducing the frequency of ejections from the end nozzles which may affect the boundary between the print areas of the respective passes in multi-pass printing.

The "print rate" of the mask pattern refers to the ratio of the number of print permitting pixels to the number of all the pixels (the sum of the print permitting pixels and print non-permitting pixels) contained in a given area in a mask pattern. For example, the print rate of the mask pattern corresponding to a single nozzle refers to the ratio of the number of print permitting pixels to the number of all the pixels contained in an area (single raster area) corresponding to the single nozzle.

With such a mask, when the mask pattern corresponding to the entire nozzle line is evaluated in terms of space frequencies, the amount of low frequency components is observed increasing owing to a variation in the print rate depending on the area in the mask pattern. However, the effect of the present invention can be exerted, that is, possible grains can be prevented, by providing a mask pattern that allows the print permitting pixels to be arranged so that the print rate gradually varies as described above, while reducing unwanted low frequency components. Accordingly, both the effect of the present invention and the effect described in Patent Document 3 can be produced by providing a gradation mask that keeps plural areas, which correspond to the respective print rates varied on the mask, high dispersiveness, while varying the print rate among the areas.

Figure 65B:
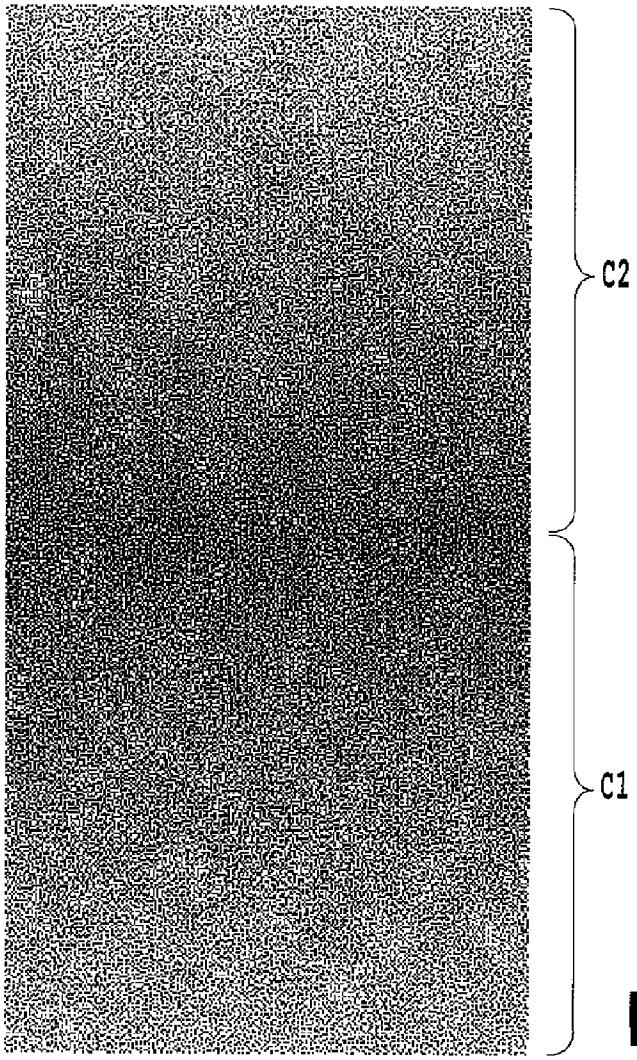
FIG. 65B is a diagram illustrating a mask according to a third embodiment of the present invention.
Figure 65A:
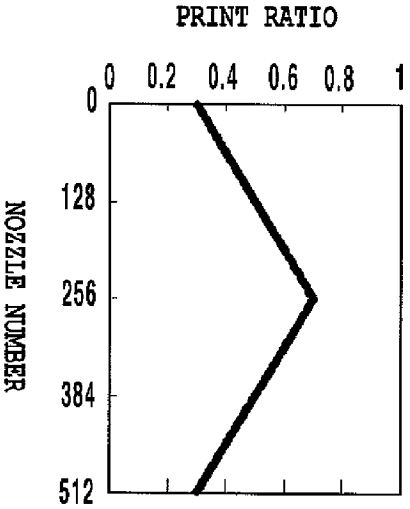
FIG. 65A is a diagram illustrating a mask according to a third embodiment of the present invention.

FIGS. 65A and 65b show the print rate of the gradation mask according to the present invention which corresponds to the nozzle position, and mask patterns for two planes which are exclusive to each other.

The two-plane masks in the present embodiment are cyan two-plane masks C1 and C2, magenta two-plane masks M1 and M2, or yellow two-plane masks Y1 and Y2. Among these masks, FIGS. 65A and 65B representatively show the case of the cyan masks C1 and C2. As described in Embodiment 1, the print permitting pixels in these six masks are mutually dispersively arranged.

As shown in the figures, during each scan, nozzles of Nos. 0 to 255 correspond to the mask C2 and nozzles of Nos. 256 to 511 correspond to the mask C1 for printing. As described above, the masks C1 and C2 are complementary to each other. During the interval between scans, the print medium is conveyed by an amount equal to the length of the array of 256 nozzles. This repetition of scan and conveyance achieves two pass printing in which the masks C1 and C2 complementarily complete the area corresponding to the array of 256 nozzles.

As shown in FIG. 65A, the masks C1 and C2 have a print rate that varies between 0.3 and 0.7 for each raster (nozzle) and a total print rate of 50% for the entire plane, respectively. Thus, the print rate determines the number of print permitting pixels on the mask for each raster. For example, for a raster with a print rate of 0.4 (40%), if the mask has a raster-wise size of 1,000 pixels, about 400 print permitting pixels are arranged on the mask.

(2) Mask Generating Method

The mask generating method according to the present embodiment is basically the same as that described in Embodiment 1. That is, it is possible to implement either the method of simultaneously generating the entire plane or the method of sequentially generating masks for each pass. For two pass printing in the present embodiment, the simultaneous generation is the same as pass-by pass generation, as described above in Embodiment 1. Further, either the arrangement moving method or the sequential arrangement method may be implemented for each of the two generation methods as described above. A sequential description will be given of the arrangement moving method and the sequential arrangement method according to the present embodiment.

Arrangement Moving Method

Figure 66:
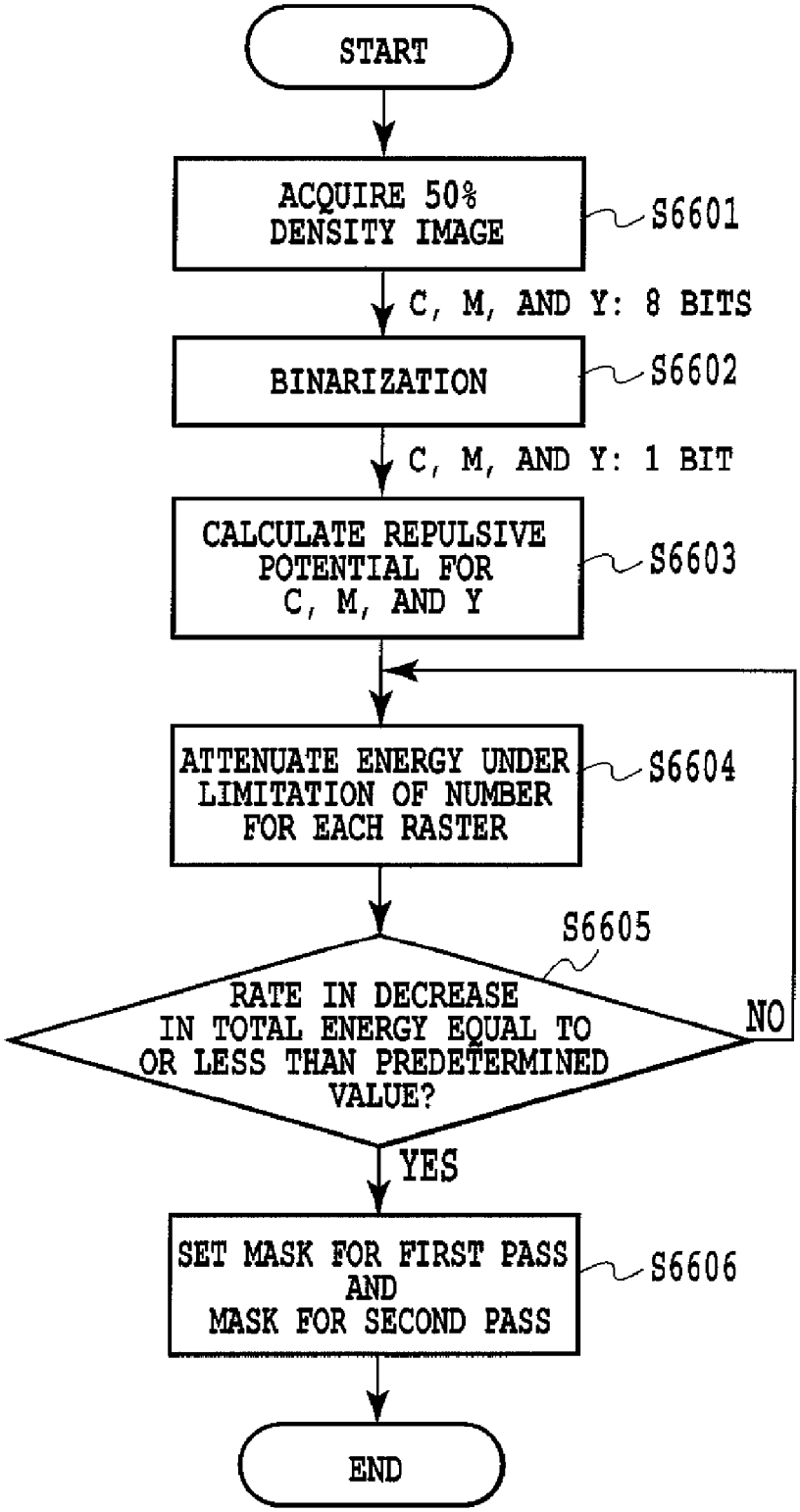
FIG. 66 is a flowchart showing the procedure of a mask generating method according to the third embodiment of the present invention.

FIG. 66 is a flowchart of an arrangement determining process based on a method for moving the arrangement of print permitting pixels in a gradation mask for two pass printing. The process shown in FIG. 66 is basically similar to that shown in FIG. 8 in connection with Embodiment 1. The difference between these processes will be mainly described below.

The processing in steps S6601 and S6602 is similar to that in steps S801 and S802, shown in FIG. 8. The processing in step S6603 is also similar to that in step S803. The repulsive potential is calculated for all the print permitting pixels arranged on the plane of each of the masks C1, M1, and Y1 for each raster as described above.

Next, in step S6604, as is the case with step S804 in FIG. 8, the repulsive potentials, which are obtained as described above for the print permitting pixels on each plane for the three planes C1, M1, and Y1, are added together to determine the total energy. Then, as described above with reference to FIGS. 10A to 10D, the arrangement of the print permitting pixels is moved.

In this movement, if moving a print permitting pixel to a position at which the potential energy most decreases causes the arrangement number of print permitting pixels to exceeds the limit on the number of arranged pixels for that raster, the movement to that raster is avoided. Instead, the print permitting pixel is moved to a pixel in one of the rasters for which the above limit is not exceeded and which includes that pixel, at which the potential energy next decreases most. This provides a highly dispersive print permitting pixel arrangement while maintaining the print rate for each raster.

Subsequently, as is the case with the processing in FIG. 8, the rate of decrease in total energy is calculated. If the rate is determined to be equal to or less than a predetermined value, the energy attenuating process is ended. The planes with the rate of decrease in total energy equal to or less than the predetermined value are determined to be the masks C1, M1 and Y1 for the first pass. Further, the masks C2, M2 and Y2 for the second pass are set for which the arrangement of the print permitting pixels is exclusive to the arrangement of the print permitting pixels on the masks C1, M1 and Y1. Also in this case, as is the case with Embodiment 1, described above, whether or not to end the energy attenuating process may be determined depending on whether or not the total energy is equal to or less than a predetermined value rather than on the rate of a decrease in total energy.

Sequential Arrangement Method

Figure 67:
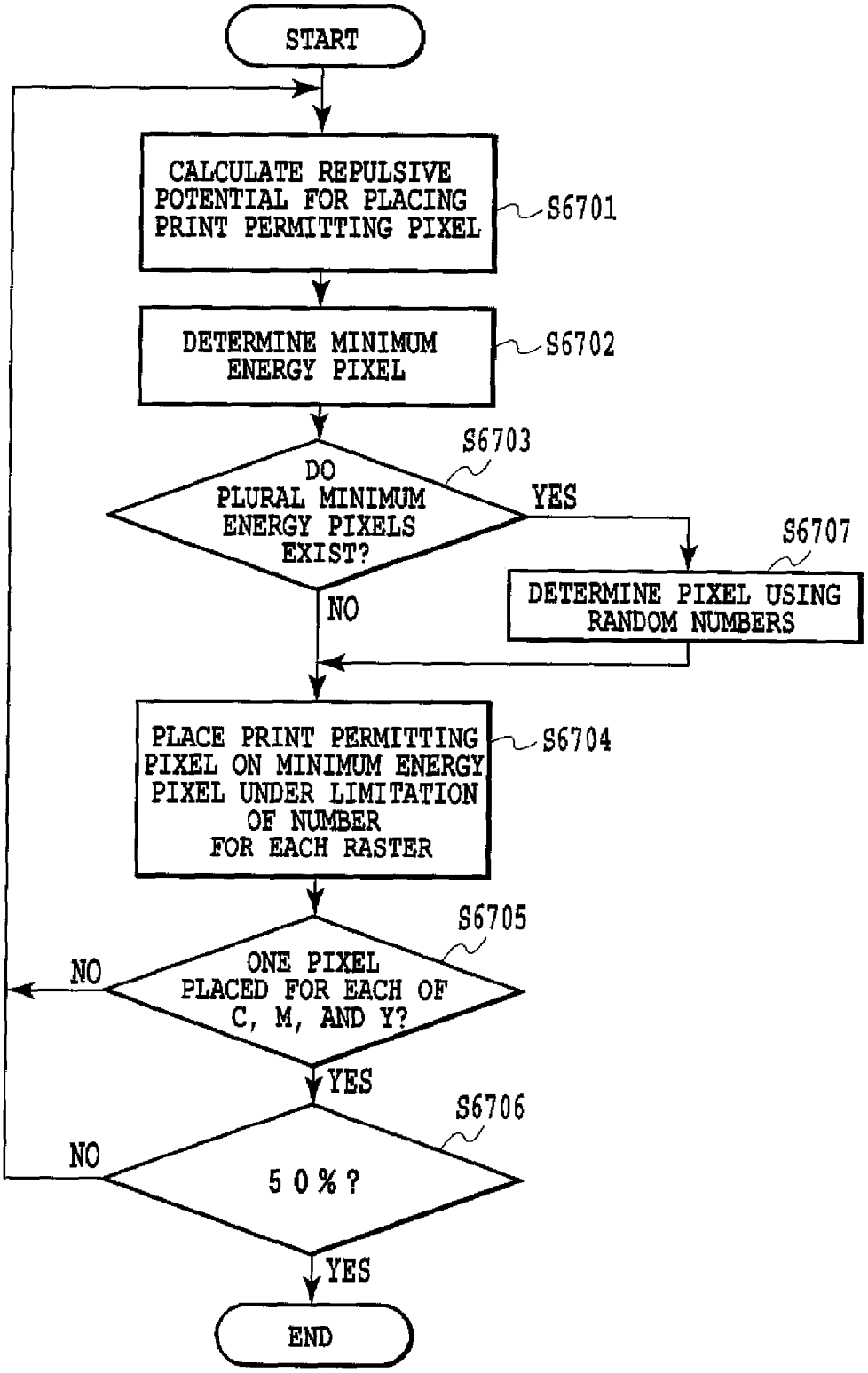
FIG. 67 is a flowchart showing the procedure of another mask generating method according to the third embodiment of the present invention.

This method is basically the same as that described above for Embodiment 1 with reference to FIG. 11. FIG. 67 is a flowchart showing a process for determining the arrangement of print permitting pixels on the basis of a sequential arrangement method according to the present embodiment.

The processing in steps S6701 to S6703, S6705, S6706 and S6707 in FIG. 67 is the same as that in steps S1101 to 1103, S1105, S1106 and S1107 in FIG. 11.

The difference between these processes is that when in step S6704, a print permitting pixel is placed on a pixel with the lowest energy on the plane and if the number of arranged pixels for the raster, which includes that pixel and varies depending on the print rate as described above, is exceeded, the print permitting pixel is placed on a pixel with the second lowest energy in one of the rasters for which the limit on the number of arranged pixels is not exceeded. This provides a gradation mask that achieves a high dispersiveness while varying the print rate with the raster.

In any of the above examples of generating methods, the number of arranged pixels is managed for each raster. However, the present invention is not limited to this. For example, if the print rate of a mask pattern is determined for every plural rasters, the number of arranged pixels is limited for every that number of rasters.

(3) Mask Characteristic Evaluation

Figure 68:
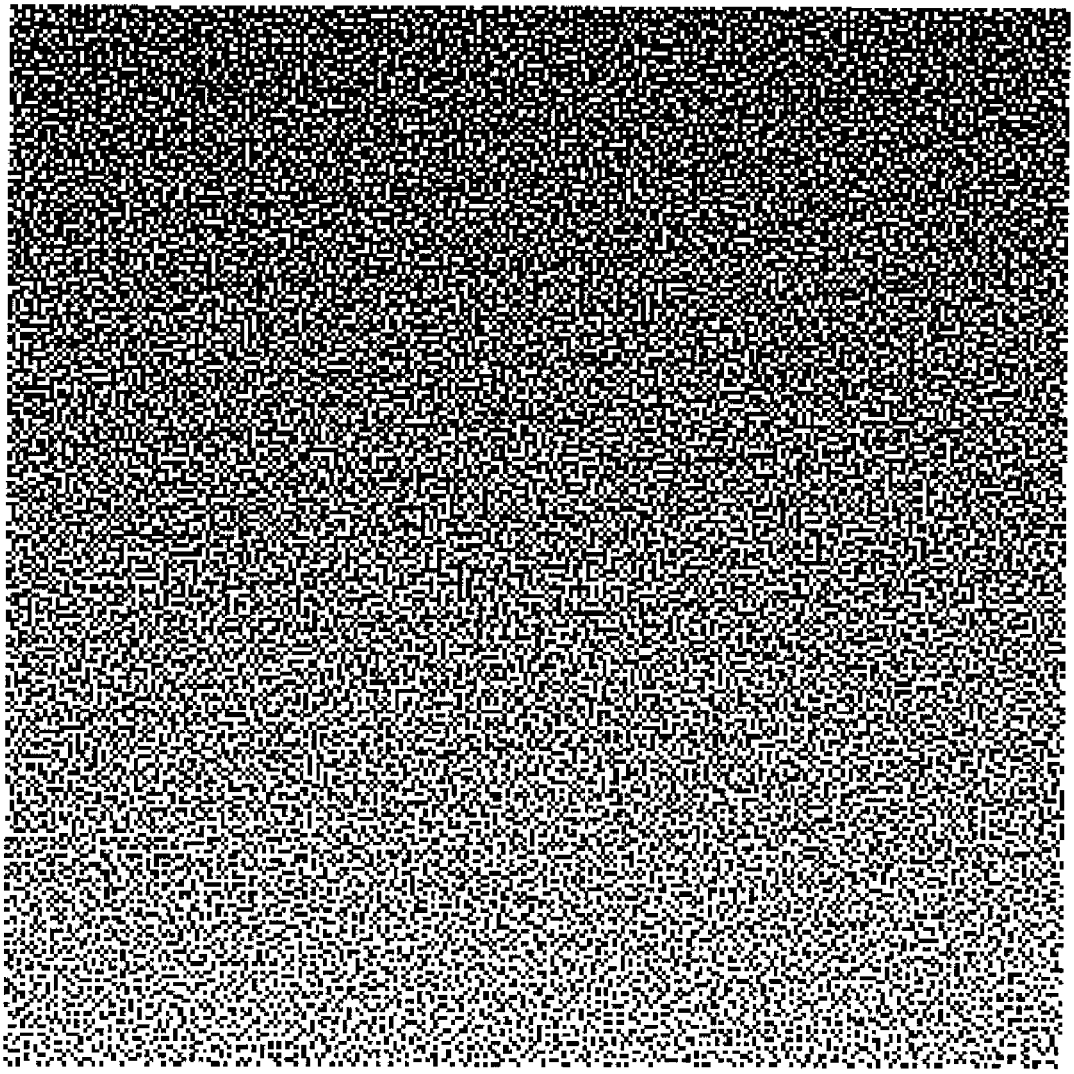
FIG. 68 is a diagram showing an arrangement of print permitting pixels in a mask pattern according to the third embodiment.
Figure 69:
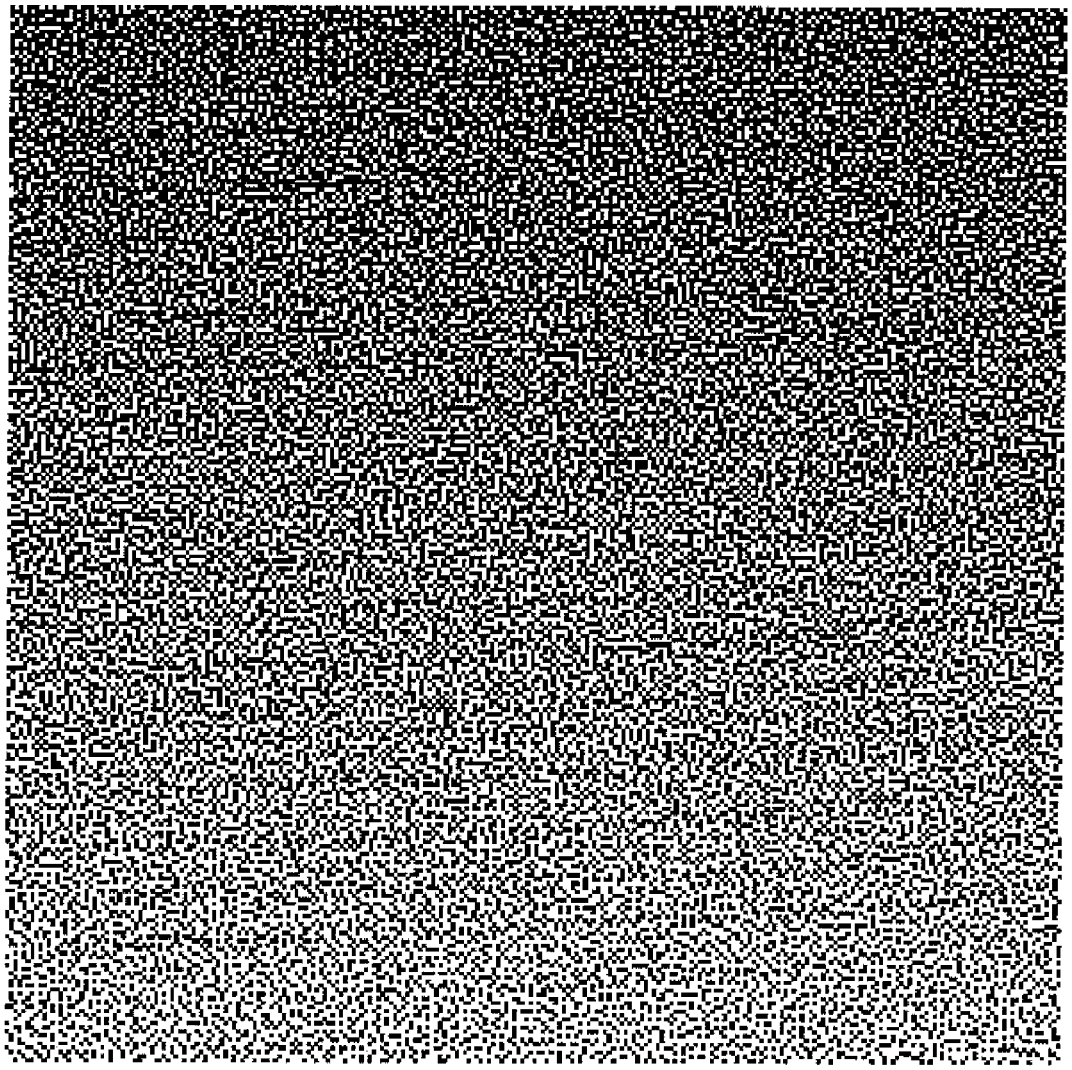
FIG. 69 is a diagram showing an arrangement of print permitting pixels in a mask pattern according to the third embodiment.
Figure 70:
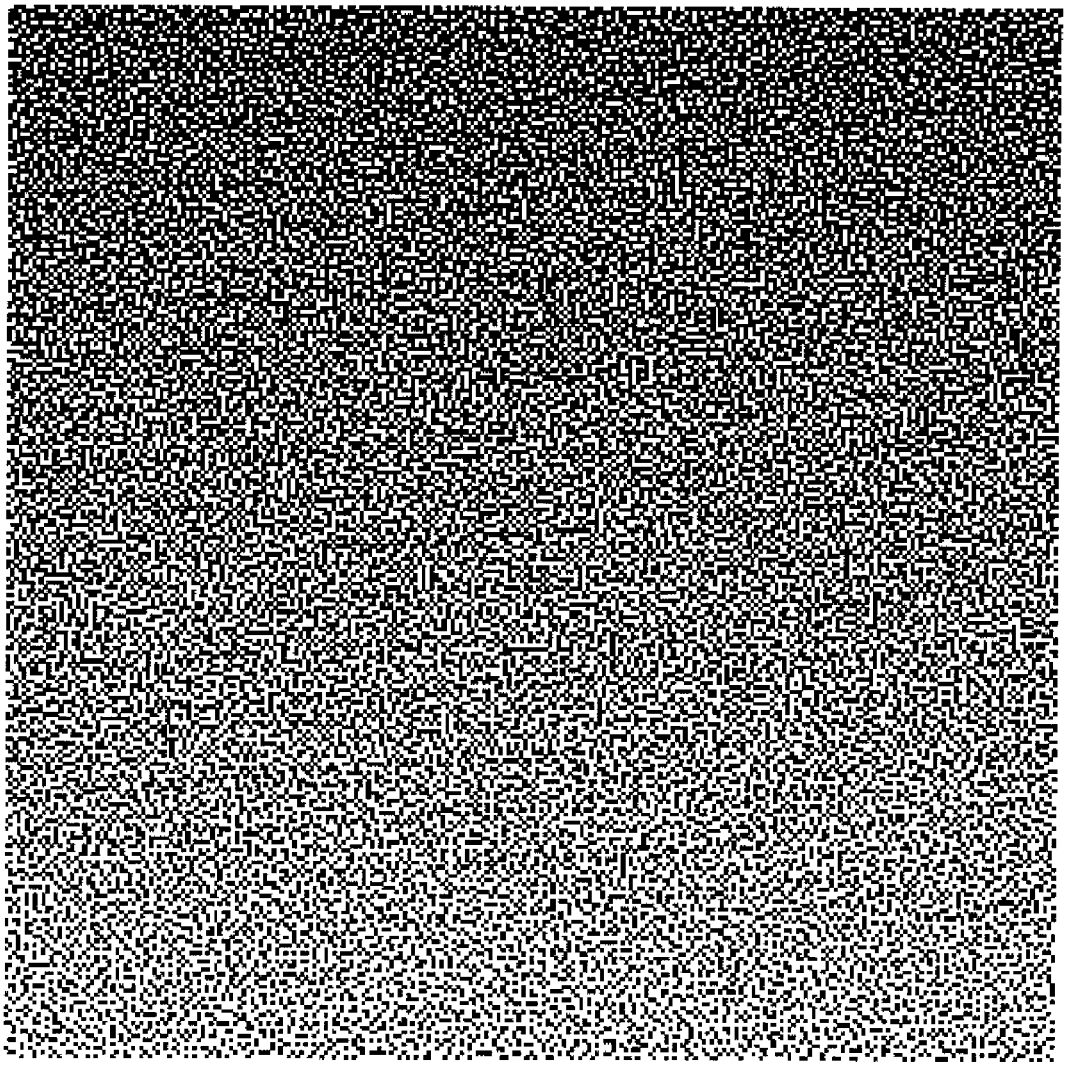
FIG. 70 is a diagram showing an arrangement of print permitting pixels in a mask pattern according to the third embodiment.

FIGS. 68 to 70 are diagrams showing the arrangement patterns of the print permitting pixels on the masks C1, M1 and Y1 for one plane according to the present embodiment generated in accordance with any of the above generating methods. Each mask pattern has an area of 256 pixels×256 pixels.

As shown in FIGS. 68 to 70, the print permitting pixels are arranged in the mask pattern according to the present embodiment taking into account the dispersiveness within the same plane based on the effect of the coefficient $\alpha$. This avoids biasing the dispersion of the print permitting pixels except for the bias of the print permitting pixels caused by the gradation. The observer thus has the impression that the image is generally smooth.

Figure 71:
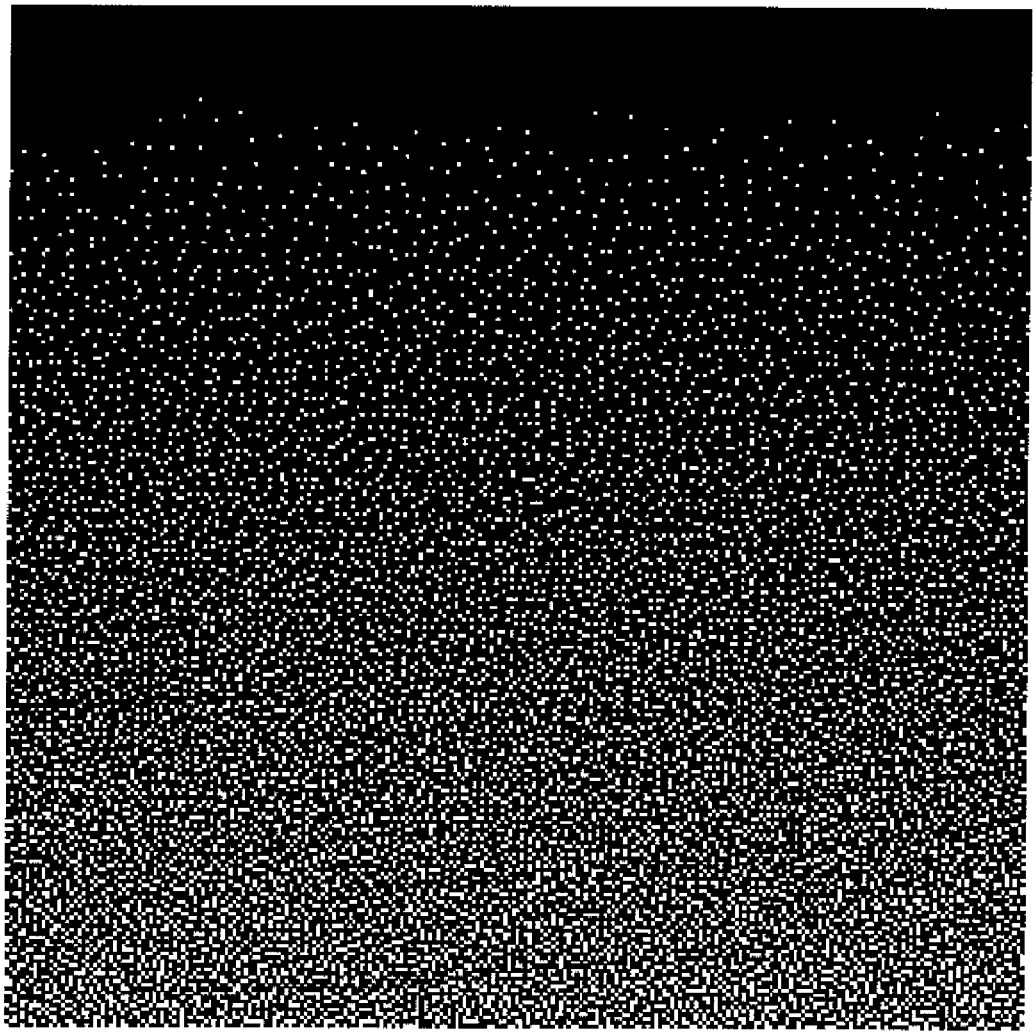
FIG. 71 is a diagram showing an arrangement of print permitting pixels in the logical sum of two mask patterns according to the third embodiment.
Figure 72:
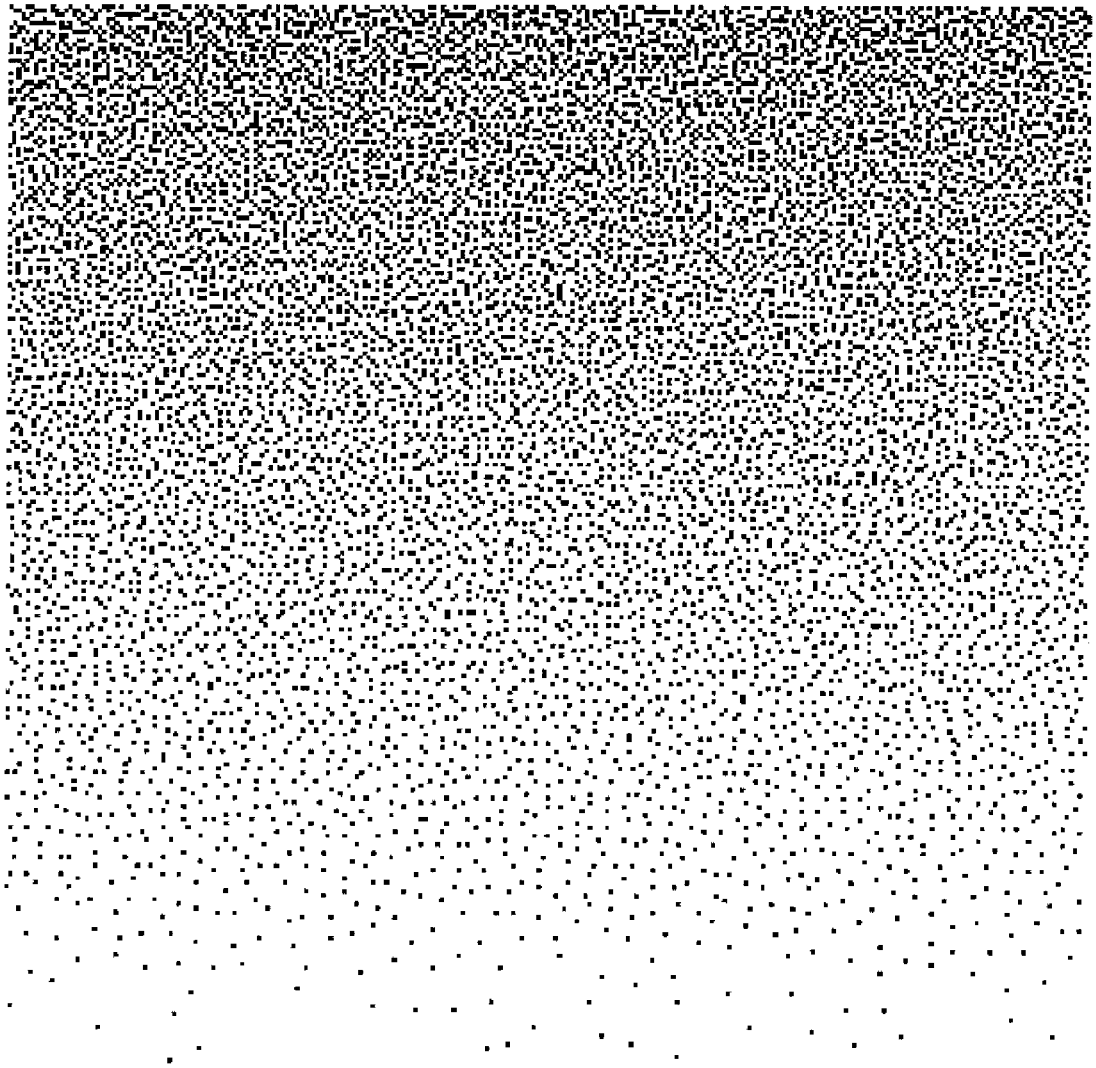
FIG. 72 is a diagram showing an arrangement of print permitting pixels in the logical product of two mask patterns according to the third embodiment.

FIGS. 71 and 72 are diagrams showing a logical sum and logical product patterns of the layer masks C1 and M1 according to the present embodiment shown in FIGS. 68 and 69.

FIGS. 71 and 72 show the arrangement (logical sum) of the print permitting pixels obtained by superposing the two masks according to the present embodiment one another and the arrangement of overlapping print permitting pixels (logical sum) extracted from the above arrangement. Both arrangements are appropriately dispersed except for the bias of the dispersion caused by the gradation and are free from a rough feeling. This is because the dispersion of the print permitting pixels between the two planes (the coefficient $\beta$) as well as the overlap itself (the coefficient $\gamma s(n)$) is taken into account as described above.

Figure 73:
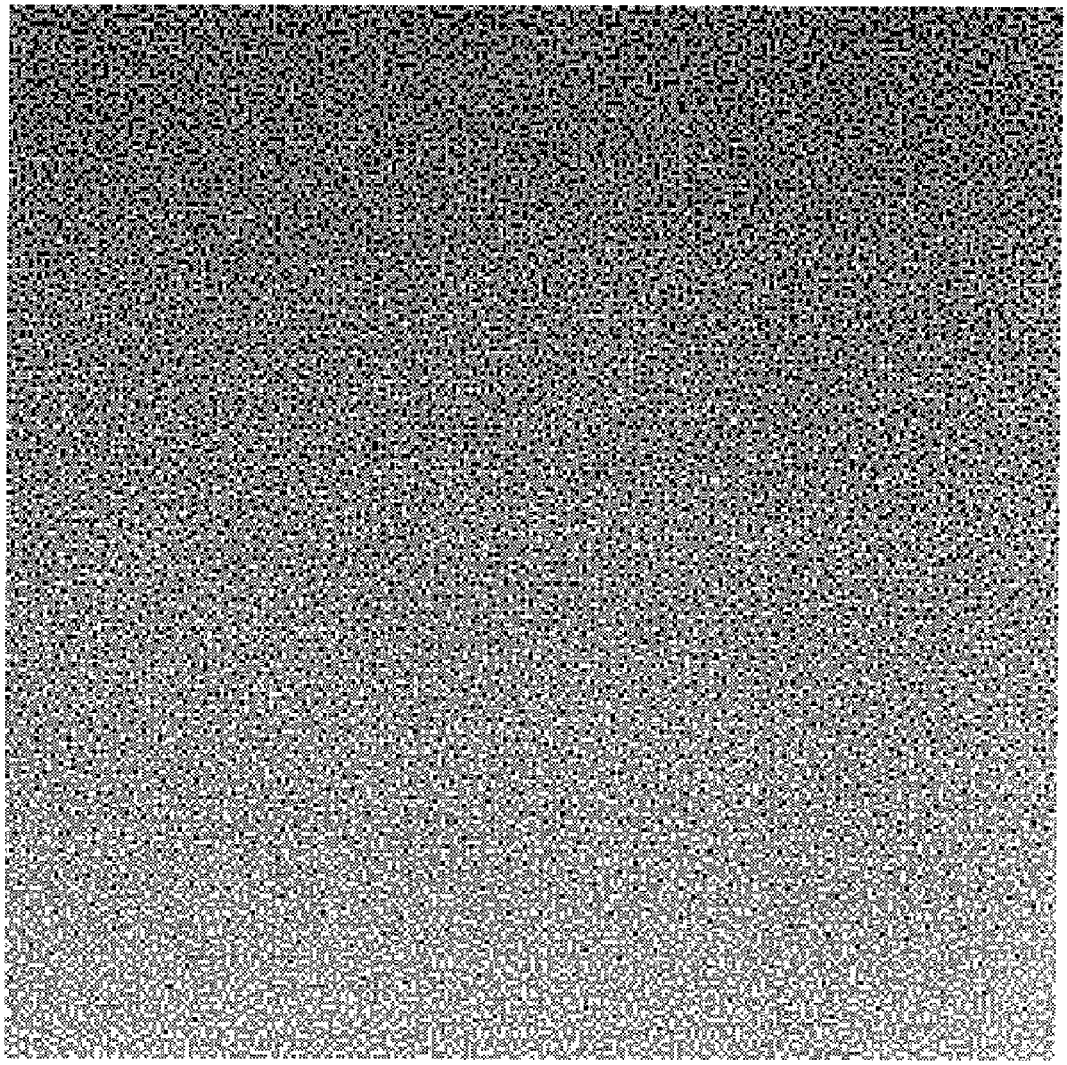
FIG. 73 is a diagram showing an arrangement of print permitting pixels in "superposing" of two mask patterns according to the third embodiment.
Figure 74:
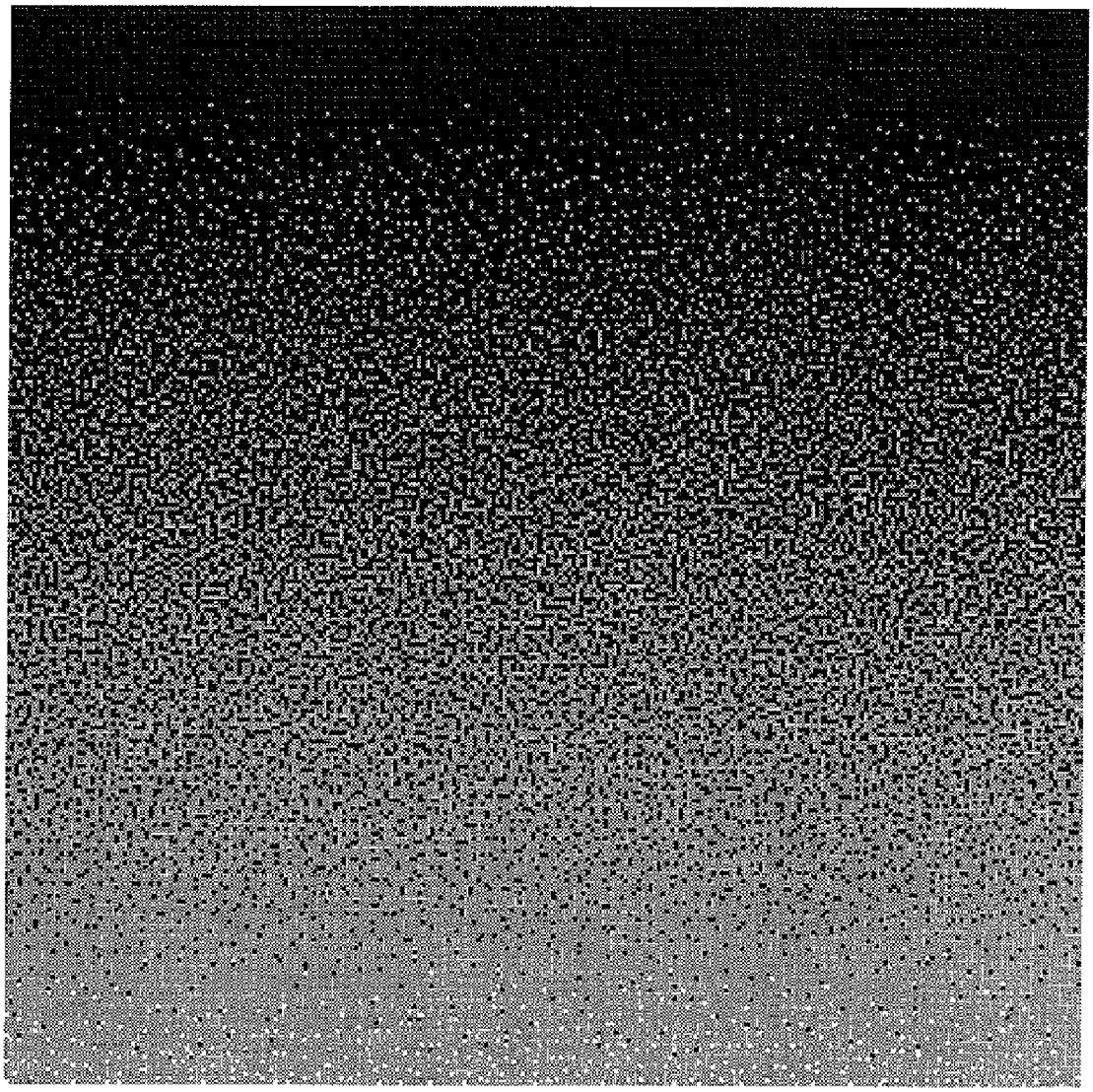
FIG. 74 is a diagram showing an arrangement of print permitting pixels in "superposing" of three mask patterns according to the third embodiment.

FIGS. 73 and 74 are diagrams showing superposing patterns of two and three layer masks according to the present embodiment, respectively. The "superposing" pattern in which the layer masks C1 and M1 are superposed one another expresses the logical sum pattern (FIG. 71) of these two masks at a lower density and their logical product pattern (FIG. 72) at a higher density. The "superposing" pattern in which the layer masks C1, M1 and Y1 are superposed one another expresses the logical sum pattern of these three masks at a lower density and their logical product pattern at a higher density.

The "superposing" patterns shown in FIGS. 73 and 74 substantially express ink dot patterns in intermediate images obtained when the masks according to the present embodiment are used for printing. Accordingly, these patterns show that the ink dots in the intermediate images and their overlaps are appropriately dispersed.

Evaluation Based on Displacement

The gradation mask according to the present embodiment is evaluated on the basis of displacement as is the case with the above embodiments.

Figure 75:
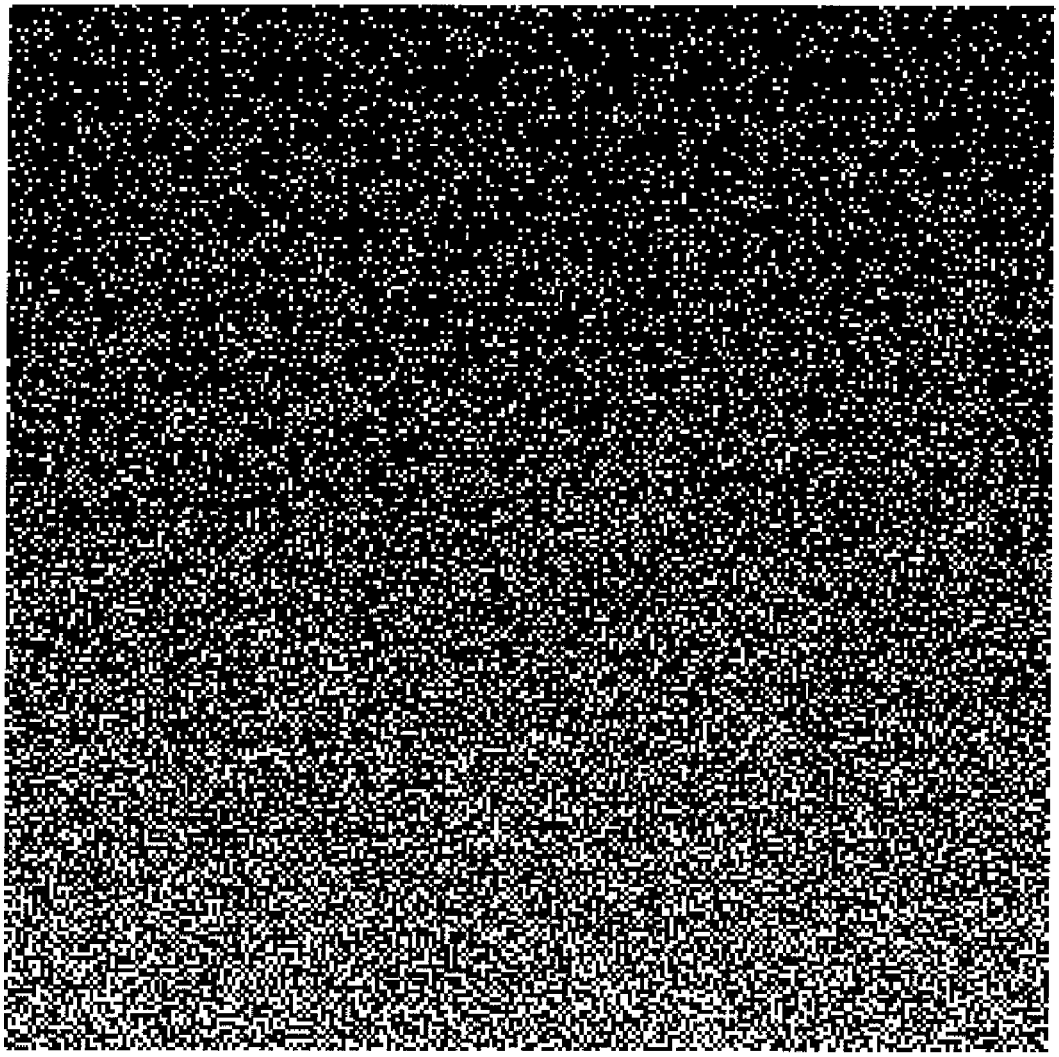
FIG. 75 is a diagram showing an arrangement of print permitting pixels in the logical sum of two mask patterns on masks according to the third embodiment which are displaced with respect to each other.
Figure 76:
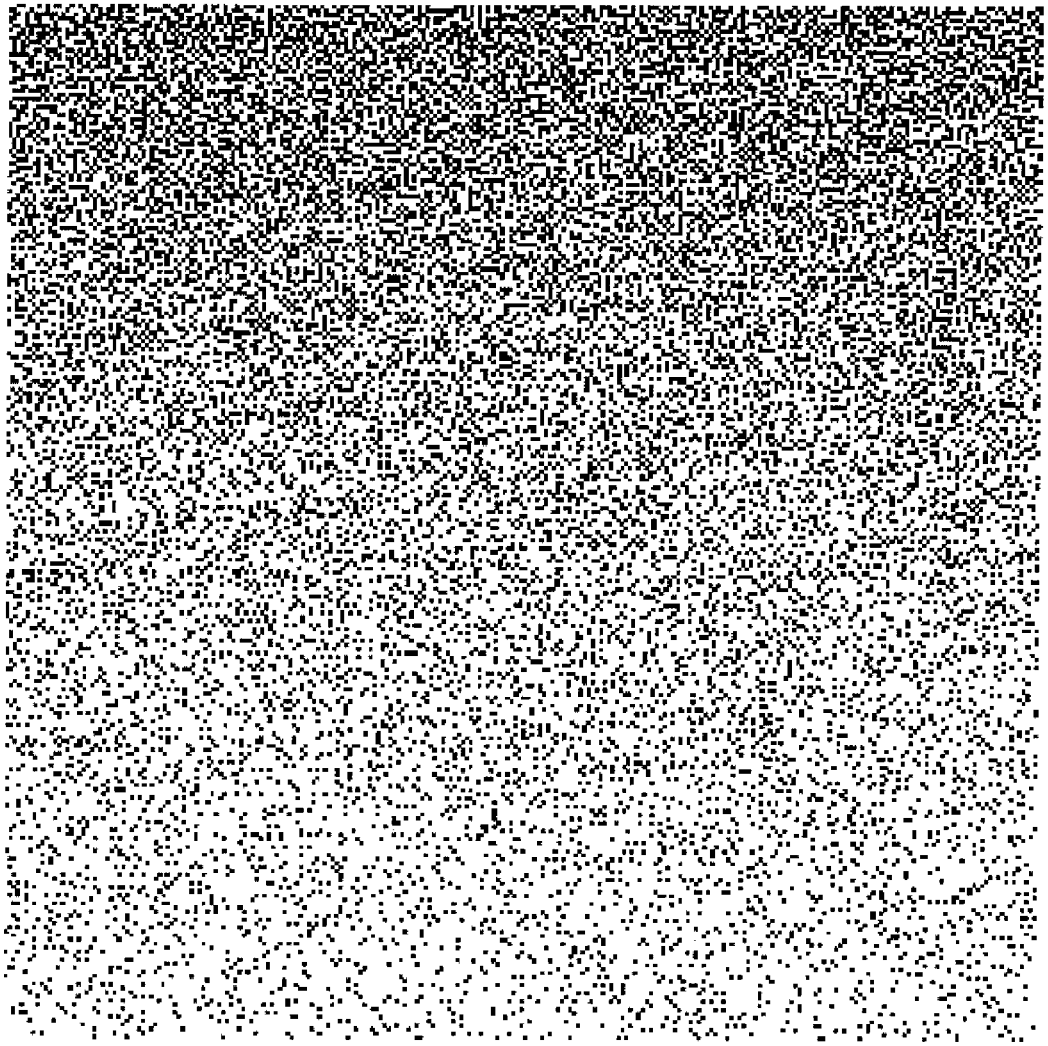
FIG. 76 is a diagram showing an arrangement of print permitting pixels in the logical product of two mask patterns on masks according to the third embodiment which are displaced with respect to each other.
Figure 77:
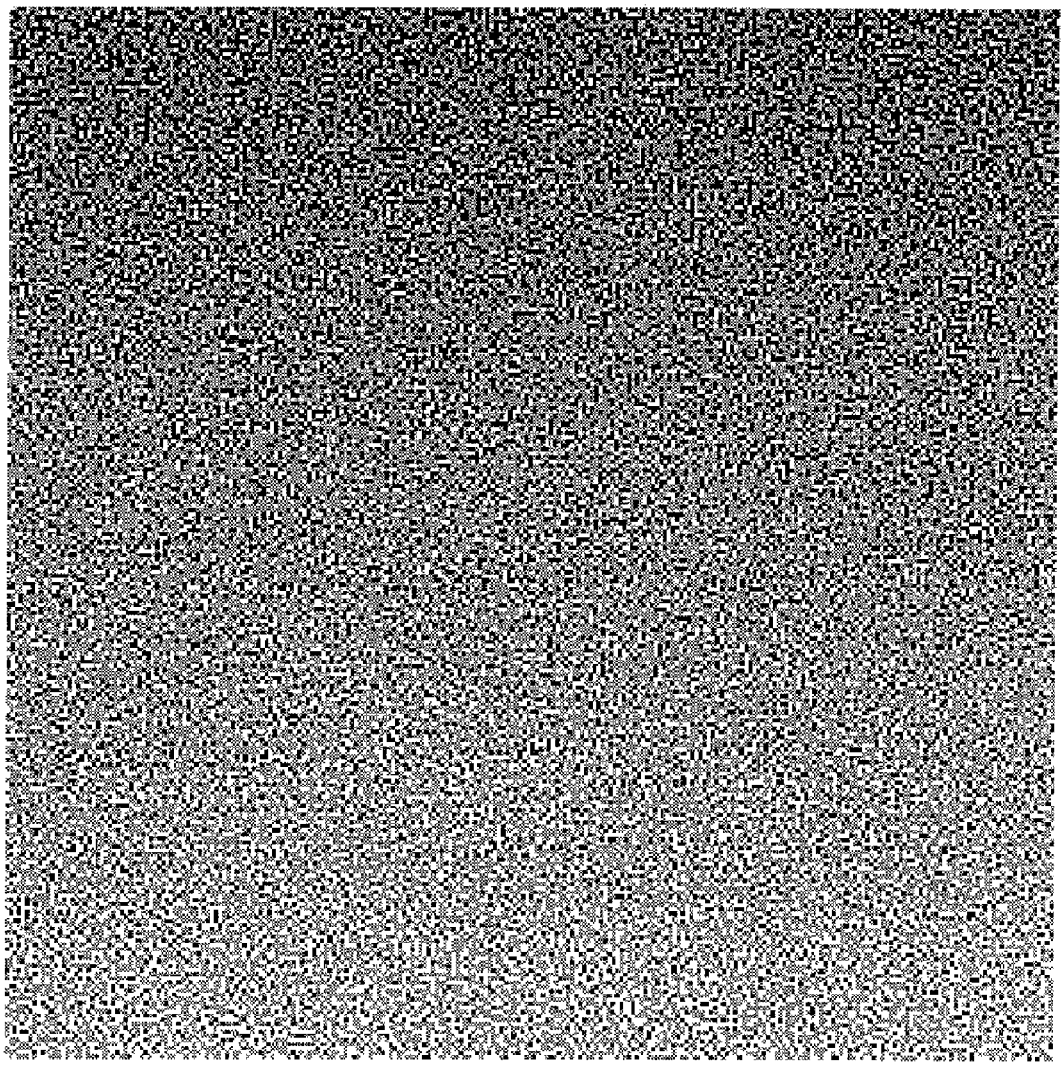
FIG. 77 is a diagram showing an arrangement of print permitting pixels in "superposing" of two mask patterns on masks according to the third embodiment which are displaced with respect to each other.

FIGS. 75 to 77 are diagrams showing a logical sum, logical product and "superposing" patterns obtained when the masks C1 and M1 shown in FIG. 58 are superposed one another so as to be displaced. As is apparent from these figures, the logical sum, logical product, and "superposing" patterns obtained when the masks C1 and M1 according to the present embodiment are displaced are less appropriately dispersed and give the observer a rougher feeling than the patterns (FIGS. 71 to 73) obtained when the masks are superposed each other at the regular position.

Figure 78:
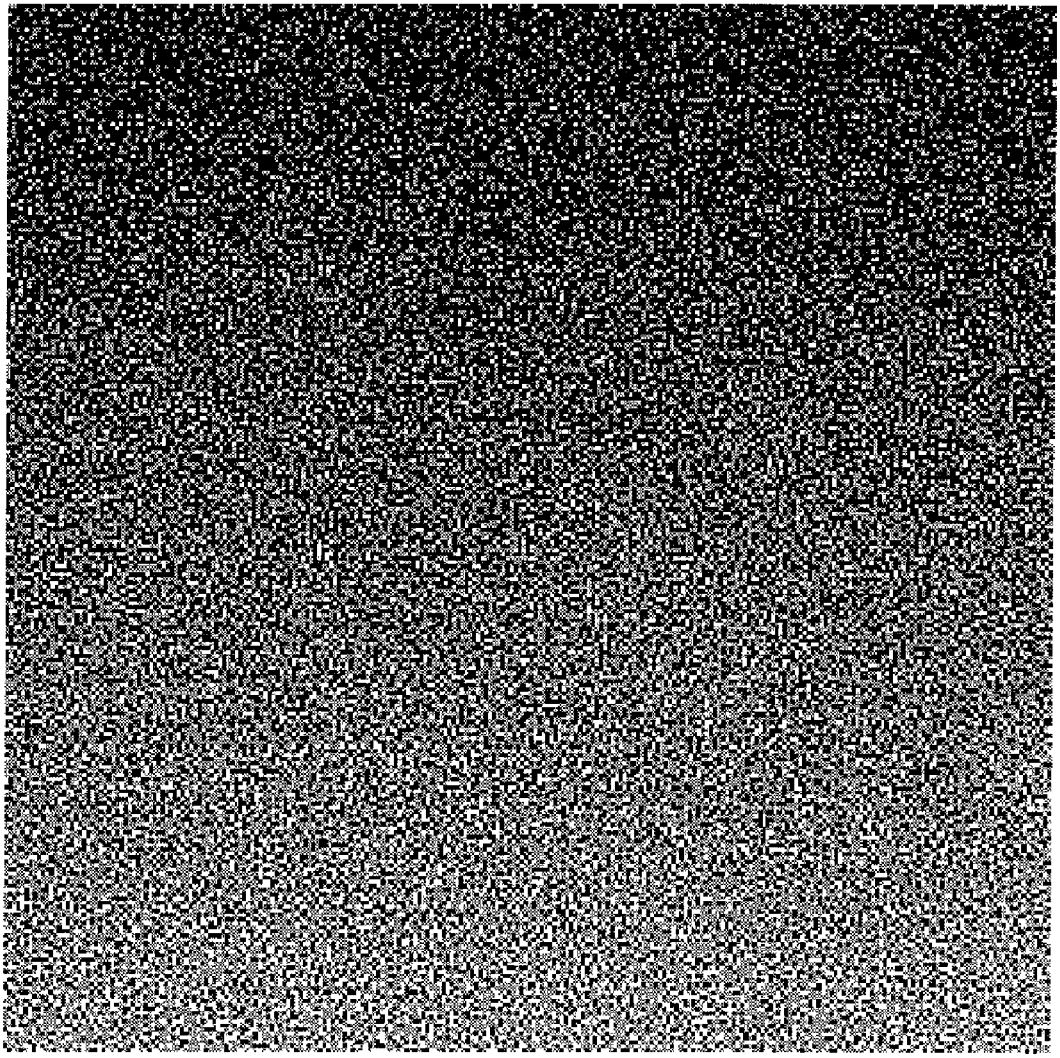
FIG. 78 is a diagram showing an arrangement of print permitting pixels in "superposing" of three mask patterns on masks according to the third embodiment which are displaced with respect to each other.

FIG. 78 is a diagram showing a "superposing" pattern obtained when the layer masks C1, M1 and Y1 are superposed one another so as to be displaced. As is apparent from these figures, the "superposing" pattern obtained when the layer masks C1, M1 and Y1 according to the present embodiment are superposed one another so as to be displaced are less appropriately dispersed and give the observer a rougher feeling than the pattern (FIG. 74) obtained when the masks are superposed each other at the regular position.

Figure 79:
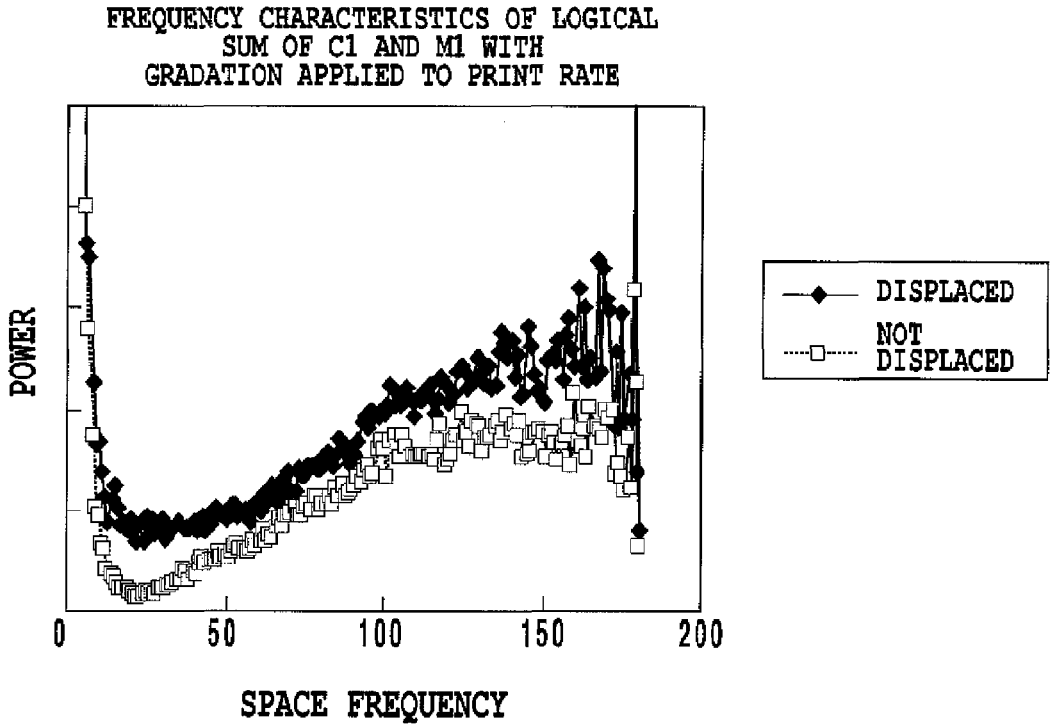
FIG. 79 is a diagram showing the power spectrum of logical sum of two mask patterns on a mask according to the third embodiment of the present invention and on this mask displaced.
Figure 80:
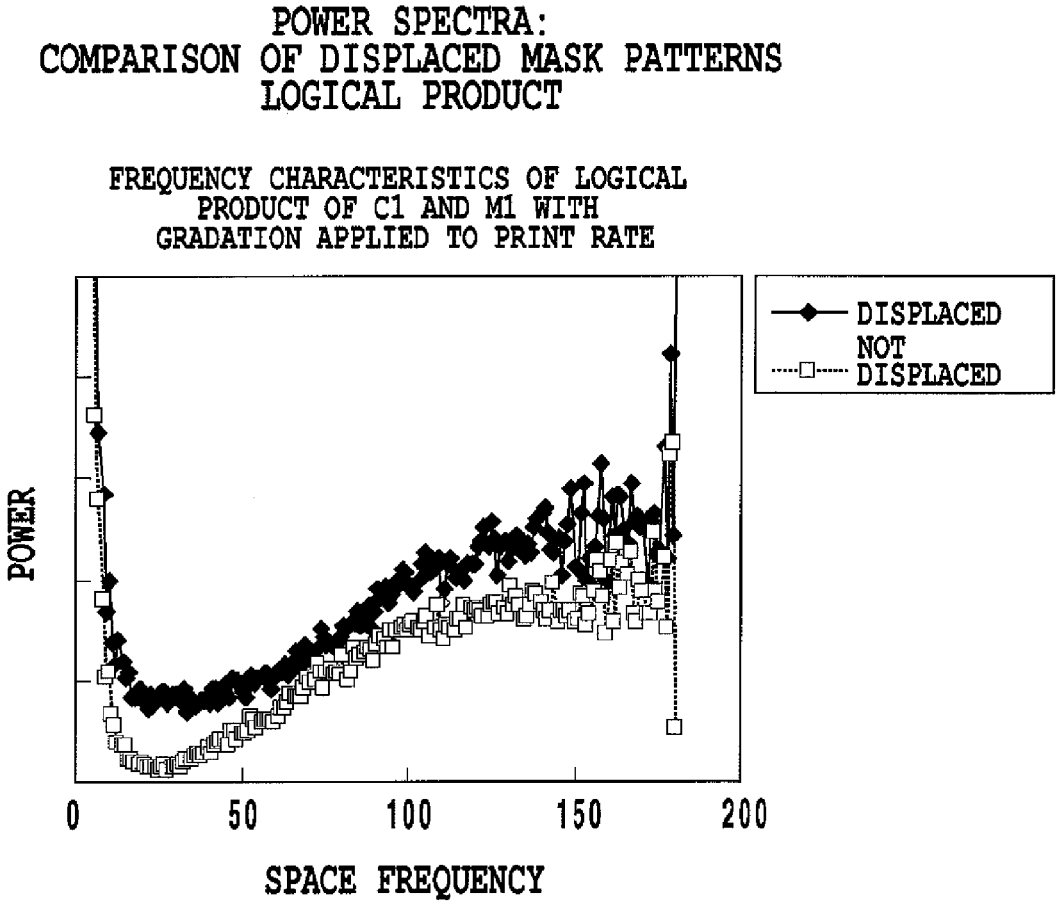
FIG. 80 is a diagram showing the power spectrum of logical product of two mask patterns on a mask according to the third embodiment of the present invention and on this mask displaced.
Figure 81:
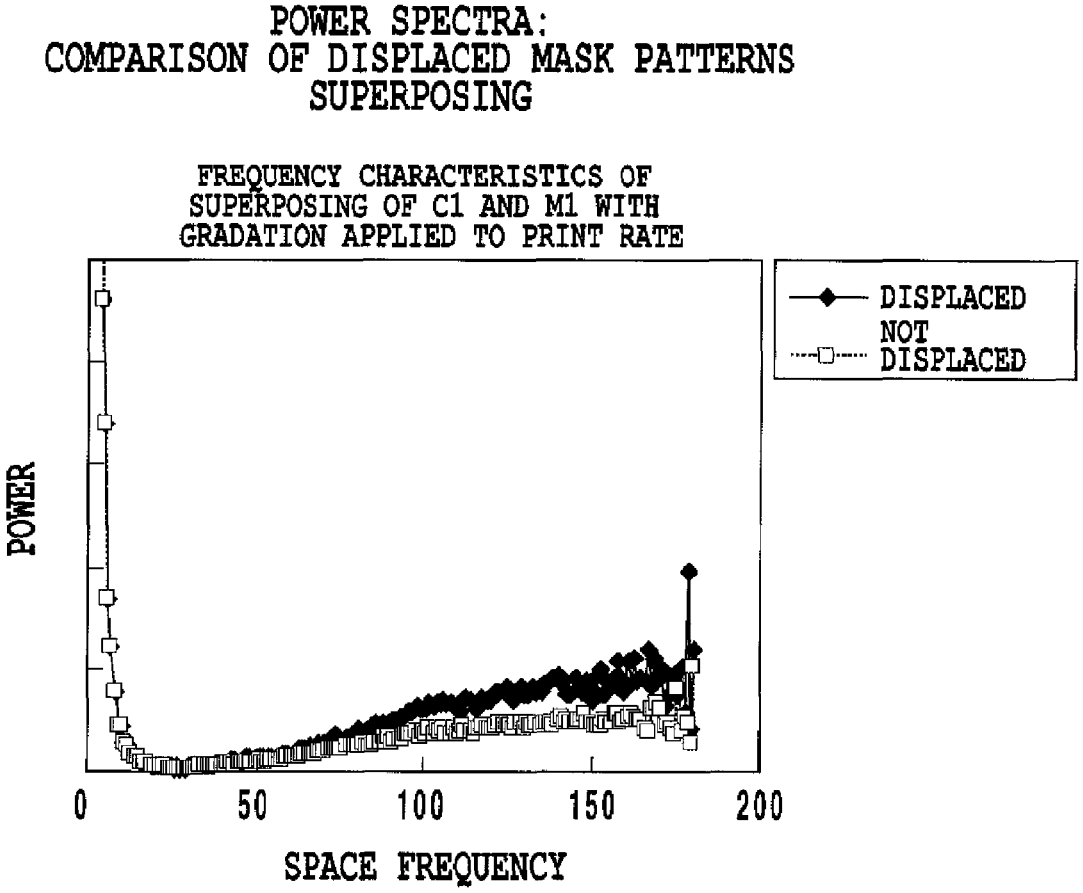
FIG. 81 is a diagram showing the power spectrum of "superposing" of two mask patterns on a mask according to the third embodiment of the present invention and on this mask displaced.
Figure 82:
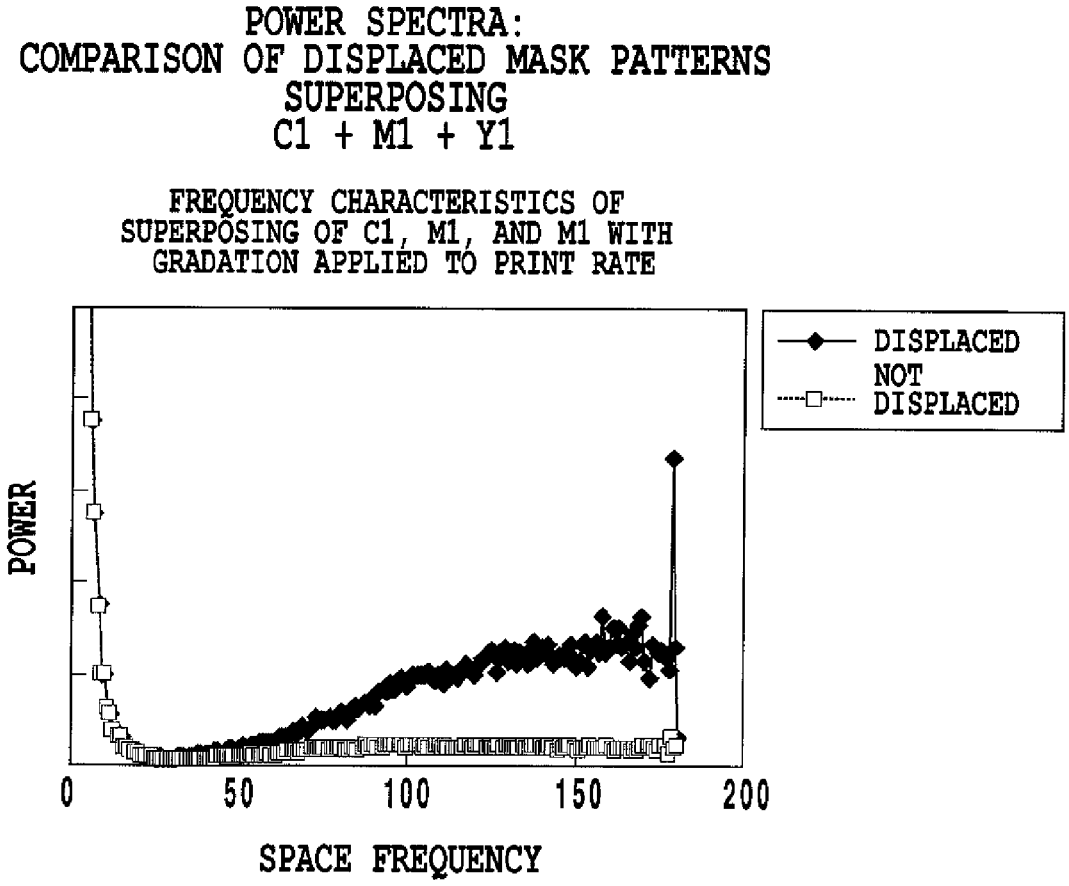
FIG. 82 is a diagram showing the power spectrum of "superposing" of three mask patterns on a mask according to the third embodiment of the present invention and on this mask displaced.

FIGS. 79 to 81 show a comparison of power spectra obtained when the masks are displaced and when they are not displaced (that is, the masks are superposed each other at the regular position). Specifically, FIGS. 79 to 81 are diagrams showing power spectra obtained when the logical sum, logical product, and "overlapping" patterns of the two layer masks C1 and M1 according to the present embodiment when the masks are displaced and when they are aligned. Further, FIG. 82 shows power spectra obtained when the "overlapping" pattern of the three layer masks according to the present embodiment when the masks are displaced and when they are aligned.

As shown in FIGS. 79 to 82, with the layer masks according to the present embodiment, any of the logical sum, logical product, and "overlapping" patterns show larger amount of low frequency components when displaced than when aligned. This is because the layer masks take the dispersion among the different planes into account, so that the dispersiveness is markedly degraded if the masks are superposed one another in a manner different from the regular one with the dispersion taken into account, as described above.

Further, the power spectrum of the aligned masks in each figure shows that power is larger when the space frequency is between about 1 and 20. This is due to a variation in print rate which is inherent in the gradation mask. In other words, a relatively small space frequency, that is, the bias of print permitting pixels with a long period, is more or less perceives as gradation; it is not perceived as the bias of unwanted low frequency components, which is to be controlled by the present invention.

Figure 83:
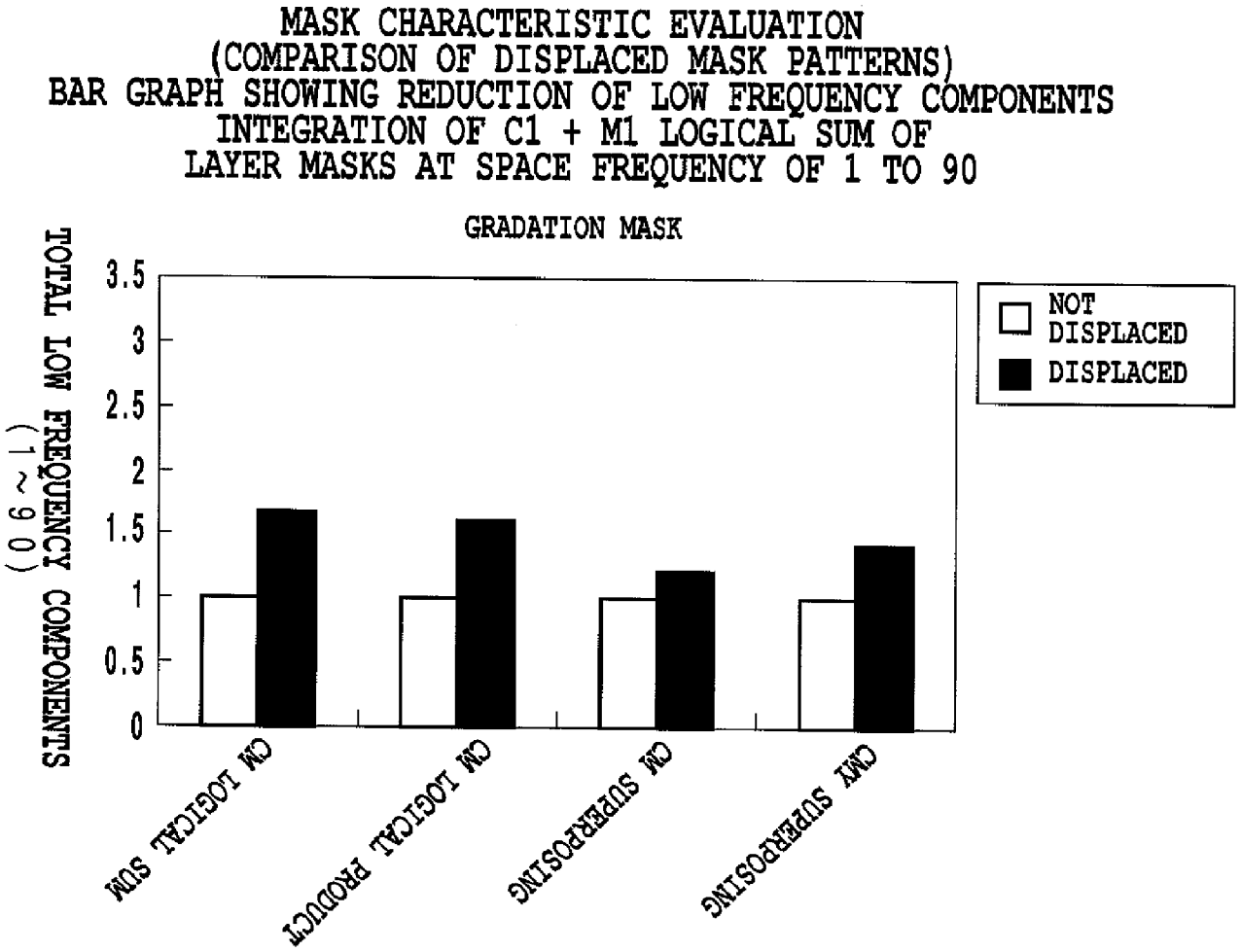
FIG. 83 is a diagram showing differences in low frequency components between the logical sum and logical product and "superposing" of masks according to the third embodiment of the present invention and this mask displaced.

FIG. 83 is a diagram showing the evaluation based on displacement in terms of an amount of low frequency components. The figure shows a comparison of the amount of low frequency components obtained when the masks are displaced and when they are aligned, for the logical sum, logical product and "superposing" patterns of the layer masks C1 and M1 according to the present embodiment and the "superposing" pattern of the masks C1, M1 and Y1 according to the preset embodiment.

As shown in the figures, with the layer masks according to the present embodiment, all of the logical sum, logical product and "superposing" patterns of the layer masks C1 and M1 and the "superposing" pattern of the masks C1, M1, and Y1 show larger amount of low frequency components when displaced than when aligned.

As described above, when the masks are superposed each other, it is possible to determine whether or not the present invention has been applied to the masks, depending on whether a dispersiveness evaluation value changes greatly when the masks are displaced.

Embodiment 4

150% Even Mask for Two Pass Printing

In the above embodiments, plural plane masks of the same color are complementary to one another, and the arrangements of the print permitting pixels on plural planes are exclusive to one another. The application of the present invention is not limited to these masks. The present invention is also applicable to plural planes of masks of the same color which have a total print rate of more than 100%. Masks with a print rate of more than 100% enable an increase in maximum ink ejection amount even with the low resolution of image data.

A fourth embodiment of the present invention relates to masks for which two planes of the same color which are used for two pass printing each have a print rate of 75% and a total print rate of 150%.

Figure 84:
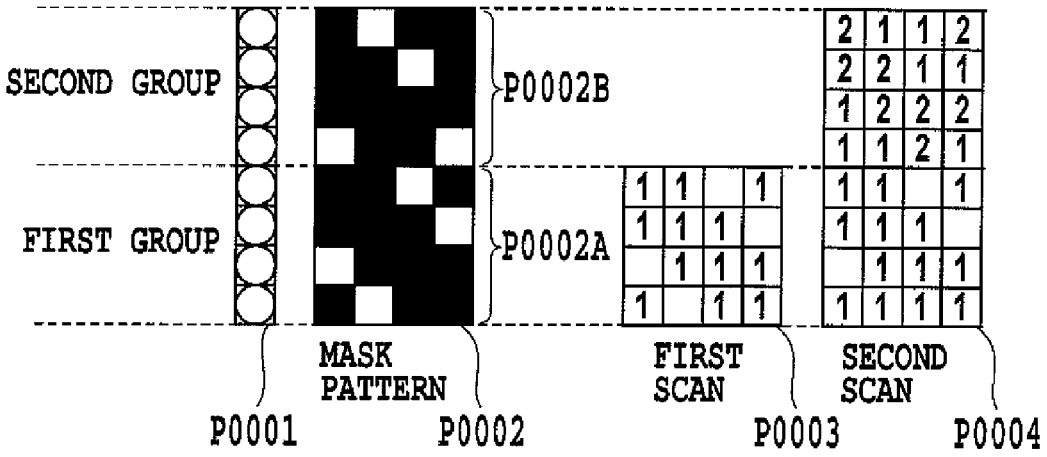
FIG. 84 is a diagram illustrating a mask used for multi-pass printing for two passes according to a fourth embodiment of the present invention.

FIG. 84 is a schematic diagram conceptually illustrating the masks for the two pass printing. In FIG. 84, P0001 denotes a print head for one of the colors C, M and Y. Here, for simplification of illustration, the print head has eight nozzles. The nozzles are divided into two groups of first and second groups, each of which includes four nozzles. P0002A and P0002B denote mask patterns corresponding to the first and second group nozzle arrays. That is, the mask pattern P0002A (lower pattern in the figure) is used for the first scan. The mask pattern P0002B (upper pattern in the figure) is used for the second scan. Each of these mask patterns constitutes one plane of mask. In each mask pattern, print permitting pixels are shown in black, whereas print non-permitting pixels are shown in white. The mask pattern P0002A for the first scan and the mask pattern P0002B for the second scan each have a print rate of 75%, that is, the ratio of the print permitting pixels to all the mask pixels in each pattern is 75%. Consequently, superposing these mask patterns each other results in a pattern with the print rate of 150% in an area of 4 pixels×4 pixels, that is, results in a pattern including overlaps of the print permitting pixels. For simplification of description, the illustrated patterns are conceptually shown compared to the actual mask patterns according to the present embodiment shown below.

P0003 and P0004 denote images completed by the two pass printing and shown as arrangements of dots constituting the images. A pixel on which one dot is placed is represented as "1". A pixel on which two dots are placed is represented as "2". For simplification of description, the images are what is called solid image in which dots are formed on all the pixels. Accordingly, the dot arrangements directly reflect the print permitting pixels on the mask P0002 that is used to generate dot print data. For the first scan, dot print data for the first group is generated using the mask pattern P0002A. Thus, with the solid image, an image is formed in which dots are filled into 75% of all the pixels. The print medium is then conveyed upward in the figure by an amount equal to the width of the nozzle group.

For the next second scan, the mask pattern P0002A is also used to generate dot print data for the first group for an area offset from the above area by the conveyance amount. The mask pattern P0002B is used to generate dot print data for the second group for the area which has been printed using the first group. These two printing scans complete an image. In this case, in the completed solid image, dots are filled into 150% of all the pixels.

The mask generating method according to the present embodiment can be executed in basically the same manner as in Embodiment 1.

The difference between the present embodiment and Embodiment 1 is that in either the simultaneously generation method or the pass-by pass generation method (see FIG. 7), after step 1 generates a 75% mask pattern for the first pass, step 2 repeats processing similar to that in step 1 to generate a mask pattern for the second pass, instead of arranging print permitting pixels at exclusive positions as in the case of Embodiment 1. For the arrangement moving method and sequential arrangement method as specific arrangement methods, the difference between the present embodiment and Embodiment 1 will be described.

Arrangement Moving Method

The arrangement moving method according to the present embodiment executes processing basically similar to that according to Embodiment 1 shown in FIG. 8. The difference between the present embodiment and Embodiment 1 is as follows. In processing similar to that in step S801, in the generation in either step 1 or 2, 75% binary data is obtained for each plane as an initial arrangement. Further, in the generation in step 2, in processing similar to that in step S804 in FIG. 8, print permitting pixels on different planes of the same color are not prohibited from overlapping during movement of print permitting pixels. That is, when a print permitting pixel is moved to a position with the lowest energy, even if it overlaps a print permitting pixel on another plane of the same color, it is place on that position. This enables masks with the print rate of 150% exceeding 100%, which are made by superposing two masks, to be generated.

Sequential Arrangement Method

The sequential moving method also executes processing basically similar to that according to Embodiment 1 shown in FIG. 11. The difference between the present embodiment and Embodiment 1 is as follows. In processing similar to that in step S1106, in the generation in either step 1 or 2, the method determines whether or not the print permitting pixels have been arranged on 75% of all the mask pixels. For the generation of a mask for the second pass in step 2, in processing similar to that in step S1104 in FIG. 11, print permitting pixels on different planes of the same color are not prohibited from overlapping when placing the print permitting pixel. That is, when a print permitting pixel is placed to a position with the lowest energy, even if it overlaps a print permitting pixel on another plane of the same color, it is placed on that position. This enables masks with the print rate of 150% exceeding 100%, which are made by superposing two masks, to be generated.

The mask generated by the above generating method makes it possible to improve the dispersiveness of a location (pixel position) in which two dots are arranged.

Embodiment 5

A Mask With a m×n Cluster Size

The present invention is also applicable to what is called a cluster mask for which m×n print permitting pixels constitute a unit.

Figure 85:
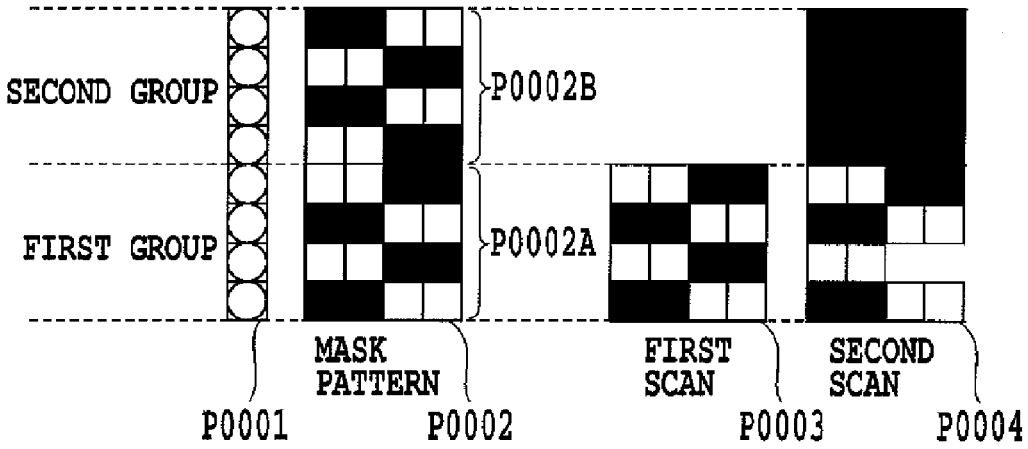
FIG. 85 is a diagram illustrating a mask used for multi-pass printing for two passes according to a fifth embodiment of the present invention.

FIG. 85 is a diagram illustrating the concept of a 100% even mask with a 1×2 cluster size. In FIG. 85, P0001 denotes a print head for one of the colors C, M and Y. Here, for simplification of illustration, the print head is shown as a head having eight nozzles. The nozzles are divided into two groups of first and second groups, each of which includes four nozzles. P0002A and P0002B denote mask patterns corresponding to the first and second group nozzle arrays, respectively. That is, the mask pattern P0002A (lower pattern in the figure) is used for the first scan for an area, and then the mask pattern P0002B (upper pattern in the figure) is used for the second scan for that area. Each of these mask patterns constitutes one1 plane of mask. In each mask pattern, cluster print permitting pixels with a size of 1×2 are shown in black, whereas print non-permitting pixels with a size of 1×2 are shown in white. The mask pattern P0002A for the first scan and the mask pattern P0002B for the second scan each have a print rate of 50%, respectively. Consequently, superposing these mask patterns each other results in a pattern with a print rate of 100% in an area of 4×4 cluster print permitting pixels.

P0003 and P0004 denote images completed by two pass printing and shown as arrangements of dots constituting the images. For simplification of description, these images are what is called solid images in which dots are formed on all the pixels. Accordingly, the dot arrangements directly reflect the print permitting pixels on the mask P0002 that is used to generate dot print data. For the first scan, dot print data for the first group is generated using the mask pattern P0002A. Thus, with the solid image, an image is formed in which dots are filled into 50% of all the pixels. The print medium is then conveyed upward in the figure by an amount equal to the width of the nozzle group. For the next second scan, the mask pattern P0002A is also used to generate dot print data of the first group for an area offset from the above area by the conveyance amount. The mask pattern P0002B is used to generate dot print data of the second group for the area printed using the first group. These two printing scans complete an image. In this case, in the completed solid image, dots as the unit of 1×2 dot size are filled into 100% of all the pixels.

As is also apparent from the above description, it would be easily appreciated that when m×n (in the present embodiment, 1×2) print permitting pixels constitute one unit, a mask can be generated in the same manner as described in Embodiment 1. Further, the mask according to the present embodiment can exert almost the same effects as those described in Embodiment 1.

Other Embodiments

Instead of the above embodiments, for example, the four pass configuration shown in Embodiment 2 may be combined with Embodiment 3, 4 or 5. Further, the gradation configuration shown in Embodiment 3 may be combined with Embodiment 4 or 5. Moreover, Embodiments 4 and 5 may be combined together. These combinations may be implemented as is understood from the description of the corresponding embodiments.

The types of inks applicable to the present invention are not limited to those described in the above embodiments. For example, it is possible to additionally use light color inks (light cyan ink and light magenta ink) having lower densities than the C, M, and Y basic colors or special color inks such as red, blue, and green.

Further, according to the present invention, the layer masks described in the above embodiments may be applied to all of the plural types of inks that are used in the printing apparatus or to a combination of some of the plural types of inks that are used in the printing apparatus.

If for example, six color inks, cyan (C), magenta (M), yellow (Y), black (K), light cyan (Lc) and light magenta (Lm) are used, the layer masks may be applied to all of these six colors. In this case, layer masks for the six colors are generated according to any of the generating methods described in the above embodiments.

On the other hand, the layer masks may be applied to a combination of some (two, three, four, or five) of these six colors. In this case, two forms are possible. In a first form, layer masks are generated only for the some colors, whereas an arbitrary generating method may be used for the other colors. For example, for three (for example, C, M, and Y) of the six colors, any of the generating methods described in the above embodiments is used to generate layer masks. For the three other colors (K, Lc, and Lm), a well-known generating method is used to generate masks. In a second form, layer masks are generated only for some colors, whereas any of the layer masks generated for those colors is selected and assigned to the other colors. For example, for three of the six colors, C, M, and Y, layer masks are generated by any of the generating methods described in the above embodiments. Any of the layer masks generated for C, M, and Y is applied to the three other colors (K, Lc, and Lm).

In the description of the above embodiments, the layer masks are applied to a combination of different ink colors. However, the present invention is not limited to this configuration. The present invention is also applicable to a configuration in which dots of the same color and different diameters (inks of the same color and different ejection volumes) are used for printing. In this case, the above layer masks may be applied to dots of the same color and different diameters (for example, large and small dots). For example, it is assumed that six types of dots, large cyan, small cyan, large magenta, small magenta, yellow, and black dots, are used. In this case, layer masks are generated for the large and small cyan dots or the large and small magenta dots by any of the generating methods described in the above embodiments.

Moreover, in a form in which dots of the same color and different diameters (for example, large and small dots) are used, the above layer masks may be used for a combination of different color dots, whereas the same mask may be used for a combination of dots of the same color and different diameters. For example, if the above six types of dots are used, layer masks are generated for the large cyan and magenta dots by any of the generating methods described in the above embodiments. Further, the same mask as that for the large cyan dots is applied to the small cyan dots. The same mask as that for the large magenta dots is applied to the small magenta dots.

The dots of the same color and different diameters are not limited to two types, large and small dots. Three types of dots, large, medium, and small dots may be provided. Alternatively, more types of dots may be provided. Further, the present invention is not only effectively applied to the dots of at least either different colors or sizes but also to, for example, inks of the same color which are ejected from spaced nozzle groups at different timings. For example, in a form in which, for example, nozzle groups are arranged along the main scanning direction of the head in order of C, M, Y, M, and C, layer masks generated by any of the above generating methods are applied to the spaced nozzle groups each of the same color (C nozzle group and M nozzle group).

The present invention is applicable to a form in which a liquid different from ink is used, as described above. The ink different from ink is, for example, a reaction liquid that aggregates or insolubilizes a color material in the ink. In this case, for at least one type of ink and a reaction liquid, layer masks are generated by any of the generating methods described in the embodiments.

The present invention is applicable to a dye ink containing a dye as a color material, a pigment ink containing a pigment as a color material, or a mixed ink containing a dye and a pigment as a color material.

What is claimed is:

1. A data processing method [for generating image data which is used for plural printing scans of first and second nozzle groups for ejecting ink, relative to a predetermined area of a print medium, said method] comprising:

a first dividing step of dividing *first* image data *indicative of a first image* to be printed on [the] *a* predetermined area *of a print medium* by [the] *a* first nozzle group into a plurality of *divided* image data used for [the] plural printing scans *of the first nozzle group relative to the predetermined area*, by using a first pattern group having plural mask patterns corresponding to the plural printing scans; and a second dividing step of dividing *second* image data *indicative of the second image* to be printed on the predetermined area by [the] *a* second nozzle group into a plurality of *divided* image data used for [the] plural printing scans *of the second nozzle group relative to the predetermined area*, by using a second pattern group having plural mask patterns corresponding to the plural printing scans, wherein an arrangement of print permitting pixels in one mask pattern, of the first pattern group, which is used for a predetermined printing scan of the plural printing scans, is different from an arrangement of print permitting pixels in one mask pattern, of the second pattern group, which is used for the predetermined printing scan, and

*wherein an amount of* low frequency components of an arrangement pattern of print permitting pixels obtained by a logical product of the one mask pattern of the first pattern group and the one mask pattern of the second pattern group based on a correspondence relationship of the two mask patterns when the two mask patterns are used [are fewer] *is less* than [that] *an amount of low frequency components of another arrangement pattern of print permitting pixels* obtained by a logical product of the one mask pattern of the first pattern group and the one mask pattern of the second pattern group based on a correspondence relationship different from the correspondence relationship of the two mask patterns when the two mask patterns are used.

2. A data processing method according to claim 1, wherein the arrangement pattern of the print permitting pixels obtained by the logical product of the one mask pattern of the first pattern group and the one mask pattern of the second pattern group based on the correspondence relationship of the two mask patterns when the two mask patterns are used has properties in which the arrangement pattern is aperiodic and in which *the amount of* the low frequency components [are fewer] *is less* than *an amount of* high frequency components.

3. A data processing method according to claim 1, wherein each of the two mask patterns is aperiodic and has a property in which *an amount of* the low frequency components [are fewer] *is less* than *an amount of* high frequency components.

4. A data processing method according to claim 1, wherein the predetermined printing scan is a first printing scan that prints the predetermined area.

5. A data processing method according to claim 1, wherein a first type of dots formed by the first nozzle group are dots of ink containing a color material of a predetermined color, and a second type of dots formed by the second nozzle group are dots of a liquid containing a component that reacts chemically with the ink.

6. A data processing method according to claim 1, wherein each of the arrangement patterns of the print permitting pixels in each of the plural mask patterns of the first pattern group has properties in which the arrangement pattern is aperiodic and in which *the amount of* low frequency components [are fewer] *is less* than *an amount of* high frequency components, and each of the arrangement patterns of the print permitting pixels in each of the plural mask patterns of the second pattern group has properties in which the arrangement pattern is aperiodic and in which *the amount of* low frequency components [are fewer] *is less* than *an amount of* high frequency components.

7. A data processing method according to claim 1, wherein each of the plural mask patterns of the first pattern group has a print rate that is biased in a nozzle arrangement direction of the first nozzle group, and each of the plural mask patterns of the second pattern group has a print rate that is biased in a nozzle arrangement direction of the second nozzle group.

8. A data processing method according to claim 1, wherein the print permitting pixels and print non-permitting pixels are arranged in each of the plural mask patterns of the first pattern group so that a unit corresponds to a group comprising plural pixels adjacent to one another in at least one of the scan direction and a sub-scan direction that is orthogonal to the scan direction, and the print permitting pixels and print non-permitting pixels are arranged in each of the plural mask patterns of the second pattern group so that a unit corresponds to a group comprising plural pixels adjacent to one another in at least one of the scan direction and the sub-scan direction that is orthogonal to the scan direction.

9. A data processing method according to claim 1, wherein a printing head has N (N is an integer equal to or greater than 2) nozzle groups including the first nozzle group and the second nozzle group, and each of arrangement patterns of print pixels obtained by a logical product and a logical sum of N mask patterns corresponding to the N nozzle groups for the predetermined printing scan has properties in which the arrangement pattern is aperiodic and in which *an amount of* low frequency components [are fewer] *is less* than *an amount of* high frequency components.

10. A data processing method according to claim 1, wherein a first type of dots formed by the first nozzle group are different from a second type of dots formed by the second nozzle group in at least one of colors and sizes.

11. A data processing method according to claim 1, wherein the low frequency components are components in a low-frequency-side of a half of a space frequency area in which frequency components are present.

12. A data processing apparatus comprising an image processing section that executes the data processing method according to claim 1.

13. A data processing apparatus according to claim 12, wherein said data processing apparatus is a printing apparatus that executes printing on the predetermined area by the plural printing scans of the first and second nozzle groups relative to the predetermined area.

14. A data processing apparatus according to claim 12, wherein said data processing apparatus is a host apparatus connected to a printing apparatus that executes printing on the predetermined area by the plural printing scans of the first and second nozzle groups relative to the predetermined area.

15. A data processing method [for generating image data which is used for plural printing scans of first and second nozzle groups for ejecting ink, relative to a predetermined area of a print medium, said method] comprising:

a first dividing step of dividing *first* image data *indicative of a first image* to be printed on [the] *a* predetermined area *of a print medium* by [the] *a* first nozzle group into a plurality of *divided* image data used for [the] plural printing scans *of the first nozzle group relative to the predetermined area*, by using a first pattern group having plural mask patterns corresponding to the plural printing scans; and a second dividing step of dividing *second* image data *indicative of a second image* to be printed on the predetermined area by [the] *a* second nozzle group into a plurality of *divided* image data used for [the] plural printing scans *of the second nozzle group relative to the predetermined area*, by using a second pattern group having plural mask patterns corresponding to the plural printing scans, wherein an arrangement of print permitting pixels in one mask pattern, of the first pattern group, which is used for a predetermined printing scan, of the plural printing scans, is different from an arrangement of print permitting pixels in one mask pattern, of the second pattern group, which is used for the predetermined printing scan, and

*wherein an amount of* low frequency components of an arrangement pattern of print permitting pixels obtained by a logical product of the one mask pattern of the first pattern group and the one mask pattern of the second pattern group at a regular position [are fewer] *is less* than [that] *an amount of low frequency components of another arrangement pattern of print permitting pixels* obtained by a logical product of the one mask pattern of the first pattern group and the one mask pattern of the second pattern group at a position different from the regular position.

16. A data processing method [for generating image data which is used for plural printing scans of first and second nozzle groups for ejecting ink, relative to a predetermined area of a print medium, said method] comprising:

a first dividing step of dividing *first* image data *indicative of a first image* to be printed to [the] *a* predetermined area *of a print medium* by [the] *a* first nozzle group into a plurality of *divided* image data used for [the] plural printing scans *of the first nozzle group relative to the predetermined area*, by using a first pattern group having plural mask patterns corresponding to the plural printing scans; and a second dividing step of dividing *second* image data *indicative of a second image* to be printed to the predetermined area by [the] *a* second nozzle group into a plurality of *divided* image data used for [the] plural printing scans *of the second nozzle group relative to the predetermined area*, by using a second pattern group having plural mask patterns corresponding to the plural printing scans, wherein an arrangement of print permitting pixels in one mask pattern, of the first pattern group, which is used for a predetermined printing scan of the plural printing scans, is different from an arrangement of print permitting pixels in one mask pattern, of the second pattern group, which is used for the predetermined printing scan, and

*wherein* an arrangement pattern of print permitting pixels obtained by a logical product of the one mask pattern of the first pattern group and the one mask pattern of the second pattern group based on a correspondence relationship of the two mask patterns when the two mask patterns are used has a property in which *an amount of* low frequency components [are fewer] *is less* than *an amount of* high frequency components.

17. A data processing method [for generating image data which is used for plural printing scans of first and second nozzle groups for ejecting ink, relative to a predetermined area of a print medium, said method] comprising:

a first dividing step of dividing *first* image data *indicative of a first image* to be printed on [the] *a* predetermined area *of a print medium* by [the] *a* first nozzle group into a plurality of *divided* image data used for [the] plural printing scans *of the first nozzle group relative to the predetermined area*, by using a first pattern group having plural mask patterns corresponding to the plural printing scans; and a second dividing step of dividing *second* image data *indicative of a second image* to be printed on the predetermined area by [the] *a* second nozzle group into a plurality of *divided* image data used for [the] plural printing scans *of the second nozzle group relative to the predetermined area*, by using a second pattern group having plural mask patterns corresponding to the plural printing scans, wherein an arrangement of print permitting pixels in one mask pattern, of the first pattern group, which is used for a predetermined printing scan of the plural printing scans, is different from an arrangement of print permitting pixels in one mask pattern, of the second pattern group, which is used for the predetermined printing scan, and

*wherein* an arrangement pattern of print permitting pixels obtained by a logical product of the one mask pattern of the first pattern group and the one mask pattern of the second pattern group is aperiodic and has a property in which *an amount of* low frequency components [are fewer] *is less* than *an amount of* high frequency components.

18. A data processing method [for generating image data which is used for plural printing scans of first and second nozzle groups for ejecting ink, relative to a predetermined area of a print medium, said method] comprising:

a first dividing step of dividing *first* image data *indicative of a first image* to be printed on [the] *a* predetermined area *of a print medium* by [the] *a* first nozzle group into a plurality of *divided* image data used for [the] plural printing scans *of the first nozzle group relative to the predetermined area*, by using a first pattern group having plural mask patterns corresponding to the plural printing scans; and a second dividing step of dividing *second* image data *indicative of a second image* to be printed on the predetermined area by [the] *a* second nozzle group into a plurality of *divided* image data used for [the] plural printing scans *of the second nozzle group relative to the predetermined area*, by using a second pattern group having plural mask patterns corresponding to the plural printing scans, wherein an arrangement of print permitting pixels in one mask pattern, of the first pattern group, which is used for a predetermined printing scan of the plural printing scans, is different from an arrangement of print permitting pixels in one mask pattern, of the second pattern group, which is used for the predetermined printing scan, and

*wherein an amount of* low frequency components of an arrangement pattern of print permitting pixels obtained by a logical sum of the one mask pattern of the first pattern group and the one mask pattern of the second pattern group based on a correspondence relationship of the two mask patterns when the two mask patterns are used [are fewer] *is less* than [that] *an amount of low frequency components of another arrangement pattern of print permitting pixels* obtained by a logical sum of the one mask pattern of the first pattern group and the one mask pattern of the second pattern group based on a correspondence relationship different from the correspondence relationship of the two mask patterns when the two mask patterns are used.

19. A data processing method according to claim 18, wherein the arrangement pattern of the print permitting pixels obtained by the logical sum of the one mask pattern of the first pattern group and the one mask pattern of the second pattern group based on a correspondence relationship of the two mask patterns when the two mask patterns are used has properties in which the arrangement pattern is aperiodic and in which the *amount of* low frequency components [are fewer] *is less* than *an amount of* high frequency components.

20. A data processing method [for generating image data which is used for plural printing scans of first and second nozzle groups for ejecting ink, relative to a predetermined area of a print medium, said method] comprising:

a first dividing step of dividing *first* image data *indicative of a first image* to be printed on [the] *a* predetermined area

*of a print medium* by the first nozzle group into a plurality of *divided* image data used for [the] plural printing scans *of the first nozzle group relative to the predetermined area*, by using a first pattern group having plural mask patterns corresponding to the plural printing scans; and a second dividing step of dividing *second* image data *indicative of a second image* to be printed on the predetermined area by [the] *a* second nozzle group into a plurality of *divided* image data used for [the] plural printing scans *of the second nozzle group relative to the predetermined area*, by using a second pattern group having plural mask patterns corresponding to the plural printing scans, wherein an arrangement of print permitting pixels in one mask pattern of the first pattern group, which is used for a predetermined printing scan of the plural printing scans, is different from an arrangement of print permitting pixels in one mask pattern, of the second pattern group, which is used for the predetermined printing scan, and

*wherein an amount of* low frequency components of an arrangement pattern of print permitting pixels obtained by a logical sum of the one mask pattern of the first pattern group and the one mask pattern of the second pattern group at a regular position [are fewer] *is less* than [that] *an amount of low frequency components of an arrangement pattern of print permitting pixels* obtained by a logical sum of the one mask pattern of the first pattern group and the one mask pattern of the second pattern group at a position different from the regular position.

21. A data processing method [for generating image data which is used for plural printing scans of first and second nozzle groups for ejecting ink, relative to a predetermined area of a print medium, said method] comprising:

a first dividing step of dividing *first* image data *indicative of a first image* to be printed on [the] *a* predetermined area *of a print medium* by [the] *a* first nozzle group into a plurality of *divided* image data used for [the] plural printing scans *of the first nozzle group relative to the predetermined area*, by using a first pattern group having plural mask patterns corresponding to the plural printing scans; and a second dividing step of dividing *second* image data *indicative of a second image* to be printed on the predetermined area by [the] *a* second nozzle group into a plurality of *divided* image data used for [the] plural printing scans *of the second nozzle group relative to the predetermined area*, by using a second pattern group having plural mask patterns corresponding to the plural printing scans, wherein an arrangement of print permitting pixels in one mask pattern, of the first pattern group, which is used for a predetermined printing scan of the plural printing scans, is different from an arrangement of print permitting pixels in one mask pattern, of the second pattern group, which is used for the predetermined printing scan, and

*wherein* an arrangement pattern of print permitting pixels obtained by a logical sum of the one mask pattern of the first pattern group and the one mask pattern of the second pattern group based on a correspondence relationship of the two mask patterns when the two mask patterns are used has a property in which *an amount of* low frequency components [are fewer] *is less* than *an amount of* high frequency components.

22. A data processing method [for generating image data which is used for plural printing scans of first and second nozzle groups for ejecting ink, relative to a predetermined area of a print medium, said method] comprising:

a first dividing step of dividing *first* image data *indicative of a first image* to be printed on [the] *a* predetermined area by [the] *a* first nozzle group into a plurality of *divided* image data used for [the] plural printing scans *of the first nozzle group relative to the predetermined area*, by using a first pattern group having plural mask patterns corresponding to the plural printing scans; and a second dividing step of dividing *second* image data *indicative of a second image* to be printed on the predetermined area by [the] *a* second nozzle group into a plurality of *divided* image data used for [the] plural printing scans *of the second nozzle group relative to the predetermined area*, by using a second pattern group having plural mask patterns corresponding to the plural printing scans, wherein an arrangement of print permitting pixels in one mask pattern, of the first pattern group, which is used for a predetermined printing scan of the plural printing scans, is different from an arrangement of print permitting pixels in one mask pattern, of the second pattern group, which is used for the predetermined printing scan, and

*wherein* an arrangement pattern of print permitting pixels obtained by a logical sum of the one mask pattern of the first pattern group and the one mask pattern of the second pattern group is aperiodic and has a property in which *an amount of* low frequency components [are fewer] *is less* than *an amount of* high frequency components.

23. A data processing method [for generating image data which is used for plural printing scans of first and second nozzle groups for ejecting ink, relative to a predetermined area of a print medium, said method] comprising:

a first dividing step of dividing *first* image data *indicative of a first image* to be printed on [the] *a* predetermined area by [the] *a* first nozzle group into a plurality of *divided* image data used for [the] plural printing scans *of the first nozzle group relative to the predetermined area*, by using a first pattern group having plural mask patterns corresponding to the plural printing scans; and a second dividing step of dividing *second* image data *indicative of a second image* to be printed on the predetermined area by [the] *a* second nozzle group into a plurality of *divided* image data used for [the] plural printing scans *of the second nozzle group relative to the predetermined area*, by using a second pattern group having plural mask patterns corresponding to the plural printing scans, wherein an arrangement of print permitting pixels in one mask pattern, of the first pattern group, which is used for a predetermined printing scan of the plural printing scans, is different from an arrangement of print permitting pixels in one mask pattern, of the second pattern group, which is used for the predetermined printing scan,

*wherein an amount of* low frequency components of an arrangement pattern of print permitting pixels obtained by a logical product of the one mask pattern of the first pattern group and the one mask pattern of the second pattern group based on a correspondence relationship of the two mask patterns when the two mask patterns are used [are fewer] *is less* than [that] *an amount of low frequency components of another arrangement pattern of print permitting pixels* obtained by a logical product of the one mask pattern of the first pattern group and the one mask pattern of the second pattern group based on a correspondence relationship different from the correspondence relationship of the two mask patterns when the two mask patterns are used, and

*wherein an amount of* low frequency components of an arrangement pattern of print permitting pixels obtained by a logical sum of the one mask pattern of the first pattern group and the one mask pattern of the second pattern group based on the correspondence relationship of the two mask patterns when the two mask patterns are used [are fewer] *is less* than [that] *an amount of low frequency components of another arrangement pattern of print permitting pixels* obtained by a logical sum of the one mask pattern of the first pattern group and the one mask pattern of the second pattern group based on the correspondence relationship different from the correspondence relationship of the two mask patterns when the two mask patterns are used.

24. A data processing method according to claim 23, wherein the arrangement pattern of the print permitting pixels obtained by the logical product of the one mask pattern of the first pattern group and the one mask pattern of the second pattern group based on the correspondence relationship of the two mask patterns when the two mask patterns are used is aperiodic and has a property in which *the amount of* the low frequency components [are fewer] *is less* than *an amount of* high frequency components, and the arrangement pattern of the print permitting pixels obtained by the logical sum of the one mask pattern of the first pattern group and the one mask pattern of the second pattern group is aperiodic and has a property in which *the amount of* the low frequency components [are fewer] *is less* than [the] *an amount of* high frequency components.

25. A data processing method [for generating image data which is used for plural printing scans of first and second nozzle groups for ejecting ink, relative to a predetermined area of a print medium, said method] comprising:

a first dividing step of dividing *first* image data *indicative of a first image* to be printed on [the] *a* predetermined area by [the] *a* first nozzle group into a plurality of *divided* image data used for [the] plural printing scans *of the first nozzle group relative to the predetermined area*, by using a first pattern group having plural mask patterns corresponding to the plural printing scans; and a second dividing step of dividing *second* image data *indicative of a second image* to be printed on the predetermined area by [the] *a* second nozzle group into a plurality of *divided* image data used for [the] plural printing scans *of the second nozzle group relative to the predetermined area*, by using a second pattern group having plural mask patterns corresponding to the plural printing scans, wherein an arrangement of print permitting pixels in one mask pattern, of the first pattern group, which is used for a predetermined printing scan of the plural printing scans, is different from an arrangement of print permitting pixels in one mask pattern, of the second pattern group, which is used for the predetermined printing scan,

*wherein an amount of* low frequency components of an arrangement pattern of print permitting pixels obtained by a logical product of the one mask pattern of the first pattern group and the one mask pattern of the second pattern group at a regular position [are fewer] *is less* than [that] *an amount of low frequency components of another arrangement pattern of print permitting pixels* obtained by a logical product of the one mask pattern of the first pattern group and the one mask pattern of the second pattern group at a position different from the regular position, and

*wherein an amount of* low frequency components of an arrangement pattern of print permitting pixels obtained by a logical sum of the one mask pattern of the first pattern group and the one mask pattern of the second pattern group at the regular position [are fewer] *is less* than [that] *an amount of low frequency components of another arrangement pattern of print permitting pixels* obtained by a logical sum of the one mask pattern of the first pattern group and the one mask pattern of the second pattern group at the position different from the regular position.

26. A data processing method [for generating image data which is used for plural printing scans of first and second nozzle groups for ejecting ink, relative to a predetermined area of a print medium, said method] comprising:

a first dividing step of dividing *first* image data *indicative of a first image* to be printed on [the] *a* predetermined area by [the] *a* first nozzle group into a plurality of *divided* image data used for [the] plural printing scans *of the first nozzle group relative to the predetermined area*, by using a first pattern group having plural mask patterns corresponding to the plural printing scans; and a second dividing step of dividing *second* image data *indicative of a second image* to be printed on the predetermined area by [the] *a* second nozzle group into a plurality of *divided* image data used for [the] plural printing scans *of the second nozzle group relative to the predetermined area*, by using a second pattern group having plural mask patterns corresponding to the plural printing scans, wherein an arrangement of print permitting pixels in one mask pattern, of the first pattern group, which is used for a predetermined printing scan of the plural printing scans, is different from an arrangement of print permitting pixels in one mask pattern of the second pattern group, which is used for the predetermined printing scan, and

*wherein* an arrangement pattern of print permitting pixels obtained by a logical product of the one mask pattern of the first pattern group and the one mask pattern of the second pattern group based on a correspondence relationship of the two mask patterns when the two mask patterns are used has a property in which *an amount of* low frequency components [are fewer] *is less* than *an amount of* high frequency components and an arrangement pattern of print permitting pixels obtained by a logical sum of the one mask pattern of the first pattern group and the one mask pattern of the second pattern group based on the correspondence relationship of the two mask patterns when the two mask patterns are used has a property in which *an amount of* low frequency components [are fewer] *is less* than *an amount of* high frequency components.

27. A data processing method [for generating image data which is used for plural printing scans of first and second nozzle groups for ejecting ink, relative to a predetermined area of a print medium, said method] comprising:

a first dividing step of dividing *first* image data *indicative of a first image* to be printed on [the] *a* predetermined area *of a print medium* by [the] *a* first nozzle group into a plurality of *divided* image data used for [the] plural printing scans *of the first nozzle group relative to the*

*predetermined area*, by using a first pattern group having plural mask patterns corresponding to the plural printing scans; and a second dividing step of dividing *second* image data *indicative of a second image* to be printed on the predetermined area by [the] *a* second nozzle group into a plurality of *divided* image data used for [the] plural printing scans *of the second nozzle group relative to the predetermined area*, by using a [first] *second* pattern group having plural mask patterns corresponding to the plural printing scans, wherein an arrangement of print permitting pixels in one mask pattern, of the first pattern group, which is used for a predetermined printing scan of the plural printing scans, is different from an arrangement of print permitting pixels in one mask pattern, of the second pattern group, which is used for the predetermined printing scan, and

*wherein* an arrangement pattern of print permitting pixels obtained by a logical product of the one mask pattern of the first pattern group and the one mask pattern of the second pattern group is aperiodic and has a property in which *an amount of* low frequency components [are fewer] *is less* than *an amount of* high frequency components and an arrangement pattern of print permitting pixels obtained by a logical sum of the one mask pattern of the first pattern group and the one mask pattern of the second pattern group is aperiodic and has a property in which *an amount of* low frequency components [are fewer] *is less* than *an amount of* high frequency components.

[28. A printing apparatus for printing an image on a predetermined area of a print medium by plural printing scans of first and second nozzle groups for ejecting ink, relative to the predetermined area, said apparatus comprising:

a first dividing unit configured to divide first image data indicative of a first image to be printed on the a predetermined area of a print medium by the a first nozzle group into a plurality of divided image data used for the plural printing scans of the first nozzle group relative to the predetermined area, by using a first pattern group having plural mask patterns corresponding to the plural printing scans; and a second dividing unit configured to divide second image data indicative of a second image to be printed on the predetermined area by the a second nozzle group into a plurality of divided image data used for the plural printing scans of the second nozzle group relative to the predetermined area, by using a second pattern group having plural mask patterns corresponding to the plural printing scans, wherein an arrangement of print permitting pixels in one mask pattern, of the first pattern group, which is used for a predetermined printing scan of the plural printing scans, is different from an arrangement of print permitting pixels in one mask pattern, of the second pattern group, which is used for the predetermined printing scan, and wherein an arrangement pattern of print permitting pixels obtained by a logical product of the one mask pattern of the first pattern group and the one mask pattern of the second pattern group based on a correspondence relationship of the two mask patterns when the two mask patterns are used for printing has a property in which an amount of low frequency components are fewer is less than an amount of high frequency components.]

29. A printing apparatus [for printing an image on a predetermined area of a print medium by plural printing scans of first and second nozzle groups for ejecting ink, relative to the predetermined area, said apparatus] comprising:

a first dividing unit configured to divide *first* image data *indicative of a first image* to be printed on [the] *a* predetermined area *of a print medium* by [the] *a* first nozzle group into a plurality of *divided* image data used for [the] plural printing scans *of the first nozzle group relative to the predetermined area*, by using a first pattern group having plural mask patterns corresponding to the plural printing scans; and a second dividing unit configured to divide *second* image data *indicative of a second image* to be printed on the predetermined area by [the] *a* second nozzle group into a plurality of *divided* image data used for [the] plural printing scans *of the second nozzle group relative to the predetermined area*, by using a second pattern group having plural mask patterns corresponding to the plural printing scans, wherein an arrangement of print permitting pixels in one mask pattern, of the first pattern group, which is used for a predetermined printing scan of the plural printing scans, is different from an arrangement of print permitting pixels in one mask pattern, of the second pattern group, which is used for the predetermined printing scan, and

*wherein* an arrangement pattern of print permitting pixels obtained by a logical sum of the one mask pattern of the first pattern group and the one mask pattern of the second pattern group based on a correspondence relationship of the two mask patterns when the two mask patterns are used for printing has a property in which *an amount of* low frequency components [are fewer] *is less* than *an amount of* high frequency components.

30. A printing apparatus [for printing an image on a predetermined area of a print medium by plural printing scans of first and second nozzle groups for ejecting ink, relative to the predetermined area, said apparatus] comprising:

a first dividing unit configured to divide *first* image data *indicative of a first image* to be printed on [the] *a* predetermined area *of a print medium* by [the] *a* first nozzle group into a plurality of *divided* image data used for [the] plural printing scans *of the first nozzle group relative to the predetermined area*, by using a first pattern group having plural mask patterns corresponding to the plural printing scans; and a second dividing unit configured to divide *second* image data *indicative of a second image* to be printed on the predetermined area by [the] *a* second nozzle group into a plurality of *divided* image data used for [the] plural printing scans *of the second nozzle group relative to the predetermined area*, by using a second pattern group having plural mask patterns corresponding to the plural printing scans, wherein an arrangement of print permitting pixels in one mask pattern, of the first pattern group, which is used for a predetermined printing scan of the plural printing scans, is different from an arrangement of print permitting pixels in one mask pattern, of the second pattern group, which is used for the predetermined printing scan, and

*wherein* an arrangement pattern of print permitting pixels obtained by a logical sum of the one mask pattern of the first pattern group and the one mask pattern of the second pattern group is aperiodic and has a property in which *an*

*amount of* low frequency components [are fewer] *is less* than *an amount of* high frequency components.

31. A printing apparatus [for printing an image on a predetermined area of a print medium by plural printing scans of first and second nozzle groups for ejecting ink, relative to the predetermined area, said apparatus] comprising:

a first dividing unit configured to divide *first* image data *indicative of a first image* to be printed on [the] *a* predetermined area *of a print medium* by [the] *a* first nozzle group into a plurality of *divided* image data used for [the] plural printing scans *of the first nozzle group relative to the predetermined area*, by using a first pattern group having plural mask patterns corresponding to the plural printing scans; and a second dividing unit configured to divide *second* image data *indicative of a second image* to be printed on the predetermined area by [the] *a* second nozzle group into a plurality of *divided* image data used for [the] plural printing scans *of the second nozzle group relative to the predetermined area*, by using a second pattern group having plural mask patterns corresponding to the plural printing scans, wherein an arrangement of print permitting pixels in one mask pattern, of the first pattern group, which is used for a predetermined printing scan of the plural [panting] *printing* scans, is different from an arrangement of print permitting pixels in one mask pattern, of the second pattern group, which is used for the predetermined printing scan, and

*wherein an amount of* low frequency components of an arrangement pattern of print permitting pixels obtained by a logical product of the one mask pattern of the first pattern group and the one mask pattern of the second pattern group based on a correspondence relationship of the two mask patterns when the two mask patterns are used for printing [are fewer] *is less* than [that] *an amount of low frequency components of another arrangement pattern of print permitting pixels* obtained by a logical product of the one mask pattern of the first pattern group and the one mask pattern of the second pattern group based on a correspondence relationship different from the correspondence relationship of the two mask patterns when the two mask patterns are used for printing.

32. A printing apparatus according to claim 31, wherein a printing head has N (N is an integer equal to or greater than 2) nozzle groups including the first nozzle group and the second nozzle group, and N mask patterns corresponding to the N nozzle groups are used to generate N thinned images that are successively printed in the predetermined area.

33. A printing apparatus [for printing an image on a predetermined area of a print medium by plural printing scans of first and second nozzle groups for ejecting ink, relative to the predetermined area, said apparatus] comprising:

a first dividing unit configured to divide *first* image data *indicative of a first image* to be printed on [the] *a* predetermined area *of a print medium* by [the] *a* first nozzle group into a plurality of *divided* image data used for [the] plural printing scans *of the first nozzle group relative to the predetermined area*, by using a first pattern group having plural mask patterns corresponding to the plural printing scans; and a second dividing unit configured to divide *second* image data *indicative of a second image* to be printed on the predetermined area by [the] *a* second nozzle group into a plurality of *divided* image data used for [the] plural printing scans *of the second nozzle group relative to the predetermined area*, by using a second pattern group having plural mask patterns corresponding to the plural printing scans, wherein an arrangement of print permitting pixels in one mask pattern, of the first pattern group, which is used for a predetermined printing scan of the plural printing scans, is different from an arrangement of print permitting pixels in one mask pattern, of the second pattern group, which is used for the predetermined printing scan, and

*wherein an amount of* low frequency components of an arrangement pattern of print permitting pixels obtained by a logical sum of the one mask pattern of the first pattern group and the one mask pattern of the second pattern group based on a correspondence relationship of the two mask patterns when the two mask patterns are used for printing [are fewer] *is less* than [that] *an amount of low frequency components of another arrangement pattern of print permitting pixels* obtained by a logical sum of the one mask pattern of the first pattern group and the one mask pattern of the second pattern group based on a correspondence relationship different from the correspondence relationship of the two mask patterns when the two mask patterns are used for printing.

34. A printing apparatus [for printing an image on a predetermined area of a print medium by plural printing scans of first and second nozzle groups for ejecting ink, relative to the predetermined area, said apparatus] comprising:

a first dividing unit configured to divide *first* image data *indicative of a first image* to be printed on [the] *a* predetermined area *of a print medium* by [the] *a* first nozzle group into a plurality of *divided* image data used for [the] plural printing scans *of the first nozzle group relative to the predetermined area*, by using a first pattern group having plural mask patterns corresponding to the plural printing scans; and a second dividing unit configured to divide *second* image data *indicative of a second image* to be printed on the predetermined area by [the] *a* second nozzle group into a plurality of *divided* image data used for [the] plural printing scans *of the second nozzle group relative to the predetermined area*, by using a second pattern group having plural mask patterns corresponding to the plural printing scans, wherein an arrangement of print permitting pixels in one mask pattern, of the first pattern group, which is used for a predetermined printing scan of the plural printing scans, is different from an arrangement of print permitting pixels in one mask pattern, of the second pattern group, which is used for the predetermined printing scan,

*wherein an amount of* low frequency components of an arrangement pattern of print permitting pixels obtained by a logical product of the one mask pattern of the first pattern group and the one mask pattern of the second pattern group based on a correspondence relationship of the two mask patterns when the two mask patterns are used for printing [are fewer] *is less* than [that] *an amount of low frequency components of another arrangement pattern of print permitting pixels* obtained by a logical product of the one mask pattern of the first pattern group and the one mask pattern of the second pattern group based on a correspondence relationship different from the correspondence relationship of the two mask patterns when the two mask patterns are used for printing, and

*wherein an amount of* low frequency components of an arrangement pattern of print permitting pixels obtained by a logical sum of the one mask pattern of the first pattern group and the one mask pattern of the second pattern group based on [a] *the* correspondence relationship of the two mask patterns when the two mask patterns are used for printing [are fewer] *is less* than [that] *an amount of low frequency components of another arrangement pattern of print permitting pixels* obtained by a logical sum of the one mask pattern of the first pattern group and the one mask pattern of the second pattern group based on a correspondence relationship different from the correspondence relationship of the two mask patterns when the two mask patterns are used for printing.

35. A printing apparatus [for printing an image on a predetermined area of a print medium by plural printing scans of first and second nozzle groups for ejecting ink, relative to the predetermined area, said apparatus] comprising:

a first dividing unit configured to divide *first* image data *indicative of a first image* to be printed on [the] *a* predetermined area *of a print medium* by [the] *a* first nozzle group into a plurality of *divided* image data used for [the] plural printing scans *of the first nozzle group relative to the predetermined area*, by using a first pattern group having plural mask patterns corresponding to the plural printing scans; and a second dividing unit configured to divide *second* image data *indicative of a second image* to be printed on the predetermined area by [the] *a* second nozzle group into a plurality of *divided* image data used for [the] plural printing scans *of the second nozzle group relative to the predetermined area*, by using a second pattern group having plural mask patterns corresponding to the plural printing scans, wherein an arrangement of print permitting pixels in one mask pattern of the first pattern group, which is used for a predetermined printing scan of the plural printing scans, is different from an arrangement of print permitting pixels in one mask pattern of the second pattern group, which is used for the predetermined printing scan, and

*wherein* an arrangement pattern of print permitting pixels obtained by a logical product of the one mask pattern of the first pattern group and the one mask pattern of the second pattern group is aperiodic and has a property in which *an amount of* low frequency components [are fewer] *is less* than *an amount of* high frequency components.

36. A data processing apparatus [for generating image data which is used for plural printing scans of first and second nozzle groups for ejecting ink, relative to a predetermined area of a print medium,] comprising:

a first dividing unit configured to divide *first* image data *indicative of a first image* to be printed on [the] *a* predetermined area *of a print medium* by [the] *a* first nozzle group into a plurality of *divided* image data used for [the] plural printing scans *of the first nozzle group relative to the predetermined area*, by using a first pattern group having plural mask patterns corresponding to the plural printing scans; and a second dividing unit configured to divide *second* image data *indicative of a second image* to be printed on the predetermined area by [the] *a* second nozzle group into a plurality of *divided* image data used for [the] plural printing scans *of the second nozzle group relative to the predetermined area*, by using a second pattern group having plural mask patterns corresponding to the plural printing scans, wherein an arrangement of print permitting pixels in one mask pattern, of the first pattern group, which is used for a predetermined printing scan of the plural printing scans, is different from an arrangement of print permitting pixels in one mask pattern, of the second pattern group, which is used for the predetermined printing scan, and

*wherein an amount of* low frequency components of an arrangement pattern of print permitting pixels obtained by a logical product of the one mask pattern of the first pattern group and the one mask pattern of the second pattern group based on a correspondence relationship of the two mask patterns when the two mask patterns are used [are fewer] *is less* than [that] *an amount of low frequency components of another arrangement pattern of print permitting pixels* obtained by a logical product of the one mask pattern of the first pattern group and the one mask pattern of the second pattern group based on a correspondence relationship different from the correspondence relationship of the two mask patterns when the two mask patterns are used.

37. A data processing apparatus [for generating image data which is used for plural printing scans of first and second nozzle groups for ejecting ink, relative to a predetermined area of a print medium,] comprising:

a first dividing unit configured to divide *first* image data *indicative of a first image* to be printed on [the] *a* predetermined area *of a print medium* by [the] *a* first nozzle group into a plurality of *divided* image data used for [the] plural printing scans *of the first nozzle group relative to the predetermined area*, by using a first pattern group having plural mask patterns corresponding to the plural printing scans; and a second dividing unit configured to divide *second* image data *indicative of a second image* to be printed on the predetermined area by [the] *a* second nozzle group into a plurality of *divided* image data used for [the] plural printing scans *of the second nozzle group relative to the predetermined area*, by using a second pattern group having plural mask patterns corresponding to the plural printing scans, wherein an arrangement of print permitting pixels in one mask pattern, of the first pattern group, which is used for a predetermined printing scan of the plural printing scans, is different from an arrangement of print permitting pixels in one mask pattern, of the second pattern group, which is used for the predetermined printing scan, and

*wherein* an arrangement pattern of print permitting pixels obtained by a logical product of the one mask pattern of the first pattern group and the one mask pattern of the second pattern group based on a correspondence relationship of the two mask patterns when the two mask patterns are used has a property in which *an amount of* low frequency components [are fewer] *is less* than *an amount of* high frequency components.

38. A data processing apparatus [for generating image data which is used for plural printing scans of first and second nozzle groups for ejecting ink, relative to a predetermined area of a print medium,] comprising:

a first dividing unit configured to divide *first* image data *indicative of a first image* to be printed on [the] *a* predetermined area by [the] *a* first nozzle group into a plurality of *divided* image data used for [the] plural printing scans

*of the first nozzle group relative to the predetermined area*, by using a first pattern group having plural mask patterns corresponding to the plural printing scans; and a second dividing unit configured to divide *second* image data *indicative of a second image* to be printed on the predetermined area by [the] *a* second nozzle group into a plurality of *divided* image data used for [the] plural printing scans *of the second nozzle group relative to the predetermined area*, by using a second pattern group having plural mask patterns corresponding to the plural printing scans, wherein an arrangement of print permitting pixels in one mask pattern, of the first pattern group, which is used for a predetermined printing scan of the plural printing scans, is different from an arrangement of print permitting pixels in one mask pattern, of the second pattern group, which is used for the predetermined printing scan, and

*wherein an amount of* low frequency components of an arrangement pattern of print permitting pixels obtained by a logical sum of the one mask pattern of the first pattern group and the one mask pattern of the second pattern group based on a correspondence relationship of the two mask patterns when the two mask patterns are used [are fewer] *is less* than [that] *an amount of low frequency components of another arrangement pattern of print permitting pixels* obtained by a logical sum of the one mask pattern of the first pattern group and the one mask pattern of the second pattern group based on a correspondence relationship different from the correspondence relationship of the two mask patterns when the two mask patterns are used.

39. A data processing apparatus [for generating image data which is used for plural printing scans of first and second nozzle groups for ejecting ink, relative to a predetermined area of a print medium,] comprising:

a first dividing unit configured to divide *first* image data *indicative of a first image* to be printed on [the] *a* predetermined area *of a print medium* by [the] *a* first nozzle group into a plurality of *divided* image data used for [the] plural printing scans *of the first nozzle group relative to the predetermined area*, by using a first pattern group having plural mask patterns corresponding to the plural printing scans; and a second dividing unit configured to divide *second* image data *indicative of a second image* to be printed on the predetermined area by [the] *a* second nozzle group into a plurality of *divided* image data used for [the] plural printing scans *of the second nozzle group relative to the predetermined area*, by using a second pattern group having plural mask patterns corresponding to the plural printing scans, wherein an arrangement of print permitting pixels in one mask pattern, of the first pattern group, which is used for a predetermined printing scan of the plural printing scans, is different from an arrangement of print permitting pixels in one mask pattern, of the second pattern group, which is used for the predetermined printing scan, and

*wherein* an arrangement pattern of print permitting pixels obtained by a logical sum of the one mask pattern of the first pattern group and the one mask pattern of the second pattern group based on a correspondence relationship of the two mask patterns when the two mask patterns are used has a property in which *an amount of* low frequency components [are fewer] *is less* than *an amount of* high frequency components.

40. A printing apparatus [for printing an image on a predetermined area of a print medium by plural printing scans of first and second nozzle groups for ejecting ink, relative to the predetermined area, said apparatus] comprising:

a first dividing unit configured to divide *first* image data *indicative of a first image* to be printed on [the] *a* predetermined area *of a print medium* by [the] *a* first nozzle group into a plurality of *divided* image data used for [the] plural printing scans *of the first nozzle group relative to the predetermined area*, by using a first pattern group having plural mask patterns corresponding to the plural printing scans; and a second dividing unit configured to divide *second* image data *indicative of a second image* to be printed on the predetermined area by [the] *a* second nozzle group into a plurality of *divided* image data used for [the] plural printing scans *of the second nozzle group relative to the predetermined area*, by using a second pattern group having plural mask patterns corresponding to the plural printing scans, wherein an arrangement of print permitting pixels in one mask pattern of the first pattern group, which is used for a predetermined printing scan of the plural printing scans, is different from an arrangement of print permitting pixels in one mask pattern of the second pattern group, which is used for the predetermined printing scan, and

*wherein* an arrangement pattern of print permitting pixels obtained by a logical product of the one mask pattern of the first pattern group and the one mask pattern of the second pattern group has a property in which *an amount of* low frequency components [are fewer] *is less* than *an amount of* high frequency components.

41. A printing apparatus [for printing an image on a predetermined area of a print medium by plural printing scans of first and second nozzle groups for ejecting ink, relative to the predetermined area, said apparatus] comprising:

a first dividing unit configured to divide *first* image data *indicative of a first image* to be printed on [the] *a* predetermined area *of a print medium* by [the] *a* first nozzle group into a plurality of *divided* image data used for [the] plural printing scans *of the first nozzle group relative to the predetermined area*, by using a first pattern group having plural mask patterns corresponding to the plural printing scans; and a second dividing unit configured to divide *second* image data *indicative of a second image* to be printed on the predetermined area by [the] *a* second nozzle group into a plurality of *divided* image data used for [the] plural printing scans *of the second nozzle group relative to the predetermined area*, by using a second pattern group having plural mask patterns corresponding to the plural printing scans, wherein an arrangement of print permitting pixels in one mask pattern of the first pattern group, which is used for a predetermined printing scan of the plural printing scans, is different from an arrangement of print permitting pixels in one mask pattern of the second pattern group, which is used for the predetermined printing scan, and

*wherein* an arrangement pattern of print permitting pixels obtained by a logical sum of the one mask pattern of the first pattern group and the one mask pattern of the second pattern group has a property in which *an amount of* low frequency components [are fewer] *is less* than *an amount of* high frequency components.

*42. A data processing apparatus according to claim 37, wherein the first nozzle group ejects a first color of ink and the second nozzle group ejects a second color of ink, with the second color being different from the first color.*

*43. A data processing method according to claim 16, wherein the first nozzle group ejects a first color of ink and the second nozzle group ejects a second color of ink, with the second color being different from the first color.*

*44. A data processing apparatus according to claim 37, wherein the amount of low frequency components of the arrangement pattern of print permitting pixels obtained by a logical product of the one mask pattern of the first pattern group and the one mask pattern of the second pattern group based on the correspondence relationship of the two mask patterns when the two mask patterns are used is less than an amount of low frequency components of another arrangement pattern of print permitting pixels obtained by a logical product of the one mask pattern of the first pattern group and the one mask pattern of the second pattern group based on a correspondence relationship different from the correspondence relationship of the two mask patterns when the two mask patterns are used.*

*45. A data processing apparatus according to claim 44, wherein an arrangement pattern of print permitting pixels obtained by a logical sum of the one mask pattern of the first pattern group and the one mask pattern of the second pattern group based on a correspondence relationship of the two mask patterns when the two mask patterns are used has a property in which an amount of low frequency components is less than an amount of high frequency components.*

*46. A data processing apparatus according to claim 37, wherein an arrangement pattern of print permitting pixels obtained by a logical sum of the one mask pattern of the first pattern group and the one mask pattern of the second pattern group based on a correspondence relationship of the two mask patterns when the two mask patterns are used has a property in which an amount of low frequency components is less than an amount of high frequency components.*

*47. A data processing apparatus according to claim 37, further comprising a printing head that includes the first and second nozzle groups and which is used for performing printing based on the plurality of divided image data obtained by dividing by the first dividing unit and the plurality of divided image data obtained by dividing by the second dividing unit.*

*48. A data processing apparatus according to claim 47, further comprising a scan unit configure to perform scanning by the printing head for performing the plural printing scans of the first and second nozzle groups for ejecting ink.*

*49. A data processing apparatus according to claim 48, further comprising a conveying unit configured to convey the print medium.*

*50. A data processing apparatus according to claim 36, further comprising a printing head that includes the first and second nozzle groups and which is used for performing printing based on the plurality of divided image data obtained by dividing by the first dividing unit and the plurality of divided image data obtained by dividing by the second dividing unit.*

*51. A data processing apparatus according to claim 38, further comprising a printing head that includes the first and second nozzle groups and which is used for performing printing based on the plurality of divided image data obtained by dividing by the first dividing unit and the plurality of divided image data obtained by dividing by the second dividing unit.*

*52. A data processing apparatus according to claim 39, further comprising a printing head that includes the first and second nozzle groups and which is used for performing printing based on the plurality of divided image data obtained by dividing by the first dividing unit and the plurality of divided image data obtained by dividing by the second dividing unit.*

* * * * *